United States Patent
Ying et al.

(10) Patent No.: US 12,540,143 B2
(45) Date of Patent: Feb. 3, 2026

(54) METHODS AND COMPOSITIONS FOR TARGETED PROTEIN DEGRADATION

(71) Applicant: Ranok Therapeutics (Hangzhou) Co. Ltd., Zhejiang (CN)

(72) Inventors: Weiwen Ying, Lexington, MA (US); Long Ye, Shanghai (CN); Kevin Foley, Waltham, MA (US)

(73) Assignee: Ranok Therapeutics (Hangzhou) Co. Ltd., Zhejiang (CN)

( * ) Notice: Subject to any disclaimer, the term of this patent is extended or adjusted under 35 U.S.C. 154(b) by 973 days.

(21) Appl. No.: 17/602,345

(22) PCT Filed: Apr. 8, 2020

(86) PCT No.: PCT/CN2020/083647
§ 371 (c)(1),
(2) Date: Oct. 8, 2021

(87) PCT Pub. No.: WO2020/207395
PCT Pub. Date: Oct. 15, 2020

(65) Prior Publication Data
US 2022/0162228 A1 May 26, 2022

(30) Foreign Application Priority Data
Apr. 9, 2019 (WO) ................ PCT/CN2019/081919

(51) Int. Cl.
| | |
|---|---|
| *C07D 495/14* | (2006.01) |
| *A61K 31/551* | (2006.01) |
| *A61K 47/54* | (2017.01) |
| *A61P 35/00* | (2006.01) |

(52) U.S. Cl.
CPC .......... *C07D 495/14* (2013.01); *A61K 31/551* (2013.01); *A61K 47/545* (2017.08); *A61P 35/00* (2018.01)

(58) Field of Classification Search
CPC ..... C07D 495/14; A61P 35/00; A61K 47/545; A61K 31/551
See application file for complete search history.

(56) References Cited

U.S. PATENT DOCUMENTS

| | | |
|---|---|---|
| 9,597,343 B2 | 3/2017 | Chimmanamada et al. |
| 2012/0108589 A1 | 5/2012 | Kitade et al. |
| 2017/0008888 A1 | 1/2017 | Hu et al. |
| 2018/0015087 A1 | 1/2018 | Liu et al. |
| 2019/0151457 A1 | 5/2019 | Bradner et al. |
| 2019/0270743 A1 | 9/2019 | Marx et al. |
| 2019/0315753 A1 | 10/2019 | Ferguson et al. |
| 2019/0343838 A1 | 11/2019 | Allen et al. |
| 2022/0168427 A1 | 6/2022 | Ying et al. |
| 2023/0391772 A1 | 12/2023 | Ying et al. |
| 2024/0124460 A1 | 4/2024 | Ying et al. |

FOREIGN PATENT DOCUMENTS

| | | | |
|---|---|---|---|
| CA | 2988414 A1 | 12/2016 | |
| CN | 108084193 A | 5/2018 | |
| CN | 108129484 A | 6/2018 | |
| JP | 2012-510442 A | 5/2012 | |
| JP | 2016-512812 A | 5/2016 | |
| JP | 2018-502097 A | 1/2018 | |
| WO | 1998/51702 A1 | 11/1998 | |
| WO | 2009/055077 A1 | 4/2009 | |
| WO | 2010/080712 A2 | 7/2010 | |
| WO | 2012/075456 A1 | 6/2012 | |
| WO | 2012/149493 A2 | 11/2012 | |
| WO | WO-2013158644 A2 * | 10/2013 | ........... A61K 31/185 |
| WO | 2014/128070 A1 | 8/2014 | |
| WO | 2014/128111 A1 | 8/2014 | |
| WO | 2014/145909 A2 | 9/2014 | |
| WO | 2014/160430 A1 | 10/2014 | |

(Continued)

OTHER PUBLICATIONS

Ferguson et al., Synthesis and Structure-Activity Relationships of DCLK1 Kinase Inhibitors Based on a 5,11-Dihydro-6H-benzo[e]pyrimido[5,4-b][1,4]diazepin-6-one Scaffold. J Med Chem. 2020;63(14):7817-7826.

(Continued)

*Primary Examiner* — Jeffrey S Lundgren
*Assistant Examiner* — W. Justin Youngblood
(74) *Attorney, Agent, or Firm* — McCarter & English, LLP; Michael J. DeGrazia

(57) ABSTRACT

Provided are compounds of Formula I:

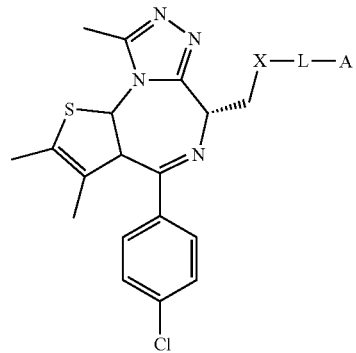

and pharmaceutically acceptable salts and compositions thereof, which are useful for treating cancers and related conditions.

34 Claims, 6 Drawing Sheets

(56) References Cited

FOREIGN PATENT DOCUMENTS

| WO | 2015/038649 | A1 | 3/2015 | |
|---|---|---|---|---|
| WO | 2015/070091 | A1 | 5/2015 | |
| WO | 2015/117083 | A1 | 8/2015 | |
| WO | 2015/143004 | A1 | 9/2015 | |
| WO | 2015/184246 | A1 | 12/2015 | |
| WO | WO-2016105518 | A1 * | 6/2016 | ............ A61P 35/02 |
| WO | 2017/007612 | A1 | 1/2017 | |
| WO | 2017/024317 | A2 | 2/2017 | |
| WO | 2017/201449 | A1 | 11/2017 | |
| WO | 2018/051107 | A1 | 3/2018 | |
| WO | 2018/144649 | A1 | 8/2018 | |
| WO | 2018/148440 | A1 | 8/2018 | |
| WO | 2019/118830 | A1 | 6/2019 | |
| WO | 2019/195609 | A2 | 10/2019 | |
| WO | 2020/207395 | A1 | 10/2020 | |
| WO | 2021/051034 | A1 | 3/2021 | |
| WO | 2021/061894 | A1 | 4/2021 | |

OTHER PUBLICATIONS

Wang et al., Structural and Atropisomeric Factors Governing the Selectivity of Pyrimido-benzodiazipinones as Inhibitors of Kinases and Bromodomains. ACS Chem Biol. 2018;13(9):2438-2448.

International Search Report and Written Opinion for Application No. PCT/CN2021/123366, dated Jan. 17, 2022, 17 pages.

An et al., Small-molecule PROTACs: An emerging and promising approach for the development of targeted therapy drugs. EBioMedicine. Oct. 2018;36:553-562.

Naro et al., Optical Control of Small Molecule-Induced Protein Degradation. J Am Chem Soc. Feb. 5, 2020;142(5):2193-2197.

International Search Report and Written Opinion for Application No. PCT/CN2020/083647, dated Jul. 8, 2020, 10 pages.

International Search Report and Written Opinion for Application No. PCT/CN2020/083648, dated Jul. 8, 2020, 9 pages.

Collins et al., Chemical approaches to targeted protein degradation through modulation of the ubiquitin-proteasome pathway. Biochem J. Mar. 15, 2017;474(7):1127-1147.

Flygare et al., Discovery of a potent small-molecule antagonist of inhibitor of apoptosis (IAP) proteins and clinical candidate for the treatment of cancer (GDC-0152). J Med Chem. May 10, 2012;55(9):4101-13.

Li et al., Analogs of the Allosteric Heat Shock Protein 70 (Hsp70) Inhibitor, MKT-077, as Anti-Cancer Agents. ACS Med Chem Lett. Nov. 14, 2013;4(11):1042-1047.

International Search Report and Written Opinion for Application No. PCT/CN2021/123660, dated Jan. 14, 2022, 18 pages.

* cited by examiner

METHODS AND COMPOSITIONS FOR TARGETED PROTEIN DEGRADATION

RELATED APPLICATIONS

This application is a 35 U.S.C. § 371 national stage filing of International Application No. PCT/CN2020/083647, filed on Apr. 8, 2020, which claims priority to International Application No. PCT/CN2019/081919, filed on Apr. 9, 2019. The entire contents of each of the aforementioned applications are incorporated herein.

BACKGROUND

Protein homeostasis, or proteostasis, refers to the ability of cells to properly regulate the synthesis, folding, trafficking and degradation of cellular proteins. Properly regulated protein degradation is required for the normal functioning of cells, including their proliferation, differentiation and death, and is often dysregulated in cancers and other diseases.

The ubiquitin-proteasome system (UPS) is one of the major pathways in cells that mediates the disposal and metabolic recycling of proteins (Yu and Matouschek, Annu Rev Biophys, 2017, 46:149-173; Navon and Ciechanover, J Biol Chem, 2009, 284:33713-33718). Ubiquitin is a 76 amino acid-residue protein that is ubiquitously expressed. With respect to protein degradation by the UPS, the process of ubiquitination occurs when a ubiquitin is attached to a lysine amino acid residue in a substrate protein, which involves a series of enzymatic steps. First, ubiquitin is transferred to an E1 ubiquitin-activating enzyme. Second, activated ubiquitin is transferred from the E1 to an E2 ubiquitin-conjugating enzyme. And third, one of the several hundred different E3 ubiquitin ligase enzymes links the ubiquitin to a lysine residue in a substrate protein. Repetition of this enzymatic process results in tagging substrate proteins with polyubiquitin chains which are then delivered to the proteasome, a large multi-subunit complex that degrades ubiquitin-tagged proteins. The ability of some cellular chaperone proteins and chaperone complexes to direct proteins towards the UPS is facilitated by their direct interaction with E3 ubiquitin ligases (Amm et al., Biochim Biophys Acta, 2014, 1843:182-196; Taipale et al., Cell, 2012, 150:987-1001). In addition to protein degradation, the ubiquitination of proteins can also regulate other processes, such as the subcellular localization, activity and protein-protein interactions of substrates.

Chemically induced, targeted protein degradation has emerged as a new modality for small molecule drug development. A small molecule can be used to promote the interaction of a target protein or proteins with a component of various cellular protein degradation pathways, there by inducing the degradation of the targeted protein or proteins as a way to treat disease.

In particular, proteolysis-targeting chimeras (PROTACs) are an example of such small molecules that purposely induce protein degradation of specific proteins by coopting the UPS (Burslem and Crews, Cell, 2020, 181:102-114; Pettersson and Crews, Drug Discov Today Technol, 2019, 31:15-27). PROTAC molecules are bifunctional small molecules that simultaneously bind to a target protein or proteins and an E3 ubiquitin ligase. The induced proximity of the target protein(s) and the E3 ligase causes the ubiquitination and subsequent degradation of the target protein(s) by the proteasome). Although PROTACs that incorporate target protein binders that promiscuously bind to multiple proteins can often degrade multiple proteins, in some cases charge repulsion and steric clashing between individual targets and an E3 ligase can increase the observed selectivity of degradation (Pettersson and Crews, Drug Discov Today Technol, 2019, 31:15-27; Bondeson et al, Cell Chem Biol, 2018, 25:78-87; Gadd et al., Nat Chem Biol, 2017, 13:514-521; Zengerle et al., ACS Chem Biol, 2015, 10:1770-1777).

AUTAC technology follows a similar principle of induced proximity, but targets proteins for degradation via autophagy (Daiki et al., Mol Cell, 2019, 76:797-810). However, some disadvantages are associated with current targeted protein degradation technologies. These include the promiscuous degradation of the target protein in many tissues and organs, not just the tissue and organ where the target protein is involved in a disease process, which is expected to result in unwanted side effects of treatment. Also, resistance to a PROTAC can develop through mutations in components of the UPS such as E3 ligases (Ottis et al., ACS Chem Biol, 2019, 14:2215-2223; Zhang et al., Mol Cancer Ther, 2019, 18:1302-1311), resulting in loss of therapeutic efficacy. As such, a need exists for improved/alternative methods and compositions for targeted protein degradation.

SUMMARY

The present disclosure provides tumor-targeted protein degradation chimeras (T-PEACHs) comprising a first moiety that is capable of binding to a target protein (e.g., BRD4) or proteins and a second moiety that is capable of binding a chaperone protein or protein component of a chaperone complex. Such T-PEACH compounds include those having the Formula I:

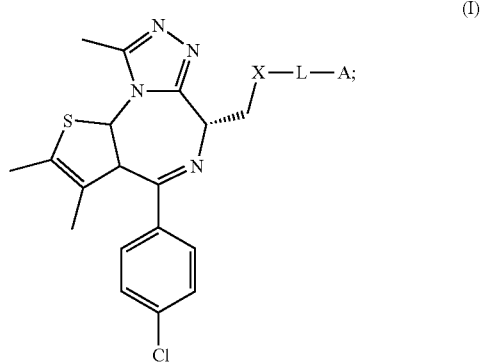

and pharmaceutically acceptable salts thereof, wherein X, L, and A are as defined herein.

Compositions comprising the disclosed compounds of Formula I as well as methods for their manufacture are also provided. In one aspect, the disclosed compounds induce targeted oncogenic protein degradation in a tumor-selective fashion and are useful in the treatment of cancer and related conditions.

DETAILED DESCRIPTION

1. General Description of Compounds

Figure 1:
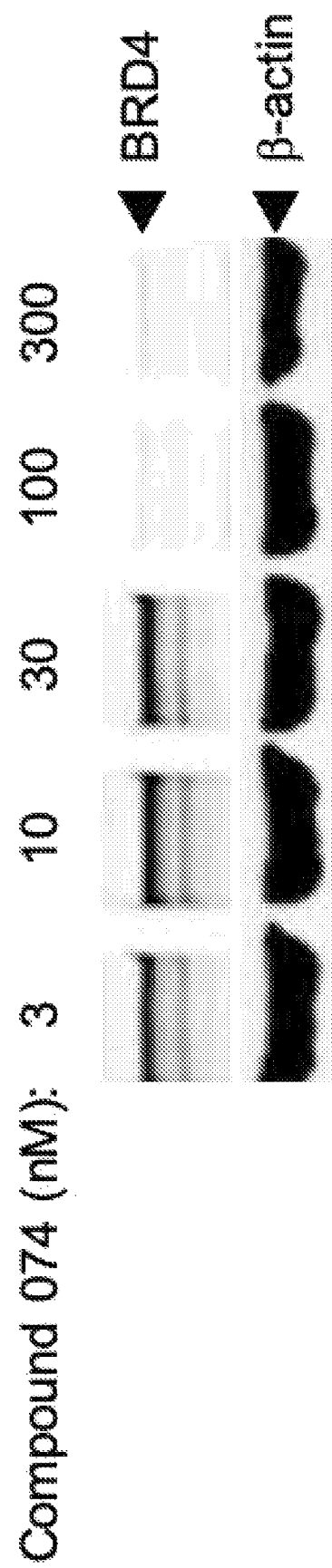
FIG. 1 shows a western blot of BRD4 degradation induced by compound 074.

Provided herein are T-PEACH compounds having the Formula I:

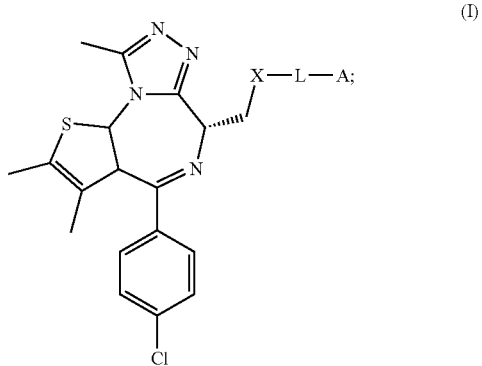

(I)

or a pharmaceutically acceptable salt thereof, wherein
X is C(O) or $(C_1-C_4)$alkylene;
A is

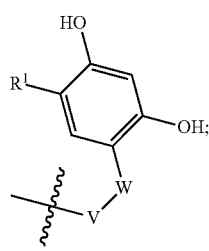

W is 5- or 6-membered heteroaryl optionally substituted with 1 to 3 groups selected from $R^2$;
V is phenyl or 5- to 9-membered heteroaryl optionally substituted with 1 to 3 groups selected from $R^3$;
$R^1$ is halo, $(C_1-C_4)$alkyl, halo$(C_1-C_4)$alkyl, $(C_1-C_4)$alkoxy, or halo$(C_1-C_4)$alkoxy;
$R^2$ is $(C_1-C_4)$alkyl, halo$(C_1-C_4)$alkyl, $(C_2-C_6)$alkenyl, halo$(C_2-C_6)$alkenyl, $(C_2-C_6)$alkynyl, halo$(C_2-C_6)$alkynyl, CN, —$C_{1-4}$alkylO$R^a$, —O$R^a$, —C(O)$R^a$, —C(O)O$R^a$, —C(O)N$R^aR^b$, —C(O)N$R^a(C_{1-4}$alkylene)O$R^a$, —C(O)N$R^a(C_{1-4}$alkylene)N$R^aR^b$, —C(O)N$R^a(C_{1-4}$alkylene)OR, —N$R^aR^b$, —O($C_{1-4}$alkylene)N$R^aR^b$, —$C_{1-4}$alkylN$R^aR^b$, —S$R^a$, —S(O) $R^a$, —S(O)$_2R^a$, —S(O)N$R^aR^b$, —SO$_2$N$R^aR^b$, —N$R^a(C_{1-4}$alkyl)O$R^a$, —N$R^a(C_{1-4}$alkyl)N$R^aR^b$, —$C_{1-6}$alkylC(O)N$R^aR^b$, phenyl or 5- to 7-membered heteroaryl, wherein said phenyl and 5- to 7-membered heteroaryl are each optionally and independently substituted with 1 to 3 groups selected from $R^4$.

$R^a$ and $R^b$ are each independently selected from hydrogen and $(C_1-C_4)$alkyl, wherein said $(C_1-C_4)$alkyl is optionally substituted with one or more halo or a 3- to 7-membered heterocyclyl, or both;
$R^3$ and $R^4$ are each independently halo, —N$R^aR^b$, $(C_1-C_4)$alkyl, halo$(C_1-C_4)$alkyl, $(C_1-C_4)$alkoxy, or halo$(C_1-C_4)$alkoxy; and
L is a linker.

2. Definitions

As used herein, the articles "a" and "an" refer to one or more than one, e.g., to at least one, of the grammatical object of the article. The use of the words "a" or "an" when used in conjunction with the term "comprising" herein may mean "one," but it is also consistent with the meaning of "one or more," "at least one," and "one or more than one."

As used herein, "about" and "approximately" generally mean an acceptable degree of error for the quantity measured given the nature or precision of the measurements. Exemplary degrees of error are within 20 percent (%), typically, within 10%, and more typically, within 5% of a given range of values. The term "substantially" means more than 50%, preferably more than 80%, and most preferably more than 90% or 95%.

As used herein the term "comprising" or "comprises" are used in reference to compositions, methods, and respective component(s) thereof, that are present in a given embodiment, yet open to the inclusion of unspecified elements.

As used herein the term "consisting essentially of" refers to those elements required for a given embodiment. The term permits the presence of additional elements that do not materially affect the basic and novel or functional characteristic(s) of that embodiment of the disclosure.

The term "consisting of" refers to compositions, methods, and respective components thereof as described herein, which are exclusive of any element not recited in that description of the embodiment.

As used herein, the term "alkyl" means a saturated straight chain or branched non-cyclic hydrocarbon having, unless specified otherwise, from 1 to 10 carbon atom e.g., $(C_1-C_6)$alkyl or $(C_1-C_4)$alkyl. Representative straight chain alkyls include methyl, ethyl, n-propyl, n-butyl, n-pentyl, n-hexyl, n-heptyl, n-octyl, n-nonyl and n-decyl; while saturated branched alkyls include isopropyl, sec-butyl, isobutyl, tert-butyl, isopentyl, 2-methylbutyl, 3-methylbutyl, 2-methylpentyl, 3-methylpentyl, 4-methylpentyl, 2-methylhexyl, 3-methylhexyl, 4-methylhexyl, 5-methylhexyl, 2,3-dimethylbutyl, 2,3-dimethylpentyl, 2,4-dimethylpentyl, 2,3-dimethylhexyl, 2,4-dimethylhexyl, 2,5-dimethylhexyl, 2,2-dimethylpentyl, 2,2-dimethylhexyl, 3,3-dimethylpentyl, 3,3-dimethylhexyl, 4,4-dimethylhexyl, 2-ethylpentyl, 3-ethylpentyl, 2-ethylhexyl, 3-ethylhexyl, 4-ethylhexyl, 2-methyl-2-ethylpentyl, 2-methyl-3-ethylpentyl, 2-methyl-4-ethylpentyl, 2-methyl-2-ethylhexyl, 2-methyl-3-ethylhexyl, 2-methyl-4-ethylhexyl, 2,2-diethylpentyl, 3,3-diethylhexyl, 2,2-diethylhexyl, 3,3-diethylhexyl and the like.

As used herein, the term "alkenyl" means a saturated straight chain or branched non-cyclic hydrocarbon having, unless specified otherwise, from 2 to 10 carbon atoms (e.g., $(C_2-C_6)$alkenyl or $(C_2-C_4)$alkenyl) and having at least one carbon-carbon double bond. Representative straight chain and branched (C.sub.2-C.sub.10)alkenyls include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl, 3-decenyl and the like.

As used herein, the term "alkynyl" means a saturated straight chain or branched non-cyclic hydrocarbon having, unless specified otherwise, from 2 to 10 carbon atoms (e.g., $(C_2-C_6)$alkynyl or $(C_2-C_4)$alkynyl) and having at least one carbon-carbon triple bond. Representative straight chain and branched alkynyls include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl, 9-decynyl, and the like.

As used herein, the term "4- to 6-membered cycloalkyl" means a saturated, monocyclic alkyl radical having from 4 to 6 carbon atoms. Representative cycloalkyls include cyclopropyl, cyclobutyl, cyclopentyl, and cyclohexyl.

As used herein, the term "haloalkyl" means and alkyl group in which one or more (including all) the hydrogen radicals are replaced by a halo group, wherein each halo group is independently selected from —F, —Cl, —Br, and —I. Representative haloalkyl groups include trifluoromethyl, bromomethyl, 1,2-dichloroethyl, 4-iodobutyl, 2-fluoropentyl, and the like.

As used herein, an "alkoxy" is an alkyl group which is attached to another moiety via an oxygen linker.

As used herein, an "haloalkoxy" is an haloalkyl group which is attached to another moiety via an oxygen linker.

As used herein, the term "alkylene" refers to an alkyl group that has two points of attachment. Straight chain alkylene groups are preferred. Non-limiting examples of alkylene groups include methylene ethylene, n-propylene, isopropylene, and the like. Alkylene groups may be optionally substituted with one or more substituents.

As used herein, the term "heterocyclyl" means a monocyclic heterocyclic ring system which is either a saturated ring or an unsaturated non-aromatic ring comprising, as size and valency permits, up to 5 heteroatoms independently selected from nitrogen, oxygen, and sulfur. The heterocycle may be attached via any heteroatom or carbon atom. Representative heterocycles include morpholinyl, thiomorpholinyl, pyrrolidinonyl, pyrrolidinyl, piperidinyl, piperazinyl, oxiranyl, oxetanyl, tetrahydrofuranyl, tetrahydropyranyl, tetrahydropyrindinyl, tetrahydropyrimidinyl, and the like.

As used herein, the term "heteroaromatic", "heteroaryl" or like terms means, as the defined size permits, a monocyclic or polycyclic heteroaromatic ring comprising carbon atom ring members and one or more heteroatom ring members selected from nitrogen, oxygen, and sulfur. Representative heteroaryl groups include pyridyl, furanyl, thienyl, pyrrolyl, oxazolyl, imidazolyl, thiazolyl, isoxazolyl, quinolinyl, pyrazolyl, isothiazolyl, pyridazinyl, pyrimidinyl, pyrazinyl, triazinyl, triazolyl, thiadiazolyl, isoquinolinyl, indazolyl, benzoxazolyl, benzofuryl, indolizinyl, imidazopyridyl, tetrazolyl, benzimidazolyl, benzothiazolyl, benzothiadiazolyl, benzoxadiazolyl, indolyl, tetrahydroindolyl, azaindolyl, imidazopyridyl, quinazolinyl, purinyl, benzothienyl, and the like. The point of attachment of a heteroaromatic or heteroaryl ring to another group may be at either a carbon atom or a heteroatom of the heteroaromatic or heteroaryl rings.

As used herein, the term "halogen" or "halo" means F, Cl, Br or I.

When a heterocyclyl or heteroaryl, group contains a nitrogen atom, it may be substituted or unsubstituted as valency permits.

The term "linker" or "tether," used interchangeably, refers to a chemical moiety that joins two other moieties (e.g., a first binding moiety and a second binding moiety). A linker can covalently join a first binding moiety and a second binding moiety. In one aspect, the linker is uncleavable in vivo. In one aspect, the linker comprises one or more cyclic ring systems. In another aspect, the linker comprises an alkyl chain optionally substituted by and/or interrupted with one or more chemical groups. In one aspect, the linker comprises optimal spatial and chemical properties to effectuate optimal therapeutic activity. In one aspect, the linker does not interfere with the ability of the first binding moiety and the second binding moiety to bind their respective targets e.g., HSP90 and BRD4.

When used in connection to describe a chemical group that may have multiple points of attachment, a hyphen (—) designates the point of attachment of that group to the variable to which it is defined. For example, —NR$^a$R$^b$ and —C(O)NR$^a$(C$_{1-4}$alkylene)NR$^a$R mean that the point of attachment for these groups occur on the nitrogen atom and carbon atom respectively.

A hash bond as in "~~~" represents the point at which the depicted group is attached to the defined variable.

When the stereochemistry of a disclosed compound is named or depicted by structure, the named or depicted stereoisomer is at least 60%, 70%, 80%, 90%, 99% or 99.9% by weight pure relative to all of the other stereoisomers. Percent by weight pure relative to all of the other stereoisomers is the ratio of the weight of one stereoisomer over the weight of the other stereoisomers. For example, when a single enantiomer is named or depicted by structure, the depicted or named enantiomer is at least 60%, 70%, 80%, 90%, 99% or 99.9% by weight optically pure. Percent optical purity by weight is the ratio of the weight of the enantiomer over the weight of the enantiomer plus the weight of its optical isomer.

For use in medicines, the pharmaceutically acceptable salts of the disclosed compounds refer to non-toxic "pharmaceutically acceptable salts." Pharmaceutically acceptable salt forms include pharmaceutically acceptable acidic/anionic or basic/cationic salts. Suitable pharmaceutically acceptable acid addition salts of the compounds described herein include e.g., salts of inorganic acids (such as hydrochloric acid, hydrobromic, phosphoric, nitric, and sulfuric acids) and of organic acids (such as, acetic acid, benzenesulfonic, benzoic, methanesulfonic, and p-toluenesulfonic acids). Compounds of the present teachings with acidic groups such as carboxylic acids can form pharmaceutically acceptable salts with pharmaceutically acceptable base(s). Suitable pharmaceutically acceptable basic salts include e.g., ammonium salts, alkali metal salts (such as sodium and potassium salts) and alkaline earth metal salts (such as magnesium and calcium salts). Compounds with a quaternary ammonium group also contain a counteranion such as chloride, bromide, iodide, acetate, perchlorate and the like. Other examples of such salts include hydrochlorides, hydrobromides, sulfates, methanesulfonates, nitrates, benzoates and salts with amino acids such as glutamic acid.

The term "pharmaceutically acceptable carrier" refers to a non-toxic carrier, adjuvant, or vehicle that does not destroy the pharmacological activity of the compound with which it is formulated. Pharmaceutically acceptable carriers, adjuvants or vehicles that may be used in the compositions described herein include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat.

Any compositions or methods provided herein can be combined with one or more of any of the other compositions and methods provided herein.

As used herein, the term "subject" refers to human and non-human animals, including veterinary subjects. The term "non-human animal" includes all vertebrates, e.g., mammals and non-mammals, such as non-human primates, mice, rabbits, sheep, dog, cat, horse, cow, chickens, amphibians, and reptiles. In a preferred embodiment, the subject is a human and may be referred to as a patient.

As used herein, the terms "treat," "treating" or "treatment" refer, preferably, to an action to obtain a beneficial or desired clinical result including, but not limited to, alleviation or amelioration of one or more signs or symptoms of a disease or condition, diminishing the extent of disease, stability (i.e., not worsening) of the state of disease, amelioration or palliation of the disease state, diminishing rate of or time to progression, and remission (whether partial or total), whether detectable or undetectable. "Treatment" can also mean prolonging survival as compared to expected survival in the absence of treatment. Treatment does not need to be curative.

A "therapeutically effective amount" is that amount sufficient to treat a disease in a subject. A therapeutically effective amount can be administered in one or more administrations. In one aspect, a therapeutically effective amount refers to a dosage of from about 0.01 to about 100 mg/kg body weight/day.

The terms "administer," "administering" or "administration" include any method of delivery of a pharmaceutical composition or agent into a subject's system or to a particular region in or on a subject. In certain embodiments of the invention, an agent is administered intravenously, intramuscularly, subcutaneously, intradermally, intranasally, orally, transcutaneously, or mucosally. In a preferred embodiment, an agent is administered intravenously. In another preferred embodiment, an agent is administered orally. Administering an agent can be performed by a number of people working in concert. Administering an agent includes, for example, prescribing an agent to be administered to a subject and/or providing instructions, directly or through another, to take a specific agent, either by self-delivery, e.g., as by oral delivery, subcutaneous delivery, intravenous delivery through a central line, etc.; or for delivery by a trained professional, e.g., intravenous delivery, intramuscular delivery, intratumoral delivery, etc.

3. Compounds

In a first embodiment, provided is a compound of the Formula I:

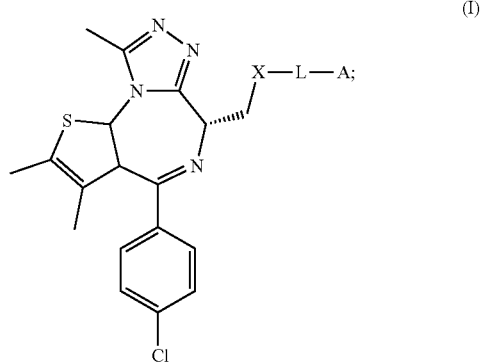

(I)

or a pharmaceutically acceptable salt thereof, wherein the variables are as described above.

In a second embodiment, A in the compound of Formula I, or a pharmaceutically acceptable salt thereof, is

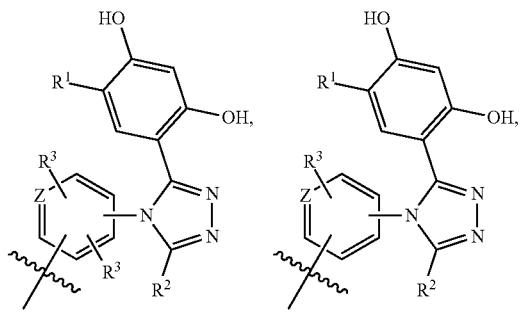

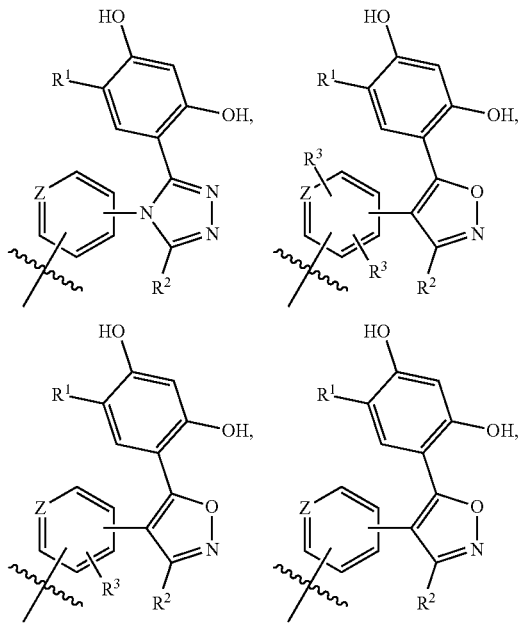

-continued

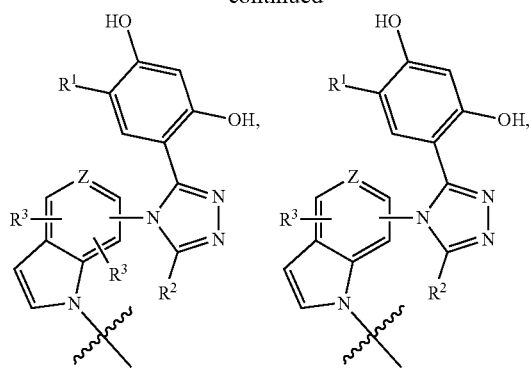
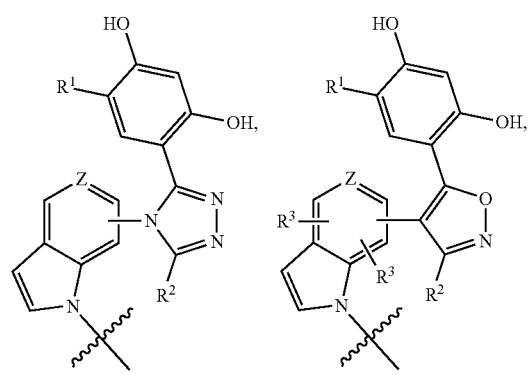
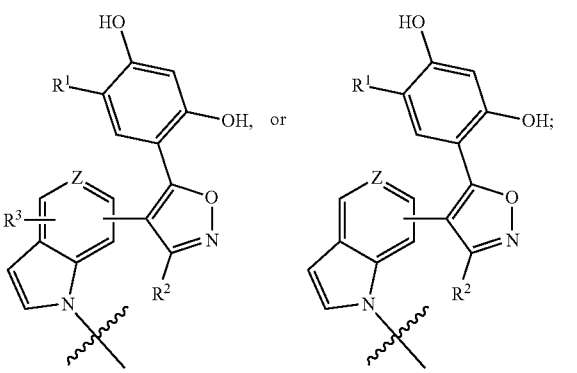

and Z is N or CH, wherein the remaining variables are as described above for Formula I. Alternatively, as part of a second embodiment, A in the compound of Formula I, or a pharmaceutically acceptable salt thereof, is as defined above, wherein Z is CH and wherein the remaining variables are as described above for Formula I.

In a third embodiment, $R^3$ in the compound of Formula I, or a pharmaceutically acceptable salt thereof, is independently $(C_1-C_4)$alkyl or halo, wherein the remaining variables are as described above for Formula I or the second embodiment.

In a fourth embodiment, A in the compound of Formula I, or a pharmaceutically acceptable salt thereof, is

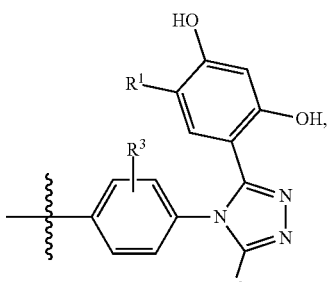
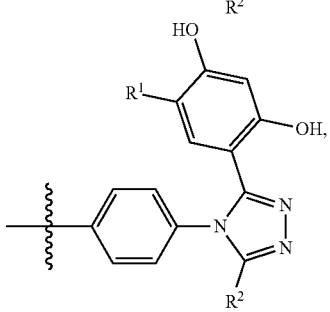
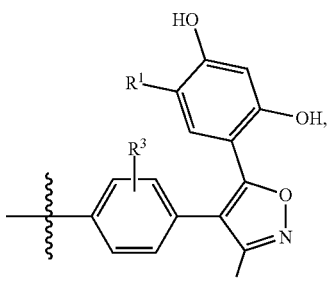
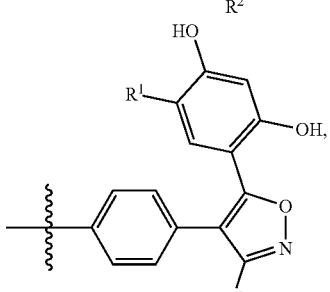
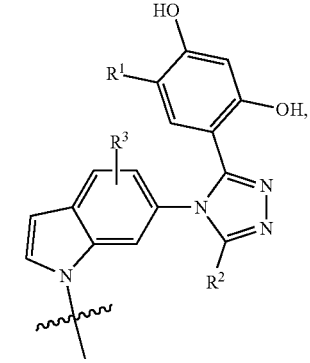

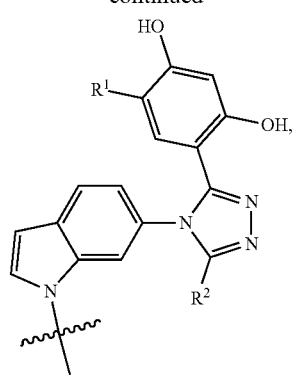

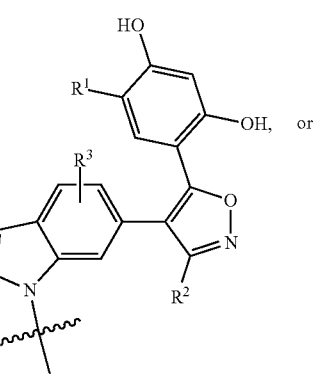

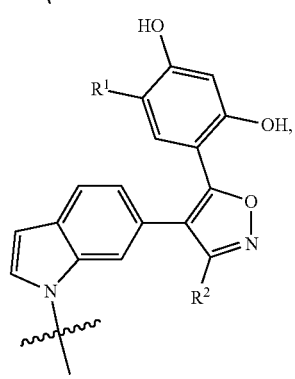

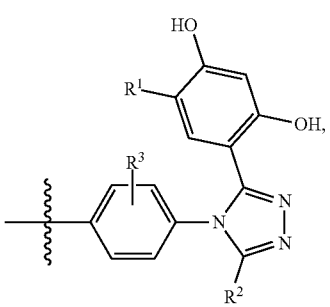

wherein the remaining variables are as described above for Formula I or the second or third embodiment. Alternatively, as part of a fourth embodiment, A in the compound of Formula I, or a pharmaceutically acceptable salt thereof, is

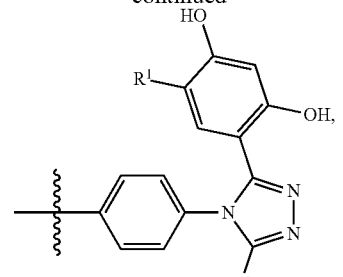

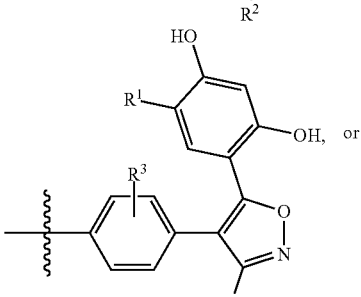

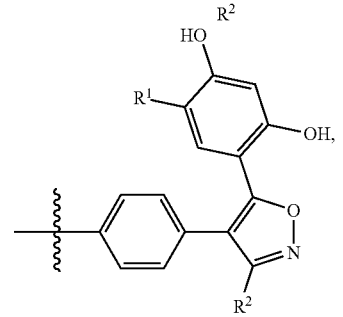, or

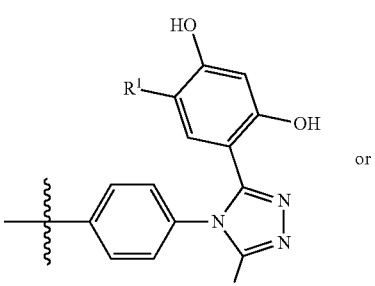

wherein the remaining variables are as described above for Formula I or the second or third embodiment. In another alternative, as part of a fourth embodiment, A in the compound of Formula I, or a pharmaceutically acceptable salt thereof, is

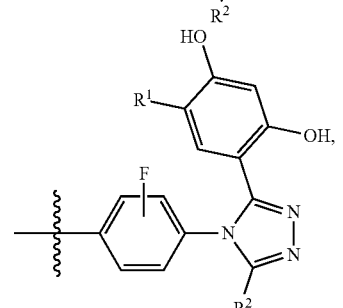

wherein the remaining variables are as described above for Formula I or the second or third embodiment.

In a fifth embodiment, L in the compound of Formula I, or a pharmaceutically acceptable salt thereof, is *Het$^1$-X$^1$—, *Het$^1$-X$^1$-Het$^2$-X$^2$—, *Het$^1$-X$^1$—(C$_1$-C$_4$)alkylene-Het$^2$-X$^2$—, *Het$^1$-X$^1$-Het$^2$-X$^2$(C$_1$-C$_4$)alkylene-, *—(CH$_2$CH$_2$O)$_o$—(CH$_2$)$_p$-Het$^1$-X$^1$-Het$^2$-(CH$_2$CH$_2$O)$_n$, *—(CH$_2$CH$_2$O)$_n$—(CH$_2$)$_m$-Het$^1$-X$^1$-Het$^2$-X$^2$, *Het$^1$-X$^1$-Phe-X$^2$—NR$^c$—X$^3$—, *—(CH$_2$CH$_2$O)$_o$—(CH$_2$)$_p$-Het$^1$-X$^1$-Phe-X$^2$—NR$^c$—(CH$_2$CH$_2$O)$_n$—, *—(CH$_2$CH$_2$O)$_n$—(CH$_2$)$_m$—NR$^c$-Phe-X$^1$—, *—(CH$_2$CH$_2$O)$_o$—(CH$_2$)$_p$—NR$^c$-Phe-(CH$_2$CH$_2$O)$_n$—, *—(CH$_2$CH$_2$O)$_o$—(CH$_2$)$_p$—NR$^c$—(CH$_2$CH$_2$O)$_n$—(CH$_2$)$_m$—, *(CH$_2$CH$_2$O)$_n$—(CH$_2$)$_m$—NR$^c$—(CH$_2$CH$_2$O)—(CH$_2$)$_m$—C(O)—NR$^d$—(CH$_2$CH$_2$O), —(CH$_2$)$_p$—, *—(CH$_2$CH$_2$O)$_o$—(CH$_2$)$_p$—NR$^c$—(CH$_2$CH$_2$O)$_n$—(CH$_2$)$_m$-Het$^1$-X$^1$-Het$^2$-X$^2$, *—(CH$_2$CH$_2$O), —(CH$_2$)$_p$—NR$^c$—(CH$_2$CH$_2$O)$_n$—(CH$_2$)$_m$-Het$^1$-X$^1$-Het$^2$-X$^2$—(CH$_2$CH$_2$O)$_o$, *NR$^c$—(CH$_2$CH$_2$O)$_n$—(CH$_2$)$_m$-Phe-NH—X$^1$-Het$^1$-X$^2$, *NR$^c$—(CH$_2$CH$_2$O)$_n$—(CH$_2$)$_m$-Phe-NH—X$^1$-Het$^1$-X$^2$—(CH$_2$CH$_2$O)$_o$, *—(CH$_2$CH$_2$O)$_o$—(CH$_2$)$_p$—NR$^c$—(CH$_2$CH$_2$O)$_n$—(CH$_2$)$_m$-Phe-X$^1$—NR$^c$—(CH$_2$CH$_2$O)$_n$, —(CH$_2$)$_p$—, *—(CH$_2$CH$_2$O)$_o$—(CH$_2$)$_p$—NR$^c$—(CH$_2$CH$_2$O)$_n$—(CH$_2$)$_m$-Het$^1$-X$^1$—, *—(CH$_2$CH$_2$O), —(CH$_2$)$_p$—NR$^c$—(CH$_2$CH$_2$O)$_n$—(CH$_2$)$_m$-Het$^1$-X$^1$—(CH$_2$CH$_2$O)$_n$—, *—(CH$_2$CH$_2$O)$_n$—(CH$_2$)$_m$—NR$^c$—(CH$_2$)$_m$—C(O)—NR$^d$-Het$^1$-X$^1$-Het$^2$-(CH$_2$CH$_2$O)$_o$—(CH$_2$)$_p$, or *NR$^c$—(CH$_2$)$_m$—C(O)—NR$^d$—(CH$_2$)$_m$-Het$^1$-X$^1$-Het$^2$-X$^2$;

* indicates the point of attachment to X;

Het$^1$ and Het$^2$ are each independently phenyl, a 4- to 6-membered heterocyclyl, 5- to 7-membered heteroaryl, or a 4- to 6-membered cycloalkyl;

X$^1$, X$^2$, and X$^3$, are each independently C(O) or (CH$_2$)$_r$;

R$^c$ and R$^d$ are each independently hydrogen or (C$_1$-C$_4$) alkyl; and m, n, o, p, q and r are each independently integers selected from 0, 1, 2, 3, 4, 5, and 6, wherein the remaining variables are as described above for Formula I or the second, third, or fourth embodiment.

In a sixth embodiment, the compound of Formula I is of the Formula II:

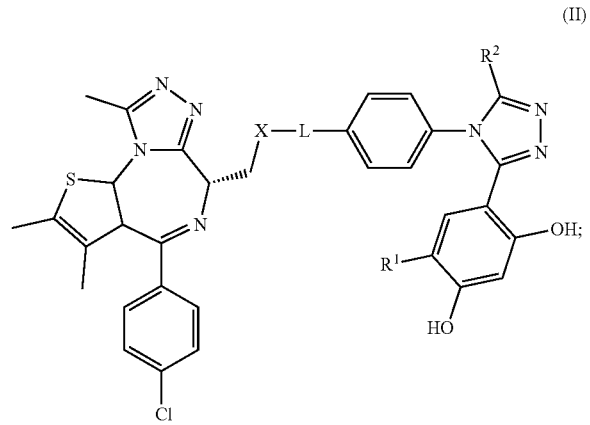

(II)

or a pharmaceutically acceptable salt thereof, wherein the remaining variables are as described above for Formula I or the second, third, fourth, or fifth embodiment.

In a seventh embodiment, R$^1$ in the compound of Formula I or II, or a pharmaceutically acceptable salt thereof, is halo or (C$_1$-C$_4$)alkyl, wherein the remaining variables are as described above for Formula I or the second, third, fourth, or fifth embodiment. Alternatively, as part of a seventh embodiment, R$^1$ in the compound of Formula I or II, or a pharmaceutically acceptable salt thereof, is chloro, isopropyl, methyl, propyl, or ethyl, wherein the remaining variables are as described above for Formula I or the second, third, fourth, or fifth embodiment. In another alternative, as part of a seventh embodiment, R$^1$ in the compound of Formula I or II, or a pharmaceutically acceptable salt thereof, isopropyl or ethyl, wherein the remaining variables are as described above for Formula I or the second, third, fourth, or fifth embodiment.

In an eighth embodiment, R$^2$ in the compound of Formula I or II, or a pharmaceutically acceptable salt thereof, is —OR$^a$, —SR$^a$, —C(O)NR$^a$R$^b$, or —C(O)NR$^a$(C$_{1-4}$alkylene)NR$^a$R$^b$, wherein the remaining variables are as described above for Formula I or the second, third, fourth, fifth, or seventh embodiment.

In a ninth embodiment, R$^a$ and R$^b$ in the compound of Formula I or II, or a pharmaceutically acceptable salt thereof, are each independently selected from hydrogen and (C$_1$-C$_4$)alkyl, wherein said (C$_1$-C$_4$)alkyl is optionally substituted with 1 to 3 halo or a 6-membered heterocyclyl, wherein the remaining variables are as described above for Formula I or the second, third, fourth, fifth, seventh, or eighth embodiment.

In a tenth embodiment, R$^2$, in the compound of Formula I or II, or a pharmaceutically acceptable salt thereof, is OH, SH, —C(O)NHCH$_2$CF$_3$, —C(O)NHCH$_2$CH$_3$, —C(O)NH(CH$_2$)$_2$N(CH$_2$CH$_3$)$_2$, —C(O)NHCH(CH$_3$)$_2$, C(O)NH$_2$, —C(O)NH(CH$_2$)$_2$piperidinyl, wherein the remaining variables are as described above for Formula I or the second, third, fourth, fifth, seventh, eighth, or ninth embodiment. Alternatively, as part of a tenth embodiment, R$^2$, in the compound of Formula I or II, or a pharmaceutically acceptable salt thereof, is —C(O)NHCH$_2$CF$_3$ or OH, wherein the remaining variables are as described above for Formula I or the second, third, fourth, fifth, seventh, eighth, or ninth embodiment.

In an eleventh embodiment, the compound of Formula I is of the Formula III:

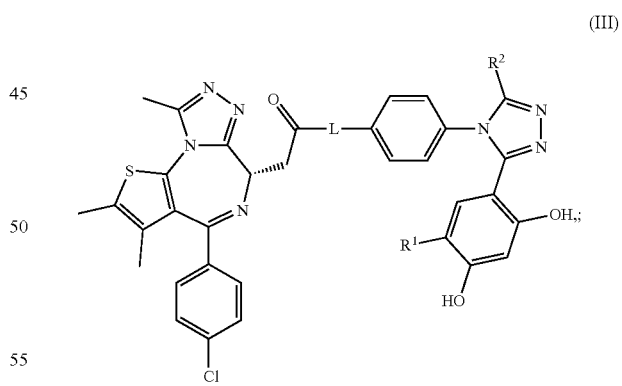

(III)

or a pharmaceutically acceptable salt thereof, wherein the remaining variables are as described above for Formula I or the second, third, fourth, fifth, seventh, eighth, ninth, or tenth embodiment.

In an twelfth embodiment, Het$^1$ and Het$^2$ as defined in the fifth and subsequent embodiments, are each independently a 4- to 6-membered heterocyclyl, wherein the remaining variables are as described above for Formula I, II, or III, or the second, third, fourth, fifth, seventh, eighth, ninth, or tenth embodiment.

In a thirteenth embodiment, L in the compound of Formula I, II, or III, or a pharmaceutically acceptable salt thereof, is *Het$^1$-X$^1$—, *Het$^1$-X$^1$-Het$^2$-X$^2$, *Het$^1$-X$^1$-Het$^2$-(CH$_2$CH$_2$O)$_n$—, *Het$^1$-X$^1$-Phe-X$^2$—NR$^c$—X$^3$—, *Het$^1$-X$^1$-Phe-X$^2$—NR$^c$—(CH$_2$CH$_2$O)$_n$—, *NR$^c$-Phe-X$^1$—, *NR$^c$-Phe-(CH$_2$CH$_2$O)$_n$—, *NR$^c$—(CH$_2$CH$_2$O), —(CH$_2$)$_m$—, *NR$^c$—(CH$_2$CH$_2$O)$_n$—(CH$_2$)$_m$—C(O)—NR$^d$—(CH$_2$CH$_2$O)$_o$—(CH$_2$)$_p$—, *NR$^c$—(CH$_2$CH$_2$O)$_n$—(CH$_2$)$_m$-Het$^1$-X$^1$-Het$^2$-X$^2$—, *NR$^c$—(CH$_2$CH$_2$O)$_n$—(CH$_2$)$_m$-Phe-NH—X$^1$-Het$^1$-X$^2$—, *NR$^c$—(CH$_2$CH$_2$O)$_n$—(CH$_2$)$_m$-Phe-X$^1$-Het$^1$-X$^2$—, *NR$^c$—(CH$_2$CH$_2$O)$_n$—(CH$_2$)$_m$-Phe-X$^1$—NR$^c$—(CH$_2$CH$_2$O)$_n$—(CH$_2$CH$_2$O)$_o$—(CH$_2$)$_p$—, *NR$^c$—(CH$_2$CH$_2$O)$_n$—(CH$_2$)$_m$-Het$^1$-X$^1$—, *NR$^c$—(CH$_2$)$_m$—C(O)—NR$^d$-Het$^1$-X$^1$-Het$^2$-(CH$_2$CH$_2$O), —(CH$_2$)$_p$, or*NR$^c$—(CH$_2$)$_m$—C(O)—NR$^d$—(CH$_2$)$_m$-Het$^1$-X$^1$-Het$^2$-X$^2$, wherein the remaining variables are as described above for Formula I or the second, third, fourth, fifth, seventh, eighth, ninth, tenth, or twelfth embodiment. Alternatively, L in the compound of Formula I, II, or III, or a pharmaceutically acceptable salt thereof, is *Het$^1$-X$^1$—(CH$_2$)$_r$, *Het$^1$-X$^1$-Het$^2$-(CH$_2$)$_r$—, *Het$^1$-(CH$_2$)$_r$-Phe-(CH$_2$)$_r$—NR$^c$—(CH$_2$)$_r$—, *NR$^c$-Phe-(CH$_2$)$_r$—, *NR$^c$—(CH$_2$CH$_2$O)$_n$—, *NR$^c$—(CH$_2$)$_m$—, *NR$^c$—(CH$_2$)$_m$—C(O)—NR$^d$—(CH$_2$)$_p$—, *NR$^c$—(CH$_2$)$_m$—C(O)—NR$^d$—(CH$_2$CH$_2$O)$_o$—, *NR$^c$—(CH$_2$)$_m$-Het$^1$-X$^1$-Het$^2$-(CH$_2$)$_r$—, *NR$^c$—(CH$_2$)$_m$-Phe-(CH$_2$)$_r$-Het$^1$-(CH$_2$)$_r$—, *NR$^c$-Phe-NH—C(O)-Het$^1$-(CH$_2$)$_r$—, *NR$^c$—(CH$_2$CH$_2$O)$_n$—(CH$_2$)$_m$-Phe-(CH$_2$)$_r$—NR$^c$—(CH$_2$)$_p$—, or *NR$^c$—(CH$_2$)$_m$—C(O)—NR$^d$—(CH$_2$)$_m$-Het$^1$-X$^1$-Het$^2$-(CH$_2$)$_r$—, wherein the remaining variables are as described above for Formula I or the second, third, fourth, fifth, seventh, eighth, ninth, tenth, or twelfth embodiment.

In a fourteenth embodiment, m, n, o, p, q and r as defined in the fifth and subsequent embodiment, are each independently integers selected from 0, 1, 2, and 3, wherein the remaining variables are as described above for Formula I, II, or III, or the second, third, fourth, fifth, seventh, eighth, ninth, tenth, twelfth, or thirteenth embodiment.

In a fifteenth embodiment, Het$^1$ and Het$^2$ as defined in the fifth and subsequent embodiments, are each independently piperidinyl, piperazinyl, azetidinyl, or pyrrolidinyl, wherein the remaining variables are as described above for Formula I, II, or III, or the second, third, fourth, fifth, seventh, eighth, ninth, tenth, twelfth, thirteenth or fourteenth embodiment.

In a sixteenth embodiment, L in the compound of Formula I, II, or III, or a pharmaceutically acceptable salt thereof, is

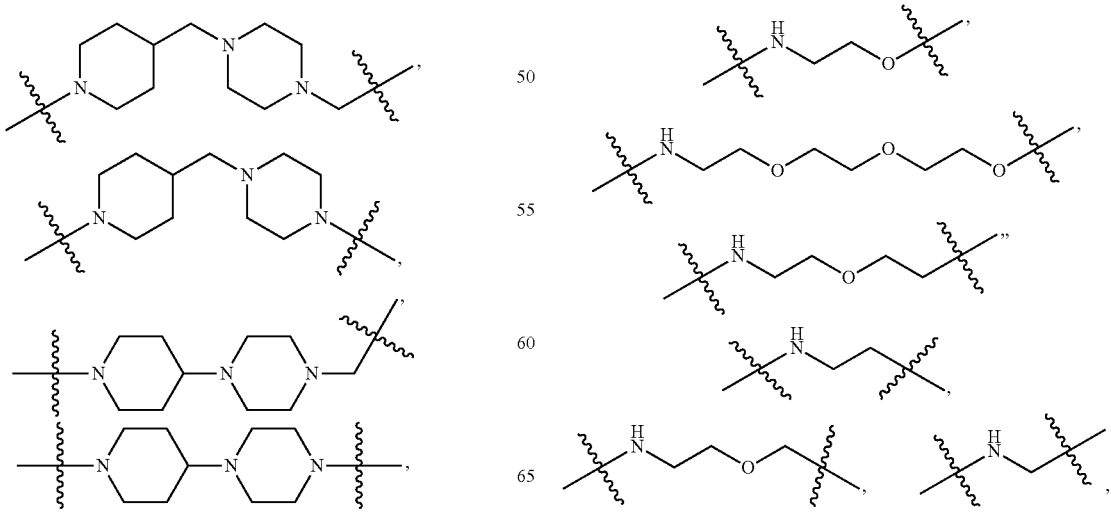

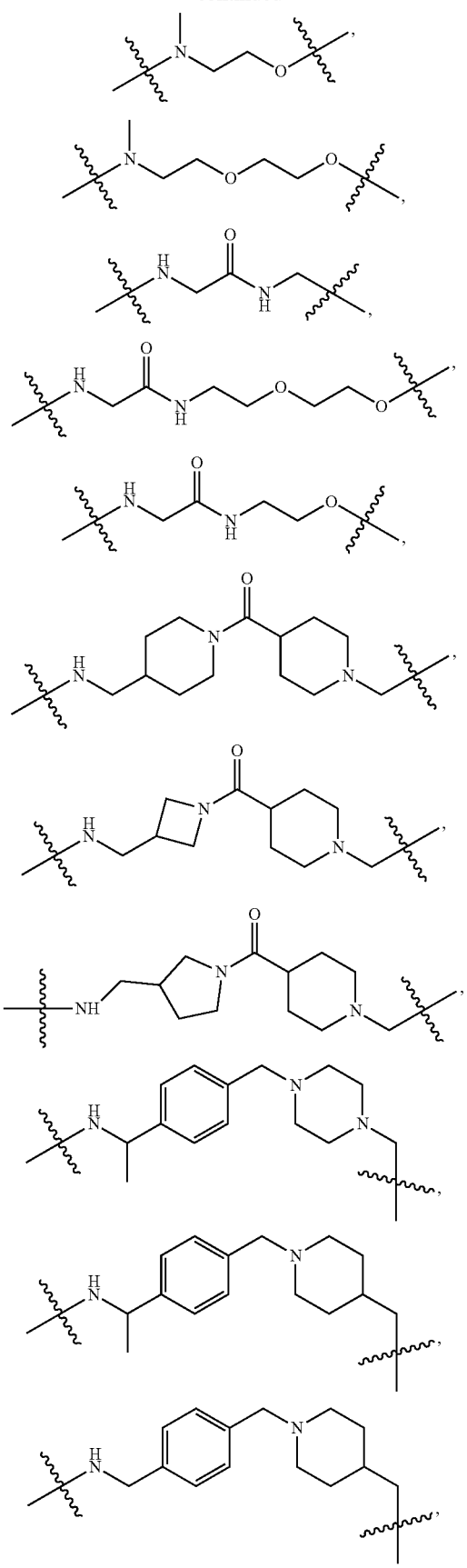
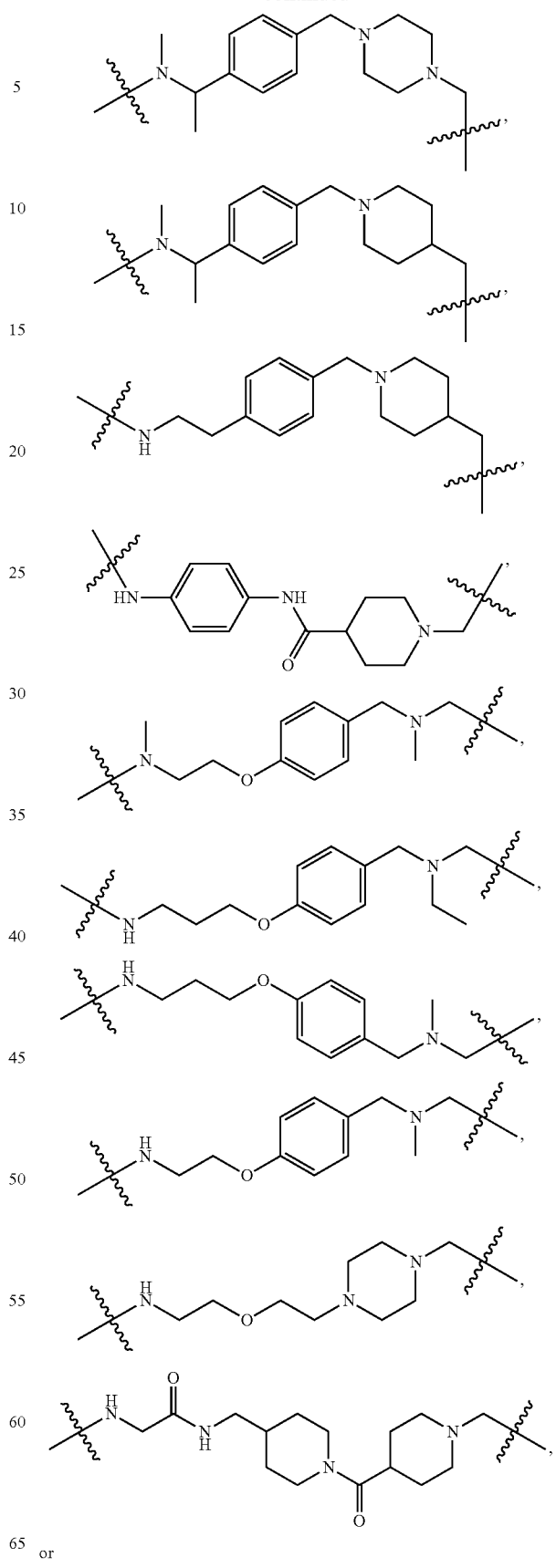
or

-continued

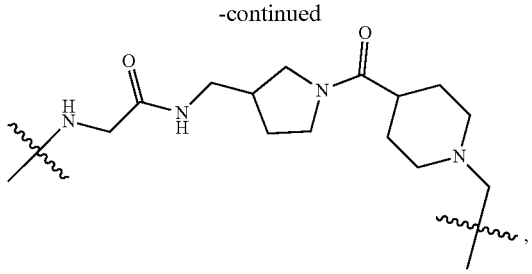

wherein the remaining variables are as described above for Formula I, II, or III, or the second, third, fourth, fifth, seventh, eighth, ninth, tenth, twelfth, thirteenth fourteenth, or fifteenth embodiment.

In a seventeenth embodiment, the compound of Formula I is of the Formula IV:

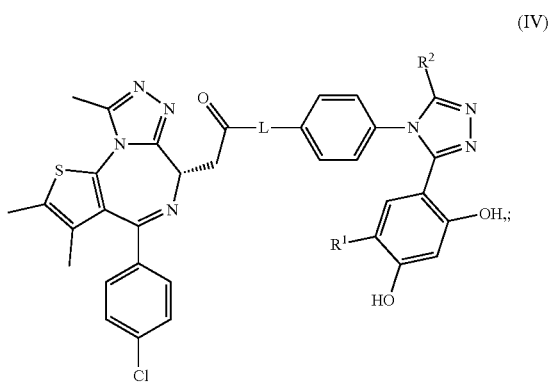

or a pharmaceutically acceptable salt thereof, wherein
R$^1$ is (C$_1$-C$_4$)alkyl;
R$^2$ is —C(O)NR$^a$R$^b$ or OH;
R$^a$ is hydrogen or (C$_1$-C$_2$)alkyl;
R$^b$ is (C$_1$-C$_4$)alkyl optionally substituted with 1 to 3 halo; and
L is *Het$^1$-X$^1$-Het$^2$-X$^2$— or *Het$^1$-X$^1$-Phe-X$^2$—NR$^c$—X$^3$, and wherein the remaining variables are as described above for Formula I.

In an eighteenth embodiment, R$^a$ in the compound of Formula IV, or a pharmaceutically acceptable salt thereof, is hydrogen, wherein the remaining variables are as described above for Formula I or the seventeenth embodiment.

In a nineteenth embodiment, R$^b$ in the compound of Formula IV, or a pharmaceutically acceptable salt thereof, is (C$_1$-C$_4$)alkyl substituted with 1 to 3 halo, wherein the remaining variables are as described above for Formula I or the seventeenth or eighteenth embodiment.

In a twentieth embodiment, L in the compound of Formula IV, or a pharmaceutically acceptable salt thereof, is *Het$^1$-(CH$_2$)$_r$-Het$^2$-X$^2$— or *Het$^1$-(CH$_2$)$_r$-Phe-(CH$_2$)$_o$—NR$^c$—(CH$_2$)$_r$, wherein the remaining variables are as described above for Formula I or the seventeenth, eighteenth, or nineteenth embodiment. Alternatively, as part of a twentieth embodiment, L in the compound of Formula IV, or a pharmaceutically acceptable salt thereof, is *Het$^1$-(CH$_2$)$_r$-Het$^2$-X$^2$— or *Het$^1$-(CH$_2$)$_r$-Phe-(CH$_2$)$_r$—NR$^c$—(CH$_2$)$_r$; and each r is independently integers selected from 1 and 2, wherein the remaining variables are as described above for Formula I or the seventeenth, eighteenth, or nineteenth embodiment.

In a twenty-first embodiment, Het$^1$ and Het$^2$ in the compound of Formula IV, or a pharmaceutically acceptable salt thereof, are each independently piperidinyl or piperazinyl, wherein the remaining variables are as described above for Formula I or the seventeenth, eighteenth, nineteenth, or twentieth embodiment.

Specific examples of compounds are provided in the EXEMPLIFICATION section and are included as part of a twenty-second embodiment herein. Pharmaceutically acceptable salts as well as the neutral forms of these compounds are also included.

Also provided herein are pharmaceutical compositions comprising a compound described herein; and a pharmaceutically acceptable carrier.

4. Uses, Formulation and Administration

Compounds and compositions described herein are generally useful as anticancer therapies. In one aspect, the disclosed compounds and compositions behave as tumor-targeted protein degradation chimeras (T-PEACHs) in which one portion of the compounds is responsible for binding BRD4 and the other portion is responsible for binding to HSP90 and/or HSP70. Their mechanisms of action include, but are not limited to, degrading BRD4 and/or other members of the BET protein family, and thereby impeding down-stream signals and resulting in cancer cell death. In one aspect, the disclosed compounds effectuate the degradation of BRD4.

Thus, provided herein are methods of treating conditions which are responsive to the degradation of BRD4 comprising administering to a subject in need thereof, a therapeutically effective amount of one or more compounds or compositions described herein. Also provided is the use of one or more compounds or compositions described herein in the manufacture of a medicament for treating conditions which are responsive to the degradation of BRD4. Further provided is the use of a compound or composition described herein for treating conditions which are responsive to the degradation of BRD4.

In one aspect, the condition treated by the present compounds and compositions is a cancer. The terms "cancer" or "tumor" are well known in the art and refer to the presence, e.g., in a subject, of cells possessing characteristics typical of cancer-causing cells, such as uncontrolled proliferation, immortality, metastatic potential, rapid growth and proliferation rate, decreased cell death/apoptosis, and certain characteristic morphological features. Cancer cells are often in the form of a solid tumor. However, cancer also includes non-solid tumors, e.g., blood tumors, e.g., leukemia, wherein the cancer cells are derived from bone marrow. As used herein, the term "cancer" includes pre-malignant as well as malignant cancers. Cancers include, but are not limited to, acoustic neuroma, acute leukemia, acute lymphocytic leukemia, acute myelocytic leukemia (monocytic, myeloblastic, adenocarcinoma, angiosarcoma, astrocytoma, myelomonocytic and promyelocytic), acute T-cell leukemia, basal cell carcinoma, bile duct carcinoma, bladder cancer, brain cancer, breast cancer, bronchogenic carcinoma, cervical cancer, chondrosarcoma, chordoma, choriocarcinoma, chronic leukemia, chronic lymphocytic leukemia, chronic myelocytic (granulocytic) leukemia, chronic myelogenous leukemia, colon cancer, colorectal cancer, craniopharyngioma, cystadenocarcinoma, diffuse large B-cell lymphoma, Burkitt's lymphoma, dysproliferative changes (dysplasias and metaplasias), embryonal carcinoma, endometrial cancer, endotheliosarcoma, ependymoma, epithelial carcinoma, erythroleukemia, esophageal cancer, estrogen-receptor positive breast cancer, essential thrombocythemia, Ewing's tumor, fibrosarcoma, follicular lymphoma, germ cell testicular cancer, glioma, heavy chain disease, hemangioblastoma, hepatoma, hepatocellular cancer, hormone insensitive prostate cancer, leiomyosarcoma, liposarcoma, lung cancer, lymphagioendotheliosarcoma, lymphangiosarcoma, lymphoblastic leukemia, lymphoma (Hodgkin and non-Hodgkin), malignancies and hyperproliferative disorders of the bladder, breast, colon, lung, ovaries, pancreas, prostate, skin, and uterus, lymphoid malignancies of T-cell or B-cell origin, leukemia, lymphoma, medullary carcinoma, medulloblastoma, melanoma, meningioma, mesothelioma, multiple myeloma, myelogenous leukemia, myeloma, myxosarcoma, neuroblastoma, non-small cell lung cancer, oligodendroglioma, oral cancer, osteogenic sarcoma, ovarian cancer, pancreatic cancer, papillary adenocarcinomas, papillary carcinoma, pinealoma, polycythemia vera, prostate cancer, rectal cancer, renal cell carcinoma, retinoblastoma, rhabdomyosarcoma, sarcoma, sebaceous gland carcinoma, seminoma, skin cancer, small cell lung carcinoma, solid tumors (carcinomas and sarcomas), small cell lung cancer, stomach cancer, squamous cell carcinoma, synovioma, sweat gland carcinoma, thyroid cancer, Waldenstrom's macroglobulinemia, testicular tumors, uterine cancer, and Wilms' tumor. Other cancers include primary cancer, metastatic cancer, oropharyngeal cancer, hypopharyngeal cancer, liver cancer, gall bladder cancer, bile duct cancer, small intestine cancer, urinary tract cancer, kidney cancer, urothelium cancer, female genital tract cancer, uterine cancer, gestational trophoblastic disease, male genital tract cancer, seminal vesicle cancer, testicular cancer, germ cell tumors, endocrine gland tumors, thyroid cancer, adrenal cancer, pituitary gland cancer, hemangioma, sarcoma arising from bone and soft tissues, Kaposi's sarcoma, nerve cancer, ocular cancer, meningial cancer, glioblastomas, neuromas, neuroblastomas, Schwannomas, solid tumors arising from hematopoietic malignancies such as leukemias, metastatic melanoma, recurrent or persistent ovarian epithelial cancer, fallopian tube cancer, primary peritoneal cancer, gastrointestinal stromal tumors, colorectal cancer, gastric cancer, melanoma, glioblastoma multiforme, non-squamous non-small-cell lung cancer, malignant glioma, epithelial ovarian cancer, primary peritoneal serous cancer, metastatic liver cancer, neuroendocrine carcinoma, refractory malignancy, triple negative breast cancer, HER2-amplified breast cancer, nasopharageal cancer, oral cancer, biliary tract, hepatocellular carcinoma, squamous cell carcinomas of the head and neck (SCCHN), non-medullary thyroid carcinoma, recurrent glioblastoma multiforme, neurofibromatosis type 1, CNS cancer, liposarcoma, leiomyosarcoma, salivary gland cancer, mucosal melanoma, acral/lentiginous melanoma, paraganglioma, pheochromocytoma, advanced metastatic cancer, solid tumor, triple negative breast cancer, colorectal cancer, sarcoma, melanoma, renal carcinoma, endometrial cancer, thyroid cancer, rhabdomysarcoma, multiple myeloma, ovarian cancer, glioblastoma, gastrointestinal stromal tumor, mantle cell lymphoma, and refractory malignancy.

"Solid tumor," as used herein, is understood as any pathogenic tumor that can be palpated or detected using imaging methods as an abnormal growth having three dimensions. A solid tumor is differentiated from a blood tumor such as leukemia. However, cells of a blood tumor are derived from bone marrow; therefore, the tissue producing the cancer cells is a solid tissue that can be hypoxic.

"Tumor tissue" or "tumorous tissue" are understood as cells, extracellular matrix, and other naturally occurring components associated with the solid tumor.

A specific dosage and treatment regimen for any particular patient will depend upon a variety of factors, including the activity of the specific compound employed, the age, body weight, general health, sex, diet, time of administration, rate of excretion, drug combination, and the judgment of the treating physician and the severity of the particular disease being treated. The amount of a compound described herein in the composition will also depend upon the particular compound in the composition.

EXEMPLIFICATION

Example 1: Compound 039 Synthesis

A representative synthesis scheme for compound 039. Specific synthesis routes of intermediates are shown below.

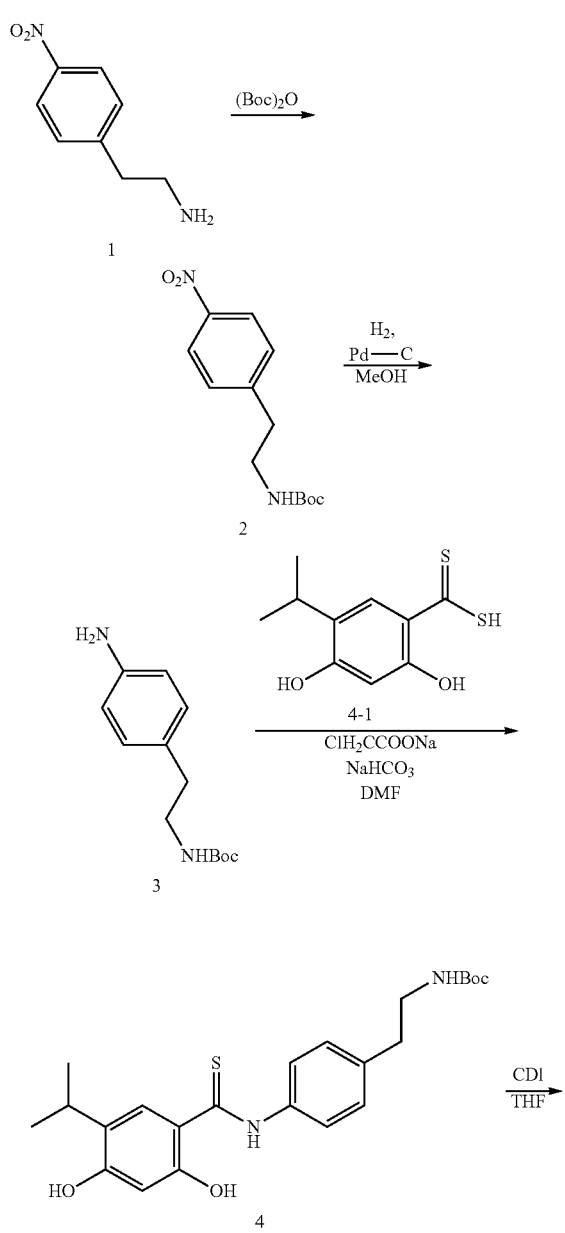

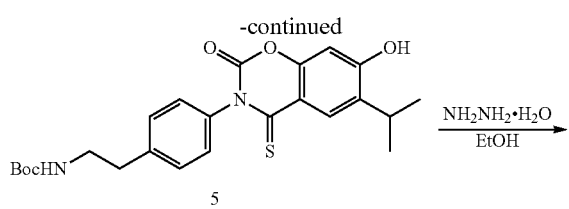

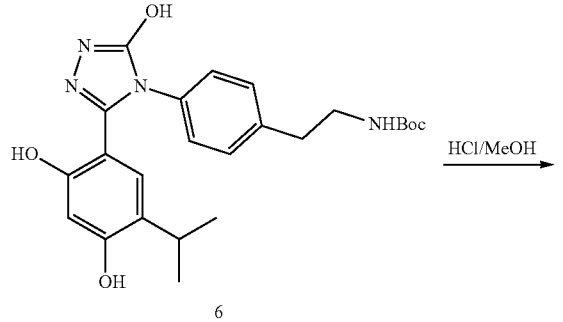

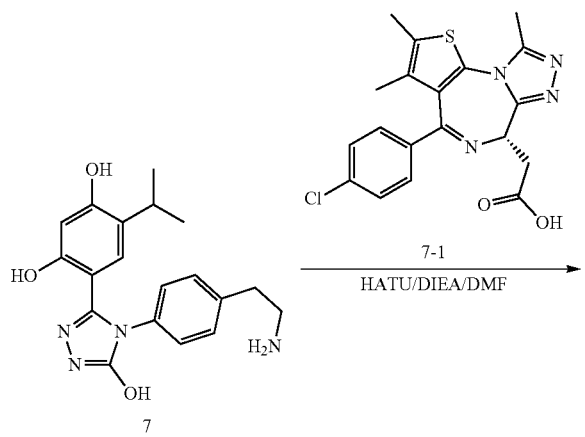

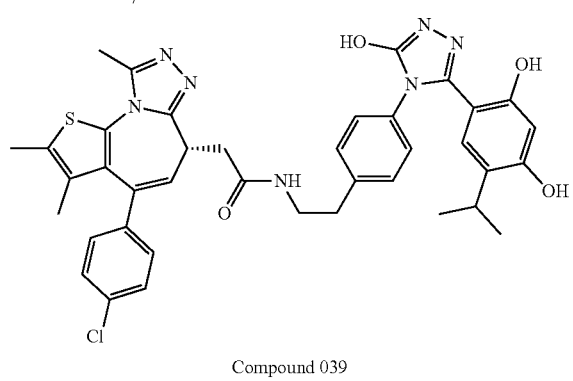

Compound 039

Intermediate 2 tert-butyl 4-nitrophenethylcarbamate

To a solution of intermediate 1 (8.00 g, 39.5 mmol) and (Boc)₂O (8.60 g, 39.5 mmol) in THF (50 mL) and water (50 mL) was added NaOH (3.1 g, 79.0 mmol). Then the reaction solution was stirred at room temperature for 3 hours. The reaction solution was extracted with EtOAc (50 mL*3). The combined organic layers were washed with brine and dried over Na₂SO₄ and concentrated to give the intermediate 2 (10.0 g, yield 79.3%) as an oil.

Intermediate 3 tert-butyl 4-aminophenethylcarbamate

The solution of intermediate 2 (10.0 g, 33.1 mmol) and Pd/C (10%, 1.5 g) in MeOH (150 mL) was stirred under H₂ atmosphere overnight. The mixture was filtered and the filtrate was concentrated to give the intermediate 3 (8.8 g, yield 99%) as a yellow solid.

Intermediate 4 tert-butyl 4-(2,4-dihydroxy-5-isopropylphenylthio-amido)phenethylcarbamate

The solution of intermediate 4-1 (1.0 g, 4.38 mmol), ClH₂CCOONa (765 mg, 6.57 mmol) and NaHCO₃ (1.1 g, 13.14 mmol) in DMF (10 mL) was stirred at 30° C. for 3 hours. Intermediate 3 (1.03 g, 4.38 mmol) was added to the reaction mixture. After the resulting mixture was stirred at 80° C. for 4 hours, the mixture was poured into ice-water and extracted with EA (20 mL*3). The combine organic layers were washed with brine, dried over Na₂SO₄ and filtered. The filtrate was concentrated and purified by SGC eluted with PE:EA=1:1 to give intermediate 4 (1.50 g, yield 79.7%) as an oil.

Intermediate 5 tert-butyl 4-(7-hydroxy-6-isopropyl-2-oxo-4-thioxo-2H-benzo[e][1,3]oxazin-3(4H)-yl)phenethylcarbamate The solution of intermediate 4 (1.5 g 3.2 mmol) and CDI (1.07 g, 6.57 mmol) in THF (3 mL) was stirred at room temperature for 4 hours. The reaction solution was poured into brine (5 mL) and extracted with EA (5 mL). The combined organic layers were washed with brine, dried over Na₂SO₄ and concentrated to give the intermediate 5 (2.5 g, crude) which was used for further reaction without purification.

Intermediate 6 tert-butyl 4-(3-(2,4-dihydroxy-5-isopropylphenyl)-5-hydroxy-4H-1,2,4-triazol-4-yl)phenethylcarbamate To a solution of intermediate 5 (2.5 g, crude) in EtOH (5 mL) was added (NH₂)₂ (238 mg, 7.4 mmol). Then the resulting mixture was stirred overnight at room temperature. The precipitated solid was filtered and dried to give intermediate 6 (500 mg, yield 20%) as a white solid.

Intermediate 7

4-(4-(4-(2-aminoethyl)phenyl)-5-hydroxy-4H-1,2,4-triazol-3-yl)-6-isopropylbenzene-1,3-diol A solution of intermediate 6 (500 mg, 1.41 mmol) in HCl-MeOH (3N, 10 mL) was stirred at room temperature for 16 hours. The reaction solution was concentrated to give intermediate 7 (360 mg, yield 92%) as a white solid.

Compound 039:

2-((6S)-4-(4-chlorophenyl)-2,3,9-trimethyl-6H-thieno[3,2-f][1,2,4]triazolo[4,3-a][1,4]diazepin-6-yl)-N-(4-(3-(2,4-dihydroxy-5-isopropylphenyl)-5-hydroxy-4H-1,2,4-triazol-4-yl) phenethyl)acetamide To a solution of intermediate 7-1 (50 mg, 0.125 mmol), HATU (71.3 mg, 0.188 mmol) and DIEA (48.4 mg, 0.375 mmol) in DMF (3 mL) was added intermediate 7 (48.8 mg, 0.125 mmol). The resulting mixture was stirred at room temperature for 3 hours. The mixture was purified by prep-HPLC (Waters 2767/Qda, Column: SunFire 19*250 mm 10 um, Mobile Phase A: 0.1% TFA/H$_2$O, B: CAN) to give Compound 039 15 mg, yield 16.3%) as a white solid.

$^1$H NMR (400 MHz, DMSO-d$_6$): δ 11.91 (s, 1H), 9.58 (s, 1H), 9.39 (s, 1H), 8.36-8.30 (m, 1H), 7.45 (dd, J=24.9, 8.6 Hz, 4H), 7.24 (d, J=8.4 Hz, 2H), 7.10 (d, J=8.3 Hz, 2H), 6.80 (s, 1H), 6.25 (s, 1H), 4.51 (t, J=7.0 Hz, 1H), 3.32-3.27 (m, 2H), 3.23-3.20 (m, 2H), 2.97-2.95 (m, 1H), 2.75-2.70 (m, 2H), 2.59 (s, 3H), 2.41 (s, 3H), 1.62 (s, 3H), 0.97 (d, J=6.9 Hz, 6H).

LCMS (ESI): RT=1.524 min, LCMS-004 (LCMS 2020-002) Method: A70B30+−, (A: 0.1% FA/H$_2$O B: 0.1% FA/ACN Col. SunFire C18) mass Calculated for C$_{38}$H$_{37}$ClN$_8$O$_4$S, 736.2, m/z found 737.6 [M+H$^+$]).

Example 2: Compound 074 Synthesis

A representative synthesis scheme for compound 074 is shown below. Specific synthesis routes of intermediates are also shown.

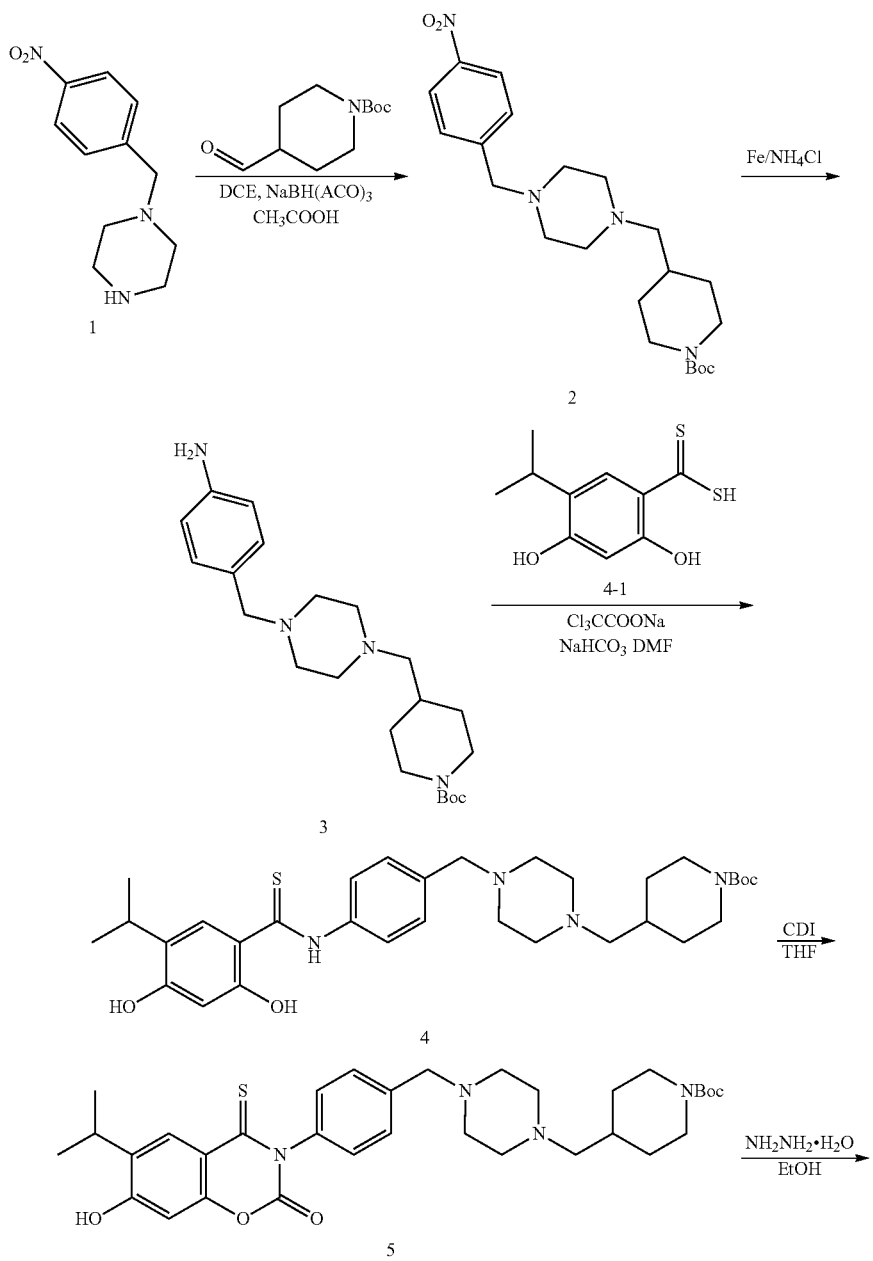

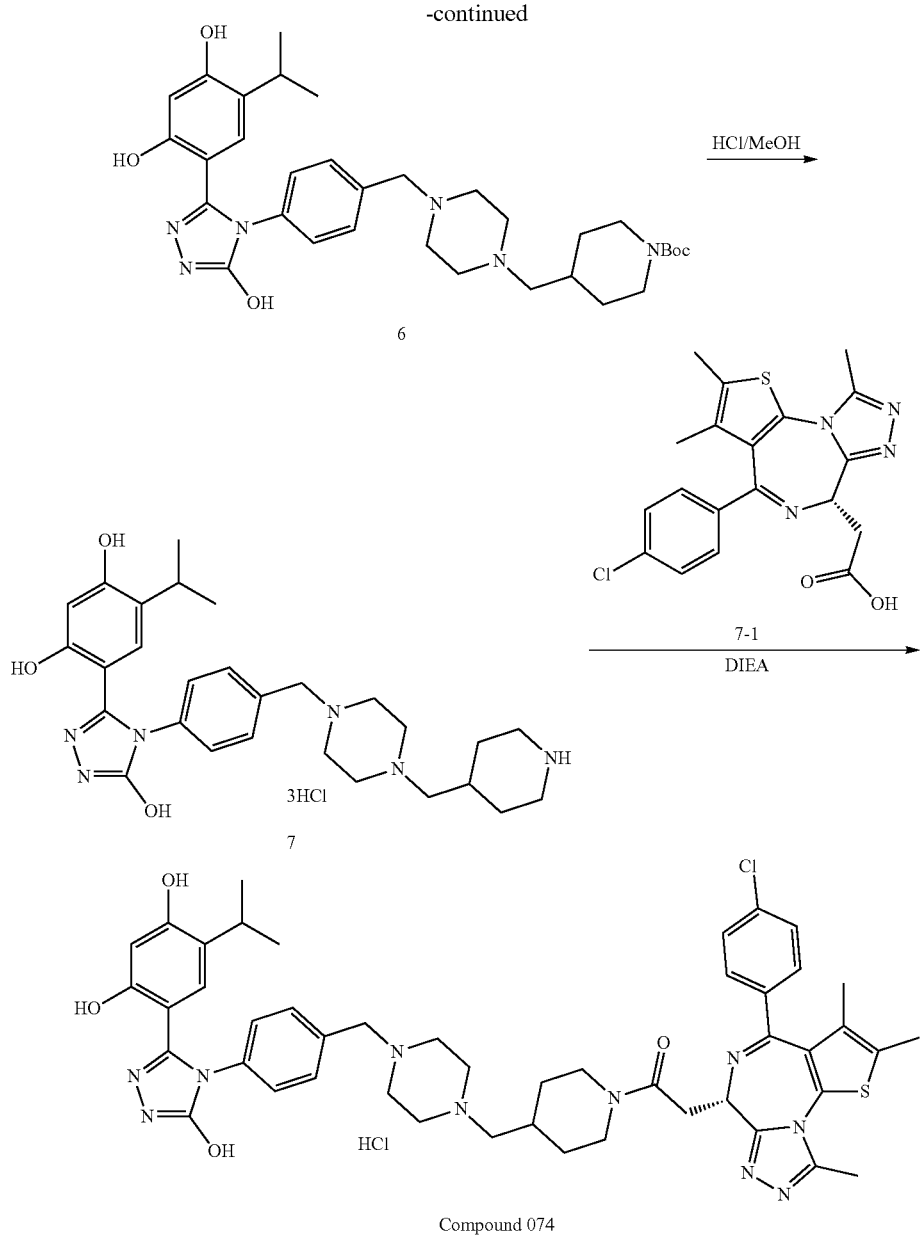

Compound 074

Intermediate 2 tert-butyl 4-((4-(4-nitrobenzyl)piperazin-1-yl)methyl)piperidine-1-carboxylate

To a solution of 1-(4-nitrobenzyl)piperazine (intermediate 1)(96 g, 0.434 mol), tert-butyl 4-formylpiperidine-1-carboxylate (92 g, 0.434 mol) and $CH_3COOH$ (26 g, 0.434 mol) in DCE (1 L) was added $NaBH(OAc)_3$ (138 g, 0.65 mol). Then the resulting mixture was stirred at room temperature overnight. The reaction solution was poured into aq. $NaHCO_3$ solution and extracted with DCM (500 mL*3). The combine organic layers were washed with brine, dried over $Na_2SO_4$ and concentrated to give intermediate 2 (163 g, yield 90%) as a white solid.

Intermediate 3 tert-butyl 4-((4-(4-aminobenzyl)piperazin-1-yl)methyl)piperidine-1-carboxylate

To a solution of intermediate 2 (163 g, 0.39 mol) and $NH_4Cl$ (210 g, 3.9 mol) in EtOH (1 L) and $H_2O$(100 mL) was added Fe power (109 g, 1.95 mmol). The resulting mixture was heated at 80° C. for 3 hours. It was cooled to room temperature and filtered. The filtrate was poured into aq. $NaHCO_3$ solution and extracted with EtOAc (1 L*3). The combine organic layers was washed with brine, dried over $Na_2SO_4$ and concentrated. The residue was titrated with PE:EA=10:1 to give intermediate 3 (120 g, yield 73%) as a white solid.

Intermediate 4 tert-butyl 4-((4-(4-(2,4-dihydroxy-5-isopropylphenylthioamido)benzyl)piperazin-1-yl)methyl)piperidine-1-carboxylate To a solution of intermediate 3 (77.5 g, 340 mmol), ClCH$_2$CO$_2$Na (49.5 g, 424.5 mmol) and NaHCO$_3$ (90 g, 849 mmol) in DMF (500 mL) was stirred at 40° C. for 3 hours. Compound 4 (110 g, 283 mmol) was added to the reaction. After the resulting mixture was heated at 80° C. overnight. The reaction mixture was poured into ice-water solid precipitated was collected by filtration to give intermediate 4 (132 g, 80% yield) as a yellow solid.

Intermediate 5 tert-butyl 4-((4-(4-(7-hydroxy-6-isopropyl-2-oxo-4-thioxo-2H-benzo[e][1,3]oxazin-3(4H)-yl)benzyl)piperazin-1-yl)methyl)piperidine-1-carboxylate The solution of intermediate 4 (132 g, 226 mmol) and CDI (73.4 g, 452 mmol) in THF (1 L) was stirred for 2 hours at room temperature. The reaction solution was poured into brine (1 L) and extracted with EtOAc (500 mL*3). The combine organic layers was washed with brine, dried over Na$_2$SO$_4$ and concentrated to give intermediate 5 (138 g, crude) which was used for further reaction without purification.

Intermediate 6 tert-butyl 4-((4-(4-(3-(2,4-dihydroxy-5-isopropylphenyl)-5-hydroxy-4H-1,2,4-triazol-4-yl)benzyl)piperazin-1-yl)methyl)piperidine-1-carboxylate To a solution of intermediate 5 (138 g, crude) in EtOH (1 L) was added NH$_2$NH$_2$H$_2$O (22.6 g, 452 mmol). Then the resulting mixture was stirred at room temperature overnight. The precipitated solid was filtered and dried to give intermediate 6 (62 g, 45% yield for 2 steps) as a white solid.

Intermediate 7

4-(5-hydroxy-4-(4-((4-(piperidin-4-ylmethyl)piperazin-1-yl)methyl)phenyl)-4H-1,2,4-triazol-3-yl)-6-isopropylbenzene-1,3-diol The solution of intermediate 6 (62 g, 102 mmol) in HCl-MeOH (3N, 300 mL) was stirred at room temperature for 16 hours. The reaction solution was concentrated to give intermediate 7 (63 g, 100% yield) as a white solid.

Compound 074:

(S)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-isopropylphenyl)-5-hydroxy-4H-1,2,4-triazol-4-yl)benzyl)piperazin-1-yl)methyl)piperidin-1-yl)ethan-1-one hydrochloride To a solution of intermediate 7-1 (13 g, 32.5 mmol), BOP (21.55 g, 48.75 mmol) and DIEA (41.86 g, 325 mmol) in DMF (130 mL) was added intermediate 7 (20 g, 32.5 mmol). The resulting mixture was stirred at room temperature overnight. H$_2$O was added and solid precipitated was collected by filtration. It was in dried then purified by silica gel chromatography (gradient, DCM: MeOH=50:1 to 30:1 to 20:1) to give 8 g of a white solid. To a solution of this white solid in MeOH (200 mL) was added HCl-MeOH (9 mL, 3N) and stirred. It was stirred at r.t. for 1 hour and concentrated. H$_2$O (60 mL) was added and stirred for 10 min. It was filtered, the filter cake was washed with H$_2$O (30 mL*2). It was dried under vacuum to give compound 074 (7.5 g) as yellow solid.

$^1$H NMR (400 MHz, DMSO-d$_6$): δ 11.95 (s, 1H), 10.68 (m, 1H), 9.62 (s, 1H), 9.38 (s, 1H), 7.64-7.44 (m, 6H), 7.25 (d, J=8.4 Hz, 2H), 6.93 (s, 1H), 6.31 (s, 1H), 4.63 (t, J=6.7 Hz, 1H), 4.41-4.15 (m, 3H), 3.79-3.40 (m, 12H), 3.43-3.00 (m, 4H), 2.76-2.55 (m, 5H), 2.42 (s, 3H), 2.05-2.02 (m, 1H), 1.90-1.68 (m, 2H), 1.63 (s, 3H), 0.98 (d, J=6.9 Hz, 6H).

LCMS (ESI): RT=1.31 min, LCMS-004 (LCMS 2020-002) Method: A90B10+−, (A: 0.1% FA/H2O B: 0.1% FA/ACN Col. SunFire C18) mass calcd. for C$_{47}$H$_{54}$C$_{12}$N$_{10}$O$_4$S, 924.34 m/z found 889.6 [M−HCl+H$^+$]).

Example 3: Compound 078 Synthesis

A representative synthesis scheme for compound 078 is shown below. Specific synthesis routes of intermediates are also shown.

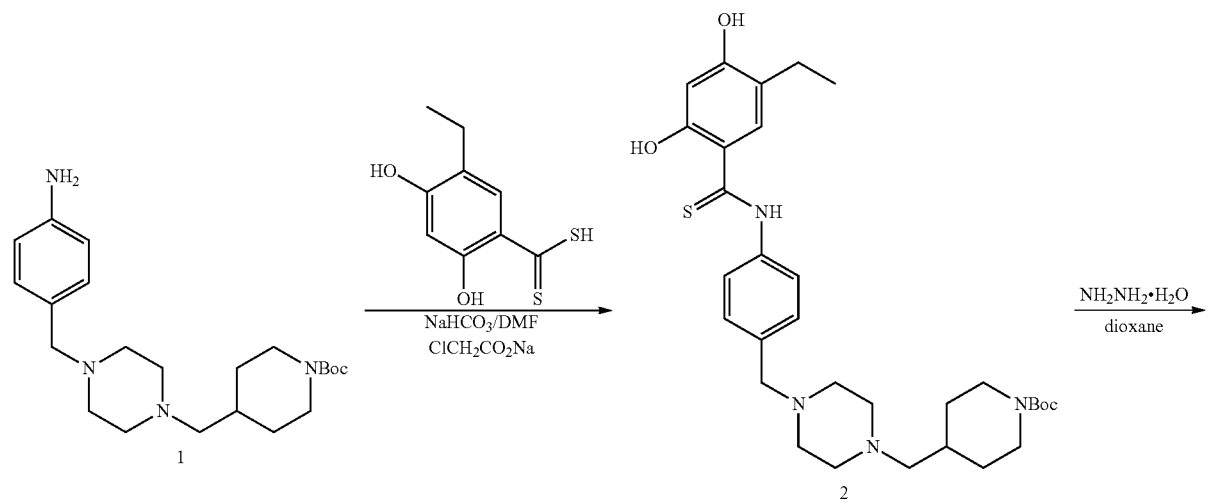

-continued
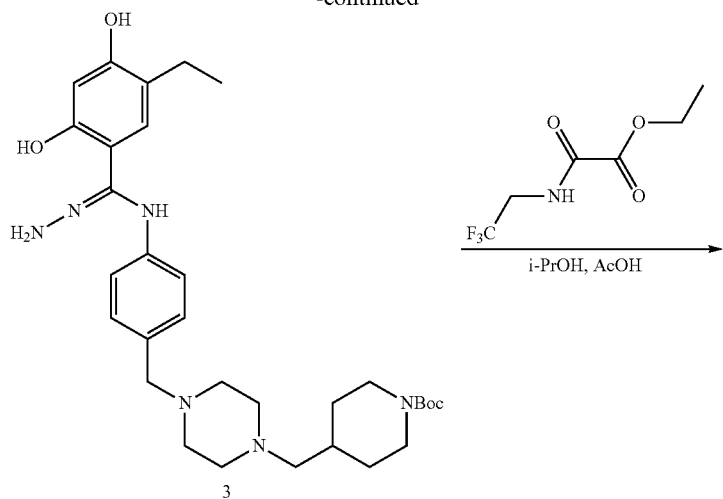
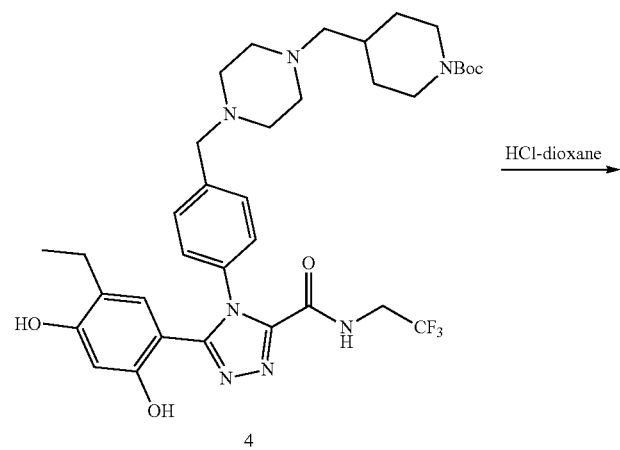
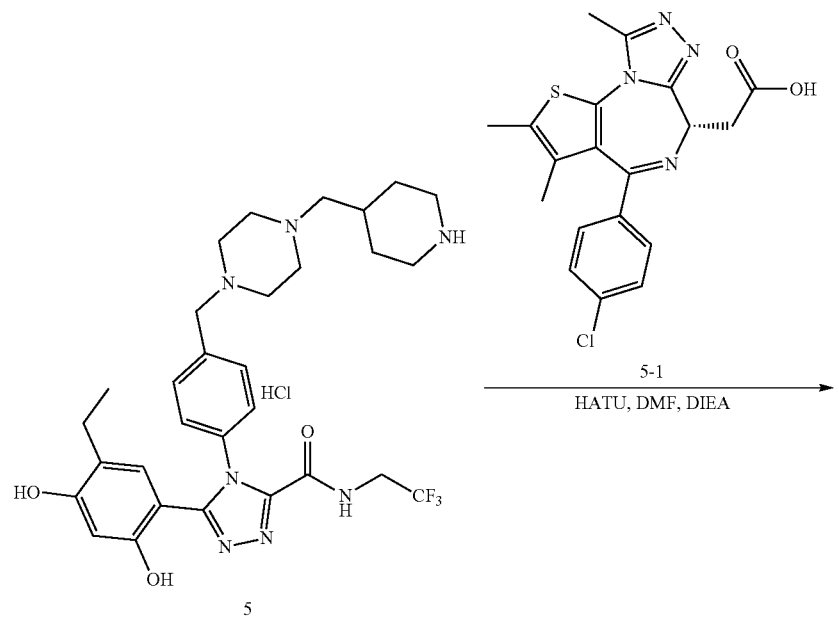

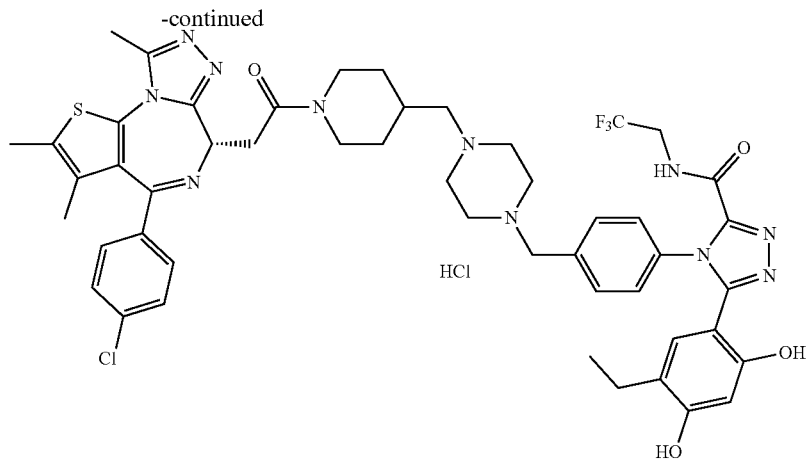

Compound 078

Intermediate 2 tert-butyl 4-((4-(4-(5-ethyl-2,4-dihydroxyphenylthioamido)benzyl)piperazin-1-yl)methyl) piperidine-1-carboxylate To a mixture of 5-ethyl-2,4-dihydroxybenzodithioic acid (3.00 g, 14.02 mmol) and NaHCO$_3$ (1.57 g, 18.70 mmol) in DMF (30 mL) was added ClCH$_2$CO$_2$Na (1.20 g, 10.29 mmol). After stirred at 40° C. for 1.5 h, intermediate 1 (3.64 g, 9.35 mmol) in DMF (30 mL) was added and stirred at 80° C. for 2 h. It was poured into ice water (50 mL). The precipitated solid was collected by filtration and dried under vacuum to give intermediate 2 (5.0 g) as a yellow solid.

Intermediate 3 tert-butyl 4-((4-(4-(5-ethyl-2,4-dihydroxybenzohydrazonamido)benzyl)piperazin-1-yl)methyl)piperidine-1-carboxylate To a solution of intermediate 2 (5 g, 5.27 mmol) in dioxane (70 mL) was added hydrazine hydride (1.6 g, 21.08 mmol). It was stirred at r.t. for 3 h and extracted with EtOAc (200 mL*2). Combined organic phase was washed with H$_2$O and brine, dried over Na$_2$SO$_4$, filtered and concentrated to give intermediate 3 (5.4 g) as a brown solid.

Intermediate 4 tert-butyl 4-((4-(4-(3-(5-ethyl-2,4-dihydroxyphenyl)-5-((2,2,2-trifluoroethyl) carbamoyl)-4H-1,2,4-triazol-4-yl)benzyl)piperazin-1-yl)methyl)piperidine-1-carboxylate To a solution of intermediate 3 (5.4 g, 9.5 mmol) in i-PrOH (55 mL) was added ethyl 2-oxo-2-((2,2,2-trifluoroethyl)amino)acetate (3.8 g, 19.0 mmol) and AcOH (0.15 mL). After stirred at 85° C. overnight, it was cooled to room temperature. The precipitated solid was collected filtration and dried under vacuum to give intermediate 4 (2.5 g) as a white solid.

Intermediate 5

5-(5-ethyl-2,4-dihydroxyphenyl)-4-(4-((4-(piperidin-4-ylmethyl)piperazin-1-yl)methyl)phenyl)-N-(2,2,2-trifluoroethyl)-4H-1,2,4-triazole-3-carboxamide Intermediate 4 (2.5 g, 3.56 mmol) was dissolved in HCl-Dioxane (3 N, 10 mL). The mixture was stirred at r.t. overnight and concentrated under vacuum to give the title compound Intermediate 5 (3.0 g) as a yellow solid.

Compound 078:

4-(4-((4-((1-(2-((6S)-4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(5-ethyl-2,4-dihydroxyphenyl)-N-(2,2,2-trifluoroethyl)-4H-1,2,4-triazole-3-carboxamide hydrochloride To a solution of intermediate 5-1 (300 mg, 0.8 mmol) and intermediate 5 (530 mg, 0.8 mmol) in DMF (15 mL) was added DIEA (4 mg, 3.8 mmol) and HATU (290 mg, 0.8 mmol) at r.t.. After stirred at r.t. overnight, the reaction mixture was diluted with water (10 mL) and extracted with EtOAc (10 mL*3). The combined organic phase was washed with H$_2$O, brine, dried over Na$_2$SO$_4$ and concentrated. The crude product was purified by prep-HPLC (Waters 2767/Qda, Column: SunFire 19*250 mm 10 um, Mobile Phase A: 0.1% TFA/H$_2$O, B: ACN) to give a white solid (211 mg). Saturated NaHCO$_3$ (20 mL) was added and extracted with EtOAc (20 mL*2). Combined organic phase was washed with H$_2$O and brine, dried over Na$_2$SO$_4$, filtered and concentrated. H$_2$O (20 mL) was added to the residue and then HCl (2N, 1 mL) was added. It was lyophilized to give compound 078 as a yellow solid.

$^1$H NMR (400 MHz, DMSO-d$_6$): 9.75-9.66 (m, 2H), 7.61-7.37 (m, 8H), 6.75 (s, 1H), 6.34 (s, 1H), 4.60-4.57 (m, 1H), 4.37-4.34 (m, 2H), 4.21-4.16 (m, 2H), 3.99-3.95 (m, 2H), 3.66-3.30 (m, 11H), 3.18-3.12 (m, 3H), 2.67-2.57 (m, 4H), 2.44 (s, 3H), 2.33-2.29 (m, 2H), 1.76-1.60 (m, 4H), 1.63 (s, 3H), 1.24 (s, 1H), 0.95-0.91 (m, 4H).

LCMS (ESI): Shimadzu LCMS-017 R$_T$=1.415 min, Method: A90B10, (A: 0.1% FA/H$_2$O B: 0.1% FA/CAN Col. SunFire C18) mass calcd. For C$_{49}$H$_{54}$C$_{12}$F$_3$N$_{11}$O$_4$S Chemical Formula: 1019.34 m/z found 984.4 [M–HCl+H]$^+$.

Example 4: Compound 016 Synthesis
A representative synthesis scheme for compound 016 is shown below. Specific synthesis routes of intermediates are also shown.
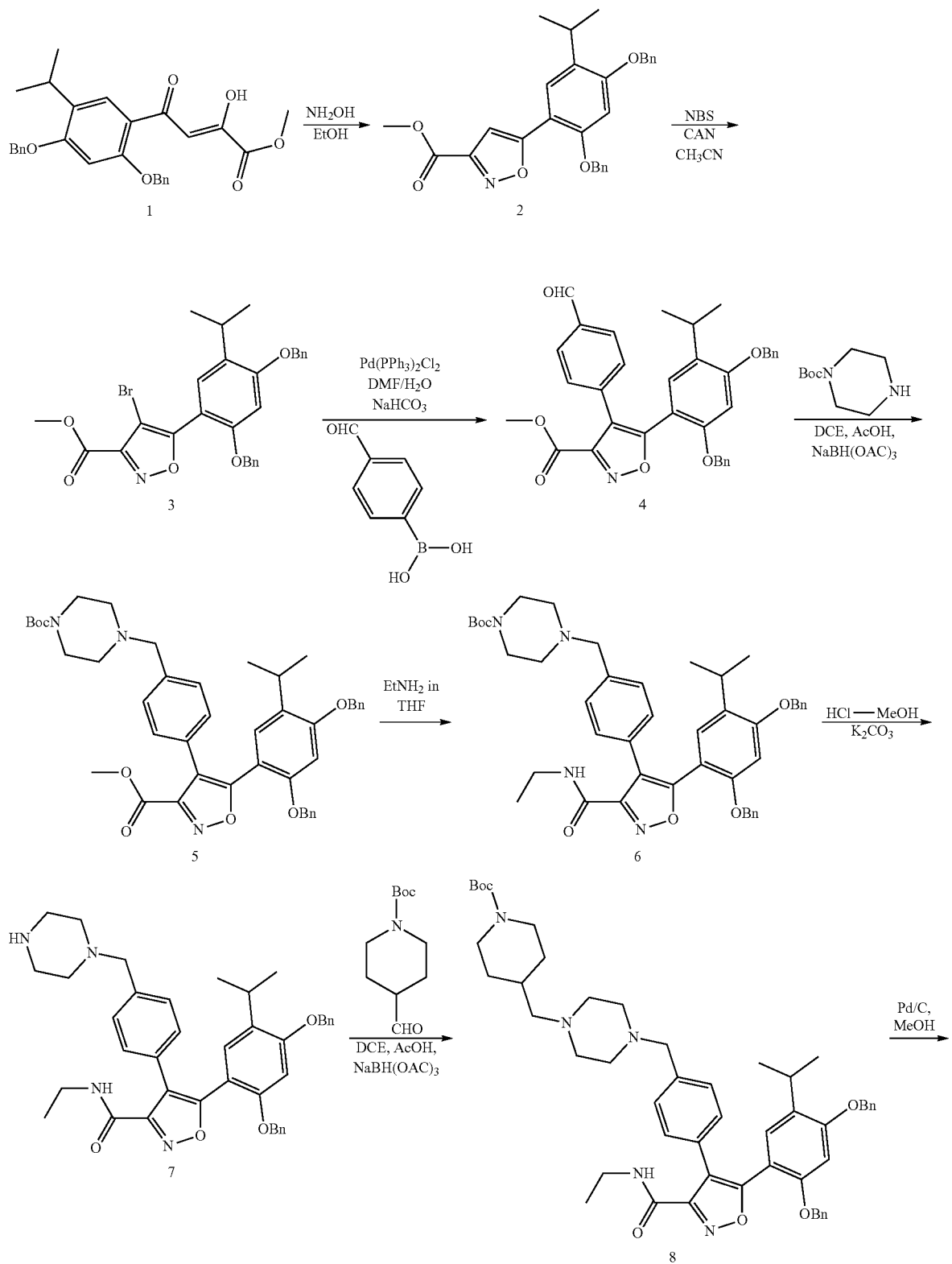

-continued
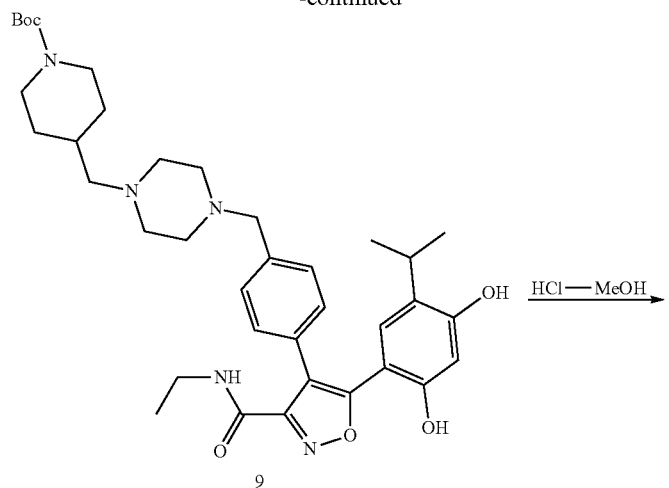
9
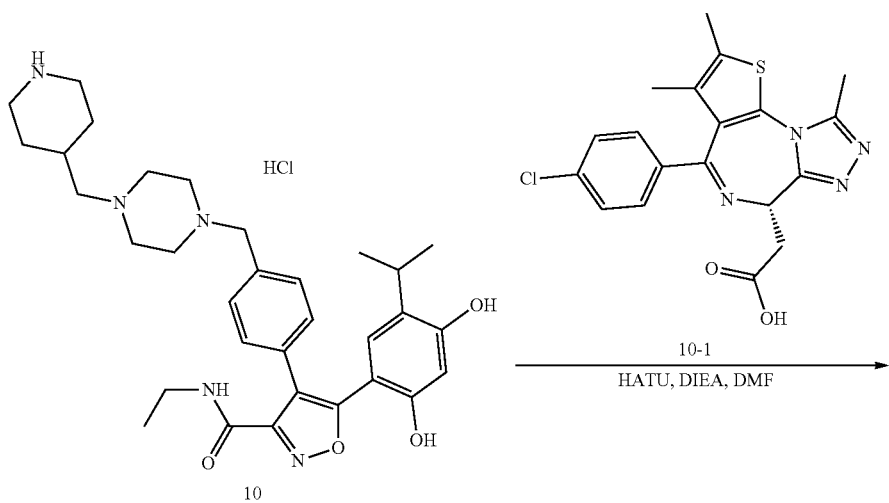
10-1
HATU, DIEA, DMF
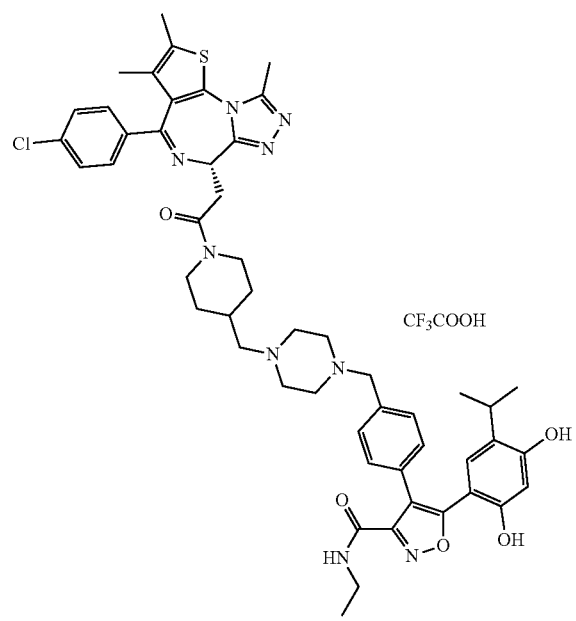
Compound 16

Intermediate 2 methyl 5-(2,4-bis(benzyloxy)-5-isopropylphenyl) isoxazole-3-carboxylate

The mixture of intermediate 1 (15.5 g, 33.70 mmol) and hydroxylamine hydrochloride in EtOH (50 mL) was stirred at reflux for 4 h, then cooled to r.t and concentrated. $H_2O$ was added and it was extracted with DCM (100 mL*3). The combined organic phase was dried over $Na_2SO_4$, filtered and concentrated. The residue was triturated with EtOH/$H_2O$ (200 mL/200 mL). It was collected by filtration to give intermediate 2 (15 g, yield 97%) as a yellow solid.

Intermediate 3 methyl 5-(2,4-bis(benzyloxy)-5-isopropylphenyl)-4-bromoisoxazole-3-carboxylate The mixture of methyl intermediate 2 (15 g, 32.82 mmol), NBS (6.43, 36.11 mmol) and CAN (9.0 g, 16.41 mmol) in $CH_3CN$ (200 mL) was stirred at reflux for 14 h. After cooled to r.t it was concentrated. $H_2O$ was added and it was extracted with EA (100 mL*3). The combined organic phase was washed with $H_2O$, brine, dried over $Na_2SO_4$ and concentrated. The residue was purified by silica gel chromatography (DCM:MeOH=20:1) to give compound intermediate 3 (14.2 g, yield 81) as a yellow solid.

Intermediate 4 methyl 5-(2,4-bis(benzyloxy)-5-isopropylphenyl)-4-(4-formylphenyl)isoxazole-3-carboxylate To a solution intermediate 3 (3 g, 5.6 mmol) in DMF/$H_2O$ (140 mL/28 mL) was added (4-formylphenyl) boronic acid (1.34 g, 8.4 mmol), $NaHCO_3$ (1.4 g, 16.8 mmol) and $Pd(PPh_3)_2Cl_2$ (0.4 g, 0.56 mmol). It was stirred at 800° C. for 3 h under Ar atmosphere. The resulting mixture was poured into $H_2O$ and extracted with EtOAc (100 mL*3). The combined organic phase was washed with water, brine, dried over $Na_2SO_4$ and concentrated. The residue was purified by silica gel chromatography (DCM:MeOH=20:1) to give intermediate 4 (1.7 g, yield 54%) as a yellow solid.

Intermediate 5 methyl 5-(2,4-bis(benzyloxy)-5-isopropylphenyl)-4-(4-((4-(tert-butoxycarbonyl)piperazin-1-yl)methyl)phenyl)isoxazole-3-carboxylate The mixture of intermediate 4 (1.7 g, 3.03 mmol), tert-butyl piperazine-1-carboxylate (0.56 g, 3.03 mmol) in DCE (15 mL) was stirred at room temperature for 1 h. NaBH(OAc)$_3$ (1.4 g, 6.4 mmol) was added and stirred for 2 h. The resulting mixture was diluted with $H_2O$ and extracted with EtOAc (20 mL*2). The combined organic phase was washed with water, brine, dried over $Na_2SO_4$ and concentrated to give intermediate 5 (1.5 g, yield 68%) as a yellow solid.

Intermediate 6 tert-butyl 4-(4-(5-(2,4-bis(benzyloxy)-5-isopropylphenyl)-3-(ethylcarbamoyl)isoxazol-4-yl)benzyl)piperazine-1-carboxylate The mixture of intermediate 6 (1.5 g, 2.05 mmol) in $EtNH_2$-THF (2N, 10 mL) was stirred at reflux for 18 h. The resulting mixture was diluted with water and extracted with EtOAc (20 mL*2). The combined organic phase was washed with $H_2O$, brine, dried over $Na_2SO_4$ and filtered. It was concentrated to give intermediate 6 (1.5 g, yield 98%) as a yellow solid.

Intermediate 7

5-(2,4-bis(benzyloxy)-5-isopropylphenyl)-N-ethyl-4-(4-(piperazin-1-ylmethyl)phenyl)isoxazole-3-carboxamide The mixture of intermediate 6 (1.5 g, 2.02 mmol) in HCl-MeOH (3 N, 10 mL) was stirred at room temperature for 3 hours. The resulting mixture was concentrated to give of intermediate 7 HCl (1.37 g) as a white solid. It was added into $H_2O$ then $K_2CO_3$ was added until pH=10-11. It was extracted with EtOAc (20 mL*3). The combined organic phase was washed with $H_2O$, brine, dried over $Na_2SO_4$ and concentrated to give intermediate 7 (1.28 g, 100%).

Intermediate 8 tert-butyl 4-((4-(4-(5-(2,4-bis(benzyloxy)-5-isopropylphenyl)-3-(ethylcarbamoyl)isoxazol-4-yl)benzyl)piperazin-1-yl)methyl)piperidine-1-carboxylate The mixture intermediate 7 (1.28 g, 1.98 mmol), tert-butyl 4-formylpiperidine-1-carboxylate (0.42 g, 1.98 mmol) and AcOH (1 mL) in DCE (15 mL) was stirred at room temperature for 1 h. NaBH(OAc)$_3$ (0.96 g, 4.34 mmol) was added and stirred for 2 h. The resulting mixture was diluted with water and extracted with EA (20 mL*2). The combined organic phase was washed with $H_2O$, brine, dried over $Na_2SO_4$ and concentrated to give intermediate 8 (1.64 g, yield 98%) as yellow solid.

Intermediate 9 tert-butyl 4-((4-(4-(5-(2,4-dihydroxy-5-isopropylphenyl)-3-(ethylcarbamoyl)isoxazol-4-yl)benzyl)piperazin-1-yl)methyl)piperidine-1-carboxylate The solution of intermediate 8 (1.64 g, 4.51 mmol) and Pd/C (10%, 600 mg) in MeOH (50 mL) was stirred at room temperature overnight under $H_2$ atmosphere. The reaction solution was filtered and the filtrate was concentrated in vacuo to give intermediate 9 (1.27 g, yield 100%) as a white solid.

Intermediate 10

5-(2,4-dihydroxy-5-isopropylphenyl)-N-ethyl-4-(4-((4-(piperidin-4-ylmethyl)piperazin-1-yl)methyl)phenyl)isoxazole-3-carboxamide hydrochloride The mixture of intermediate 9 (1.27 g) in HCl-MeOH (3 N, 20 mL) was stirred at room temperature for 3 hours. The resulting mixture was concentrated to give intermediate 10 (1.12 g, yield 98%) as a white solid.

Compound 16

4-(4-((4-((1-(2-(((6S)-4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxy-5-isopropylphenyl)-N-ethylisoxazole-3-carboxamide, trifluoroacetic acid The mixture of intermediate 10 (50 mg, 0.084 mmol), intermediate 10-1 (33.6 mg, 0.084 mmol), HATU (48 mg, 0.126 mmol) and DIEA (43 mg, 0.336 mmol) in DMF (2 mL) was stirred at room temperature for 1 h. The resulting mixture was extracted with EtOAc (10 mL*3). The combined organic phase was washed with $H_2O$, brine, dried over $Na_2SO_4$. It was filtered and concentrated then purified by prep-HPLC (Waters 2767/Qda, Column: SunFire 19*250 mm 10 um, Mobile Phase A: 0.1% TFA/$H_2O$, B: ACN) to give compound 016 (12.66 mg, yield 16%) as a yellow solid.

$^1$H NMR (400 MHz, DMSO-$d_6$) δ 9.79 (s, 1H), 9.67 (s, 1H), 8.87 (s, 1H), 7.55-7.19 (m, 9H), 6.76 (s, 1H), 6.44 (s, 1H), 4.57 (t, J=6.7 Hz, 1H), 4.35 (d, J=11.5 Hz, 2H), 4.15-4.13 (m, 2H), 3.64-3.59 (m, 7H), 3.39-3.33 (m, 3H), 3.26-3.20 (m, 3H), 3.13-3.10 (m, 4H), 3.02-2.95 (m, 3H), 2.60-2.58 (m, 4H), 2.42 (s, 3H), 1.77-1.66 (m, 2H), 1.63 (s, 3H), 1.09 (t, J=7.2 Hz, 3H), 0.93 (d, J=6.9 Hz, 6H). LCMS (ESI): Shimadzu LCMS-009, RT=1.486 min, Method: A90B10+−, (A: 0.1% FA/$H_2O$ B: 0.1% FA/ACN Col.sunFire C18) mass calcd. For $C_{51}H_{58}ClN_9O_5S$, 943.40 m/z found 944.6 [M−$CF_3COOH$+H]$^+$.

Additional compounds were made according to the general procedure and scheme noted in the Examples 1-4 including the following:

Compound 002

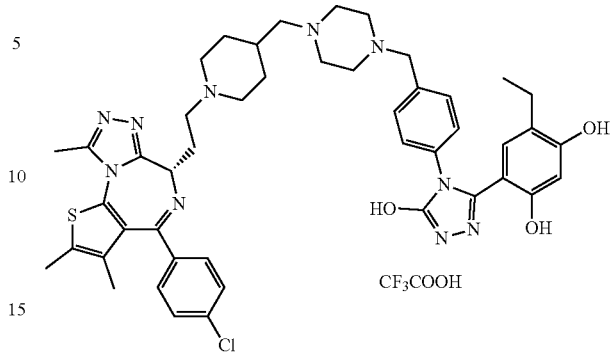

CF$_3$COOH 4-(4-(4-((4-((1-2-(((6S)-4-(4-chlorophenyl)-2,3,9-trimethyl-6H-thieno[3,2-f][1,2,4]triazolo[4,3-a][1,4]diazepin-6-yl)ethyl)piperidin-4-yl)methyl)piperazin-1-yl)methyl)phenyl)-5-hydroxy-4H-1,2,4-triazol-3-yl)-6-ethylbenzene-1,3-diol, trifluoroacetic acid. $^1$H NMR (400 MHz, DMSO-$d_6$): δ 11.95 (s, 1H), 9.60 (s, 1H), 9.36 (s, 1H), 7.51 (s, 2H), 7.40 (s, 2H), 7.22 (s, 2H), 6.87 (s, 1H), 6.24 (s, 1H), 5.32 (s, 1H), 4.29 (s, 1H), 2.85-2.58 (m, 11H), 2.36 (m, 6H), 2.00 (m, 5H), 1.62 (s, 3H), 1.23 (s, 10H), 0.99 (t, J=7.5 Hz, 3H), 0.84 (d, J=7.0 Hz, 2H). LCMS (ESI): R$_T$=1.023 min, m/z found 861.2 [M−$CF_3COOH$+H]$^+$.

Compound 001

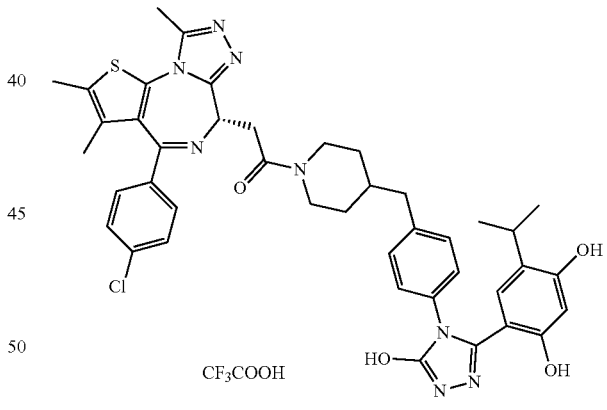

2-((6S)-4-(4-chlorophenyl)-2,3,9-trimethyl-6H-thieno[3,2-f][1,2,4]triazolo[4,3-a][1,4]diazepin-6-yl)-1-(4-((4-(4-(3-(5-ethyl-2,4-dihydroxyphenyl)-5-hydroxy-4H-1,2,4-triazol-4-yl)benzyl)piperazin-1-yl)methyl)piperidin-1-yl)ethanone. $^1$H NMR (400 MHz, DMSO-$d_6$): δ 11.90 (s, 1H), 9.56 (s, 1H), 9.37 (s, 1H), 7.47 (m, 4H), 7.27 (d, J=8.1 Hz, 2H), 7.11 (d, J=8.2 Hz, 2H), 6.82 (s, 1H), 6.24 (s, 1H), 4.56 (t, J=6.8 Hz, 1H), 4.34 (m, 1H), 4.11 (m, 1H), 3.60 (s, 1H), 3.43 (s, 3H), 3.10 (s, 1H), 2.59 (s, 4H), 2.43-2.24 (m, 11H), 2.12 (s, 2H), 1.99 (s, 1H), 1.78 (s, 2H), 1.63 (s, 4H), 1.23 (s, 2H), 1.11 (s, 1H), 0.96 (t, J=7.4 Hz, 3H). LCMS (ESI): R$_T$=1.083 min, m/z found 875.2 [M+H]$^+$.

Compound 003

2-((6S)-4-(4-chlorophenyl)-2,3,9-trimethyl-6H-thieno[3,2-f][1,2,4]triazolo[4,3-a][1,4]diazepin-6-yl)-1-(4-(4-(3-(2,4-dihydroxy-5-isopropylphenyl)-5-hydroxy-4H-1,2,4-triazol-4-yl)benzyl)piperidin-1-yl)ethanone, trifluoroacetic acid. $^1$H NMR (400 MHz, DMSO-$d_6$): δ 11.92 (s, 1H), 9.61-9.50 (m, 2H), 7.51-7.44 (m, 4H), 7.21 (d, J=8.3 Hz, 2H), 7.11 (d, J=8.0 Hz, 2H), 6.77 (s, 1H), 6.27 (s, 1H), 4.58 (t, J=6.4 Hz, 2H), 4.34 (d, J=12.1 Hz, 2H), 4.11 (d, J=13.2 Hz, 1H), 3.60-3.59 (m, 1H), 3.38-3.35 (m, 1H), 3.6-2.95 (m, 2H), 2.60-2.57 (m, 3H), 2.52-2.50 (m, 2H), 2.42 (s, 3H), 1.85-1.51 (m, 6H), 1.24-1.00 (m, 2H), 0.96 (t, J=6.8 Hz, 6H). LCMS (ESI): R$_T$=1.817 min, m/z found 791.2 [M−$CF_3COOH$+H]$^+$.

Compound 004

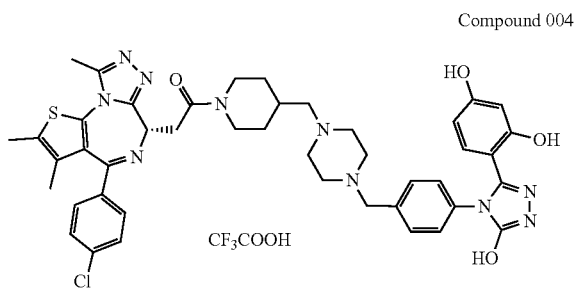 [SMILES: Cc1sc2c(c1C)C(c1ccc(Cl)cc1)=N[C@@H](CC(=O)N1CCC(CN3CCN(Cc4ccc(-n5c(O)nnc5-c5ccc(O)cc5O)cc4)CC3)CC1)c1nnc(C)n1-2 ; "CF3COOH"]

2-((6S)-4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxyphenyl)-5-hydroxy-4H-1,2,4-triazol-4-yl)benzyl)piperazin-1-yl)methyl)piperidin-1-yl)ethanone, trifluoroacetic acid. $^1$H NMR (400 MHz, DMSO-$d_6$): δ 11.95 (s, 1H), 9.59-9.50 (m, 2H), 7.50-7.37 (m, 6H), 7.21-7.06 (m, 3H), 6.25-6.17 (m, 2H), 5.20-4.88 (m, 4H), 4.59-4.56 (m, 2H), 4.37-4.34 (m, 2H), 3.98-3.90 (m, 2H), 3.67-3.61 (m, 2H), 3.40-3.33 (m, 2H), 3.17-2.73 (m, 7H), 2.60-2.58 (m, 4H), 2.49 (s, 3H), 1.99 (s, 1H), 1.75-1.69 (m, 2H), 1.63 (s, 3H). LCMS (ESI): $R_T$=1.282 min, m/z found 845.7 [M–CF$_3$COOH–H]$^-$.

Compound 006

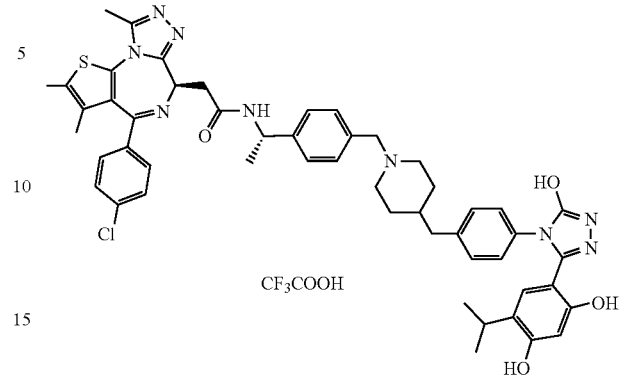

2-((6S)-4-(4-chlorophenyl)-2,3,9-trimethyl-6H-thieno[3,2-f][1,2,4]triazolo[4,3-a][1,4]diazepin-6-yl)-N—((R)-1-(4-((1-(4-(3-(2,4-dihydroxy-5-isopropylphenyl)-5-hydroxy-4H-1,2,4-triazol-4-yl)benzyl)piperidin-4-yl)methyl)phenyl)ethyl)acetamide, trifluoroacetic acid.
$^1$H NMR (400 MHz, DMSO-$d_6$): δ 11.92 (s, 1H), 10.05-9.15 (m, 3H), 8.76 (d, J=7.8 Hz, 1H), 7.55-7.45 (m, 6H), 7.37-7.30 (m, 2H), 7.14-7.09 (m, 4H), 6.77 (s, 1H), 6.27 (d, J=4.5 Hz, 1H), 5.04-4.95 (m, 1H), 4.50-4.46 (m, 1H), 4.26-4.24 (m, 2H), 3.43-3.17 (m, 5H), 2.98-2.96 (m, 1H), 2.67-2.60 (m, 2H), 2.61 (s, 3H), 2.39 (s, 3H), 1.71-1.62 (m, 2H), 1.55-1.40 (m, 3H), 1.38-1.28 (m, 5H), 0.94 (d, J=6.8 Hz, 6H). LCMS (ESI): $R_T$=1.433 min, m/z found 924 [M–CF$_3$COOH+H]$^+$.

Compound 005

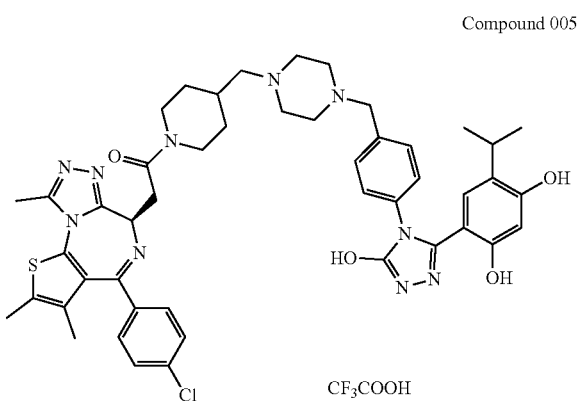 [SMILES: Cc1sc2c(c1C)C(c1ccc(Cl)cc1)=N[C@H](CC(=O)N1CCC(CN3CCN(Cc4ccc(-n5c(O)nnc5-c5cc(C(C)C)c(O)cc5O)cc4)CC3)CC1)c1nnc(C)n1-2 ; "CF3COOH"]

2-((6R)-4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-isopropylphenyl)-5-hydroxy-4H-1,2,4-triazol-4-yl)benzyl)piperazin-1-yl)methyl)piperidin-1-yl)ethanone, trifluoroacetic acid. $^1$H NMR (400 MHz, DMSO-$d_6$): δ 11.95 (s, 1H), 9.61 (s, 1H), 9.37 (s, 1H), 7.55-7.15 (m, 8H), 6.82 (s, 1H), 6.26 (s, 1H), 4.59-4.54 (m, 1H), 4.35-4.30 (m, 1H), 4.15-4.10 (m, 2H), 3.75-3.50 (m, 8H), 3.37-3.30 (m, 2H), 3.24-2.90 (m, 8H), 2.63 (s, 4H), 2.42 (s, 3H), 1.77-1.70 (m, 2H), 1.63 (s, 3H), 0.98 (d, J=6.9 Hz, 6H). LC-MS (ESI): $R_T$=1.235 min, m/z found 889.5 [M–CF$_3$COOH+H]$^+$ Compound 009

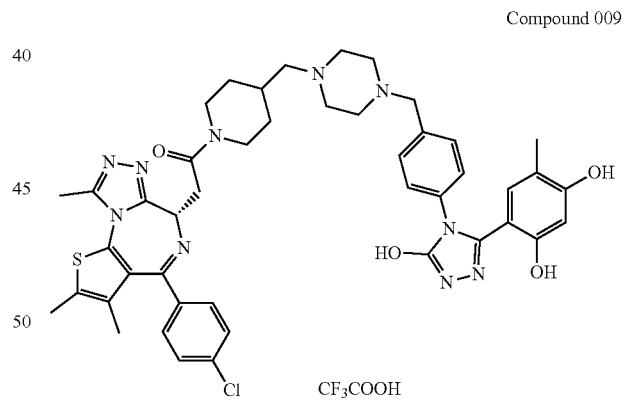

2-((6S)-4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-methylphenyl)-5-hydroxy-4H-1,2,4-triazol-4-yl)benzyl)piperazin-1-yl)methyl)piperidin-1-yl)ethanone, trifluoroacetic acid. $^1$H NMR (400 MHz, DMSO-$d_6$): δ 11.93 (s, 1H), 9.60 (s, 1H), 9.31 (s, 1H), 7.51-7.42 (m, 6H), 7.22 (d, J=8.4 Hz, 2H), 6.95 (s, 1H), 6.24 (s, 1H), 4.58 (t, J=6.7 Hz, 1H), 4.35 (d, J=12.9 Hz, 1H), 4.15-4.01 (m, 2H), 3.68-3.33 (m, 3H), 3.07-2.85 (m, 6H), 2.60 (s, 3H), 2.55-2.50 (m, 6H), 2.42 (s, 3H), 2.02-1.99 (m, 1H), 1.97 (s, 3H), 1.86-1.75 (m, 2H), 1.63 (s, 3H), 1.35-0.88 (m, 2H). LCMS (ESI): $R_T$=1.35 min, m/z found 861.4 [M–CF$_3$COOH+H]$^+$.

Compound 010

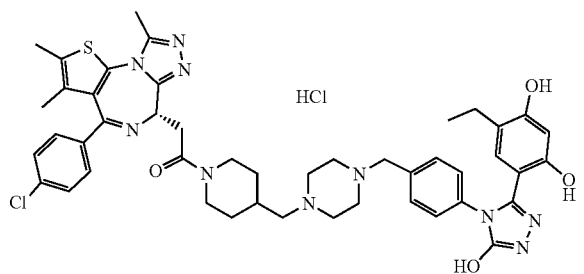

(S)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(5-ethyl-2,4-dihydroxyphenyl)-5-hydroxy-4H-1,2,4-triazol-4-yl)benzyl)piperazin-1-yl)methyl)piperidin-1-yl)ethan-1-one hydrochloride. $^1$H NMR (400 MHz, DMSO-$d_6$): δ 11.97 (s, 1H), 11.33 (s, 1H), 9.70-9.40 (m, 2H), 7.65-7.63 (m, 2H), 7.53-7.43 (m, 4H), 7.24 (d, J=8.2 Hz, 2H), 6.96 (s, 1H), 6.32 (s, 1H), 4.63 (t, J=6.8 Hz, 1H), 4.39-4.33 (m, 4H), 3.79-3.43 (s, 10H), 3.16-3.06 (m, 3H), 2.65-2.60 (m, 4H), 2.43-2.38 (m, 5H), 2.12-1.88 (m, 4H), 1.63 (s, 3H), 0.96 (t, J=7.4 Hz, 3H). LCMS (ESI): R$_T$=1.07 min, m/z found 875.1 [M−HCl+H]$^+$.

Compound 011

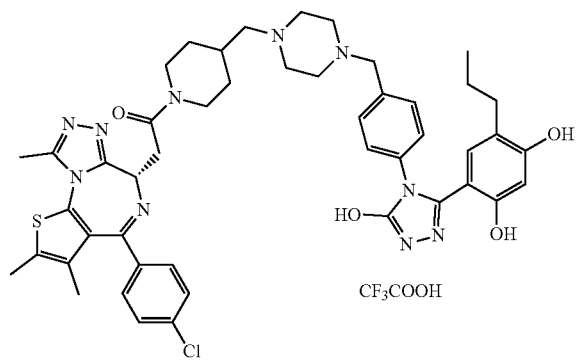

(S)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-propylphenyl)-5-hydroxy-4H-1,2,4-triazol-4-yl)benzyl)piperazin-1-yl)methyl)piperidin-1-yl)ethan-1-one, trifluoroacetic acid. $^1$H NMR (400 MHz, DMSO-$d_6$): δ 11.97 (s, 1H), 9.70-9.40 (m, 2H), 8.38 (s, 4H), 7.50-7.42 (m, 6H), 7.26 (d, J=8.2 Hz, 2H), 7.11 (d, J=8.2 Hz, 2H), 6.77 (s, 1H), 6.26 (s, 1H), 4.56 (t, J=6.8 Hz, 1H), 4.39-4.20 (m, 2H), 3.33-3.30 (m, 4H), 2.59-2.56 (m, 5H), 250-2.13 (m, 11H), 1.62-1.63 (m, 8H), 1.36-1.00 (m, 4H), 0.76 (t, J=7.4 Hz, 3H).
LCMS (ESI): R$_T$=1.47 min, m/z found 889.3 [M−CF$_3$COOH+H]$^+$.

Compound 012

2-((6S)-4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-isopropylphenyl)-5-mercapto-4H-1,2,4-triazol-4-yl)benzyl)piperazin-1-yl)methyl)piperidin-1-yl)ethanone, trifluoroacetic acid. $^1$H NMR (400 MHz, DMSO-$d_6$): δ 13.92 (s, 1H), 9.66 (s, 1H), 9.43 (s, 1H), 7.51-7.26 (m, 5H), 7.27 (d, J=8.0 Hz, 2H), 6.84 (s, 1H), 6.25 (s, 1H), 4.58 (t, J=6.7 Hz, 1H), 4.35 (d, J=12.9 Hz, 1H), 4.15-4.13 (m, 1H), 3.80-3.30 (m, 13H), 3.15-3.10 (m, 2H), 3.03-2.87 (m, 2H), 2.60-2.58 (m, 4H), 2.42 (s, 3H), 2.24-1.94 (m, 5H), 1.87 (s, 2H), 0.97 (d, J=6.9 Hz, 6H). LCMS (ESI): R$_T$=1.123 min, m/z, Found 905.1 [M−CF$_3$COOH+H]$^+$.

Compound 013

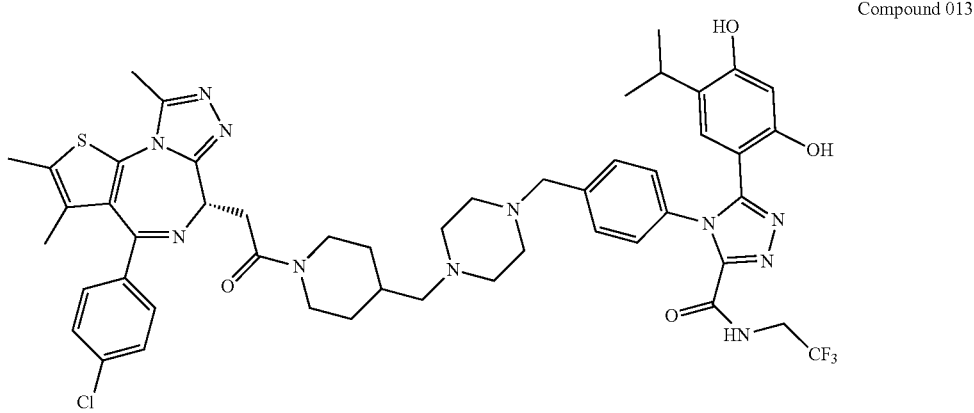 [SMILES: Cc1sc2c(c1C)C(c1ccc(Cl)cc1)=N[C@@H](CC(=O)N1CCC(CN3CCN(Cc4ccc(-n5c(C(=O)NCC(F)(F)F)nnc5-c5cc(C(C)C)c(O)cc5O)cc4)CC3)CC1)c1nnc(C)n1-2]

4-(4-((4-((1-(2-((6S)-4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxy-5-isopropylphenyl)-N-(2,2,2-trifluoroethyl)-4H-1,2,4-triazole-3-carboxamide. ¹H NMR (400 MHz, DMSO-d₆): δ 10.45 (s, 1H), 9.75-9.58 (m, 2H), 7.50-7.30 (m, 6H), 6.62 (s, 1H), 6.34 (s, 1H), 4.58-4.55 (m, 1H), 4.36-4.33 (m, 1H), 4.13-4.10 (m, 1H), 3.98-3.94 (m, 2H), 3.60-3.49 (m, 4H), 3.15-3.11 (m, 1H), 2.93-2.90 (m, 1H), 2.60 (s, 4H), 2.41-2.30 (m, 10H), 2.14-2.13 (m, 2H), 1.82-1.79 (m, 3H), 1.63 (s, 3H), 1.23-1.12 (m, 1H), 1.16 (t, J=6.8 Hz, 6H). LCMS (ESI): R_T=1.190 min, m/z found 998.3 [M+H]⁺.

4-(4-((4-((1-(2-((6S)-4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(5-ethyl-2,4-dihydroxyphenyl)-N-(2,2,2-trifluoroethyl)-4H-1,2,4-triazole-3-carboxamide, trifluoroacetic acid. ¹H NMR (400 MHz, DMSO-d₆): δ 9.71-9.65 (m, 2H), 7.52-7.30 (m, 8H), 6.68 (s, 1H), 6.31 (s, 1H), 5.32-5.30 (m, 1H), 5.00-4.50 (m, 4H), 4.58 (t, J=6.8 Hz, 2H), 4.36-4.32 (m, 2H), 4.16-1.10 (m, 2H), 4.03-3.91 (m, 3H), 3.81-3.58 (m, 3H), 3.40-2.90 (m, 6H), 2.64-2.50 (m, 5H), 2.42 (s, 3H), 2.26-2.24 (m, 2H), 2.00-1.98 (m, 1H), 1.87-1.74 (m, 1H), 1.63 (s, 3H), 0.89 (t, J=7.4 Hz, 3H). LCMS (ESI): R_T=1.193 min, m/z found 984.1 [M−CF₃COOH+H]⁺.

4-(4-((4-((1-(2-((6S)-4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxy-5-methylphenyl)-N-(2,2,2-trifluoroethyl)-4H-1,2,4-triazole-3-carboxamide, trifluoroacetic acid. ¹H NMR (400 MHz, DMSO-d₆): δ 9.70-9.62 (m, 2H), 9.38-9.02 (m, 1H), 7.60-7.20 (m, 8H), 6.72 (s, 1H), 6.28 (s, 1H), 4.58 (t, J=6.7 Hz, 1H), 4.36 (d, J=12.4 Hz, 2H), 4.15-4.13 (m, 2H), 4.01-3.90 (m, 10H), 3.64-3.63 (m, 3H), 3.37-3.35 (m, 1H), 3.07-2.95 (m, 7H), 2.60-2.58 (m, 4H), 2.42 (s, 3H), 1.87 (s, 4H), 1.73-1.70 (m, 1H), 1.63 (s, 3H). LCMS (ESI): R_T=1.385 min, m/z found 970.1 [M−CF₃COOH+H]⁺.

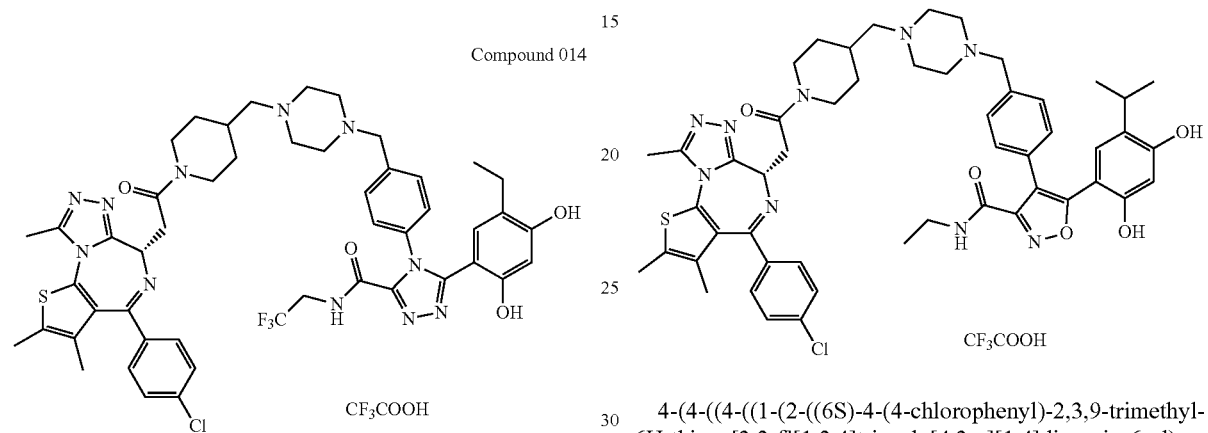

Compound 014

Compound 015

Compound 016

Compound 017

4-(4-((4-((1-(2-((6S)-4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxy-5-isopropylphenyl)-N-ethylisoxazole-3-carboxamide, trifluoroacetic acid. ¹H NMR (400 MHz, DMSO-d₆): δ 9.79 (s, 1H), 9.67 (s, 1H), 8.87 (s, 1H), 7.55-7.19 (m, 9H), 6.76 (s, 1H), 6.44 (s, 1H), 4.57 (t, J=6.7 Hz, 1H), 4.35 (d, J=11.5 Hz, 2H), 4.15-4.13 (m, 2H), 3.64-3.59 (m, 7H), 3.39-3.33 (m, 3H), 3.26-3.20 (m, 3H), 3.13-3.10 (m, 4H), 3.02-2.95 (m, 3H), 2.60-2.58 (m, 4H), 2.42 (s, 3H), 1.77-1.66 (m, 2H), 1.63 (s, 3H), 1.09 (t, J=7.2 Hz, 3H), 0.93 (d, J=6.9 Hz, 6H). LCMS (ESI): R_T=1.486 min, m/z found 944.6 [M−CF₃COOH+H]⁺.

(S)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-isopropylphenyl)-5-hydroxy-4H-1,2,4-triazol-4-yl)-2-fluorobenzyl)piperazin-1-yl)methyl)piperidin-1-yl)ethan-1-one, trifluoroacetic acid. ¹H NMR (400 MHz, DMSO-d₆): δ 12.00 (s, 1H), 9.64 (s, 1H), 9.39 (s, 1H), 7.51-7.42 (m, 5H), 7.14-7.00 (m, 2H), 6.91 (s, 1H), 6.26 (s, 1H), 4.58-4.55 (m, 1H), 4.36-4.33 (m, 1H), 4.15-4.10 (m, 1H), 3.70-3.35 (m, 5H), 3.10-2.90 (m, 8H), 2.60-2.50 (m, 6H), 2.50-2.48 (m, 5H), 2.33-2.30 (m, 1H), 2.10-2.00 (m, 1H), 1.85-1.80 (m, 2H), 1.63 (s, 3H), 1.23-1.12 (m, 1H), 1.03 (t, J=6.8 Hz, 6H). LCMS (ESI): $R_T$=1.130 min, m/z found 907.4 [M–CF$_3$COOH+H]$^+$.

1.77-1.75 (m, 2H), 1.63 (s, 3H), 1.23-1.20 (m, 3H). LCMS (ESI): $R_T$=1.073 min, m/z found 893.1 [M–CF$_3$COOH+H]$^+$.

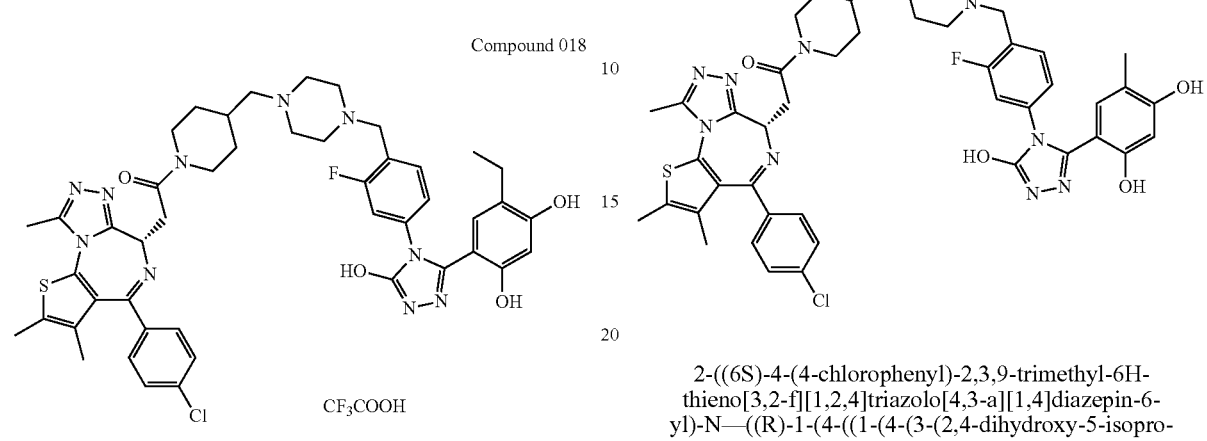

Compound 018

(S)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(5-ethyl-2,4-dihydroxyphenyl)-5-hydroxy-4H-1,2,4-triazol-4-yl)-3-fluorobenzyl)piperazin-1-yl)methyl)piperidin-1-yl)ethan-1-one, trifluoroacetic acid. $^1$H NMR (400 MHz, DMSO-d$_6$) δ 7.50-7.37 (m, 5H), 7.05-6.95 (m, 2H), 6.46-6.30 (m, 1H), 6.25 (s, 1H), 5.33 (s, 1H), 4.57 (t, J=6.7 Hz, 2H), 4.32-4.30 (m, 2H), 4.09-4.07 (m, 2H), 3.60-3.53 (m, 4H), 3.10-3.08 (m, 1H), 2.59-2.58 (m, 4H), 2.450-2.40 (m, 5H), 2.33 (s, 3H), 2.26-2.08 (m, 5H), 2.04-1.94 (m, 2H), Compound 019

2-((6S)-4-(4-chlorophenyl)-2,3,9-trimethyl-6H-thieno[3,2-f][1,2,4]triazolo[4,3-a][1,4]diazepin-6-yl)-N—((R)-1-(4-((1-(4-(3-(2,4-dihydroxy-5-isopropylphenyl)-5-hydroxy-4H-1,2,4-triazol-4-yl)benzyl)piperidin-4-yl)methyl)phenyl)ethyl)acetamide $^1$H NMR (400 MHz, DMSO-d$_6$): δ 11.95 (s, 1H), 9.59 (s, 2H), 7.46-7.33 (m, 5H), 7.35 (t, J=8.1 Hz, 1H), 7.03 (d, J=11.2 Hz, 1H), 6.95 (d, J=7.9 Hz, 1H), 6.88 (s, 1H), 6.24 (s, 1H), 4.56 (t, J=6.5 Hz, 1H), 4.33 (d, J=12.3 Hz, 1H), 4.10 (d, J=11.9 Hz, 1H), 3.60-3.59 (s, 1H), 3.49 (s, 2H), 3.10-3.00 (m, 1H), 2.59-2.58 (m, 4H), 2.41-2.34 (m, 7H), 2.09-2.08 (m, 3H), 1.95 (s, 3H), 1.76-1.75 (m, 3H), 1.63-1.60 (m, 4H), 1.27-0.81 (m, 4H). LCMS (ESI): $R_T$=1.355 min, m/z found 877.2 [M–H]–.

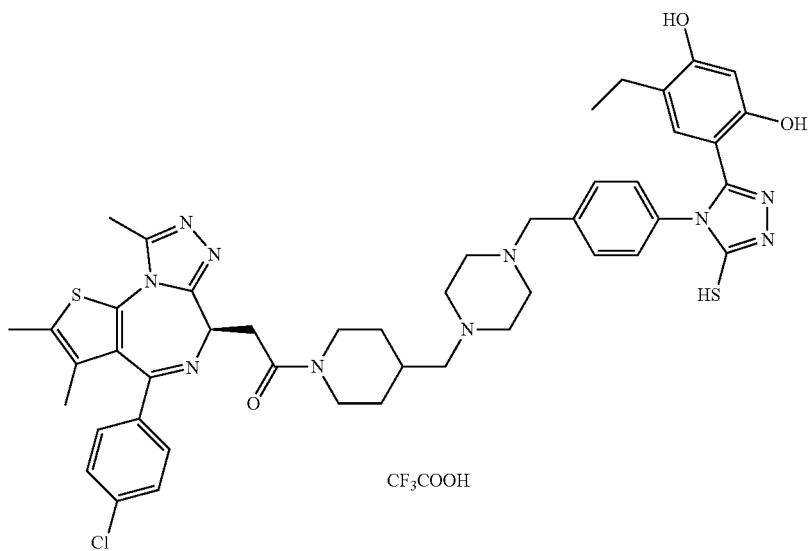

Compound 027

2-((6R)-4-(4-chlorophenyl)-2,3,9-trimethyl-6H-thieno[3,2-f][1,2,4]triazolo[4,3-a][1,4]diazepin-6-yl)-1-(4-((4-(4-(3-(5-ethyl-2,4-dihydroxyphenyl)-5-hydroxy-4H-1,2,4-triazol-4-yl)benzyl)piperazin-1-yl)methyl)piperidin-1-yl)ethanone, trifluoroacetic acid $^1$H NMR (400 MHz, DMSO-d$_6$): δ 11.95 (s, 1H), 9.62 (s, 1H), 9.38 (s, 1H), 7.50-7.20 (m, 8H), 6.87 (s, 1H), 6.24 (s, 1H), 4.58 (t, J=6.7 Hz, 1H), 4.46-4.11 (m, 8H), 3.72-3.63 (m, 2H), 3.40-3.35 (m, 2H), 312-3.04 (m, 4H), 2.42-2.40 (m, 4H), 2.39 (s, 3H), 2.35-2.33 (m, 2H), 1.85-1.72 (m, 3H), 1.63 (s, 3H), 1.20-1.10 (m, 2H), 1.01 (d, J=6.9 Hz, 6H). LCMS (ESI): R$_T$=1.420 min, m/z found 875.2 [M−CF$_3$COOH+H]$^+$.

(S)-2-(4-(4-chlorophenyl)-2,3,9-trimethyl-6H-thieno[3,2-f][1,2,4]triazolo[4,3-a][1,4]diazepin-6-yl)-1-(4-(1-(4-(3-(2,4-dihydroxy-5-isopropylphenyl)-5-hydroxy-4H-1,2,4-triazol-4-yl)phenyl)piperidine-4-carbonyl)piperazin-1-yl)ethan-1-one. $^1$H NMR (400 MHz, DMSO-d$_6$) δ 10.36 (s, 1H), 10.14 (s, 1H), 9.89 (s, 1H), 7.51-7.42 (m, 6H), 7.33 (s, 1H), 6.97 (d, J=8.8 Hz, 2H), 6.50 (s, 1H), 4.61-4.57 (m, 1H), 3.73-3.40 (m, 12H), 3.15-3.11 (m, 1H), 2.70-2.67 (m, 2H), 2.60 (s, 3H), 2.42 (s, 3H), 2.00-1.95 (m, 1H), 1.73-1.64 (m, 4H), 1.63 (s, 3H), 1.16 (t, J=6.8 Hz, 6H). LCMS (ESI): R$_T$=1.551 min, m/z found 889.5 [M+H]$^+$.

Compound 028

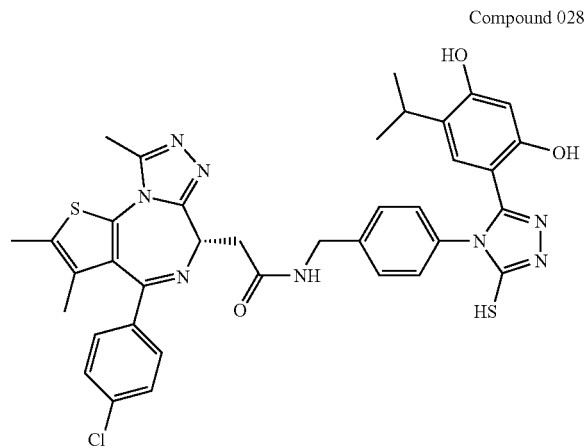 [SMILES: Cc1sc2c(c1C)C(c1ccc(Cl)cc1)=N[C@@H](CC(=O)NCc1ccc(-n3c(S)nnc3-c3cc(C(C)C)c(O)cc3O)cc1)c1nnc(C)n1-2]

Compound 032

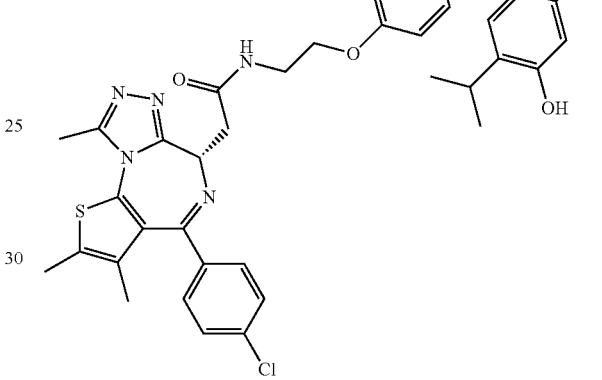

(S)-2-(4-(4-chlorophenyl)-2,3,9-trimethyl-6H-thieno[3,2-f][1,2,4]triazolo[4,3-a][1,4]diazepin-6-yl)-N-(4-(3-(2,4-dihydroxy-5-isopropylphenyl)-5-mercapto-4H-1,2,4-triazol-4-yl)benzyl)acetamide. $^1$H NMR (400 MHz, DMSO-d$_6$): δ 9.56 (s, 1H), 8.79 (s, 1H), 8.07 (s, 1H), 7.52 (d, J=8.4 Hz, 2H), 7.41 (d, J=8.4 Hz, 2H), 7.30 (d, J=8.0 Hz, 2H), 7.18 (d, J=8.4 Hz, 2H), 6.84 (s, 1H), 6.23 (s, 1H), 4.58-4.55 (m, 1H), 4.42-4.32 (m, 2H), 3.35-3.30 (m, 2H), 3.00-2.95 (m, 1H), 2.67 (s, 3H), 2.41 (s, 3H), 1.61 (s, 3H), 0.99-0.95 (m, 6H). LCMS (ESI): R$_T$=1.715 min, m/z found 739.2 [M+H]$^+$.

(S)-2-(4-(4-chlorophenyl)-2,3,9-trimethyl-6H-thieno[3,2-f][1,2,4]triazolo[4,3-a][1,4]diazepin-6-yl)-N-(2-(4-(3-(2,4-dihydroxy-5-isopropylphenyl)-5-mercapto-4H-1,2,4-triazol-4-yl)phenoxy)ethyl)acetamide. $^1$H NMR (400 MHz, DMSO-d$_6$): δ 13.84 (s, 1H), 9.61 (s, 1H), 9.42 (s, 1H), 8.48 (t, J=5.6 Hz, 1H), 7.44 (dd, J=22.7, 8.7 Hz, 4H), 7.15 (d, J=8.9 Hz, 2H), 6.95 (d, J=9.0 Hz, 2H), 6.87 (s, 1H), 6.24 (s, 1H), 4.52 (t, J=7.0 Hz, 1H), 4.01 (t, J=5.6 Hz, 2H), 3.49-3.43 (m, 2H), 3.27-3.25 (m, 2H), 2.98-2.91 (m, 1H), 2.59 (s, 3H), 2.41 (s, 3H), 1.61 (s, 3H), 0.99 (d, J=6.9 Hz, 6H). LCMS (ESI): RT=1.568 min, m/z found 769.1 [M+H]$^+$.

Compound 029

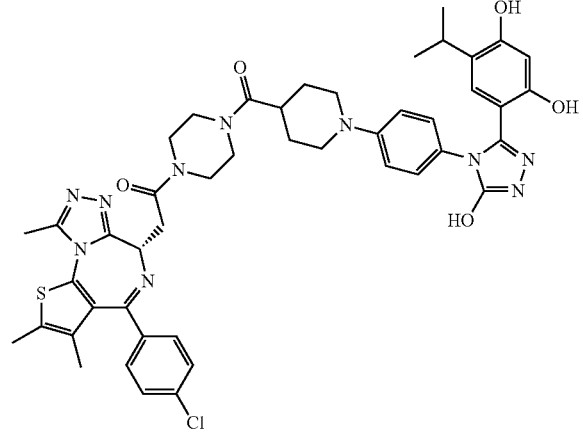

Compound 033

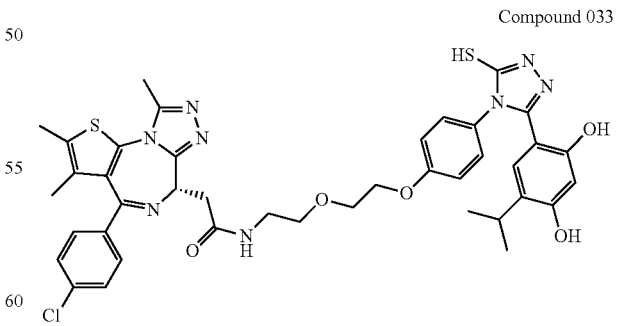

(S)-2-(4-(4-chlorophenyl)-2,3,9-trimethyl-6H-thieno[3,2-f][1,2,4]triazolo[4,3-a][1,4]diazepin-6-yl)-N-(2-(2-(4-(3-(2,4-dihydroxy-5-isopropylphenyl)-5-mercapto-4H-1,2,4-triazol-4-yl)phenoxy)ethoxy)ethyl)acetamide. $^1$H NMR (400 MHz, DMSO-d$_6$): δ 9.58 (s, 1H), 8.31 (s, 1H), 7.49 (d, J=8.8

Hz, 2H), 7.43 (d, J=8.4 Hz, 2H), 7.13 (d, J=8.0 Hz, 2H), 6.94 (d, J=8.4 Hz, 2H), 6.24 (s, 1H), 4.58-4.55 (m, 1H), 4.11-4.09 (m, 2H), 3.76-3.74 (m, 2H), 3.53-3.50 (m, 2H), 3.30-3.22 (m, 4H), 3.00-2.95 (m, 1H), 2.67 (s, 3H), 2.41 (s, 3H), 1.62 (s, 3H), 0.99-0.95 (m, 6H). LCMS (ESI): $R_T$=1.730 min, m/z found 813.2 [M+H]$^+$.

Compound 034

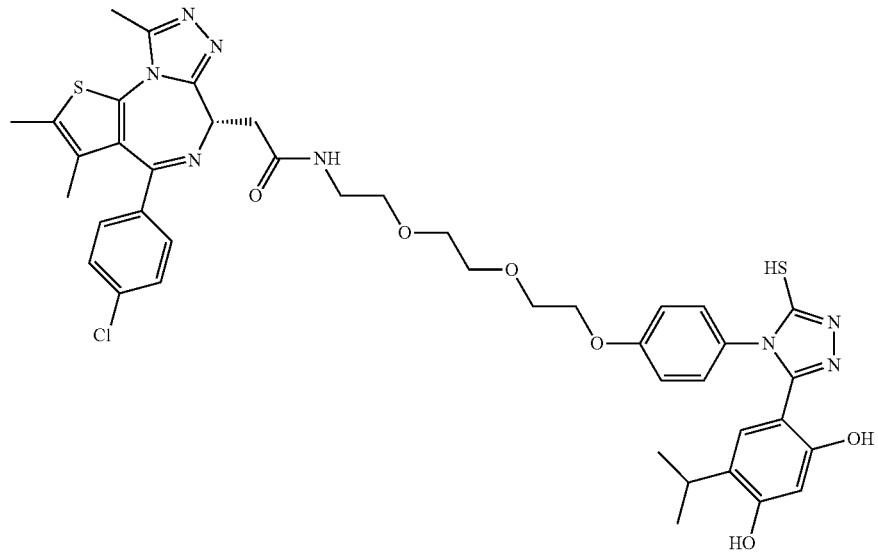

(S)-2-(4-(4-chlorophenyl)-2,3,9-trimethyl-6H-thieno[3,2-f][1,2,4]triazolo[4,3-a][1,4]diazepin-6-yl)-N-(2-(2-(2-(4-(3-(2,4-dihydroxy-5-isopropylphenyl)-5-mercapto-4H-1,2,4-triazol-4-yl)phenoxy)ethoxy)ethoxy)ethyl)acetamide. $^1$H NMR (400 MHz, DMSO): δ 13.83 (s, 1H), 9.60 (s, 1H), 9.39 (s, 1H), 8.29-8.27 (m, 1H), 7.48 (d, J=8.5 Hz, 2H), 7.42 (d, J=8.5 Hz, 2H), 7.12 (d, J=8.9 Hz, 2H), 6.92 (d, J=8.9 Hz, 2H), 6.86 (s, 1H), 6.24 (s, 1H), 4.50 (t, J=7.1 Hz, 1H), 4.08-4.07 (m, 2H), 3.73 (d, J=4.4 Hz, 2H), 3.58 (d, J=8.0 Hz, 4H), 3.46 (t, J=5.8 Hz, 2H), 3.28-3.16 (m, 5H), 3.02-2.92 (m, 1H), 2.59 (s, 3H), 2.40 (s, 3H), 2.00-1.99 (m, 1H), 1.62 (s, 3H), 0.99 (d, J=6.9 Hz, 6H). LCMS (ESI): $R_T$=1.748 min, m/z found 857.7 [M+H]$^+$.

Compound 037

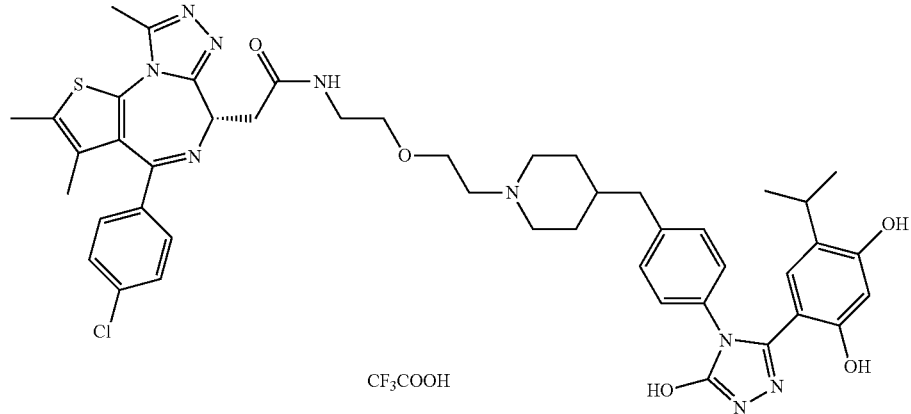

2-((6S)-4-(4-chlorophenyl)-2,3,9-trimethyl-6H-thieno[3,2-f][1,2,4]triazolo[4,3-a][1,4]diazepin-6-yl)-N-(2-(2-(4-(4-(3-(2,4-dihydroxy-5-isopropylphenyl)-5-hydroxy-4H-1,2,4-triazol-4-yl)benzyl)piperidin-1-yl)ethoxy)ethyl)acetamide, trifluoroacetic acid. $^1$H NMR (400 MHz, DMSO-$d_6$): δ 11.93 (s, 1H), 9.61 (s, 1H), 9.41 (s, 1H), 9.03-8.98 (m, 1H), 8.31 (s, 1H), 7.49-7.38 (m, 4H), 7.13-7.01 (m, 4H), 6.74 (s, 1H), 6.26 (s, 1H), 4.51 (t, J=7.2 Hz, 2H), 3.73 (s, 2H), 3.49 (d, J=5.3 Hz, 4H), 3.27 (d, J=7.5 Hz, 6H), 2.93-2.85 (m, 2H), 2.67 (s, 1H), 2.59 (s, 3H), 2.39 (s, 3H), 2.33 (s, 1H), 1.71-1.69 (m, 3H), 1.61 (s, 3H), 1.43-1.42 (m, 1H), 0.92 (d, J=6.2 Hz, 6H). LCMS (ESI): $R_T$=1.120 min, m/z found 878.2 [M−CF$_3$COOH+H$^+$]).

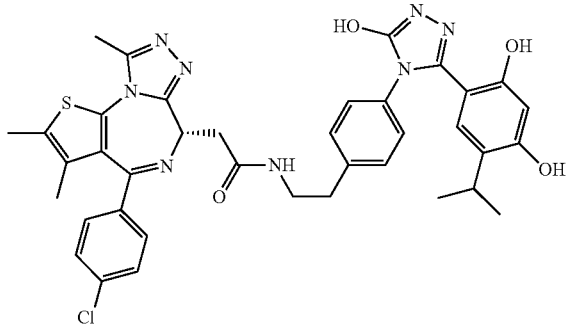

Compound 039

2-((6S)-4-(4-chlorophenyl)-2,3,9-trimethyl-6H-thieno[3,2-f][1,2,4]triazolo[4,3-a][1,4]diazepin-6-yl)-N-(4-(3-(2,4-dihydroxy-5-isopropylphenyl)-5-hydroxy-4H-1,2,4-triazol-4-yl)phenethyl)acetamide. $^1$H NMR (400 MHz, DMSO-$d_6$): δ 11.91 (s, 1H), 9.58 (s, 1H), 9.39 (s, 1H), 8.36-8.30 (m, 1H), 7.45 (dd, J=24.9, 8.6 Hz, 4H), 7.24 (d, J=8.4 Hz, 2H), 7.10 (d, J=8.3 Hz, 2H), 6.80 (s, 1H), 6.25 (s, 1H), 4.51 (t, J=7.0 Hz, 1H), 3.32-3.27 (m, 2H), 3.23-3.20 (m, 2H), 2.97-2.95 (m, 1H), 2.75-2.70 (m, 2H), 2.59 (s, 3H), 2.41 (s, 3H), 1.62 (s, 3H), 0.97 (d, J=6.9 Hz, 6H). LCMS (ESI): $R_T$=1.524 min, m/z found 737.6 [M+H$^+$]).

Compound 038

2-((6S)-4-(4-chlorophenyl)-2,3,9-trimethyl-6H-thieno[3,2-f][1,2,4]triazolo[4,3-a][1,4]diazepin-6-yl)-1-(4-(4-(3-(2,4-dihydroxy-5-isopropylphenyl)-5-hydroxy-4H-1,2,4-triazol-4-yl)benzyl)piperazin-1-yl)ethanone, trifluoroacetic acid. $^1$H NMR (400 MHz, DMSO-$d_6$): δ 11.99 (s, 1H), 9.64 (s, 1H), 9.36 (s, 1H), 7.53-7.27 (m, 8H), 6.90 (s, 1H), 6.25 (s, 1H), 4.43 (s, 2H), 4.33 (d, J=33.0 Hz, 4H), 3.68-3.60 (m, 4H), 3.20-3.11 (m, 4H), 2.99 (s, 3H), 2.60 (s, 3H), 2.42 (s, 3H), 1.63 (s, 3H), 1.02 (d, J=6.9 Hz, 6H). LCMS (ESI): $R_T$=1.129 min, m/z found 792.4 [M−CF$_3$COOH+H]$^+$.

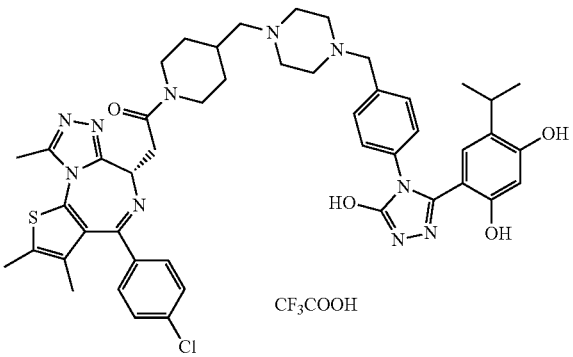

Compound 040

2-((6S)-4-(4-chlorophenyl)-2,3,9-trimethyl-6H-thieno[3,2-f][1,2,4]triazolo[4,3-a][1,4]diazepin-6-yl)-1-(4-(((4-(4-(3-(2,4-dihydroxy-5-isopropylphenyl)-5-hydroxy-4H-1,2,4-triazol-4-yl)benzyl)piperazin-1-yl)methyl)piperidin-1-yl)ethanone, trifluoroacetic acid. $^1$H NMR (400 MHz, DMSO-$d_6$): δ 11.95 (s, 1H), 9.62 (s, 1H), 9.38 (s, 1H), 7.58-7.31 (m, 6H), 7.17 (t, J=22.5 Hz, 2H), 6.83 (s, 1H), 6.26 (s, 1H), 4.57 (t, J=6.7 Hz, 1H), 4.35 (d, J=12.9 Hz, 1H), 4.15 (s, 1H), 3.66-3.60 (m, 8H), 3.43-3.31 (m, 2H), 3.21-2.81 (m, 7H), 2.76-2.55 (m, 5H), 2.42 (s, 3H), 2.05-2.02 (m, 1H), 1.90-1.68 (m, 2H), 1.63 (s, 3H), 0.98 (d, J=6.9 Hz, 6H). LCMS (ESI): $R_T$=1.097 min, m/z found 889.3 [M−CF$_3$COOH+H]$^+$.

Compound 041

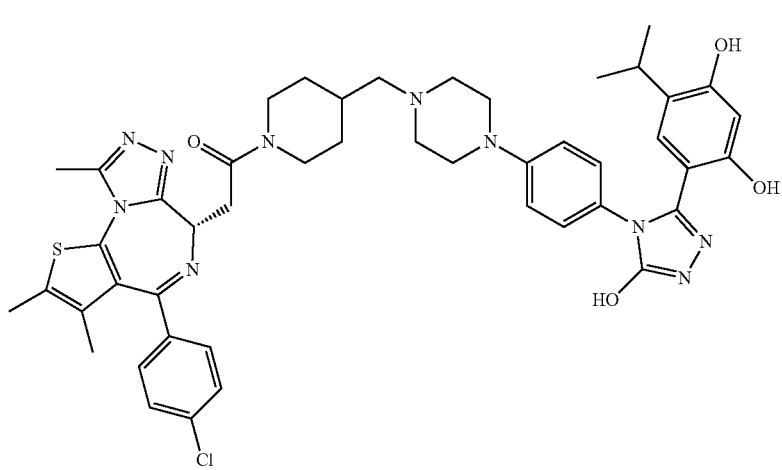

(S)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-isopropylphenyl)-5-hydroxy-4H-1,2,4-triazol-4-yl)phenyl)piperazin-1-yl)methyl)piperidin-1-yl)ethanone. $^1$H NMR MeOD-d$_4$ (400 MHz): δ 7.46-7.40 (m, 4H), 7.17 (m, 2H), 7.08 (m, 2H), 6.69 (s, 1H), 6.28 (s, 1H), 4.69 (d, J=6.6 Hz, 1H), 4.57 (m, 2H), 3.76-3.58 (m, 4H), 3.23 (m, 7.4 Hz, 2H), 2.99 (s, 1H), 2.70 (s, 4H), 2.45 (s, 3H), 2.18 (t, J=3.8 Hz, 1H), 2.02 (s, 1H), 1.70 (s, 3H), 1.60-1.57 (m, 1H), 1.37 (d, J=1.3 Hz, 4H), 1.28 (s, 5H), 0.91 (s, 3H), 0.89 (s, 3H). LCMS (ESI): R$_T$=1.112 min, m/z found 875.7 [M+H]$^+$.

Compound 042

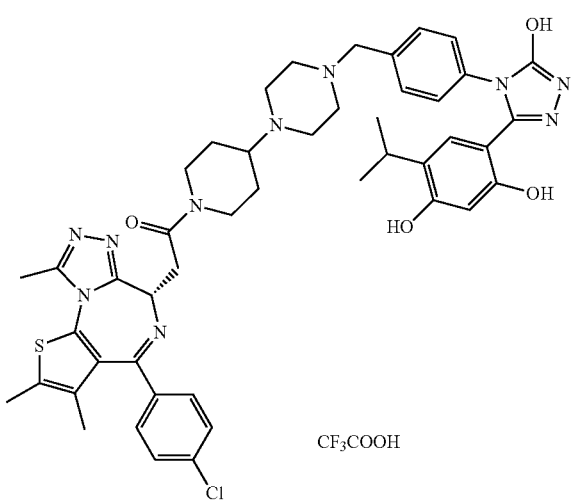

(S)-2-(4-(4-chlorophenyl)-2,3,9-trimethyl-6H-thieno[3,2-f][1,2,4]triazolo[4,3-a][1,4]diazepin-6-yl)-1-(4-(4-(4-(3-(2,4-dihydroxy-5-isopropylphenyl)-5-hydroxy-4H-1,2,4-triazol-4-yl)benzyl)piperazin-1-yl)piperidin-1-yl)ethan-1-one, trifluoroacetic acid. $^1$H NMR (400 MHz, DMSO-d$_6$): δ 11.95 (s, 1H), 9.61 (s, 1H), 9.38 (s, 1H), 8.44 (s, 1H), 7.51-7.42 (m, 6H), 7.21 (d, J=7.6 Hz, 2H), 6.82 (s, 1H), 6.26 (s, 1H), 4.57-4.50 (m, 2H), 4.26-4.20 (m, 2H), 4.00-3.95 (m, 2H), 3.69-3.50 (m, 6H), 3.33-2.95 (m, 7H), 2.67 (s, 4H), 2.55 (s, 3H), 2.36 (s, 3H), 1.62 (s, 3H), 0.97 (t, J=6.8 Hz, 6H). LCMS (ESI): R$_T$=0.720 min, m/z found 875.3 [M–CF$_3$COOH+H]$^+$.

Compound 043

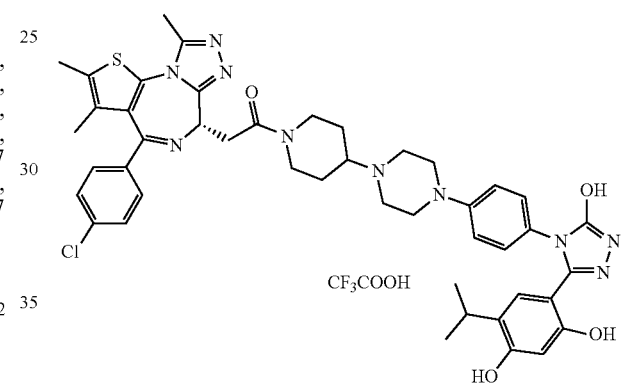

2-((6S)-4-(4-chlorophenyl)-2,3,9-trimethyl-6H-thieno[3,2-f][1,2,4]triazolo[4,3-a][1,4]diazepin-6-yl)-1-(4-(4-(4-(3-(2,4-dihydroxy-5-isopropylphenyl)-5-hydroxy-4H-1,2,4-triazol-4-yl)phenyl)piperazin-1-yl)piperidin-1-yl)ethanone, trifluoroacetic acid. $^1$H NMR (400 MHz, DMSO-d$_6$): δ 11.88 (s, 1H), 9.61 (s, 2H), 9.43 (s, 1H), 7.62-7.40 (m, 6H), 7.25-6.92 (m, 5H), 6.78 (s, 1H), 6.27 (s, 1H), 4.55-4.53 (m, 2H), 4.36-4.33 (m, 1H), 3.90 (d, J=12.6 Hz, 2H), 3.60-3.59 (m, 4H), 3.22-3.18 (m, 4H), 2.99-2.97 (m, 4H), 2.61 (s, 3H), 2.42 (s, 3H), 2.41-2.06 (m, 4H), 1.64 (s, 3H), 0.96 (d, J=6.9 Hz, 6H). LCMS (ESI): R$_T$=1.371 min, m/z found 861.7 [M–CF$_3$COOH+H]$^+$.

Compound 044

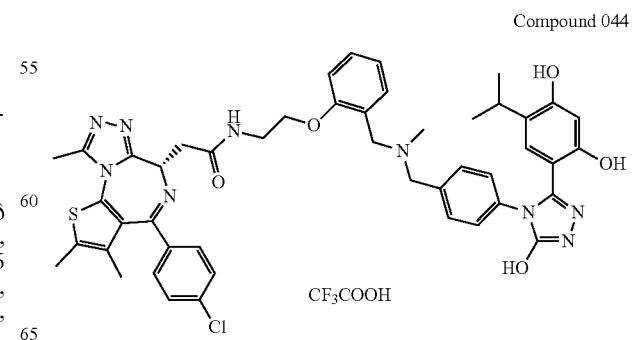

2-((6S)-4-(4-chlorophenyl)-2,3,9-trimethyl-6H-thieno[3,2-f][1,2,4]triazolo[4,3-a][1,4]diazepin-6-yl)-N-(2-(3-(((4-(3-(2,4-dihydroxy-5-isopropylphenyl)-5-hydroxy-4H-1,2,4-triazol-4-yl)benzyl)(methyl)amino)methyl)phenoxy)ethyl)acetamide, trifluoroacetic acid. $^1$H NMR (400 MHz, DMSO-$d_6$): δ 11.98 (s, 1H), 9.61 (s, 1H), 9.33 (s, 2H), 8.64 (s, 1H), 7.56-6.83 (m, 13H), 6.23 (s, 1H), 4.27-4.25 (m, 2H), 4.09-4.06 (m, 2H), 3.19-3.10 (m, 1H), 3.02-2.93 (m, 1H), 2.68 (s, 3H), 2.58-2.55 (m, 4H), 2.35 (s, 3H), 1.53-1.50 (m, 3H), 1.25-1.20 (m, 4H), 0.97-0.93 (m, 6H). LCMS (ESI): R$_T$=1.381 min, m/z found 886.3 [M−CF$_3$COOH+H]$^+$.
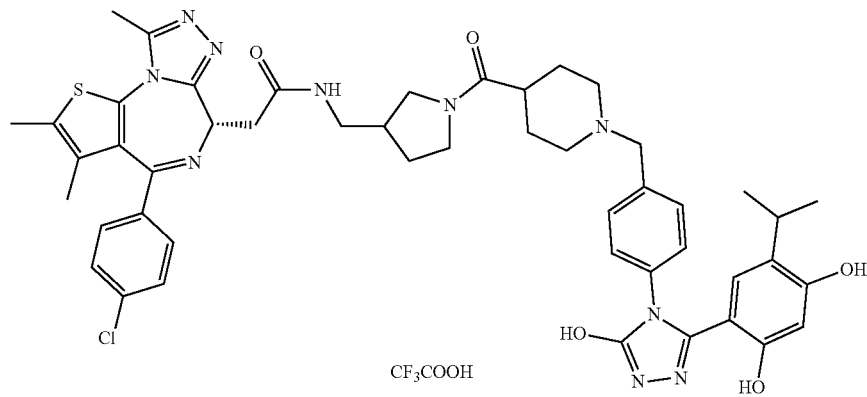
Compound 045

2-((S)-4-(4-chlorophenyl)-2,3,9-trimethyl-6H-thieno[3,2-f][1,2,4]triazolo[4,3-a][1,4]diazepin-6-yl)-N-((1-(1-(4-(3-(2,4-dihydroxy-5-isopropylphenyl)-5-hydroxy-4H-1,2,4-triazol-4-yl)benzyl)piperidine-4-carbonyl) pyrrolidin-3-yl)methyl)acetamide, trifluoroacetic acid. $^1$H NMR (400 MHz, DMSO-$d_6$): δ 11.98 (s, 1H), 9.61 (s, 1H), 9.33 (s, 1H), 8.44 (s, 1H), 7.50-7.42 (m, 6H), 7.26 (d, J=6.8 Hz, 2H), 6.86 (s, 1H), 6.24 (s, 1H), 4.48-4.45 (m, 1H), 4.26-4.20 (m, 2H), 3.69-3.50 (m, 6H), 3.33-3.10 (m, 2H), 3.02-2.95 (m, 2H), 2.67 (s, 3H), 2.55 (s, 3H), 2.38-2.36 (m, 4H), 2.25 (s, 3H), 1.86-1.82 (m, 4H), 1.61 (s, 3H), 1.01-0.99 (m, 6H). LCMS (ESI): $R_T$=1.30 min, m/z found 917.3 [M−CF$_3$COOH+H]$^+$.
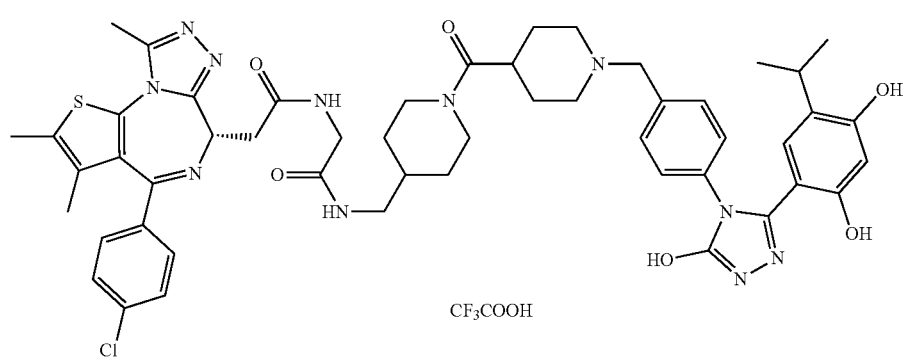
Compound 046

(S)-2-(4-(4-chlorophenyl)-2,3,9-trimethyl-6H-thieno[3,2-f][1,2,4]triazolo[4,3-a][1,4]diazepin-6-yl)-N-(2-(((1-(1-(4-(3-(2,4-dihydroxy-5-isopropylphenyl)-5-hydroxy-4H-1,2,4-triazol-4-yl)benzyl)piperidine-4-carbonyl)piperidin-4-yl)methyl)amino)-2-oxoethyl)acetamide, trifluoroacetic acid. $^1$H NMR (400 MHz, DMSO-d$_6$): δ 11.98 (s, 1H), 9.61 (s, 1H), 9.33 (s, 2H), 8.58-8.56 (m, 1H), 7.78-7.65 (m, 1H), 7.53-7.46 (m, 6H), 7.25 (d, J=8.0 Hz, 2H), 6.87 (s, 1H), 6.24 (s, 1H), 4.54-4.51 (m, 1H), 4.40-4.30 (m, 2H), 3.98-3.60 (m, 4H), 3.50-3.40 (m, 6H), 3.02-2.85 (m, 7H), 2.61-2.51 (m, 4H), 2.41 (s, 3H), 2.38-2.35 (m, 1H), 1.86-1.60 (m, 9H), 1.01-0.99 (m, 6H). LCMS (ESI): R$_T$=1.298 min, m/z found 988.3 [M−CF$_3$COOH+H]$^+$.
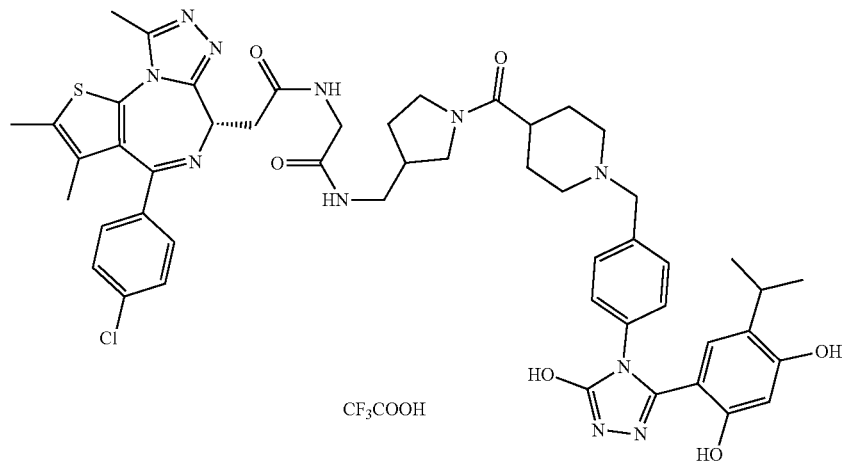
Compound 047

2-((S)-4-(4-chlorophenyl)-2,3,9-trimethyl-6H-thieno[3,2-f][1,2,4]triazolo[4,3-a][1,4]diazepin-6-yl)-N-(2-(((1-(1-(4-(3-(2,4-dihydroxy-5-isopropylphenyl)-5-hydroxy-4H-1,2,4-triazol-4-yl)benzyl)piperidine-4-carbonyl) pyrrolidin-3-yl)methyl)amino)-2-oxoethyl)acetamide, trifluoroacetic acid.
$^1$H NMR (400 MHz, DMSO-d$_6$): δ 11.98 (s, 1H), 9.61 (s, 1H), 9. 9.34 (s, 2H), 8.58-8.56 (m, 1H), 7.89-7.85 (m, 1H), 7.50-7.46 (m, 6H), 7.28-7.24 (m, 2H), 6.86 (s, 1H), 6.25 (s, 1H), 4.54-4.51 (m, 1H), 4.40-4.30 (m, 2H), 3.98-3.60 (m, 3H), 3.50-3.40 (m, 5H), 3.02-2.85 (m, 4H), 2.61-2.51 (m, 4H), 2.41 (s, 3H), 2.38-2.35 (m, 2H), 1.86-1.60 (m, 10H), 1.01-0.99 (m, 6H). LCMS (ESI): R$_T$=1.295 min, m/z found 974.3 [M−CF$_3$COOH+H]$^+$.

Compound 048

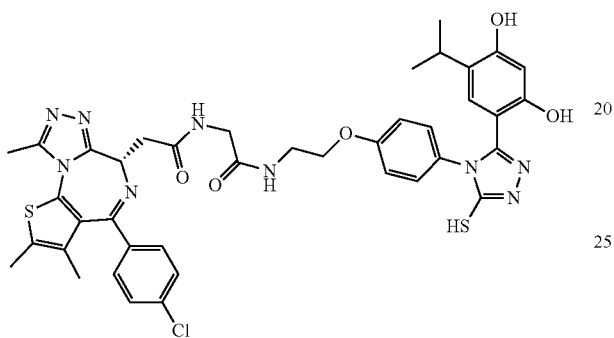

(S)-2-(4-(4-chlorophenyl)-2,3,9-trimethyl-6H-thieno[3,2-f][1,2,4]triazolo[4,3-a][1,4]diazepin-6-yl)-N-(2-((2-(4-(3-(2,4-dihydroxy-5-isopropylphenyl)-5-mercapto-4H-1,2,4-triazol-4-yl)phenoxy)ethyl)amino)-2-oxoethyl)acetamide.
$^1$H NMR (400 MHz, DMSO-d$_6$): δ 9.58 (s, 1H), 8.59 (s 1H), 8.07 (s, 1H), 7.50-7.47 (m, 4H), 7.12 (d, J=8.4 Hz, 1H), 6.93 (d, J=8.4 Hz, 1H), 6.24 (s, 1H), 4.54-4.51 (m, 1H), 4.01-3.98 (m, 2H), 3.83-3.68 (m, 2H), 3.55-3.40 (m, 2H), 3.00-2.95 (m, 1H), 2.67-2.61 (m, 2H), 2.60 (s, 3H), 2.41 (s, 3H), 2.37-2.32 (m, 2H), 1.61 (s, 3H), 0.99-0.95 (m, 6H). LCMS (ESI): R$_T$=1.666 min, m/z found 826.2 [M+H]$^+$.

Compound 049

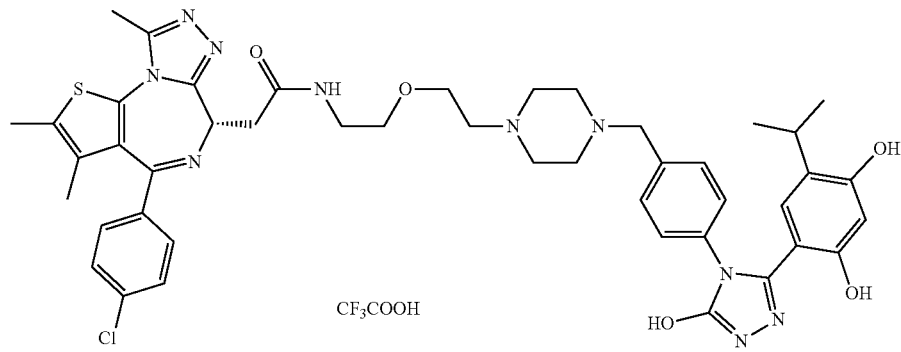

2-((6S)-4-(4-chlorophenyl)-2,3,9-trimethyl-6H-thieno[3,2-f][1,2,4]triazolo[4,3-a][1,4]diazepin-6-yl)-N-(2-(2-(4-(4-(3-(2,4-dihydroxy-5-isopropylphenyl)-5-hydroxy-4H-1,2,4-triazol-4-yl)benzyl)piperazin-1-yl)ethoxy)ethyl)acetamide, trifluoroacetic acid, trifluoroacetic acid. $^1$H NMR (400 MHz, DMSO-$d_6$): δ 11.93 (s, 1H), 9.61 (s, 1H), 9.40 (s, 1H), 8.28 (s, 1H), 7.49-7.38 (m, 4H), 7.27 (d, J=8.2 Hz, 2H), 7.12 (d, J=8.3 Hz, 3H), 6.76 (s, 1H), 6.27 (s, 1H), 4.49 (t, J=6.0 Hz, 1H), 3.43-3.30 (m, 8H), 3.27-3.15 (m, 4H), 2.97-2.92 (m, 1H), 2.59-2.55 (m, 8H), 2.43-2.38 (m, 6H), 1.62 (s, 3H), 0.93 (d, J=6.9 Hz, 6H). LCMS (ESI): $R_T$=1.074 min, m/z found 879.3 [M−CF$_3$COOH+H$^+$]).

Compound 050

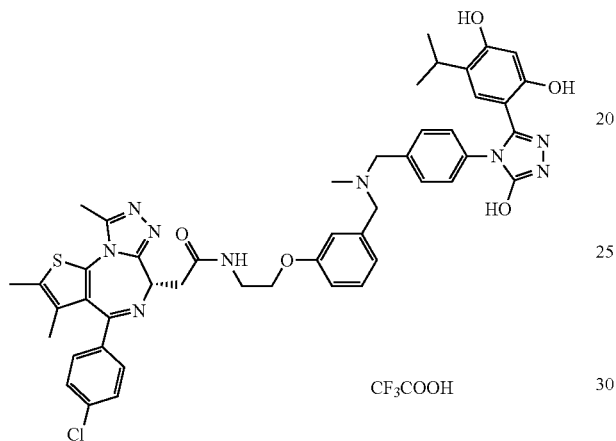

CF$_3$COOH 2-((6S)-4-(4-chlorophenyl)-2,3,9-trimethyl-6H-thieno[3,2-f][1,2,4]triazolo[4,3-a][1,4]diazepin-6-yl)-N-(2-(3-(((4-(3-(2,4-dihydroxy-5-isopropylphenyl)-5-hydroxy-4H-1,2,4-triazol-4-yl)benzyl)(methyl)amino)methyl)phenoxy)ethyl)acetamide, trifluoroacetic acid, trifluoroacetic acid. $^1$H NMR (400 MHz, DMSO-$d_6$): δ 11.98 (s, 1H), 9.65 (s, 1H), 9.37 (s, 1H), 8.54 (s, 1H), 7.64-6.98 (m, 13H), 6.87 (s, 1H), 6.25 (s, 1H), 4.55-4.48 (m, 1H), 4.40-4.15 (m, 3H), 4.08-4.04 (m, 2H), 3.56-3.53 (m, 2H), 3.23-3.20 (m, 2H), 3.06-2.91 (m, 1H), 2.59 (s, 3H), 2.40 (s, 3H), 2.00-1.95 (m, 1H), 1.59 (s, 3H), 1.25-1.23 (m, 4H), 0.99 (d, J=6.0 Hz, 6H). LCMS (ESI): $R_T$=1.24 min, m/z found 886.5 [M−CF$_3$COOH+H]$^+$.

Compound 051

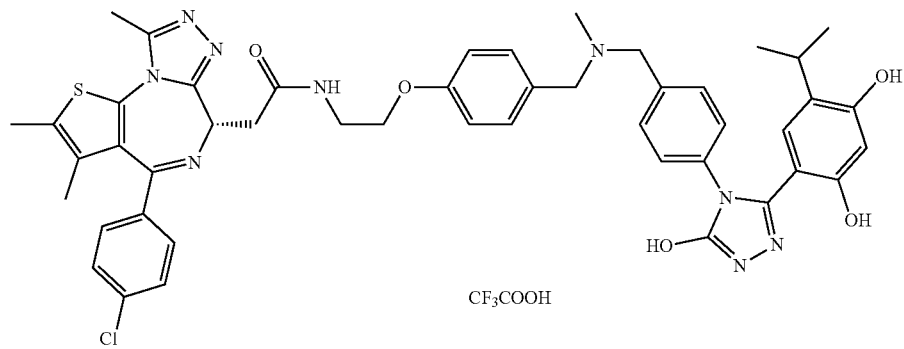

CF$_3$COOH 2-((6S)-4-(4-chlorophenyl)-2,3,9-trimethyl-6H-thieno[3,2-f][1,2,4]triazolo[4,3-a][1,4]diazepin-6-yl)-N-(2-(3-(((4-(3-(2,4-dihydroxy-5-isopropylphenyl)-5-hydroxy-4H-1,2,4-triazol-4-yl)benzyl)(methyl)amino)methyl)phenoxy)ethyl)acetamide, trifluoroacetic acid. $^1$H NMR (400 MHz, DMSO-$d_6$): δ 11.93 (s, 1H), 9.58 (s, 1H), 9.38 (s, 1H), 8.53 (s, 1H), 7.62-6.57 (m, 14H), 6.25 (s, 1H), 4.54-4.47 (m, 1H), 4.05-3.98 (m, 2H), 3.50-3.30 (m, 5H), 2.96-2.91 (m, 3H), 2.67 (s, 3H), 2.40 (s, 3H), 2.33 (s, 1H), 1.62-1.57 (m, 3H), 1.24 (s, 4H), 0.96-0.93 (m, 6H). LCMS (ESI): $R_T$=1.355 min, m/z found 886.2 [M–CF$_3$COOH+H]$^+$.

Compound 052

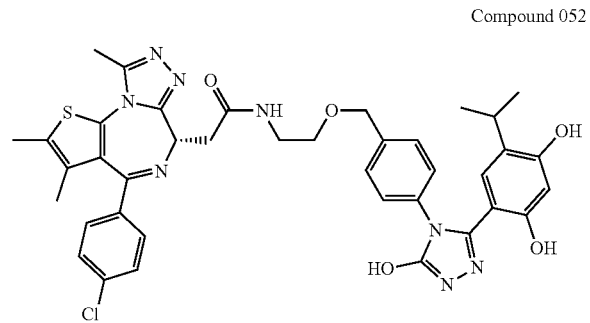 [SMILES: Cc1sc2c(c1C)C(c1ccc(Cl)cc1)=N[C@@H](CC(=O)NCCOCc1ccc(-n3c(O)nnc3-c3cc(C(C)C)c(O)cc3O)cc1)c1nnc(C)n1-2]

2-((6S)-4-(4-chlorophenyl)-2,3,9-trimethyl-6H-thieno[3,2-f][1,2,4]triazolo[4,3-a][1,4]diazepin-6-yl)-N-(2-((4-(3-(2,4-dihydroxy-5-isopropylphenyl)-5-hydroxy-4H-1,2,4-triazol-4-yl)benzyl)oxy)ethyl)acetamide. $^1$H NMR (400 MHz, DMSO-$d_6$): δ 11.91 (s, 1H), 9.57 (s, 1H), 9.36 (s, 1H), 8.33 (t, J=5.4 Hz, 1H), 7.55-7.25 (m, 6H), 7.14 (d, J=8.3 Hz, 2H), 6.86 (s, 1H), 6.24 (s, 1H), 4.51-4.48 (m, 3H), 3.52-3.47 (m, 2H), 3.32-3.24 (m, 4H), 3.02-2.93 (m, 1H), 2.59 (s, 3H), 2.41 (s, 3H), 1.61 (s, 3H), 0.99 (d, J=6.9 Hz, 6H).
LCMS (ESI): $R_T$=1.549 min, m/z found 767.2 [M+H$^+$]).

Compound 053

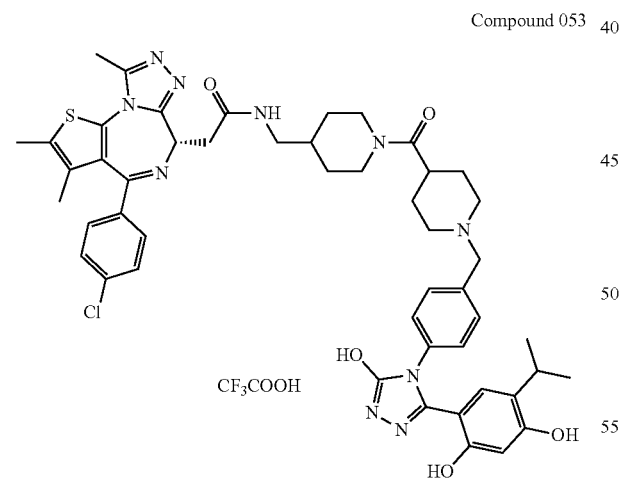

(S)-2-(4-(4-chlorophenyl)-2,3,9-trimethyl-6H-thieno[3,2-f][1,2,4]triazolo[4,3-a][1,4]diazepin-6-yl)-N-((1-(1-(4-(3-(2,4-dihydroxy-5-isopropylphenyl)-5-hydroxy-4H-1,2,4-triazol-4-yl)benzyl)piperidine-4-carbonyl)piperidin-4-yl)methyl)acetamide, trifluoroacetic acid. $^1$H NMR (400 MHz, DMSO-$d_6$): δ 11.97 (s, 1H), 9.62 (s, 2H), 9.35 (s, 1H), 8.24 (s, 1H), 7.51-7.40 (m, 6H), 7.25 (d, J=7.6 Hz, 2H), 6.86 (s, 1H), 6.25 (s, 1H), 4.53-4.51 (m, 1H), 4.38-3.92 (m, 5H), 3.19-3.10 (m, 3H), 3.02-2.65 (m, 7H), 2.67 (s, 3H), 2.35 (s, 3H), 1.77-1.62 (m, 10H), 1.25-1.20 (m, 2H), 0.97-0.93 (m, 8H). LCMS (ESI): $R_T$=1.392 min, m/z found 931.7 [M–CF$_3$COOH+H]$^+$.

Compound 054

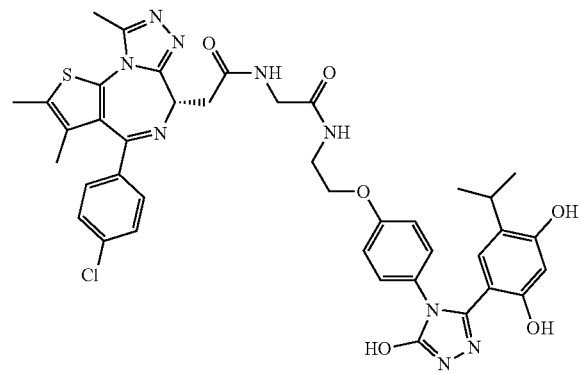

(S)-2-(4-(4-chlorophenyl)-2,3,9-trimethyl-6H-thieno[3,2-f][1,2,4]triazolo[4,3-a][1,4]diazepin-6-yl)-N-(2-((2-(4-(3-(2,4-dihydroxy-5-isopropylphenyl)-5-hydroxy-4H-1,2,4-triazol-4-yl)phenoxy)ethyl)amino)-2-oxoethyl)acetamide. $^1$H NMR (400 MHz, DMSO-$d_6$): δ 11.85 (s, 1H), 9.56 (s, 1H), 9.37 (s, 1H), 8.60 (t, J=6.0 Hz, 1H), 8.06 (t, J=5.4 Hz, 1H), 7.47 (q, J=8.9 Hz, 4H), 7.08 (d, J=8.9 Hz, 2H), 6.92 (d, J=8.9 Hz, 2H), 6.83 (s, 1H), 6.24 (s, 1H), 4.52 (t, J=7.2 Hz, 1H), 3.99 (t, J=5.7 Hz, 2H), 3.49-3.43 (m, 4H), 3.36-3.30 (m, 2H), 3.03-2.93 (m, 1H), 2.58 (s, 3H), 2.41 (s, 3H), 1.62 (s, 3H), 0.99 (d, J=6.9 Hz, 6H). LCMS (ESI): $R_T$=1.645 min, m/z found 810.6 [M+H]$^+$.

Compound 055

(S)-2-(4-(4-chlorophenyl)-2,3,9-trimethyl-6H-thieno[3,2-f][1,2,4]triazolo[4,3-a][1,4]diazepin-6-yl)-N-(2-((2-(2-(4-(3-(2,4-dihydroxy-5-isopropylphenyl)-5-hydroxy-4H-1,2,4-triazol-4-yl)phenoxy)ethoxy)ethyl)amino)-2-oxoethyl)acetamide. $^1$H NMR (400 MHz, DMSO-$d_6$): δ 11.86 (s, 1H), 9.57 (s, 1H), 9.37 (s, 1H), 8.58-8.56 (m, 1H), 7.91-7.89 (m, 1H), 7.50-7.44 (m, 4H), 7.07 (d, J=9.0 Hz, 2H), 6.93 (t, J=10.4 Hz, 2H), 6.82 (s, 1H), 6.24 (s, 1H), 4.52 (t, J=7.3 Hz, 1H), 4.08-4.06 (m, 3H), 3.76-3.64 (m, 5H), 3.30-3.25 (m, 4H), 3.00-2.92 (m, 1H), 2.59 (s, 3H), 2.40 (s, 3H), 1.62 (s, 3H), 0.98 (d, J=6.9 Hz, 6H). LCMS (ESI): $R_T$=1.636 min, m/z found 852.2 [M–H]$^−$.

Compound 056

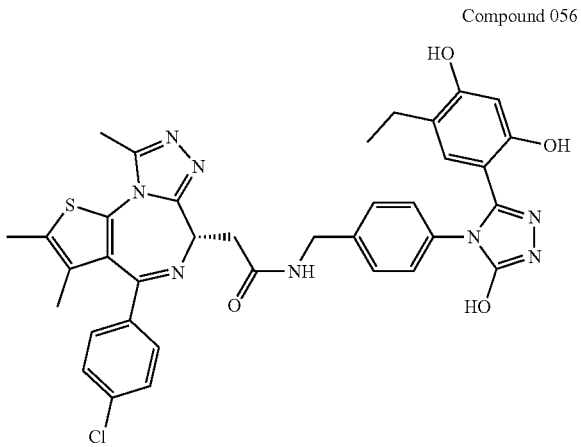 [SMILES: CCc1cc(-c2nnc(O)n2-c2ccc(CNC(=O)C[C@@H]3N=C(c4ccc(Cl)cc4)c4c(sc(C)c4C)-n4c(C)nnc43)cc2)c(O)cc1O]

2-((6S)-4-(4-chlorophenyl)-2,3,9-trimethyl-6H-thieno[3,2-f][1,2,4]triazolo[4,3-a][1,4]diazepin-6-yl)-N-(4-(3-(5-ethyl-2,4-dihydroxyphenyl)-5-hydroxy-4H-1,2,4-triazol-4-yl)benzyl)acetamide. $^1$H NMR (400 MHz, DMSO): δ 8.76 (s, 1H), 7.49 (d, J=8.7 Hz, 2H), 7.40 (d, J=8.5 Hz, 2H), 7.28 (d, J=8.4 Hz, 2H), 7.12 (d, J=8.4 Hz, 2H), 6.91 (s, 1H), 6.23 (s, 1H), 4.57-4.51 (m, 1H), 4.34 (m, 3H), 2.60 (s, 3H), 2.41 (s, 3H), 2.38-2.33 (m, 2H), 2.00 (d, J=7.7 Hz, 1H), 1.61 (s, 3H), 1.23 (s, 4H), 1.00 (t, J=7.5 Hz, 3H). LCMS (ESI): LCMS-010 (LCMS 2020-004) $R_T$=1.525 min, Method: A70B30+−, (A: 0.1% FA/H$_2$O B: 0.1% FA/CAN Col.sunFire C18) mass calcd. for $C_{36}H_{33}ClN_8O_4S$ 708.20, m/z found 709.6 [M+H]$^+$.

Compound 057

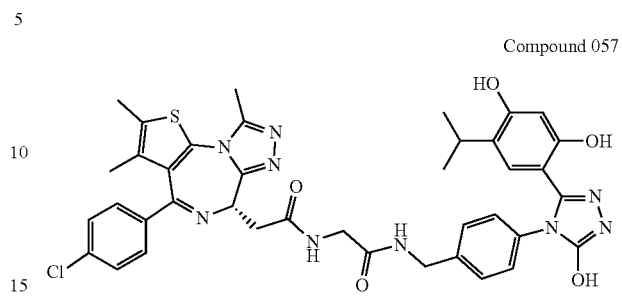

2-((6S)-4-(4-chlorophenyl)-2,3,9-trimethyl-6H-thieno[3,2-f][1,2,4]triazolo[4,3-a][1,4]diazepin-6-yl)-N-(2-((4-(3-(2,4-dihydroxy-5-isopropylphenyl)-5-hydroxy-4H-1,2,4-triazol-4-yl)benzyl)amino)-2-oxoethyl)acetamide. $^1$H NMR (400 MHz, DMSO-d$_6$): δ 11.90 (s, 1H), 9.55 (s, 1H), 9.36 (s, 1H), 8.74 (t, J=5.8 Hz, 1H), 8.29 (t, J=6.0 Hz, 1H), 7.54-7.41 (m, 4H), 7.17 (d, J=8.3 Hz, 2H), 7.07 (t, J=11.9 Hz, 2H), 6.87 (s, 1H), 6.23 (s, 1H), 4.52 (t, J=7.4 Hz, 1H), 4.32-4.28 (m, 2H), 3.89-3.84 (m, 1H), 3.76-3.71 (m, 1H), 3.63-3.40 (m, 3H), 3.39-3.35 (m, 1H), 3.30-3.26 (m, 3H), 2.41 (s, 3H), 1.62 (s, 3H), 1.00 (dd, J=6.8, 1.5 Hz, 6H). LCMS (ESI): $R_T$=1.641 min, m/z found 780.6 [M+H]$^+$.

Compound 058

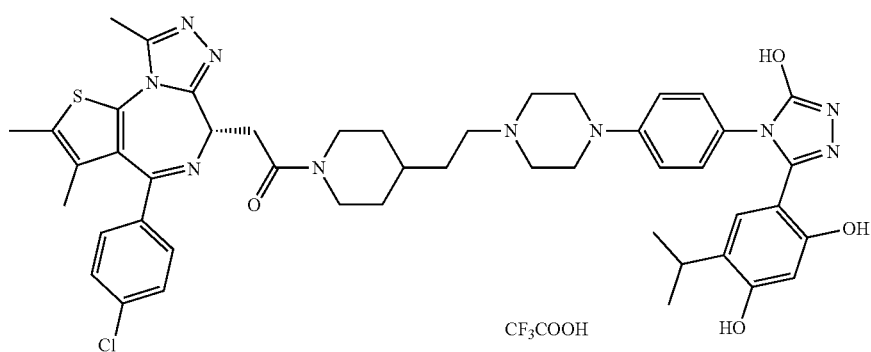

2-((6S)-4-(4-chlorophenyl)-2,3,9-trimethyl-6H-thieno[3,2-f][1,2,4]triazolo[4,3-a][1,4]diazepin-6-yl)-1-(4-(2-(4-(4-(3-(2,4-dihydroxy-5-isopropylphenyl)-5-hydroxy-4H-1,2,4-triazol-4-yl)benzyl)piperazin-1-yl)ethyl)piperidin-1-yl)ethanone, trifluoroacetic acid. ¹H NMR (400 MHz, DMSO-d₆): δ 11.87 (s, 1H), 9.61 (s, 1H), 9.42 (s, 1H), 7.52-7.42 (m, 4H), 7.04 (dd, J=30.5, 8.8 Hz, 4H), 6.80 (s, 1H), 6.27 (s, 1H), 4.61-4.54 (m, 1H), 4.34-4.30 (m, 1H), 4.15-4.14 (m, 1H), 3.87-3.83 (m, 2H), 3.57-3.50 (m, 4H), 3.24-2.89 (m, 10H), 2.60 (s, 3H), 2.42 (s, 3H), 1.79-1.75 (m, 1H), 1.68-1.63 (m, 8H), 0.97 (d, J=6.8 Hz, 6H). LCMS (ESI): $R_T$=1.112 min, m/z found 889.4 [M−CF₃COOH+H⁺]).

Compound 059

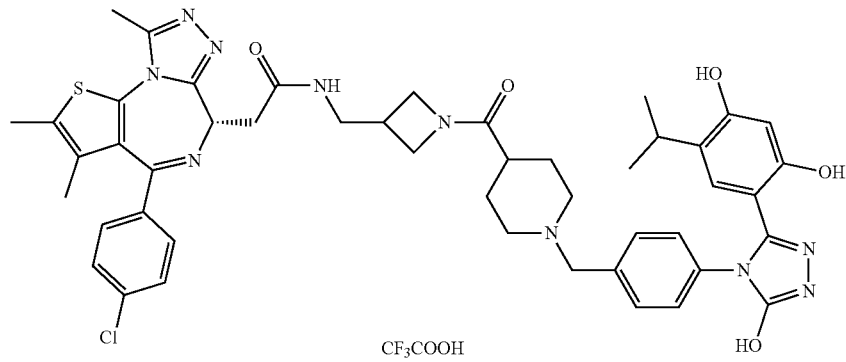

2-((6S)-4-(4-chlorophenyl)-2,3,9-trimethyl-6H-thieno[3,2-f][1,2,4]triazolo[4,3-a][1,4]diazepin-6-yl)-N-((1-(1-(4-(3-(2,4-dihydroxy-5-isopropylphenyl)-5-hydroxy-4H-1,2,4-triazol-4-yl)benzyl)piperidine-4-carbonyl)azetidin-3-yl)methyl)acetamide, trifluoroacetic acid. ¹H NMR (400 MHz, CD₃OD): δ 7.55 (d, J=8.1 Hz, 2H), 7.52-7.24 (m, 6H), 6.87 (s, 1H), 6.20 (s, 1H), 4.64 (s, 1H), 4.33 (s, 3H), 4.05 (s, 2H), 3.74 (s, 1H), 3.58-3.33 (m, 6H), 3.01 (m, 4H), 2.69 (d, J=3.2 Hz, 3H), 2.45 (s, 3H), 1.97 (m, 5H), 1.69 (s, 3H), 1.29 (s, 4H), 1.05-0.92 (m, 6H). LCMS (ESI): $R_T$=1.039 min, m/z found 903.4 [M−CF₃COOH+H]⁺.

Compound 060

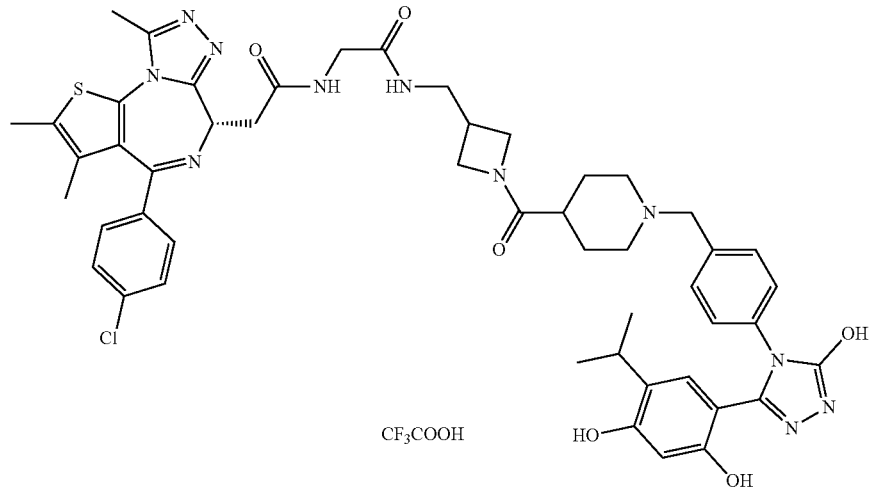

2-((6S)-4-(4-chlorophenyl)-2,3,9-trimethyl-6H-thieno[3,2-f][1,2,4]triazolo[4,3-a][1,4]diazepin-6-yl)-N-(2-(((1-(1-(4-(3-(2,4-dihydroxy-5-isopropylphenyl)-5-hydroxy-4H-1,2,4-triazol-4-yl)benzyl)piperidine-4-carbonyl)azetidin-3-yl)methyl)amino)-2-oxoethyl)acetamide, trifluoroacetic acid. $^1$H NMR (400 MHz, CD$_3$OD): δ 7.45 (m, 8H), 6.87 (s, 1H), 6.20 (s, 1H), 4.65 (t, J=6.6 Hz, 1H), 4.31 (s, 3H), 3.99 (m, 3H), 3.81-3.64 (m, 2H), 3.47 (s, 5H), 3.05 (m, 3H), 2.86 (s, 1H), 2.69 (s, 3H), 2.58 (s, 1H), 2.44 (s, 3H), 2.20 (m, 1H), 1.95 (m, 5H), 1.69 (d, J=2.2 Hz, 3H), 1.30 (s, 4H), 1.01 (d, J=6.8 Hz, 6H). LCMS (ESI): R$_T$=1.063 min, m/z found 960.3 [M−CF$_3$COOH+H]$^+$.

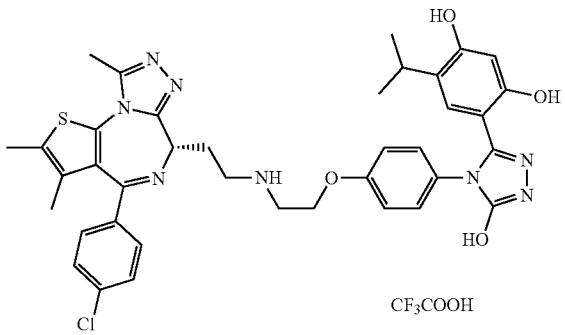

Compound 062

(S)-4-(4-(4-(2-((2-(4-(4-chlorophenyl)-2,3,9-trimethyl-6H-thieno[3,2-f][1,2,4]triazolo[4,3-a][1,4]diazepin-6-yl)ethyl)amino)ethoxy)phenyl)-5-hydroxy-4H-1,2,4-triazol-3-yl)-6-isopropylbenzene-1,3-diol, trifluoroacetic acid. $^1$H NMR (400 MHz, DMSO-d$_6$): δ 11.87 (s, 1H), 9.58 (s, 1H), 9.37 (s, 1H), 8.84-8.81 (m, 2H), 7.49 (s, 4H), 7.14 (d, J=8.9 Hz, 2H), 6.98 (d, J=9.0 Hz, 2H), 6.84 (s, 1H), 6.25 (s, 1H), 4.33 (d, J=7.6 Hz, 1H), 4.26-4.23 (m, 2H), 3.72-3.60 (m, 2H), 3.03-2.93 (m, 1H), 2.72-2.69 (m, 3H), 2.61 (s, 3H), 2.40 (s, 3H), 2.35-2.33 (m, 1H), 1.62 (s, 3H), 0.99 (d, J=6.9 Hz, 6H). LCMS (ESI): R$_T$=1.358 min, m/z found 739.2 [M−CF$_3$COOH+H]$^+$.

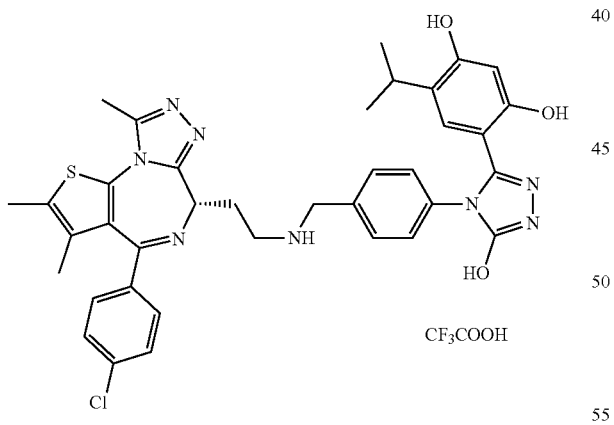

Compound 061

4-(4-(4-((2-((6S)-4-(4-chlorophenyl)-2,3,9-trimethyl-6H-thieno[3,2-f][1,2,4]triazolo[4,3-a][1,4]diazepin-6-yl)ethyl)amino)phenyl)-5-hydroxy-4H-1,2,4-triazol-3-yl)-6-isopropylbenzene-1,3-diol, trifluoroacetic acid. $^1$H NMR (400 MHz, DMSO-d$_6$): δ 11.93 (s, 1H), 9.60 (s, 1H), 9.31 (s, 1H), 8.89-8.80 (m, 2H), 7.51-7.46 (m, 6H), 7.24-7.22 (m, 2H), 6.95 (s, 1H), 6.24 (s, 1H), 4.35-4.24 (m, 3H), 3.75-3.33 (m, 3H), 3.07 (d, J=47.4 Hz, 6H), 2.76-2.66 (m, 3H), 2.60 (s, 3H), 2.42 (s, 3H), 1.97 (s, 3H), 1.63 (s, 3H), 1.01-0.88 (m, 6H). LCMS (ESI): R$_T$=1.347 min, m/z found 709.2 [M−CF$_3$COOH+H]$^+$.

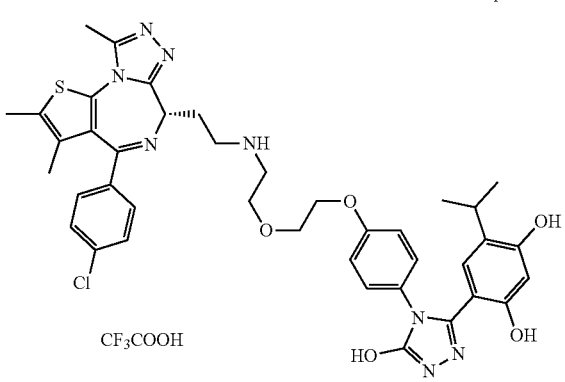

Compound 063

(S)-4-(4-(4-(2-(2-((2-(4-(4-chlorophenyl)-2,3,9-trimethyl-6H-thieno[3,2-f][1,2,4]triazolo[4,3-a][1,4]diazepin-6-yl)ethyl)amino)ethoxy)ethoxy)phenyl)-5-hydroxy-4H-1,2,4-triazol-3-yl)-6-isopropylbenzene-1,3-diol, trifluoroacetic acid. $^1$H NMR (400 MHz, DMSO-$d_6$): δ 11.87 (s, 1H), 9.59 (s, 1H), 9.38 (s, 1H), 8.68-8.50 (m, 2H), 7.50 (s, 4H), 7.09 (d, J=8.9 Hz, 2H), 6.91 (d, J=9.0 Hz, 2H), 6.82 (s, 1H), 6.25 (s, 1H), 4.33-4.28 (m, 1H), 4.12-4.11 (m, 2H), 3.80-3.70 (m, 5H), 3.44-3.40 (m, 1H), 3.30-3.25 (m, 2H), 3.02-2.93 (m, 1H), 2.68-2.55 (m, 2H), 2.60 (s, 3H), 2.40 (s, 3H), 1.61 (s, 3H), 0.98 (d, J=6.9 Hz, 6H). LCMS (ESI): $R_T$=1.385 min, m/z found 783.5 [M−CF$_3$COOH+H]$^+$.
Compound 064
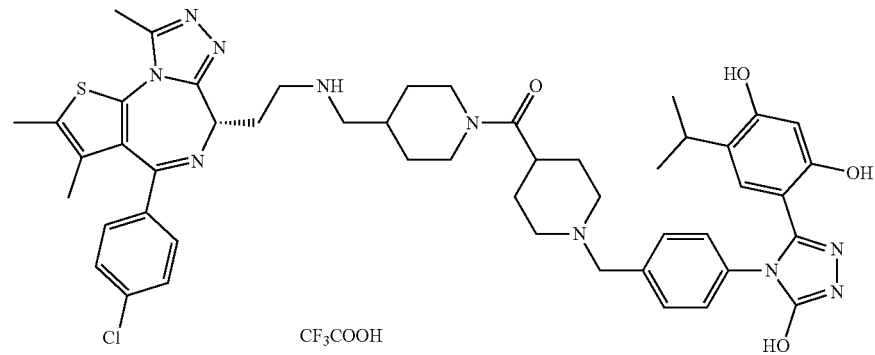

(4-(((2-((6S)-4-(4-chlorophenyl)-2,3,9-trimethyl-6H-thieno[3,2-f][1,2,4]triazolo[4,3-a][1,4]diazepin-6-yl)ethyl)amino)methyl)piperidin-1-yl)(1-(4-(3-(2,4-dihydroxy-5-isopropylphenyl)-5-hydroxy-4H-1,2,4-triazol-4-yl)benzyl)piperidin-4-yl) methanone, trifluoroacetic acid. $^1$H NMR (400 MHz, CD$_3$OD): δ 7.57 (d, J=8.3 Hz, 2H), 7.51 (d, J=8.5 Hz, 2H), 7.42 (m, 4H), 6.87 (s, 1H), 6.22 (s, 1H), 4.42 (s, 1H), 4.34 (s, 2H), 3.58 (m, 6H), 3.06 (d, J=8.3 Hz, 6H), 2.77 (d, J=6.5 Hz, 2H), 2.71 (s, 3H), 2.44 (s, 3H), 2.21-2.15 (m, 1H), 1.99 (m, 7H), 1.70 (s, 3H), 1.30 (s, 7H), 1.01 (d, J=6.9 Hz, 6H). LCMS (ESI): R$_T$=1.042 min, m/z found 917.3 [M−CF$_3$COOH+H]$^+$.

Compound 065

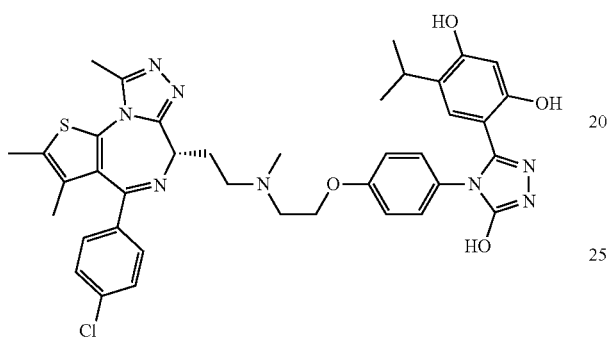

(S)-4-(4-(4-(2-((2-(4-(4-chlorophenyl)-2,3,9-trimethyl-6H-thieno[3,2-f][1,2,4]triazolo[4,3-a][1,4]diazepin-6-yl)ethyl)(methyl)amino)ethoxy)phenyl)-5-hydroxy-4H-1,2,4-triazol-3-yl)-6-isopropylbenzene-1,3-diol. $^1$H NMR (400 MHz, DMSO-d$_6$): δ 7.49 (s, 4H), 7.14 (d, J=8.9 Hz, 2H), 6.79-6.77 (m, 3H), 6.25 (s, 1H), 4.33 (t, J=7.6 Hz, 1H), 3.96-3.94 (m, 2H), 3.03-2.93 (m, 1H), 2.78-2.75 (m, 4H), 2.61 (s, 3H), 2.40 (s, 3H), 2.33 (s, 1H), 1.62 (s, 3H), 0.99 (d, J=6.9 Hz, 6H). LCMS (ESI): R$_T$=1.417 min, m/z found 753.7 [M+H]$^+$.

Compound 066

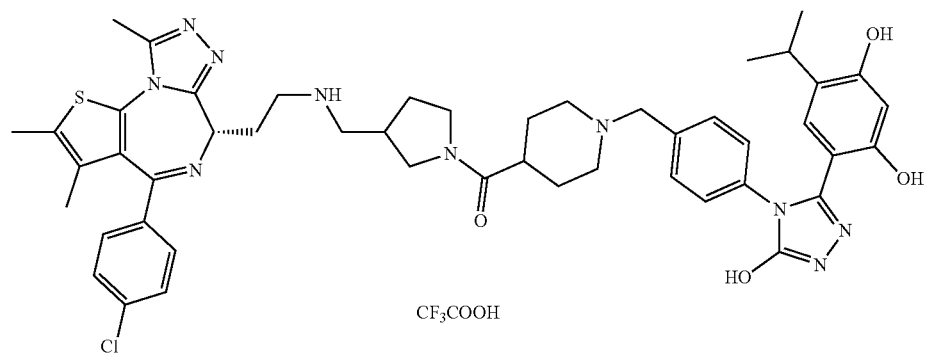

(3-(((2-((6S)-4-(4-chlorophenyl)-2,3,9-trimethyl-6H-thieno[3,2-f][1,2,4]triazolo[4,3-a][1,4]diazepin-6-yl)ethyl) amino)methyl) pyrrolidin-1-yl)(1-(4-(3-(2,4-dihydroxy-5-isopropylphenyl)-5-hydroxy-4H-1,2,4-triazol-4-yl)benzyl) piperidin-4-yl) methanone, trifluoroacetic acid. $^1$H NMR (400 MHz, CD$_3$OD): δ 7.48 (m, 7.9 Hz, 8H), 6.88 (s, 1H), 6.21 (s, 1H), 4.38 (m, 3H), 3.88 (m, 2H), 3.56 (m, 5H), 3.22 (d, J=5.6 Hz, 2H), 3.06 (d, J=7.3 Hz, 3H), 2.79 (s, 3H), 2.71 (s, 3H), 2.60 (s, 1H), 2.44 (s, 3H), 2.34-2.11 (m, 2H), 2.07-1.81 (m, 5H), 1.70 (s, 3H), 1.27 (m, 4H), 1.02 (d, J=6.9 Hz, 6H). LCMS (ESI): R$_T$=0.978 min, m/z found 903.3 [M−CF$_3$COOH+H]$^+$.

Compound 067

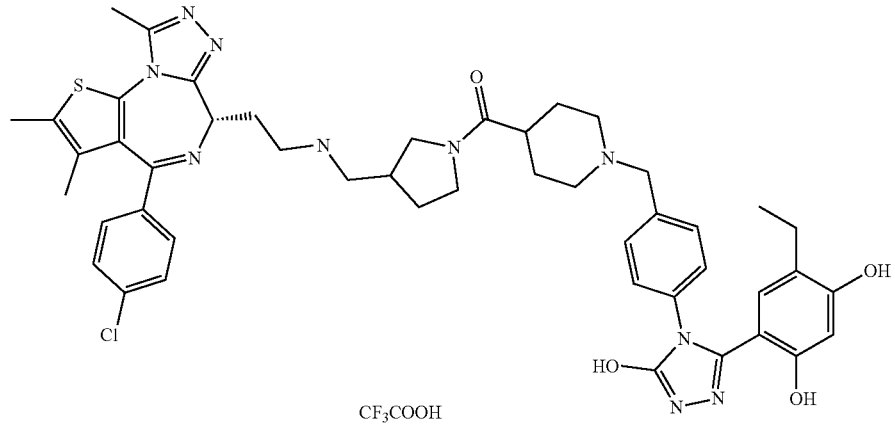

(3-(((2-((6S)-4-(4-chlorophenyl)-2,3,9-trimethyl-6H-thieno[3,2-f][1,2,4]triazolo[4,3-a][1,4]diazepin-6-yl)ethyl) amino)methyl) pyrrolidin-1-yl)(1-(4-(3-(5-ethyl-2,4-dihydroxyphenyl)-5-hydroxy-4H-1,2,4-triazol-4-yl)benzyl) piperidin-4-yl) methanone, trifluoroacetic acid. $^1$H NMR (400 MHz, DMSO-d$_6$): δ 11.99 (s, 1H), 9.64 (s, 2H), 9.36 (s, 1H), 8.68-8.65 (m, 2H), 7.52-7.49 (m, 6H), 7.26 (d, J=8.3 Hz, 2H), 6.91 (s, 1H), 6.24 (s, 1H), 4.31-4.29 (m, 3H), 3.47-3.25 (m, 7H), 3.10-2.80 (m, 4H), 2.64-2.60 (m, 5H), 2.43-2.29 (m, 5H), 2.05-1.78 (m, 6H), 1.62 (s, 3H), 1.23-1.20 (m, 3H), 1.01 (t, J=7.5 Hz, 3H). LCMS (ESI): R$_T$=0.946 min, m/z found 889.3 [M−CF$_3$COOH+H]$^+$.

Compound 068

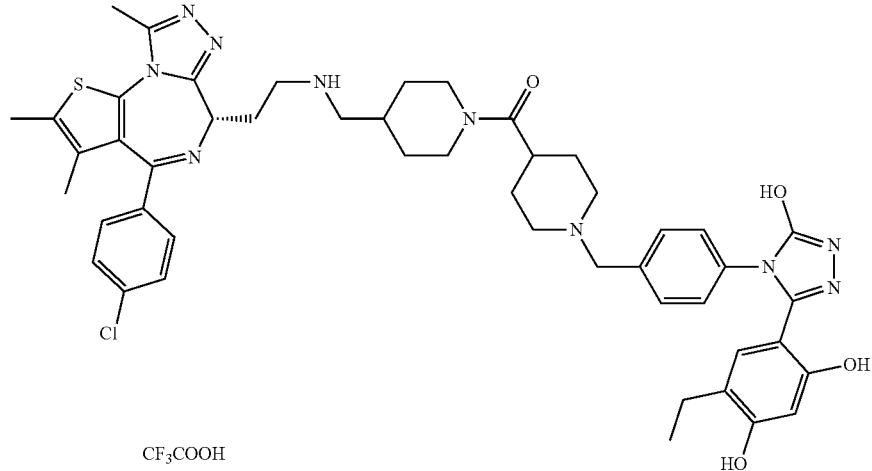

(4-(((2-(((6S)-4-(4-chlorophenyl)-2,3,9-trimethyl-6H-thieno[3,2-f][1,2,4]triazolo[4,3-a][1,4]diazepin-6-yl)ethyl)amino)methyl)piperidin-1-yl)(1-(4-(3-(5-ethyl-2,4-dihydroxyphenyl)-5-hydroxy-4H-1,2,4-triazol-4-yl)benzyl)piperidin-4-yl) methanone, trifluoroacetic acid. $^1$H NMR (400 MHz, DMSO): δ 11.98 (s, 1H), 9.63 (s, 2H), 9.35 (s, 1H), 8.56 (s, 2H), 7.49 (m, 5H), 7.27 (d, J=8.2 Hz, 2H), 6.91 (s, 1H), 6.23 (s, 1H), 4.30 (m, 4H), 2.96 (s, 5H), 2.64 (m, 8H), 2.43-2.34 (m, 4H), 1.99 (s, 3H), 1.80 (s, 4H), 1.62 (s, 3H), 1.51-1.42 (m, 1H), 1.23 (s, 5H), 1.01 (t, J=7.5 Hz, 3H). LCMS (ESI): $R_T$=0.958 min, m/z found 903.3 [M−CF$_3$COOH+H]$^+$.
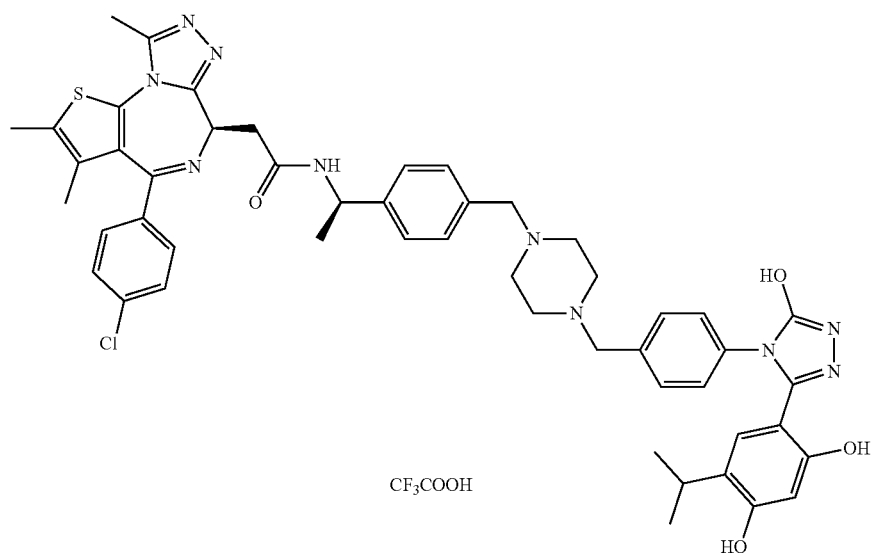
Compound 070

2-((6S)-4-(4-chlorophenyl)-2,3,9-trimethyl-6H-thieno[3,2-f][1,2,4]triazolo[4,3-a][1,4]diazepin-6-yl)-N—((R)-1-(4-((4-(4-(3-(2,4-dihydroxy-5-isopropylphenyl)-5-hydroxy-4H-1,2,4-triazol-4-yl)benzyl)piperazin-1-yl)methyl)phenyl)ethyl)acetamide, trifluoroacetic acid. $^1$H NMR (400 MHz, DMSO-$d_6$): δ 11.93 (s, 1H), 9.61 (s, 1H), 9.34 (s, 1H), 8.73 (s, 1H), 7.56-7.31 (m, 10H), 7.19 (s, 2H), 6.84 (s, 1H), 6.27 (s, 1H), 4.99 (s, 1H), 4.47 (d, J=8.6 Hz, 1H), 4.30 (s, 1H), 3.36-3.30 (m, 7H), 3.23-3.20 (m, 2H), 2.98-2.96 (m, 2H), 2.65-2.58 (m, 7H), 2.39 (s, 3H), 1.56 (s, 3H), 1.39 (d, J=6.6 Hz, 3H), 0.98 (d, J=6.7 Hz, 6H). LCMS (ESI): $R_T$=1.081 min, m/z found 925.5 [M−CF$_3$COOH+H]$^+$.

Compound 071

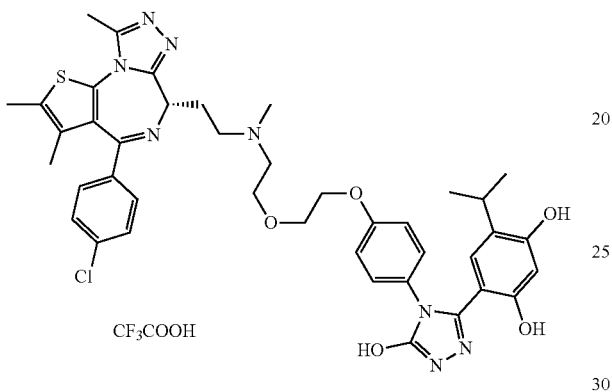

(S)-4-(4-(4-(2-(2-((2-(4-(4-chlorophenyl)-2,3,9-trimethyl-6H-thieno[3,2-f][1,2,4]triazolo[4,3-a][1,4]diazepin-6-yl)ethyl)(methyl)amino)ethoxy)ethoxy)phenyl)-5-hydroxy-4H-1,2,4-triazol-3-yl)-6-isopropylbenzene-1,3-diol, trifluoroacetic acid. $^1$H NMR (400 MHz, DMSO-$d_6$): δ 7.55-7.37 (m, 4H), 7.11-7.09 (m, 1H), 6.88 (d, J=8.1 Hz, 2H), 6.69 (s, 1H), 6.26 (s, 1H), 4.37-4.35 (m, 1H), 4.06-3.67 (m, 9H), 3.11-2.96 (m, 4H), 2.79-2.70 (m, 2H), 2.66 (d, J=8.6 Hz, 3H), 2.43 (s, 3H), 1.67 (s, 3H), 1.29-1.25 (m, 3H), 0.90-0.89 (m, 6H). LCMS (ESI): $R_T$=1.347 min, m/z found 797.3 [M−CF$_3$COOH+H]$^+$.

Compound 072

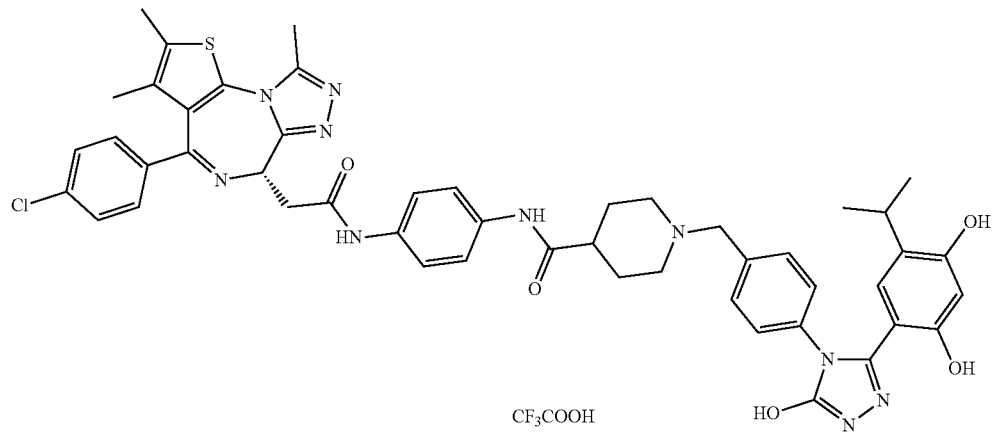

N-(4-(2-((6S)-4-(4-chlorophenyl)-2,3,9-trimethyl-6H-thieno[3,2-f][1,2,4]triazolo[4,3-a][1,4]diazepin-6-yl)acetamido)phenyl)-1-(4-(3-(2,4-dihydroxy-5-isopropylphenyl)-5-hydroxy-4H-1,2,4-triazol-4-yl)benzyl)piperidine-4-carboxamide, trifluoroacetic acid. $^1$H NMR (400 MHz, CD$_3$OD): δ 7.64-7.31 (m, 13H), 6.89 (s, 1H), 6.21 (s, 1H), 4.71 (dd, J=8.6, 5.5 Hz, 1H), 4.36-4.33 (m, 2H), 3.64-3.47 (m, 6H), 3.13-3.09 (m, 3H), 2.71 (s, 3H), 2.45 (s, 3H), 2.19-1.95 (m, 3H), 1.70 (s, 3H), 1.02 (d, J=6.9 Hz, 6H). LCMS (ESI): R$_T$=1.748 min, m/z found 925.9 [M–CF$_3$COOH+H]$^+$.

Compound 073

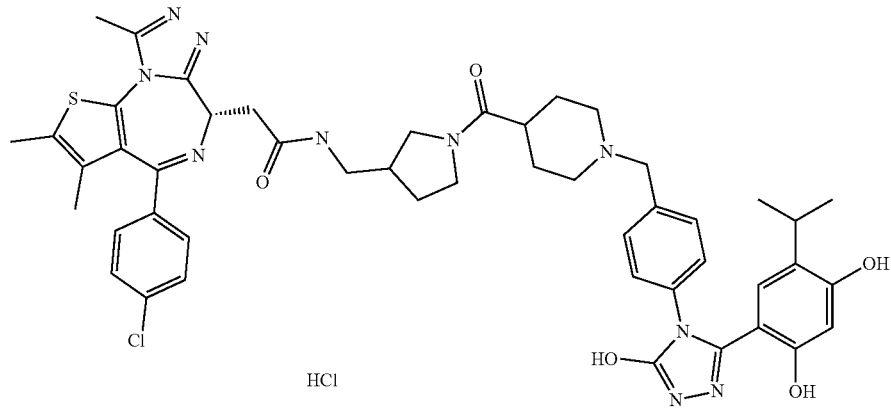

2-((S)-4-(4-chlorophenyl)-2,3,9-trimethyl-6H-thieno[3,2-f][1,2,4]triazolo[4,3-a][1,4]diazepin-6-yl)-N-((1-(1-(4-(3-(2,4-dihydroxy-5-isopropylphenyl)-5-hydroxy-4H-1,2,4-triazol-4-yl)benzyl)piperidine-4-carbonyl) pyrrolidin-3-yl)methyl)acetamide hydrochloride. $^1$H NMR (400 MHz, DMSO-d$_6$): δ 11.99 (s, 1H), 10.20 (s, 1H), 9.61 (s, 1H), 9.33 (s, 2H), 8.44 (s, 1H), 7.55-7.41 (m, 6H), 7.25 (d, J=6.8 Hz, 2H), 6.87 (s, 1H), 6.28 (s, 1H), 4.27-4.25 (m, 1H), 4.09-4.06 (m, 2H), 3.69-3.20 (m, 11H), 3.02-2.85 (m, 4H), 2.61-2.51 (m, 4H), 2.41 (s, 3H), 1.86-1.82 (m, 5H), 1.61 (m, 3H), 1.01-0.99 (m, 6H). LCMS (ESI): R$_T$=1.305 min, m/z found 917.4 [M–HCl+H]$^+$.

Compound 074

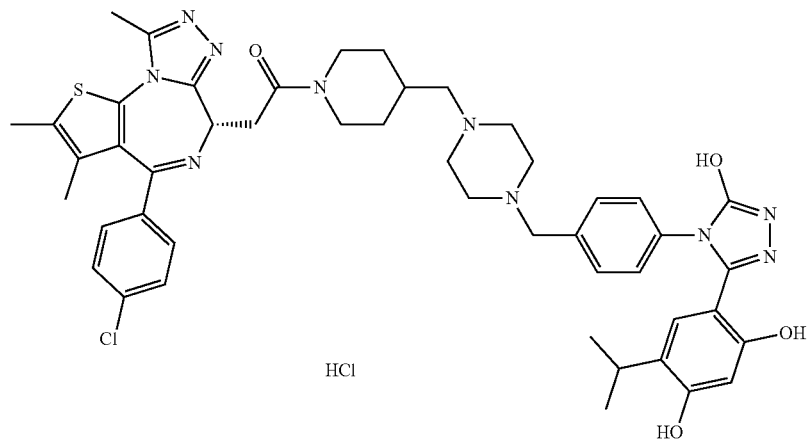

2-((6S)-4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-isopropylphenyl)-5-hydroxy-4H-1,2,4-triazol-4-yl)benzyl)piperazin-1-yl)methyl)piperidin-1-yl)ethenone hydrochloride. $^1$H NMR (400 MHz, DMSO-d$_6$): δ 11.95 (s, 1H), 10.68 (m, 1H), 9.62 (s, 1H), 9.38 (s, 1H), 7.64-7.44 (m, 6H), 7.25 (d, J=8.4 Hz, 2H), 6.93 (s, 1H), 6.31 (s, 1H), 4.63 (t, J=6.7 Hz, 1H), 4.41-4.15 (m, 3H), 3.79-3.40 (m, 12H), 3.43-3.00 (m, 4H), 2.76-2.55 (m, 5H), 2.42 (s, 3H), 2.05-2.02 (m, 1H), 1.90-1.68 (m, 2H), 1.63 (s, 3H), 0.98 (d, J=6.9 Hz, 6H). LCMS (ESI): R$_T$=1.31 min, m/z found 889.6 [M−HCl+H]$^+$.

Compound 076

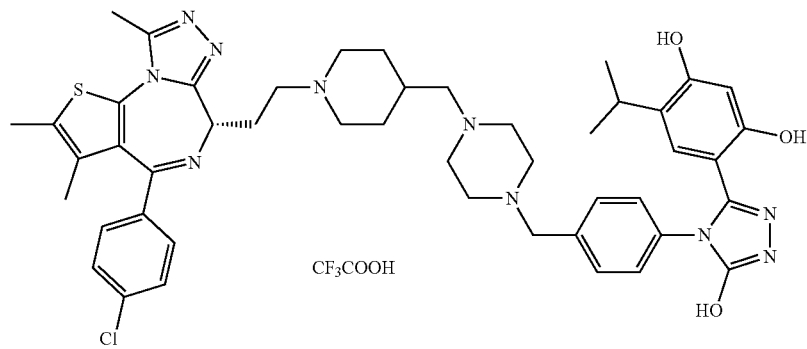

4-(4-(4-((4-((1-(2-((6S)-4-(4-chlorophenyl)-2,3,9-trimethyl-6H-thieno[3,2-f][1,2,4]triazolo[4,3-a][1,4]diazepin-6-yl)ethyl)piperidin-4-yl)methyl)piperidin-1-yl)methyl)phenyl)-5-hydroxy-4H-1,2,4-triazol-3-yl)-6-isopropylbenzene-1,3-diol, trifluoroacetic acid. $^1$H NMR (400 MHz, CD$_3$OD): δ 7.58-7.45 (m, 8H), 6.83 (s, 1H), 6.23 (s, 1H), 4.38 (t, J=6.1 Hz, 1H), 4.16 (s, 2H), 3.75-3.70 (m, 4H), 3.21-2.95 (m, 12H), 2.71 (s, 3H), 2.65-2.61 (m, 2H), 2.44 (s, 3H), 2.17-2.04 (m, 3H), 1.70 (s, 3H), 1.55-1.50 (m, 2H), 0.98 (d, J=6.9 Hz, 6H). LCMS (ESI): R$_T$=1.224 min, m/z found 875.5 [M−CF$_3$COOH+H]$^+$.

Compound 077

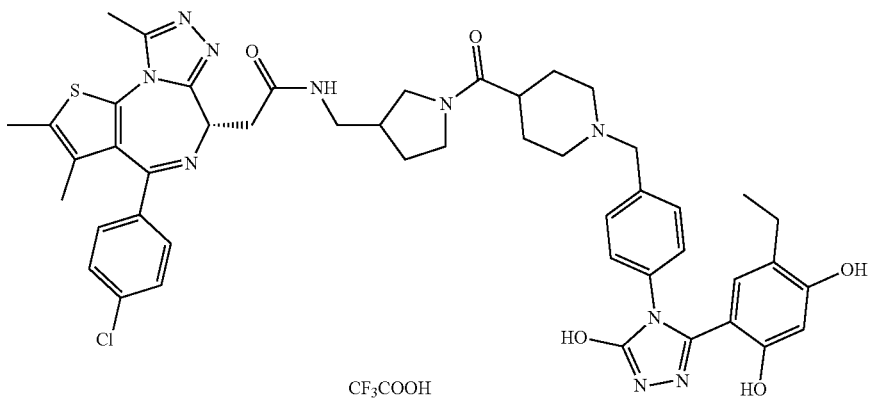

2-((6S)-4-(4-chlorophenyl)-2,3,9-trimethyl-6H-thieno[3,2-f][1,2,4]triazolo[4,3-a][1,4]diazepin-6-yl)-N-((1-(1-(4-(3-(5-ethyl-2,4-dihydroxyphenyl)-5-hydroxy-4H-1,2,4-triazol-4-yl)benzyl)piperidine-4-carbonyl) pyrrolidin-3-yl)methyl) acetamide, trifluoroacetic acid. $^1$H NMR (400 MHz, CD$_3$OD): δ 7.46 (m, 8H), 6.89 (s, 1H), 6.18 (s, 1H), 4.64 (s, 1H), 4.32 (s, 2H), 3.51 (s, 7H), 3.06 (s, 2H), 2.85 (s, 2H), 2.70 (s, 3H), 2.44 (s, 6H), 1.96 (m, 6H), 1.69 (s, 4H), 1.30 (s, 5H), 1.03 (s, 3H). LCMS (ESI): R$_T$=1.054 min, m/z found 903.1 [M–CF$_3$COOH+H]$^+$.
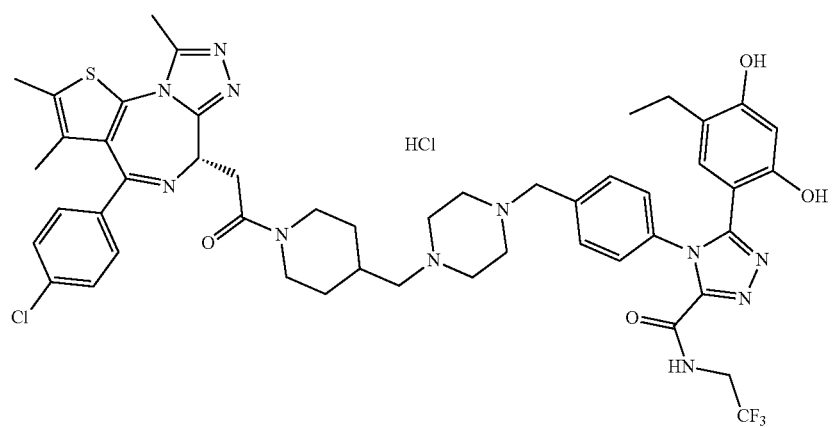
Compound 078

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(5-ethyl-2,4-dihydroxyphenyl)-N-(2,2,2-trifluoroethyl)-4H-1,2,4-triazole-3-carboxamide hydrochloride. $^1$H NMR (400 MHz, DMSO-$d_6$): 9.75-9.66 (m, 2H), 7.61-7.37 (m, 8H), 6.75 (s, 1H), 6.34 (s, 1H), 4.60-4.57 (m, 1H), 4.37-4.34 (m, 2H), 4.21-4.16 (m, 2H), 3.99-3.95 (m, 2H), 3.66-3.30 (m, 11H), 3.18-3.12 (m, 3H), 2.67-2.57 (m, 4H), 2.44 (s, 3H), 2.33-2.29 (m, 2H), 1.76-1.60 (m, 4H), 1.63 (s, 3H), 1.24 (s, 1H), 0.95-0.91 (m, 4H). LCMS (ESI): $R_T$=1.415 min, m/z found 984.4 [M−HCl+H]$^+$.

Compound 079

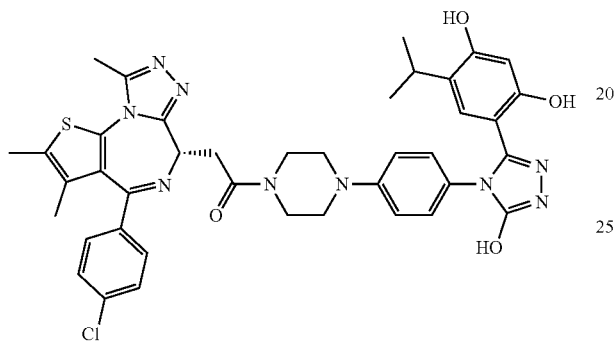

(S)-2-(4-(4-chlorophenyl)-2,3,9-trimethyl-6H-thieno[3,2-f][1,2,4]triazolo[4,3-a][1,4]diazepin-6-yl)-1-(4-(4-(3-(2,4-dihydroxy-5-isopropylphenyl)-5-hydroxy-4H-1,2,4-triazol-4-yl)phenyl)piperazin-1-yl)ethan-1-one. $^1$H NMR (400 MHz, DMSO-$d_6$): δ 11.85 (s, 1H), 9.59 (s, 2H), 7.50-7.43 (m, 4H), 7.07-6.96 (m, 4H), 6.80 (s, 1H), 6.27 (s, 1H), 4.62-4.59 (t, 1H), 3.81-3.77 (m, 2H), 3.70-3.66 (m, 2H), 3.48-3.40 (m, 2H), 3.29-3.26 (m, 2H), 3.00-2.97 (m, 1H), 2.63 (s, 3H), 2.45 (s, 3H), 1.64 (s, 3H), 0.98-0.97 (d, J=6.8 Hz, 6H). LCMS (ESI): $R_T$=1.573 min, m/z found 778.1 [M+H]$^+$.

Compound 080

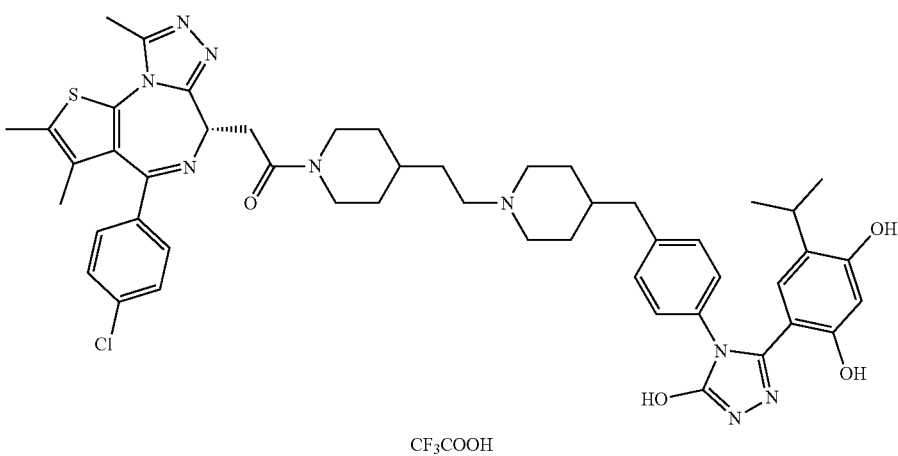

CF$_3$COOH (S)-2-(4-(4-chlorophenyl)-2,3,9-trimethyl-6H-thieno[3,2-f][1,2,4]triazolo[4,3-a][1,4]diazepin-6-yl)-1-(4-(2-(4-(4-(3-(2,4-dihydroxy-5-isopropylphenyl)-5-hydroxy-4H-1,2,4-triazol-4-yl)benzyl)piperidin-1-yl)ethyl)piperidin-1-yl)ethan-1-one, trifluoroacetic acid. $^1$H NMR (400 MHz, DMSO-d$_6$): δ 11.93 (s, 1H), 9.63 (s, 1H), 9.42 (s, 1H), 7.51-7.43 (m, 4H), 7.22-7.12 (m, 4H), 6.77 (s, 1H), 6.27 (s, 1H), 4.59-4.56 (t, J=13.2 Hz, 1H), 4.36-4.33 (m, 1H), 4.13-4.10 (m, 1H), 3.70-3.33 (m, 3H), 3.22-2.96 (m, 7H), 2.60 (s, 3H), 1.99-2.01 (m, 1H), 1.78-1.59 (m, 10H), 1.39-1.24 (m, 6H), 1.01 (d, J=6.9 Hz, 6H). LCMS (ESI): R$_T$=1.193 min, m/z found 902.2 [M–CF$_3$COOH+H]$^+$.

Compound 081

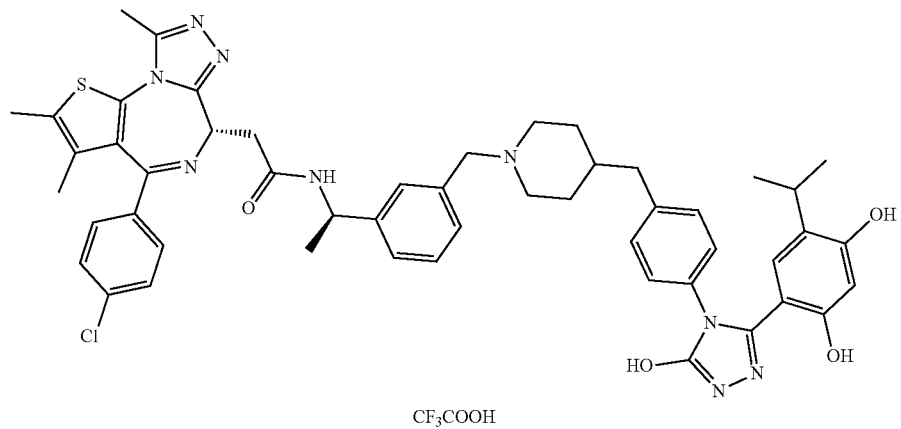

2-((S)-4-(4-chlorophenyl)-2,3,9-trimethyl-6H-thieno[3,2-f][1,2,4]triazolo[4,3-a][1,4]diazepin-6-yl)-N—((R)-1-(3-((4-(4-(3-(2,4-dihydroxy-5-isopropylphenyl)-5-hydroxy-4H-1,2,4-triazol-4-yl)benzyl)piperidin-1-yl)methyl)phenyl)ethyl)acetamide, trifluoroacetic acid. $^1$H NMR (400 MHz, DMSO-d$_6$): δ 11.91 (s, 1H), 9.60-9.40 (m, 3H), 8.73-8.71 (m, 2H), 7.52-7.10 (m, 12H), 6.76 (s, 1H), 6.26 (s, 1H), 4.02-4.00 (m, 1H), 4.48-4.46 (m, 1H), 4.27-4.26 (m, 2H), 4.94-3.59 (m, 4H), 3.43-3.33 (m, 3H), 2.98-2.86 (m, 3H), 2.68-2.66 (m, 4H), 2.40 (s, 3H), 1.76-1.72 (m, 2H), 1.56 (s, 3H), 1.43-1.24 (m, 3H), 0.94 (d, J=6.9 Hz, 6H). LCMS (ESI): R$_T$=1.410 min, m/z found 924.3 [M–CF$_3$COOH+H]$^+$.

Compound 082

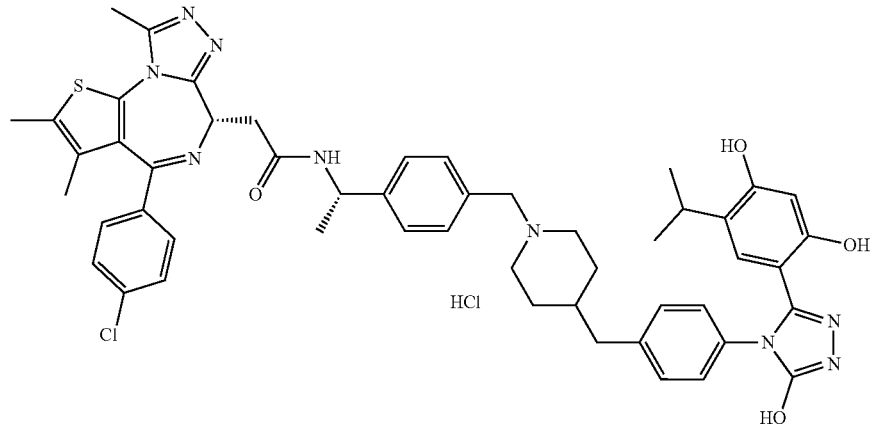

2-((S)-4-(4-chlorophenyl)-2,3,9-trimethyl-6H-thieno[3,2-f][1,2,4]triazolo[4,3-a][1,4]diazepin-6-yl)-N—((R)-1-(4-((4-(4-(3-(2,4-dihydroxy-5-isopropylphenyl)-5-hydroxy-4H-1,2,4-triazol-4-yl)benzyl)piperidin-1-yl)methyl)phenyl)ethyl)acetamide hydrochloride. $^1$H NMR (400 MHz, DMSO-$d_6$): δ 11.92 (s, 1H), 9.83 (s, 1H), 9.62 (s, 1H), 9.40 (s, 1H), 8.78-8.76 (m, 2H), 7.57-7.44 (m, 6H), 7.37-7.32 (m, 2H), 7.20-7.09 (m, 4H), 6.77 (s, 1H), 6.28 (s, 1H), 5.00 (t, J=6.7 Hz, 1H), 4.49-4.46 (m, 1H), 4.25-4.24 (m, 2H), 3.40-3.12 (m, 5H), 2.98-2.96 (m, 1H), 2.86-2.82 (m, 2H), 2.67-2.60 (m, 4H), 2.39 (s, 3H), 1.71-1.68 (m, 4H), 1.55 (s, 3H), 1.46-1.39 (m, 4H), 0.95 (d, J=6.9 Hz, 6H). LCMS (ESI): $R_T$=1.285 min, m/z found 924.6 [M−HCl+H]$^+$.

Compound 083

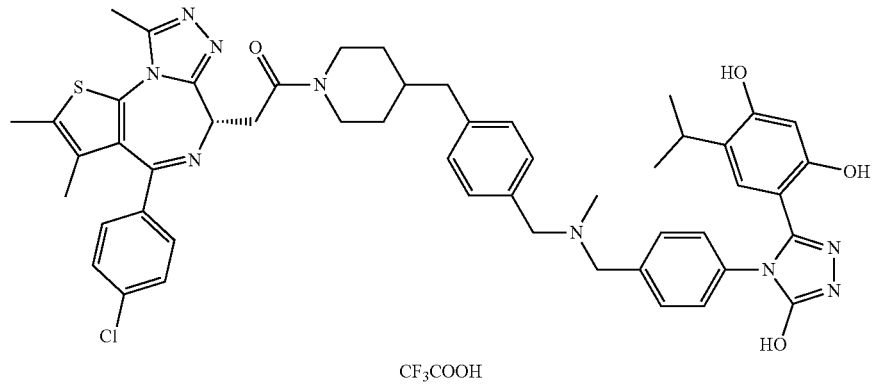

CF$_3$COOH (S)-2-(4-(4-chlorophenyl)-2,3,9-trimethyl-6H-thieno[3,2-f][1,2,4]triazolo[4,3-a][1,4]diazepin-6-yl)-1-(4-(4-(((4-(3-(2,4-dihydroxy-5-isopropylphenyl)-5-hydroxy-4H-1,2,4-triazol-4-yl)benzyl)(methyl)amino)methyl)benzyl)piperidin-1-yl)ethan-1-one, trifluoroacetic acid. $^1$H NMR (400 MHz, DMSO-$d_6$): δ 11.97 (s, 1H), 9.81 (s, 1H), 9.80 (s, 1H), 9.61 (s, 1H), 7.52-7.26 (m, 12H), 6.90 (s, 1H), 6.24 (s, 1H), 4.57 (t, J=6.7 Hz, 1H), 4.45-4.11 (m, 8H), 3.59 (s, 1H), 3.39-3.35 (s, 1H), 3.06-2.98 (m, 2H), 2.60-2.58 (m, 5H), 2.52-2.49 (m, 2H), 2.41 (s, 3H), 1.83 (s, 1H), 1.68-1.63 (m, 5H), 1.02 (d, J=6.9 Hz, 6H). LCMS (ESI): $R_T$=1.203 min, m/z found 924.2 [M−CF$_3$COOH+H]$^+$.

Compound 084

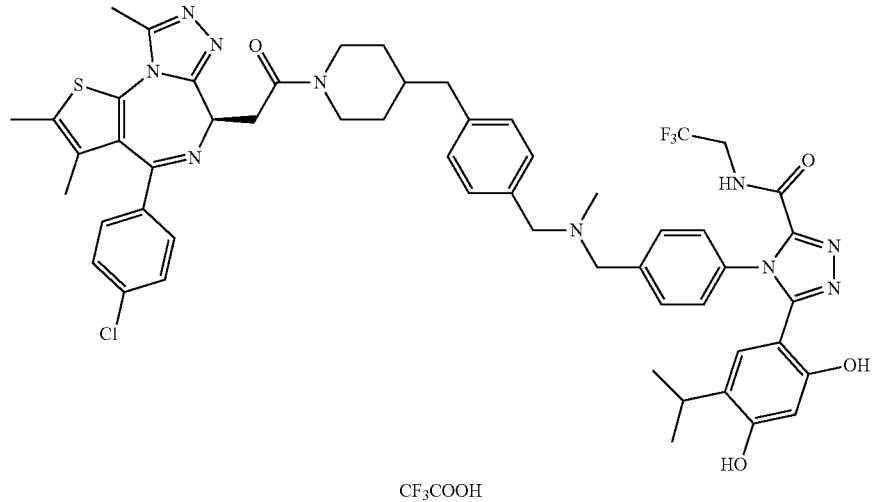

CF$_3$COOH (S)-4-(4-(((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)benzyl)(methyl)amino)methyl)phenyl)-5-(2,4-dihydroxy-5-isopropylphenyl)-N-(2,2,2-trifluoroethyl)-4H-1,2,4-triazole-3-carboxamide, trifluoroacetic acid. ¹H NMR (400 MHz, DMSO-d₆): 9.70-9.64 (m, 3H), 7.57-7.31 (m, 12H), 6.77 (s, 1H), 6.29 (s, 1H), 4.59-3.94 (m, 11H), 3.72-3.63 (m, 1H), 3.40-3.33 (m, 1H), 2.96-2.92 (m, 2H), 2.60-2.49 (m, 8H), 2.42 (s, 3H), 2.09 (m, 1H), 2.01 (m, 1H), 1.66-1.63 (m, 5H), 1.01 (d, J=6.9 Hz, 6H). LCMS (ESI): R$_T$=1.293 min, m/z found 1033.1 [M–CF₃COOH+H]⁺.

Compound 085

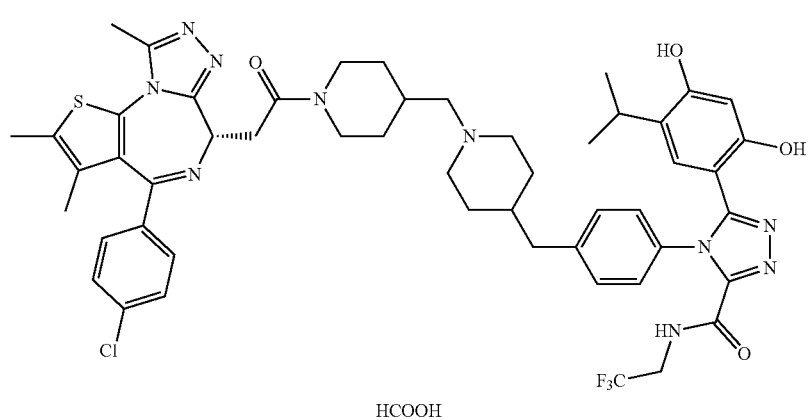

HCOOH (S)-4-(4-((1-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperidin-4-yl)methyl)phenyl)-5-(2,4-dihydroxy-5-isopropylphenyl)-N-(2,2,2-trifluoroethyl)-4H-1,2,4-triazole-3-carboxamide, formic acid. ¹H NMR (400 MHz, DMSO-d₆): δ 10.56 (s, 1H), 9.57 (s, 1H), 9.38 (s, 1H), 8.33 (s, 1H), 7.50-7.42 (m, 4H), 7.29-7.23 (m, 4H), 6.61 (s, 1H), 6.35 (s, 1H), 4.58 (m, 1H), 4.33 (m, 1H), 4.15 (m, 1H), 3.98-3.94 (m, 2H), 3.42-3.38 (m, 2H), 3.11 (m, 2H), 2.93-2.89 (m, 1H), 2.60 (s, 3H), 2.65-2.55 (m, 3H), 2.44 (s, 3H), 2.11-2.10 (m, 2H), 1.79 (m, 4H), 1.63-1.54 (m, 7H), 1.24-1.21 (m, 2H), 0.81 (d, J=6.9 Hz, 6H). LCMS (ESI): R$_T$=1.460 min, m/z found 997.3 [M–CF₃COOH+H]⁺.

Compound 086

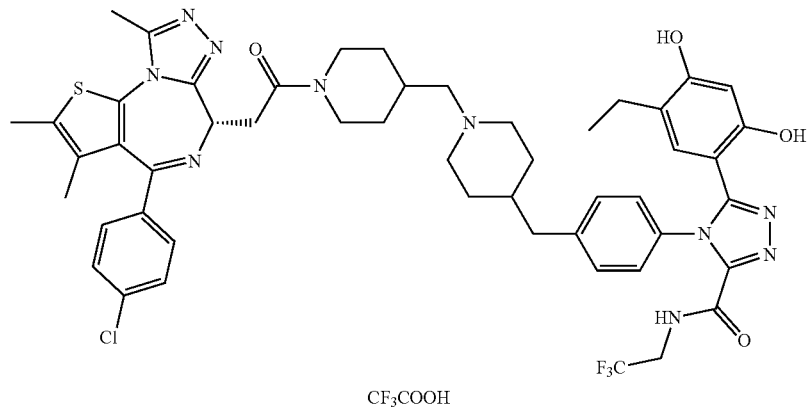

CF₃COOH (S)-4-(4-((1-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperidin-4-yl)methyl)phenyl)-5-(5-ethyl-2,4-dihydroxyphenyl)-N-(2,2,2-trifluoroethyl)-4H-1,2,4-triazole-3-carboxamide, trifluoroacetic acid. $^1$H NMR (400 MHz, DMSO-$d_6$): δ 9.73-9.59 (m, 2H), 8.82 (s, 1H), 9.38 (s, 1H), 7.51-7.43 (m, 4H), 7.29-7.24 (m, 4H), 6.61 (s, 1H), 6.33 (s, 1H), 4.60-4.56 (m, 1H), 4.38-4.34 (m, 1H), 4.23-4.21 (m, 1H), 3.98-3.94 (m, 2H), 3.64-3.52 (m, 3H), 3.40-3.15 (m, 3H), 2.98-2.86 (m, 3H), 2.62-2.58 (m, 5H), 2.42 (s, 3H), 2.27-2.21 (m, 3H), 1.87-1.73 (m, 6H), 1.63 (s, 4H), 1.38-1.10 (m, 2H), 0.84-0.88 (m, 3H). LCMS (ESI): $R_T$=1.534 min, m/z found 983.4 [M−CF$_3$COOH+H]$^+$.

Compound 087

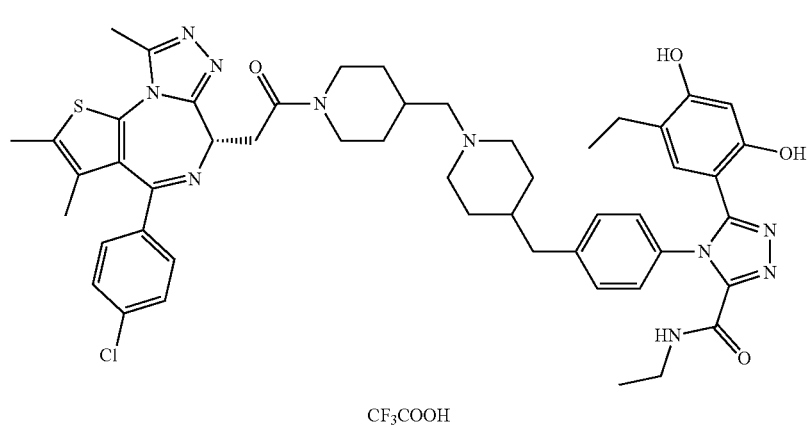

CF$_3$COOH (S)-4-(4-((1-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperidin-4-yl)methyl)phenyl)-N-ethyl-5-(5-ethyl-2,4-dihydroxyphenyl)-1H-1,2,414-triazole-3-carboxamide, trifluoroacetic acid. $^1$H NMR (400 MHz, DMSO-$d_6$): δ 9.25 (s, 1H), 8.98 (s, 1H), 7.51-7.43 (m, 4H), 7.26 (s, 4H), 6.56 (s, 1H), 6.33 (s, 1H), 4.58 (t, J=6.7 Hz, 1H), 4.38-4.35 (m, 1H), 4.19-4.08 (m, 1H), 3.78-3.36 (m, 5H), 3.19-3.16 (m, 4H), 2.98-2.81 (m, 3H), 2.67-2.60 (m, 6H), 2.42 (s, 3H), 2.26-2.22 (m, 3H), 1.89-1.74 (m, 5H), 1.63 (s, 3H), 1.60-1.24 (m, 4H), 1.06-1.03 (m, 3H), 0.86-0.83 (m, 3H). LCMS (ESI): $R_T$=1.409 min, m/z found 929.3 [M−CF$_3$COOH+H]$^+$.

Compound 088

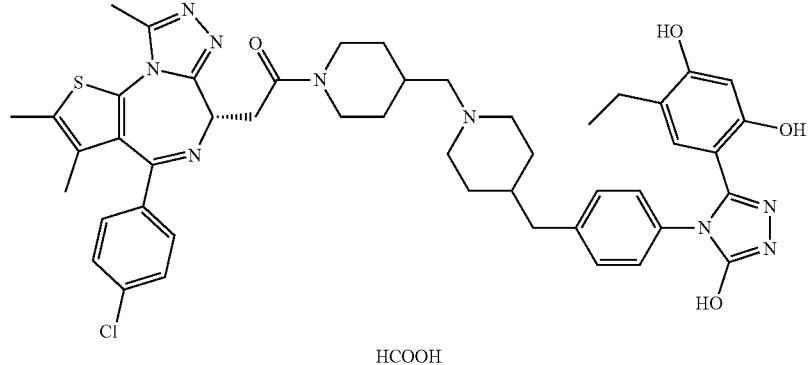

HCOOH (S)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(5-ethyl-2,4-dihydroxyphenyl)-5-hydroxy-4H-1,2,4-triazol-4-yl)benzyl)piperidin-1-yl)methyl)piperidin-1-yl)ethan-1-one, formic acid. $^1$H NMR (400 MHz, DMSO-$d_6$): δ 11.89 (s, 1H), 9.56 (s, 1H), 9.37 (s, 1H), 8.15 (s, 1H), 7.51-7.42 (m, 4H), 7.18-7.08 (m, 4H), 6.80 (s, 1H), 6.26 (s, 1H), 4.59-4.15 (m, 3H), 3.70-3.59 (m, 1H), 3.40-3.38 (m, 3H), 3.12-2.99 (m, 3H), 2.60 (s, 3H), 2.42 (s, 3H), 2.39-2.30 (m, 4H), 2.29-1.98 (m, 2H), 1.83-1.80 (m, 2H), 1.64-1.57 (m, 7H), 1.29-1.25 (m, 2H), 0.98-0.94 (m, 4H). LCMS (ESI): $R_T$=1.337 min, m/z found 874.1 [M−HCOOH+H]$^+$.

Compound 089

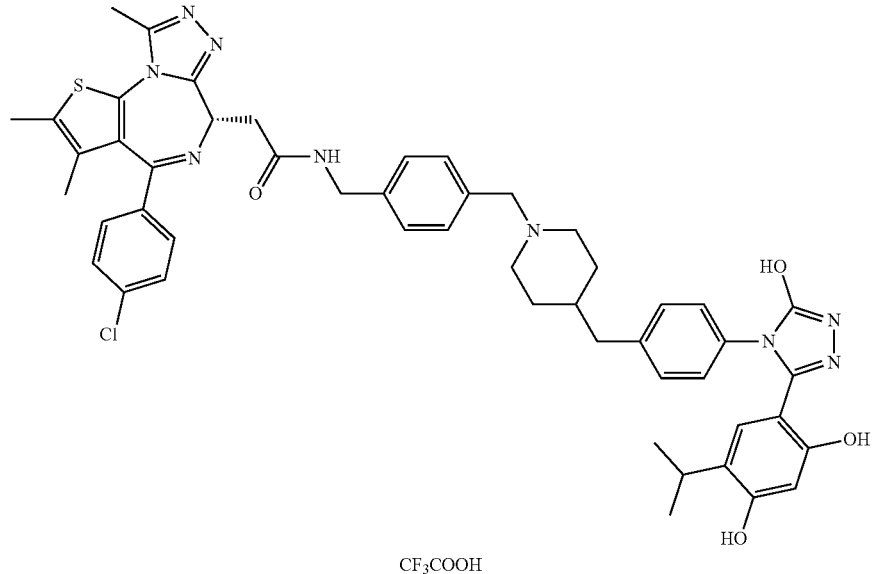

CF$_3$COOH (S)-2-(4-(4-chlorophenyl)-2,3,9-trimethyl-6H-thieno[3,2-f][1,2,4]triazolo[4,3-a][1,4]diazepin-6-yl)-N-(4-((4-(4-(3-(2,4-dihydroxy-5-isopropylphenyl)-5-hydroxy-4H-1,2,4-triazol-4-yl)benzyl)piperidin-1-yl)methyl)benzyl)acetamide, trifluoroacetic acid. $^1$H NMR (400 MHz, CD$_3$OD): δ 7.50-7.22 (m, 12H), 6.69 (s, 1H), 6.26 (s, 1H), 4.66-4.65 (m, 1H), 4.51-4.49 (m, 2H), 4.28-4.26 (m, 2H), 3.45-3.35 (m, 4H), 2.99-2.91 (m, 3H), 2.68 (s, 3H), 2.64-2.62 (m, 2H), 2.35 (s, 3H), 1.89-1.85 (m, 3H), 1.68 (s, 3H), 1.48-1.44 (m, 2H), 0.89 (d, J=6.8 Hz, 6H). LCMS (ESI): $R_T$=1.153 min, m/z found 910.2 [M−CF$_3$COOH+H]$^+$.

Compound 090

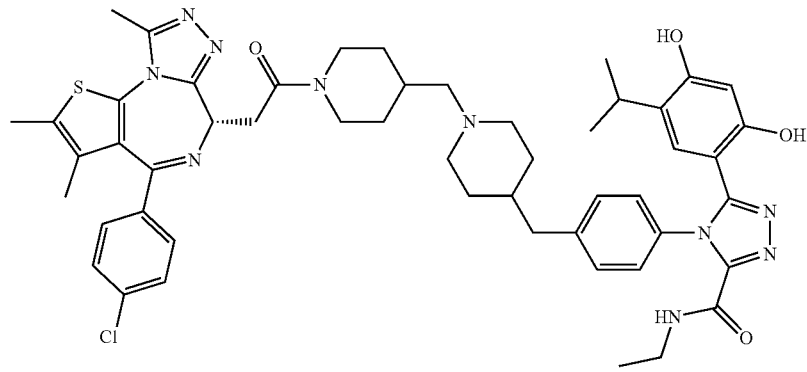

(S)-4-(4-((1-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperidin-4-yl)methyl)phenyl)-5-(2,4-dihydroxy-5-isopropylphenyl)-N-ethyl-4H-1,2,4-triazole-3-carboxamide. $^1$H NMR (400 MHz, DMSO-d$_6$): δ 10.69 (d, J=1.2 Hz, 1H), 9.77 (s, 1H), 8.95 (t, J=1.6 Hz, 1H), 7.50-7.41 (m, 4H), 7.26-7.25 (m, 4H), 6.75 (s, 1H), 6.35 (s, 1H), 4.58 (t, J=6.8 Hz, 1H), 4.32-4.32 (m, 1H), 4.25-4.20 (m, 1H), 3.65-3.60 (m, 1H), 3.16-3.14 (m, 4H), 2.91-2.88 (m, 3H), 2.59 (s, 3H), 2.54-2.50 (m, 3H), 2.41 (s, 3H), 2.40-2.38 (m, 1H), 2.11-2.01 (m, 2H), 1.98-1.97 (m, 2H), 1.79-1.66 (m, 4H), 1.57 (s, 3H), 1.57-1.45 (m, 5H), 1.03 (t, J=6.8 Hz, 3H), 0.83 (d, J=6.8 Hz, 6H). LCMS (ESI): R$_T$=2.294 min, m/z found 943.0 [M+H]$^+$.

Compound 091

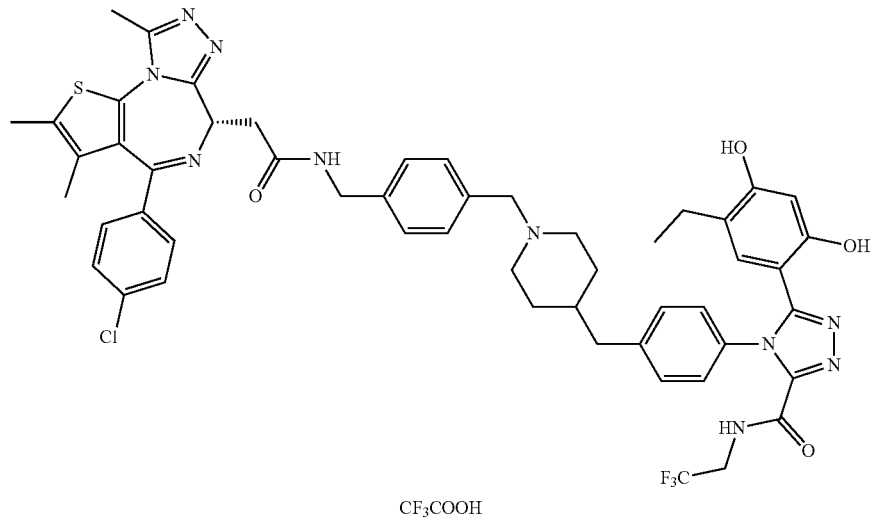

CF$_3$COOH (S)-4-(4-((1-(4-((2-(4-(4-chlorophenyl)-2,3,9-trimethyl-6H-thieno[3,2-f][1,2,4]triazolo[4,3-a][1,4]diazepin-6-yl)acetamido)methyl)benzyl)piperidin-4-yl)methyl)phenyl)-5-(5-ethyl-2,4-dihydroxyphenyl)-N-(2,2,2-trifluoroethyl)-4H-1,2,4-triazole-3-carboxamide, trifluoroacetic acid. $^1$H NMR (400 MHz, DMSO-d$_6$): 9.74-9.62 (m, 2H), 8.81 (t, J=6.7 Hz, 1H), 7.50-7.40 (m, 8H), 7.27-7.24 (m, 4H), 6.60 (s, 1H), 6.32 (s, 1H), 4.57-4.27 (m, 5H), 3.98-3.94 (m, 2H), 3.37-3.32 (m, 4H), 2.90-2.85 (m, 2H), 2.60 (s, 3H), 2.54-2.50 (m, 2H), 2.41 (s, 3H), 2.24-2.20 (m, 2H), 1.75-1.61 (m, 6H), 1.40-1.25 (m, 3H), 0.86-0.83 (m, 3H). LCMS (ESI): R$_T$=1.383 min, m/z found 1005.2 [M−CF$_3$COOH+H]$^+$.

Compound 092

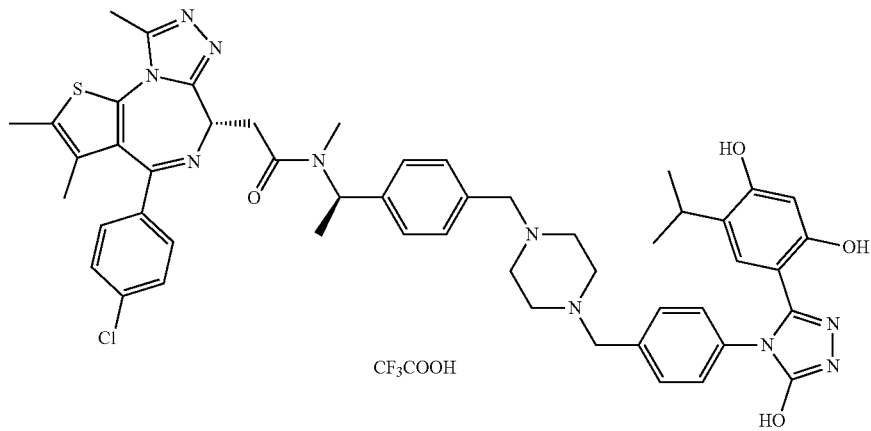

CF$_3$COOH 2-((S)-4-(4-chlorophenyl)-2,3,9-trimethyl-6H-thieno[3,2-f][1,2,4]triazolo[4,3-a][1,4]diazepin-6-yl)-N—((R)-1-(4-((4-(4-(3-(2,4-dihydroxy-5-isopropylphenyl)-5-hydroxy-4H-1,2,4-triazol-4-yl)benzyl)piperazin-1-yl)methyl)phenyl)ethyl)-N-methylacetamide, trifluoroacetic acid. $^1$H NMR (400 MHz, DMSO-$d_6$): 7.50-7.31 (m, 12H), 7.30-7.29 (m, 2H), 6.76 (s, 1H), 6.24 (s, 1H), 5.98 (s, 1H), 4.78-4.75 (m, 3H), 3.48-3.37 (m, 8H), 3.18-2.89 (m, 8H), 2.71-2.55 (m, 5H), 2.46 (s, 3H), 1.74-1.29 (m, 5H), 0.93-0.92 (m, 6H). LCMS (ESI): $R_T$=1.172 min, m/z found 939.3 [M−CF$_3$COOH+H]$^+$.

Compound 093

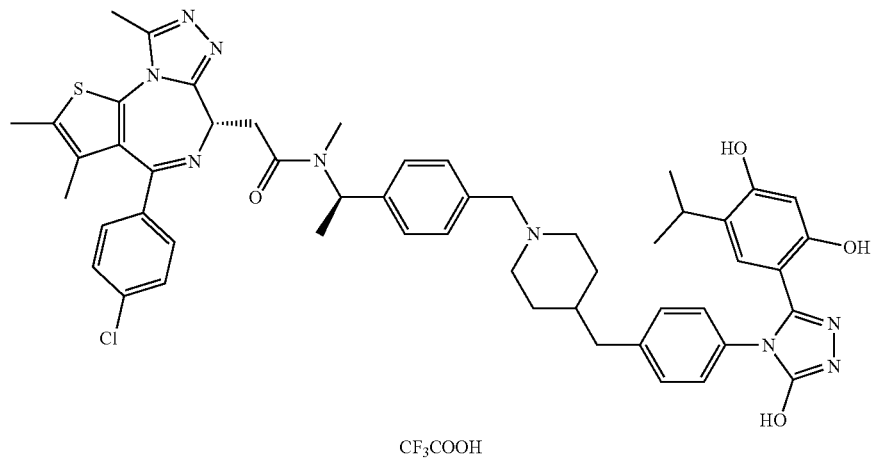

CF$_3$COOH 2-((S)-4-(4-chlorophenyl)-2,3,9-trimethyl-6H-thieno[3,2-f][1,2,4]triazolo[4,3-a][1,4]diazepin-6-yl)-N—((R)-1-(4-((4-(4-(3-(2,4-dihydroxy-5-isopropylphenyl)-5-hydroxy-4H-1,2,4-triazol-4-yl)benzyl)piperidin-1-yl)methyl)phenyl)ethyl)-N-methylacetamide, trifluoroacetic acid. $^1$H NMR (400 MHz, CD$_3$OD): δ 7.50-7.41 (m, 8H), 7.30-7.20 (m, 4H), 6.87 (d, J=3.2 Hz, 1H), 6.26 (s, 1H), 4.78 (t, J=6.7 Hz, 1H), 4.30-4.29 (m, 2H), 3.35-3.33 (m, 2H), 3.10 (s, 3H), 3.10-3.09 (m, 1H), 2.71 (s, 3H), 2.65 (s, 3H), 2.65-2.63 (m, 3H), 2.45 (s, 3H), 1.93-1.90 (m, 3H), 1.70 (s, 3H), 1.59-1.57 (m, 2H), 1.38-1.30 (m, 4H), 0.86 (d, J=6.9 Hz, 6H). LCMS (ESI): $R_T$=1.203 min, m/z found 938.3 [M−CF$_3$COOH+H]$^+$.

Compound 094

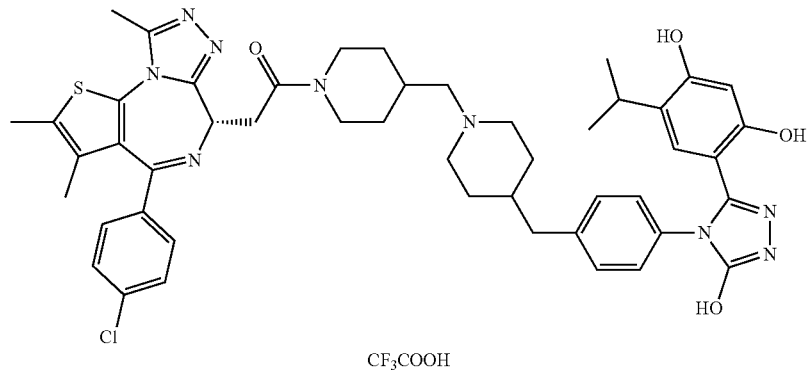

CF$_3$COOH (S)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-isopropylphenyl)-5-hydroxy-4H-1,2,4-triazol-4-yl)benzyl)piperidin-1-yl)methyl)piperidin-1-yl)ethan-1-one, trifluoroacetic acid. $^1$H NMR (400 MHz, DMSO-d$_6$): δ 11.94 (s, 1H), 9.62 (s, 1H), 9.48 (s, 1H), 8.38 (s, 1H), 7.51 (d, J=7.6 Hz, 2H), 7.44 (d, J=7.6 Hz, 2H), 7.22 (d, J=7.6 Hz, 2H), 7.13 (d, J=7.6 Hz, 2H), 6.77 (s, 1H), 6.27 (s, 1H), 4.58 (t, J=6.7 Hz, 1H), 4.37-4.34 (m, 1H), 4.18-4.16 (m, 1H), 3.66-3.60 (m, 2H), 3.20-3.10 (m, 1H), 2.99-2.84 (m, 4H), 2.56 (s, 3H), 2.52-2.50 (m, 3H), 2.40 (s, 3H), 2.10-2.00 (m, 1H), 1.83-1.73 (m, 5H), 1.63 (s, 3H), 1.48-1.44 (m, 2H), 1.25-1.20 (m, 3H), 0.96 (d, J=6.9 Hz, 6H). LCMS (ESI): R$_T$=1.174 min, m/z found 888.2 [M–CF$_3$COOH+H]$^+$.

Compound 095

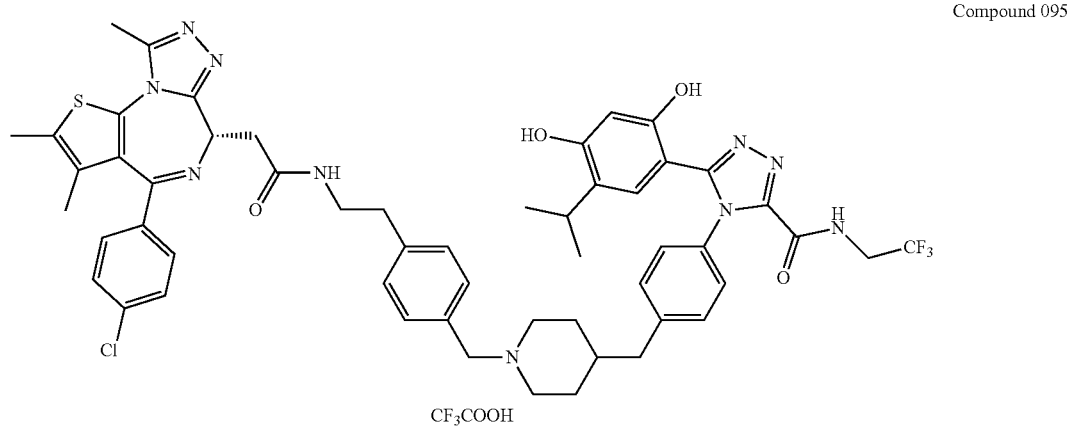 [SMILES: Cc1sc2c(c1C)C(c1ccc(Cl)cc1)=N[C@@H](CC(=O)NCCc1ccc(CN3CCC(Cc4ccc(-n5c(C(=O)NCC(F)(F)F)nnc5-c5cc(C(C)C)c(O)cc5O)cc4)CC3)cc1)c1nnc(C)n1-2 ; "CF3COOH"]

(S)-4-(4-((1-(4-(2-(2-(4-(4-chlorophenyl)-2,3,9-trimethyl-6H-thieno[3,2-f][1,2,4]triazolo[4,3-a][1,4]diazepin-6-yl)acetamido)ethyl)benzyl)piperidin-4-yl)methyl)phenyl)-5-(2,4-dihydroxy-5-isopropylphenyl)-N-(2,2,2-trifluoroethyl)-4H-1,2,4-triazole-3-carboxamide, trifluoroacetic acid. $^1$H NMR (400 MHz, DMSO-d$_6$): δ 9.82 (s, 1H), 9.62 (s, 1H), 9.38 (s, 1H), 7.50-7.20 (m, 12H), 6.60 (s, 1H), 6.33 (s, 1H), 4.52 (t, J=6.7 Hz, 1H), 4.46-4.11 (m, 1H), 3.95-3.90 (m, 2H), 3.40-3.55 (m, 10H), 3.30-3.22 (m, 4H), 2.90-2.79 (m, 2H), 2.67-2.61 (m, 2H), 2.55 (s, 3H), 2.41 (s, 3H), 1.85-1.72 (m, 3H), 1.63 (s, 3H), 1.30-1.20 (m, 2H), 0.82 (d, J=6.8 Hz, 6H). LCMS (ESI): R$_T$=1.253 min, m/z found 1033.3 [M–CF$_3$COOH+H]$^+$.

Compound 096

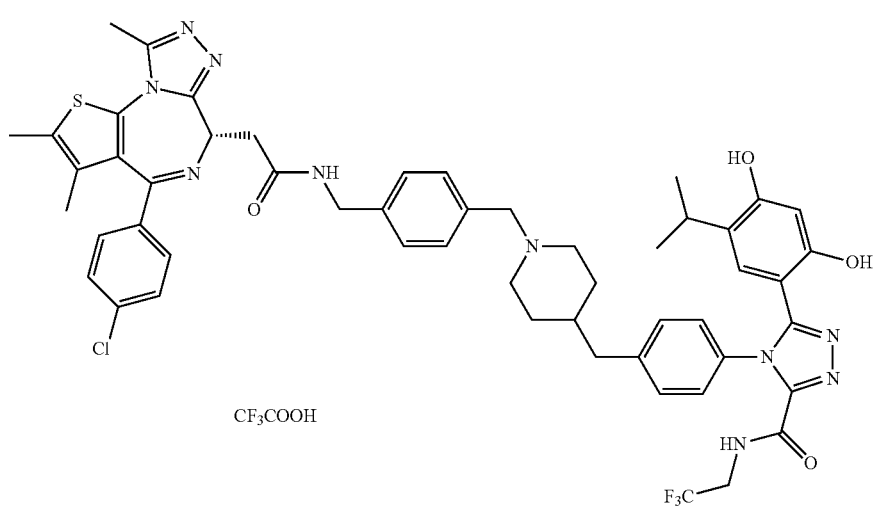

(S)-4-(4-((1-(4-((2-(4-(4-chlorophenyl)-2,3,9-trimethyl-6H-thieno[3,2-f][1,2,4]triazolo[4,3-a][1,4]diazepin-6-yl)acetamido)methyl)benzyl)piperidin-4-yl)methyl)phenyl)-5-(2,4-dihydroxy-5-isopropylphenyl)-N-(2,2,2-trifluoroethyl)-4H-1,2,4-triazole-3-carboxamide, trifluoroacetic acid. ¹H NMR (400 MHz, DMSO-$d_6$): δ 9.62-9.50 (m, 2H), 8.88 (s, 1H), 7.50-7.42 (m, 8H), 7.28-7.26 (m, 4H), 6.77 (s, 1H), 6.34 (s, 1H), 4.58 (t, J=6.7 Hz, 1H), 4.39-4.38 (m, 3H), 4.32-4.25 (m, 3H), 3.98-3.95 (m, 5H), 3.70-3.65 (m, 2H), 3.25-3.20 (m, 1H), 1.85-2.83 (m, 3H), 2.42-2.40 (m, 4H), 2.39 (s, 3H), 1.85-1.72 (m, 3H), 1.63 (s, 3H), 1.20-1.10 (m, 2H), 0.82 (d, J=6.8 Hz, 6H). LCMS (ESI): $R_T$=1.255 min, m/z found 1019.3 [M−CF$_3$COOH+H]⁺.

Compound 097

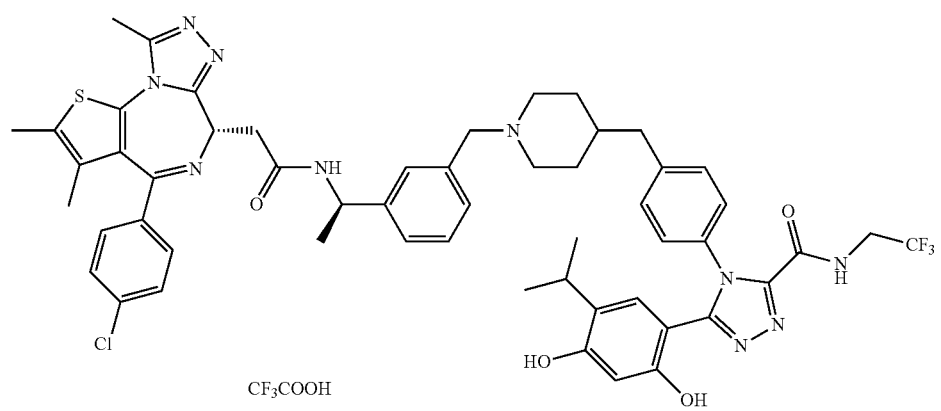

4-(4-((1-(3-((R)-1-(2-((S)-4-(4-chlorophenyl)-2,3,9-trimethyl-6H-thieno[3,2-f][1,2,4]triazolo[4,3-a][1,4]diazepin-6-yl)acetamido)ethyl)benzyl)piperidin-4-yl)methyl)phenyl)-5-(2,4-dihydroxy-5-isopropylphenyl)-N-(2,2,2-trifluoroethyl)-4H-1,2,4-triazole-3-carboxamide, trifluoroacetic acid. ¹H NMR (400 MHz, DMSO-$d_6$): δ 9.78 (s, 1H), 9.60-9.50 (m, 2H), 8.73 (d, J=7.6 Hz, 1H), 7.52-7.40 (m, 7H), 7.31-7.24 (m, 6H), 6.59 (s, 1H), 6.34 (s, 1H), 5.00 (t, J=6.7 Hz, 1H), 4.49-4.46 (m, 1H), 4.28-4.26 (m, 2H), 3.99-3.97 (m, 2H), 3.38-3.35 (m, 2H), 3.32-3.24 (m, 2H), 3.13-3.10 (m, 3H), 2.59 (s, 3H), 2.50-2.48 (m, 2H), 2.41 (s, 1H), 1.75-1.72 (m, 3H), 1.63 (s, 3H), 1.44-1.41 (m, 4H), 1.22 (t, J=6.8 Hz, 3H), 0.98 (d, J=6.8 Hz, 6H). LCMS (ESI): $R_T$=1.455 min, m/z found 1033.3 [M−CF$_3$COOH+H]⁺.

Compound 098

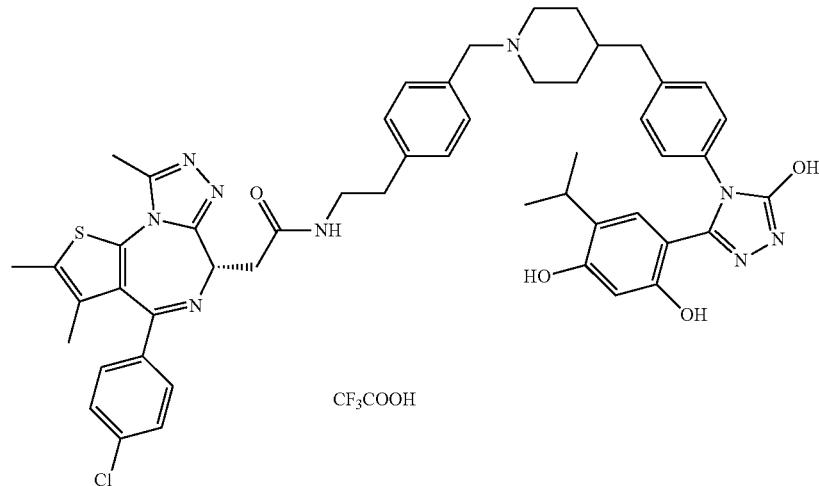

(S)-2-(4-(4-chlorophenyl)-2,3,9-trimethyl-6H-thieno[3,2-f][1,2,4]triazolo[4,3-a][1,4]diazepin-6-yl)-N-(4-((4-(4-(3-(2,4-dihydroxy-5-isopropylphenyl)-5-hydroxy-4H-1,2,4-triazol-4-yl)benzyl)piperidin-1-yl)methyl) phenethyl)acetamide, trifluoroacetic acid. $^1$H NMR (400 MHz, DMSO-$d_6$): δ 11.91 (s, 1H), 9.62-9.38 (m, 3H), 8.31 (d, J=2.4 Hz, 1H), 7.50-7.33 (m, 8H), 7.19-7.09 (m, 4H), 6.76-6.75 (m, 1H), 6.26-6.24 (m, 1H), 4.51-4.49 (m, 1H), 4.21-3.92 (m, 2H), 3.44-3.25 (m, 2H), 2.98-2.82 (m, 7H), 2.68-2.66 (m, 4H), 2.41 (s, 3H), 1.73-1.71 (m, 3H), 1.68-1.66 (m, 3H), 1.35-1.33 (m, 2H), 0.94 (d, J=6.8 Hz, 6H). LCMS (ESI): $R_T$=1.172 min, m/z found 924.3 [M–CF$_3$COOH+H]$^+$.

Compound 099

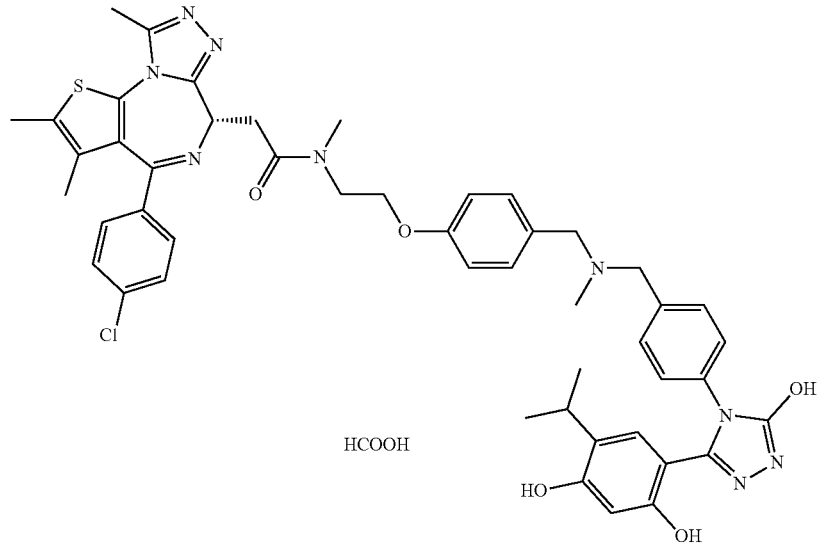

(S)-2-(4-(4-chlorophenyl)-2,3,9-trimethyl-6H-thieno[3,2-f][1,2,4]triazolo[4,3-a][1,4]diazepin-6-yl)-N-(2-(4-(((4-(3-(2,4-dihydroxy-5-isopropylphenyl)-5-hydroxy-4H-1,2,4-triazol-4-yl)benzyl)(methyl)amino)methyl)phenoxy)ethyl)-N-methylacetamide, formic acid. $^1$H NMR (400 MHz, DMSO-$d_6$): δ 11.92 (s, 1H), 9.75-9.30 (m, 2H), 8.37 (s, 3H), 7.43-7.12 (m, 11H), 6.95-6.90 (m, 2H), 6.76 (s, 1H), 6.26 (s, 1H), 4.58-4.55 (m, 1H), 4.31-4.24 (m, 1H), 4.06-4.04 (m, 1H), 3.45 (s, 3H), 3.42 (s, 3H), 3.27 (s, 2H), 2.95-2.92 (m, 2H), 2.59 (s, 3H), 2.42-2.41 (m, 3H), 2.04 (s, 3H), 1.62 (d, J=9.2 Hz, 3H), 0.91 (d, J=7.2 Hz, 6H). LCMS (ESI): $R_T$=1.403 min, m/z found 900.2 [M–HCOOH+H]$^+$.

Compound 100

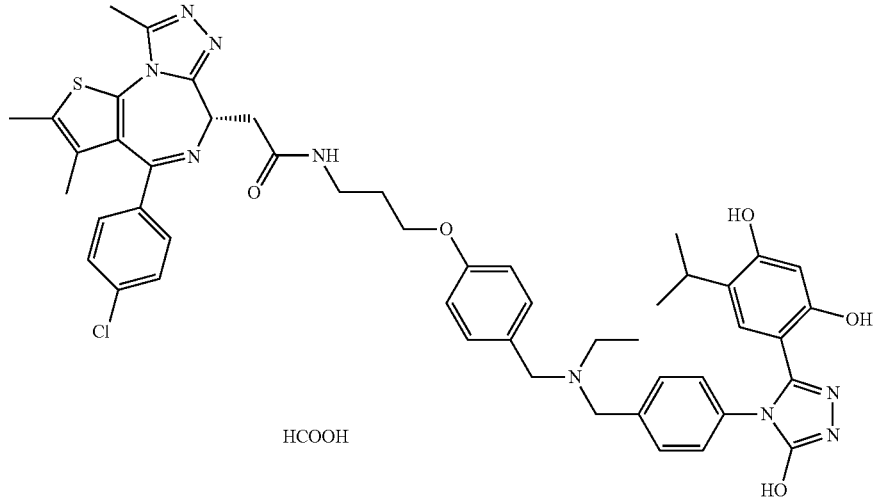

(S)-2-(4-(4-chlorophenyl)-2,3,9-trimethyl-6H-thieno[3,2-f][1,2,4]triazolo[4,3-a][1,4]diazepin-6-yl)-N-(3-(4-(((4-(3-(2,4-dihydroxy-5-isopropylphenyl)-5-hydroxy-4H-1,2,4-triazol-4-yl)benzyl)(ethyl)amino)methyl)phenoxy) propyl) acetamide, formic acid. $^1$H NMR (400 MHz, DMSO-$d_6$): δ 11.92 (s, 1H), 9.81-9.32 (m, 2H), 8.44-8.29 (m, 4H), 7.42-7.33 (m, 7H), 7.22-7.12 (m, 4H), 6.85 (d, J=8.4 Hz, 2H), 6.74 (s, 1H), 6.27 (s, 1H), 4.52-4.49 (m, 1H), 3.99-3.96 (m, 2H), 3.49 (s, 2H), 3.45 (s, 2H), 3.20-3.14 (m, 1H), 2.95-2.91 (m, 1H), 2.59 (s, 3H), 2.42-2.33 (m, 6H), 1.91-1.97 (m, 2H), 1.59 (s, 3H), 0.96 (t, J=7.2 Hz, 3H), 0.89 (d, J=6.8 Hz, 6H). LCMS (ESI): $R_T$=1.398 min, m/z found 914.2 [M−HCOOH+H]$^+$.

Compound 101

(S)-4-(4-(((4-(2-(2-(4-(4-chlorophenyl)-2,3,9-trimethyl-6H-thieno[3,2-f][1,2,4]triazolo[4,3-a][1,4]diazepin-6-yl)-N-methylacetamido)ethoxy)benzyl)(methyl)amino)methyl)phenyl)-5-(2,4-dihydroxy-5-isopropylphenyl)-N-(2,2,2-trifluoroethyl)-4H-1,2,4-triazole-3-carboxamide, formic acid. $^1$H NMR (400 MHz, CD$_3$OD): δ 7.54-7.42 (m, 2H), 7.41-7.29 (m, 8H), 7.08-7.02 (m, 2H), 6.74 (s, 1H), 6.26 (d, J=1.6 Hz, 1H), 4.76-4.72 (m, 1H), 4.57 (s, 3H), 4.22-4.21 (m, 1H), 4.08-3.96 (m, 6H), 3.40 (s, 2H), 3.13 (s, 2H), 3.01-2.89 (m, 1H), 2.68 (s, 3H), 2.55 (s, 3H), 2.44 (s, 4H), 1.68 (d, J=6.4 Hz, 3H), 0.89 (d, J=6.8 Hz, 6H). LCMS (ESI): R$_T$=1.457 min, m/z found 1009.2 [M−HCOOH+H]$^+$.
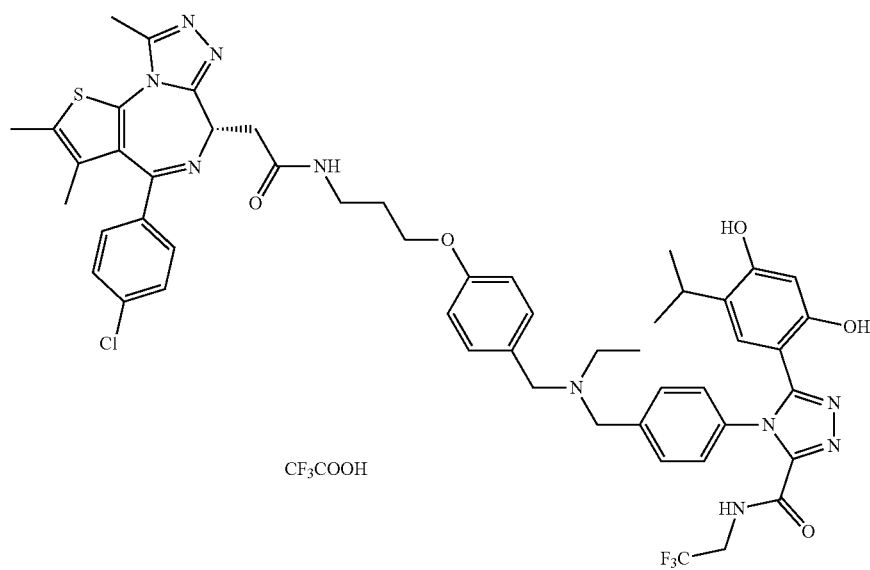
Compound 102

(S)-4-(4-(((4-(3-(2-(4-(4-chlorophenyl)-2,3,9-trimethyl-6H-thieno[3,2-f][1,2,4]triazolo[4,3-a][1,4]diazepin-6-yl)acetamido) propoxy)benzyl)(ethyl)amino)methyl)phenyl)-5-(2,4-dihydroxy-5-isopropylphenyl)-N-(2,2,2-trifluoroethyl)-4H-1,2,4-triazole-3-carboxamide, trifluoroacetic acid. $^1$H NMR (400 MHz, DMSO-$d_6$): δ 9.71-9.63 (m, 3H), 8.32-8.31 (m, 1H), 7.57-7.45 (m, 2H), 7.43-7.37 (m, 8H), 7.02 (d, J=8.4 Hz, 2H), 6.77 (s, 1H), 6.29 (s, 1H), 4.52-4.49 (m, 1H), 4.32-4.23 (m, 4H), 4.06-3.94 (m, 4H), 3.31-3.24 (m, 4H), 2.96-2.91 (m, 3H), 2.59 (s, 3H), 2.40 (s, 3H), 1.93-1.90 (m, 2H), 1.61 (s, 3H), 1.24 (t, J=7.2 Hz, 3H), 0.90 (d, J=6.8 Hz, 6H). LCMS (ESI): $R_T$=1.456 min, m/z found 1023.2 [M−CF$_3$COOH+H]$^+$.

Compound 103

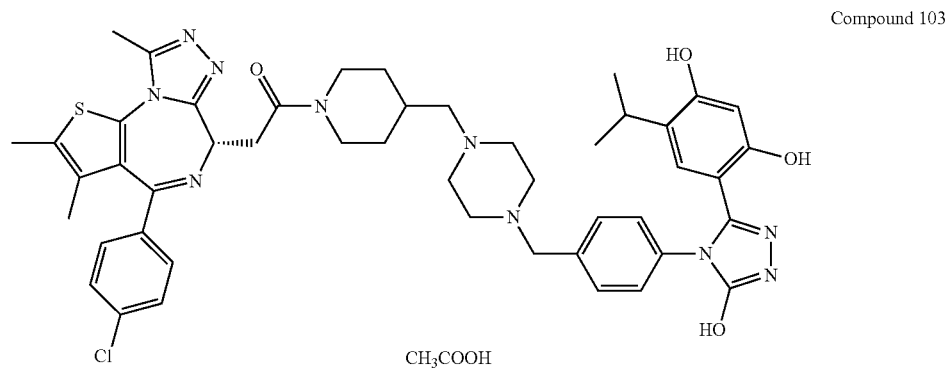 [SMILES: Cc1sc2c(c1C)C(c1ccc(Cl)cc1)=N[C@@H](CC(=O)N1CCC(CN3CCN(Cc4ccc(-n5c(O)nnc5-c5cc(C(C)C)c(O)cc5O)cc4)CC3)CC1)c1nnc(C)n1-2 ; "CH3COOH"]

(S)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-isopropylphenyl)-5-hydroxy-4H-1,2,4-triazol-4-yl)benzyl)piperazin-1-yl)methyl)piperidin-1-yl)ethan-1-one acetate. $^1$H NMR (400 MHz, DMSO-$d_6$): δ 11.92 (s, 2H), 9.58 (s, 1H), 9.40 (s, 1H), 7.50-7.42 (m, 4H), 7.30 (d, J=8.0 Hz, 2H), 7.14 (d, J=8.0 Hz, 2H), 6.77 (s, 1H), 6.27 (s, 1H), 4.59-4.55 (m, 1H), 4.36-4.32 (m, 1.H), 4.13-4.10 (m, 1H), 3.60-3.58 (m, 1H), 3.46 (s, 1H), 3.38-3.32 (m, 6H), 3.11-2.95 (m, 2H), 2.51-2.50 (m, 4H), 2.41-2.33 (m, 8H), 2.15 (s, 2H), 1.91 (s, 3H), 1.81-1.68 (m, 3H), 1.63 (s, 3H), 1.24-1.22 (m, 1H), 0.94 (d, J=6.8 Hz, 6H). LCMS (ESI): $R_T$=1.512 min, m/z found 889.3 [M−CH$_3$COOH+H]$^+$.

Compound 104

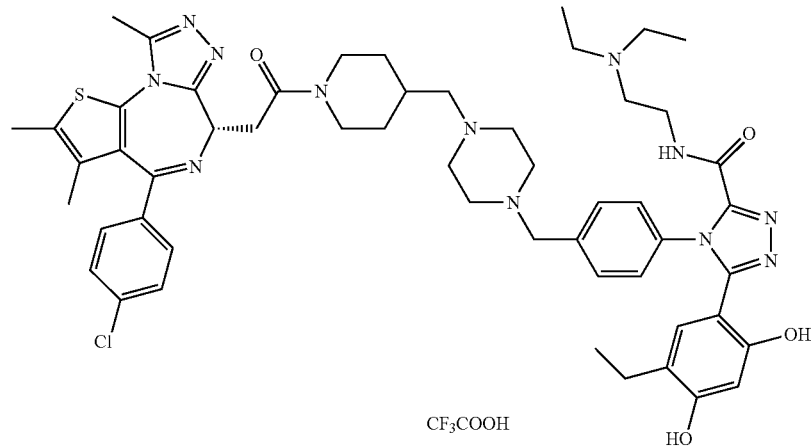

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-N-(2-(diethylamino)ethyl)-5-(5-ethyl-2,4-dihydroxyphenyl)-4H-1,2,4-triazole-3-carboxamide, trifluoroacetic acid. $^1$H NMR (400 MHz, DMSO-$d_6$): δ 9.72 (s, 1H), 9.22-9.10 (m, 2H), 7.51-7.30 (m, 8H), 6.77 (s, 1H), 6.34 (s, 1H), 4.58 (t, J=6.7 Hz, 1H), 4.46-4.35 (m, 1H), 4.20-4.10 (m, 1H), 3.70-3.65 (m, 3H), 3.35-3.16 (m, 8H), 3.10-2.80 (m, 7H), 2.67 (s, 3H), 2.42 (s, 3H), 2.34-2.23 (m, 6H), 1.85-1.70 (m, 3H), 1.63 (s, 3H), 1.18 (d, J=6.9 Hz, 6H), 0.89 (t, J=6.9 Hz, 6H). LCMS (ESI): $R_T$=1.275 min, m/z found 1001.2 [M−CF$_3$COOH+H]$^+$.

Compound 105

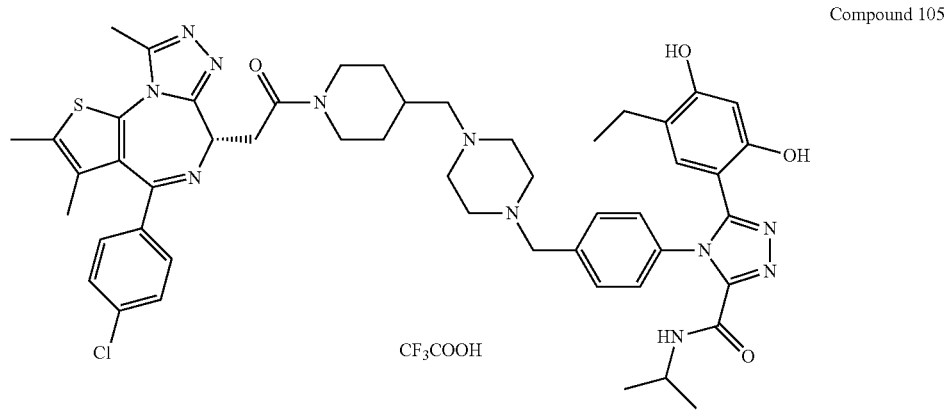 [SMILES: CCc1cc(-c2nnc(C(=O)NC(C)C)n2-c2ccc(CN3CCN(CC4CCN(C(=O)C[C@@H]5N=C(c6ccc(Cl)cc6)c6c(sc(C)c6C)-n6c(C)nnc65)CC4)CC3)cc2)c(O)cc1O ; "CF3COOH"]

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(5-ethyl-2,4-dihydroxyphenyl)-N-isopropyl-4H-1,2,4-triazole-3-carboxamide, trifluoroacetic acid. $^1$H NMR (400 MHz, DMSO-$d_6$): δ 9.69 (s, 1H), 7.51-7.28 (m, 8H), 6.62 (s, 1H), 6.31 (s, 1H), 4.59-3.92 (m, 4H), 3.77-3.61 (m, 13H), 3.26-2.88 (m, 8H), 2.67 (s, 3H), 2.38 (s, 3H), 2.33-2.22 (m, 2H), 1.87-1.72 (m, 2H), 1.63 (s, 3H), 1.13-1.06 (m, 6H), 0.89-0.85 (m, 3H). LCMS (ESI): $R_T$=1.200 min, m/z found 944.2 [M−CF$_3$COOH+H]$^+$.

Compound 106

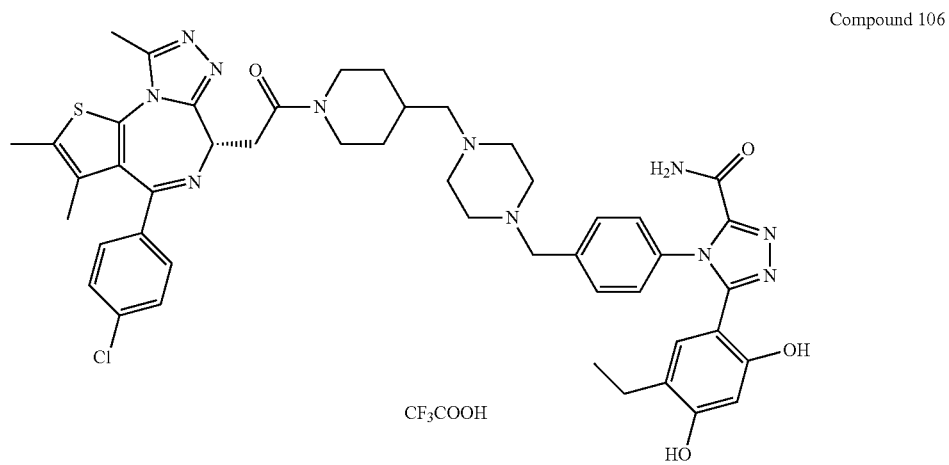 [SMILES: CCc1cc(-c2nnc(C(N)=O)n2-c2ccc(CN3CCN(CC4CCN(C(=O)C[C@@H]5N=C(c6ccc(Cl)cc6)c6c(sc(C)c6C)-n6c(C)nnc65)CC4)CC3)cc2)c(O)cc1O ; "CF3COOH"]

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(5-ethyl-2,4-dihydroxyphenyl)-4H-1,2,4-triazole-3-carboxamide, trifluoroacetic acid. $^1$H NMR (400 MHz, DMSO-$d_6$): δ 9.62 (s, 1H), 8.29 (s, 1H), 7.71 (s, 1H), 7.51-7.32 (m, 9H), 6.61 (s, 1H), 6.36 (s, 3H), 4.58 (t, J=6.7 Hz, 1H), 4.46-4.33 (m, 1H), 4.22-4.10 (m, 1H), 3.68-3.55 (m, 6H), 3.20-2.80 (m, 6H), 2.75-2.67 (m, 2H), 2.67 (s, 3H), 2.41 (s, 3H), 2.32-2.24 (m, 3H), 2.05-1.98 (m, 1H), 1.75-1.65 (m, 3H), 1.63 (s, 3H), 1.20-1.10 (m, 3H), 0.86 (t, J=6.9 Hz, 6H). LCMS (ESI): $R_T$=1.117 min, m/z found 902.2 [M–CF$_3$COOH+H]$^+$.

Compound 107

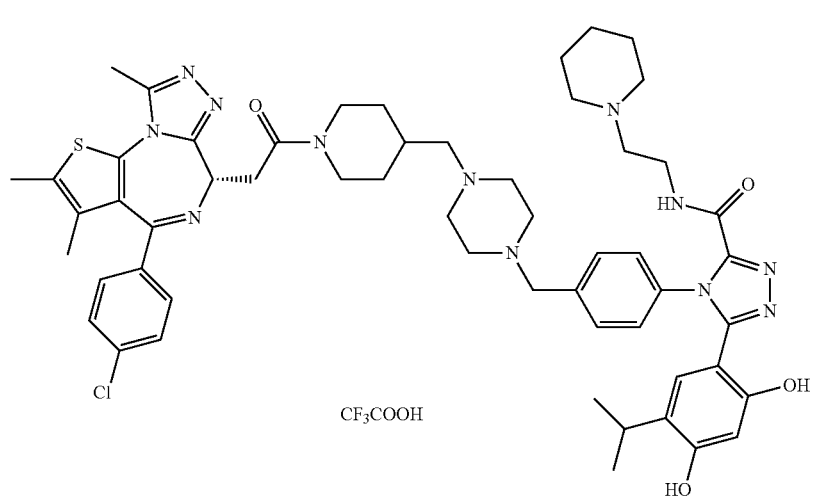

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxy-5-isopropylphenyl)-N-(2-(piperidin-1-yl)ethyl)-4H-1,2,4-triazole-3-carboxamide, trifluoroacetic acid. $^1$H NMR (400 MHz, DMSO-$d_6$):

87.55-7.40 (m, 8H), 6.70 (s, 1H), 6.31 (s, 1H), 5.11-5.00 (m, 6H), 4.75-4.20 (m, 2H), 3.88-3.39 (m, 12H), 2.97-2.91 (m, 8H), 2.74-2.70 (m, 3H), 2.45-2.44 (m, 3H), 1.94-1.68 (m, 11H), 1.63-1.20 (m, 3H), 0.92-0.90 (m, 2H). LCMS (ESI): $R_T$=0.915 min, m/z found 1027.6 [M–CF$_3$COOH+H]$^+$.

Compound 108

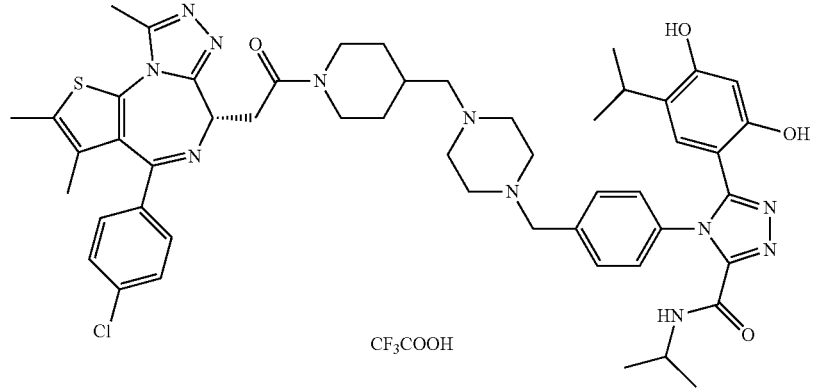

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxy-5-isopropylphenyl)-N-isopropyl-4H-1,2,4-triazole-3-carboxamide, trifluoroacetic acid. $^1$H NMR (400 MHz, DMSO-d$_6$): δ 9.76 (s, 1H), 8.93-8.75 (m, 1H), 7.50-7.31 (m, 9H), 6.60 (s, 1H), 6.34 (s, 1H), 4.70-3.85 (m, 4H), 3.62-3.45 (m, 2H), 3.20-2.92 (m, 9H), 2.78-2.57 (m, 5H), 2.42-2.00 (m, 7H), 1.87-1.60 (m, 8H), 1.11-1.07 (m, 6H), 0.95-0.75 (m, 6H). LCMS (ESI): R$_T$=1.196 min, m/z found 958.2 [M−CF$_3$COOH+H]$^+$.

Compound 109

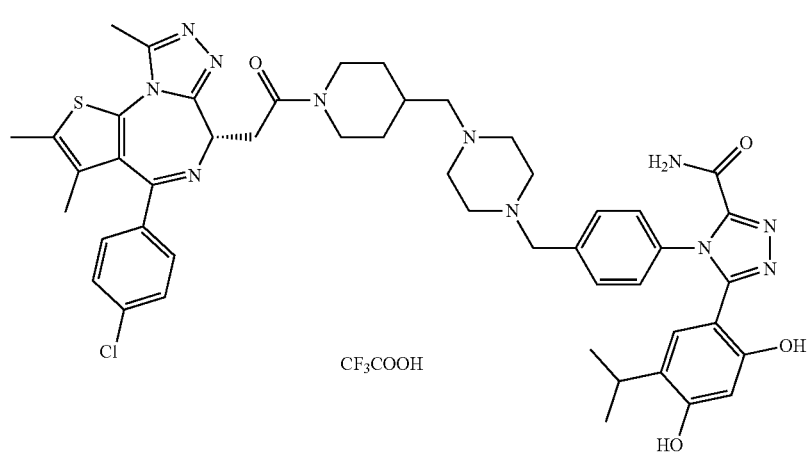

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxy-5-isopropylphenyl)-4H-1,2,4-triazole-3-carboxamide, trifluoroacetic acid. $^1$H NMR (400 MHz, DMSO-d$_6$): δ 9.81 (s, 1H), 8.32 (s, 1H), 7.72 (s, 1H), 7.51-7.37 (m, 8H), 6.20 (s, 1H), 6.34 (s, 1H), 4.60-4.12 (m, 3H), 3.17-2.93 (m, 11H), 2.67-2.50 (m, 4H), 2.41-2.33 (m, 4H), 2.05-2.02 (m, 6H), 1.63 (s, 3H), 1.23-0.84 (m, 10H). LCMS (ESI): R$_T$=1.136 min, m/z found 916.2 [M−CF$_3$COOH+H]$^+$.

Compound 110

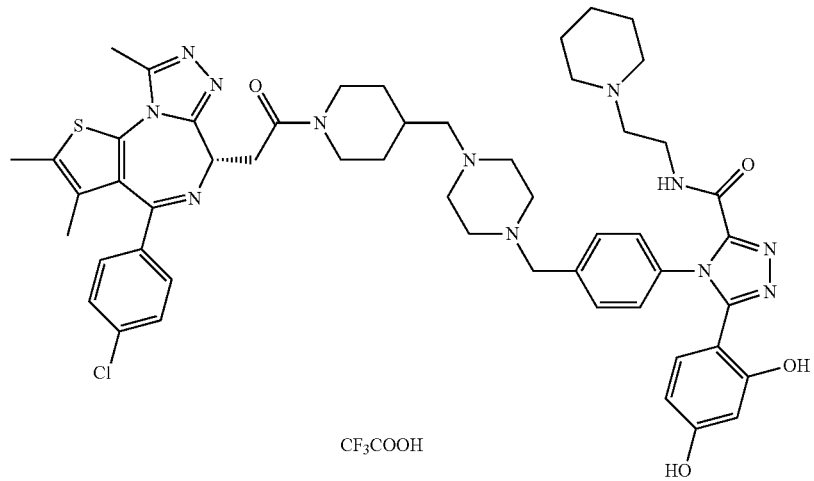

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxyphenyl)-N-(2-(piperidin-1-yl)ethyl)-4H-1,2,4-triazole-3-carboxamide, trifluoroacetic acid. $^1$H NMR (400 MHz, DMSO-$d_6$): δ 9.27-9.25 (m, 2H), 7.51-7.29 (m, 9H), 6.92-6.90 (m, 2H), 6.21-6.18 (m, 2H), 4.60-4.56 (m, 1H), 4.41-4.35 (m, 1H), 4.22-4.18 (m, 1H), 3.57-3.50 (m, 5H), 3.42-3.19 (m, 3H), 2.94-2.86 (m, 5H), 2.60 (s, 3H), 2.44-2.33 (m, 8H), 2.23-2.05 (m, 2H), 1.87-1.56 (m, 12H), 1.26-0.99 (m, 5H). LCMS (ESI): $R_T$=1.131 min, m/z found 985.5 [M−CF$_3$COOH+H]$^+$.

Compound 111

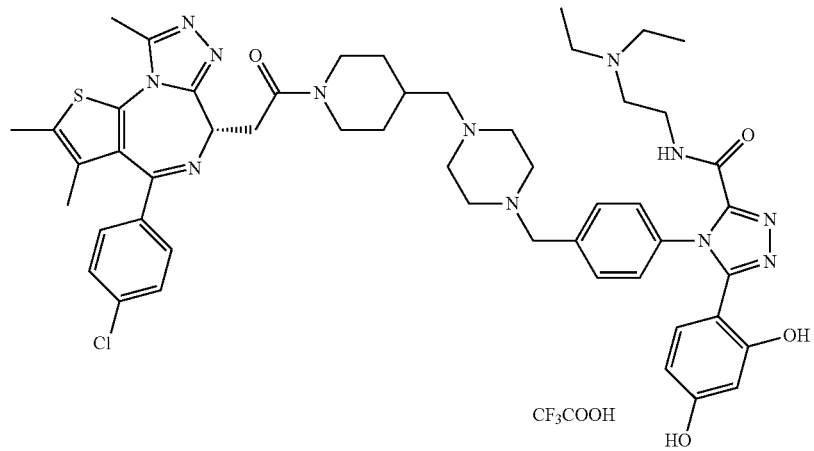

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-N-(2-(diethylamino)ethyl)-5-(2,4-dihydroxyphenyl)-4H-1,2,4-triazole-3-carboxamide, trifluoroacetic acid. $^1$H NMR (400 MHz, DMSO-$d_6$): δ 9.24-9.22 (m, 3H), 7.52-7.29 (m, 9H), 6.91 (d, J=8.4 Hz, 1H), 6.22-6.17 (m, 2H), 4.60-4.55 (m, 1H), 4.38-4.33 (m, 2H), 4.21-4.13 (m, 2H), 3.69-3.51 (m, 4H), 3.42-3.32 (m, 1H), 3.25-2.80 (m, 15H), 2.60 (s, 4H), 2.42 (s, 5H), 2.04 (s, 1H), 1.89-1.69 (m, 2H), 1.63 (s, 3H), 1.21-1.16 (m, 6H). LCMS (ESI): $R_T$=0.946 min, m/z found 973.3 [M−CF$_3$COOH+H]$^+$.

Compound 112

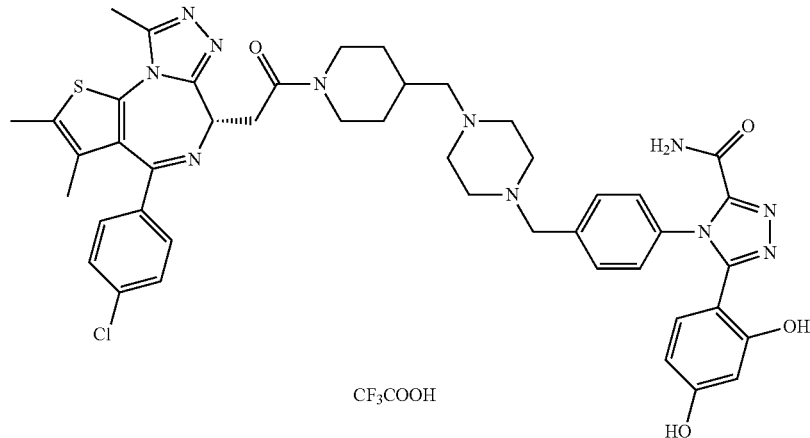

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxyphenyl)-4H-1,2,4-triazole-3-carboxamide, trifluoroacetic acid. $^1$H NMR (400 MHz, DMSO-$d_6$): δ 10.15-9.51 (m, 1H), 8.84 (s, 1H), 8.31 (s, 1H), 7.51-7.26 (m, 9H), 7.01-6.83 (m, 1H), 6.29-6.14 (m, 2H), 4.60-4.55 (m, 1H), 4.39-4.33 (m, 1H), 4.20-4.14 (m, 2H), 3.67-3.61 m, 6H), 3.42-3.33 (m, 2H), 3.15-2.92 (m, 6H), 2.68-2.58 (m, 5H), 2.42 (s, 4H), 2.05 (s, 1H), 1.88-1.71 (m, 2H), 1.63 (s, 3H), 1.31-0.96 (m, 2H). LCMS (ESI): $R_T$=1.190 min, m/z found 874.2 [M−CF$_3$COOH+H]$^+$.

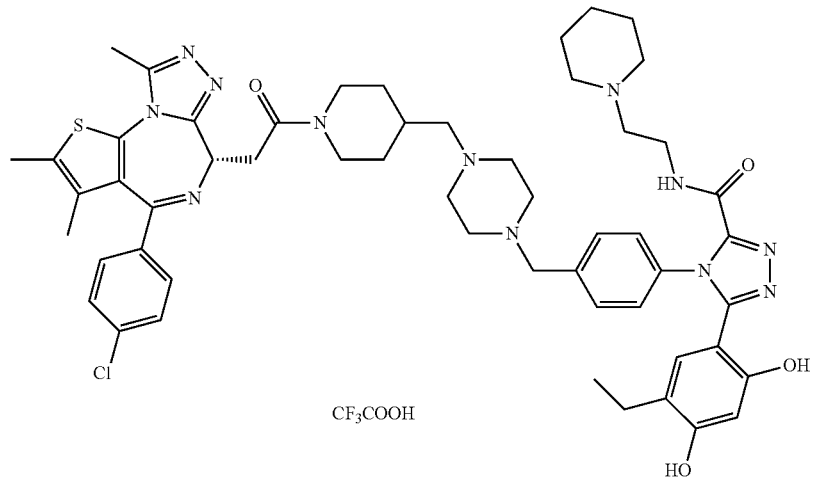 [SMILES: CCc1cc(-c2nnc(C(=O)NCCN3CCCCC3)n2-c2ccc(CN3CCN(CC4CCN(C(=O)C[C@@H]5N=C(c6ccc(Cl)cc6)c6c(sc(C)c6C)-n6c(C)nnc65)CC4)CC3)cc2)c(O)cc1O ; "CF3COOH"]

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(5-ethyl-2,4-dihydroxyphenyl)-N-(2-(piperidin-1-yl)ethyl)-4H-1,2,4-triazole-3-carboxamide, trifluoroacetic acid. $^1$H NMR (400 MHz, DMSO-$d_6$): δ 9.72 (s, 1H), 9.62-9.60 (m, 1H), 9.00 (s, 1H), 7.51-7.33 (m, 10H), 6.77 (s, 1H), 6.30 (s, 1H), 4.58 (t, J=6.7 Hz, 2H), 4.30-4.20 (m, 2H), 4.15-4.10 (m, 2H), 3.63-3.50 (m, 7H), 3.20-3.17 (m, 2H), 2.91-2.88 (m, 4H), 2.60 (s, 3H), 2.42 (s, 3H), 2.33-2.27 (m, 4H), 1.83-1.60 (m, 14H), 1.20-1.10 (m, 2H), 0.91-0.87 (m, 4H). LCMS (ESI): $R_T$=0.996 min, m/z found 1013.2 [M−CF$_3$COOH+H]$^+$.

Compound 118

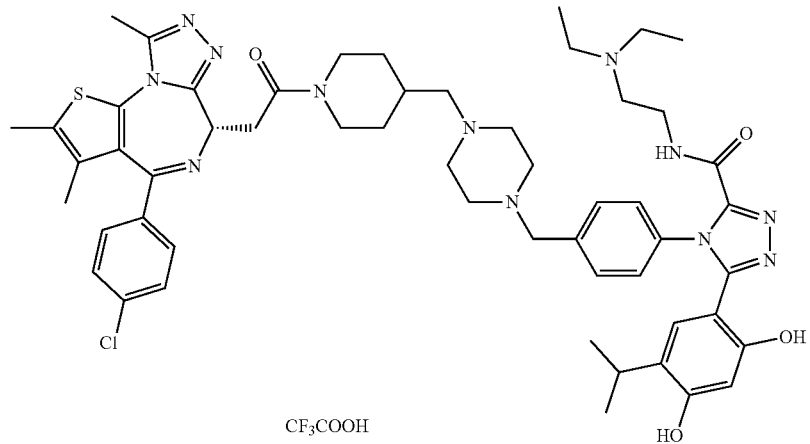

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-N-(2-(diethylamino)ethyl)-5-(2,4-dihydroxy-5-isopropylphenyl)-4H-1,2,4-triazole-3-carboxamide, trifluoroacetic acid. $^1$H NMR (400 MHz, CD$_3$OD): δ 7.55-7.38 (m, 8H), 6.70 (s, 1H), 6.31 (s, 1H), 4.76-4.68 (m, 5H), 4.30-4.20 (m, 1H), 3.86-3.50 (m, 11H), 3.12-2.96 (m, 10H), 2.71 (s, 3H), 2.45 (s, 3H), 2.20-2.10 (m, 1H), 1.98-1.90 (m, 2H), 1.70 (s, 3H), 1.40-1.38 (m, 1H), 1.31 (t, J=6.8 Hz, 6H), 0.90 (d, J=6.8 Hz, 6H). LCMS (ESI): R$_T$=1.005 min, m/z found 1015.2 [M−CF$_3$COOH+H]$^+$.

Compound 119

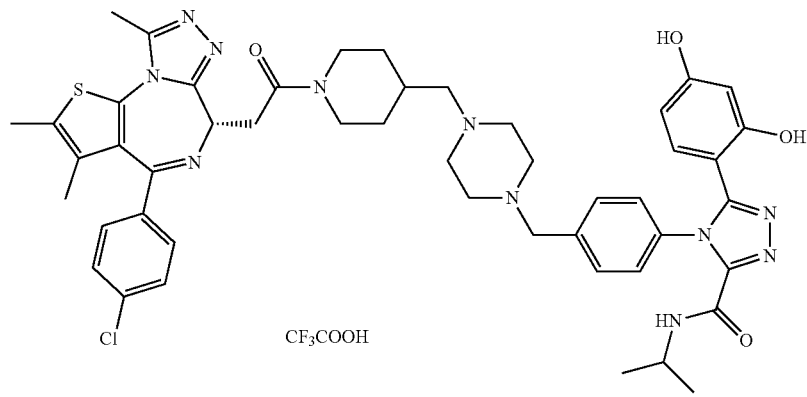

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxyphenyl)-N-isopropyl-4H-1,2,4-triazole-3-carboxamide, trifluoroacetic acid. $^1$H NMR (400 MHz, CD$_3$OD): δ 7.46-7.26 (m, 9H), 6.87 (d, J=8.8 Hz, 1H), 6.22 (d, J=2.4 Hz, 1H), 6.18 (dd, J$_1$=8.4 Hz, J$_2$=2.4 Hz, 1H), 4.70-4.50 (m, 3H), 4.28-4.26 (m, 2H), 4.04-4.02 (m, 1H), 3.65-3.58 (m, 4H), 3.30-3.23 (m, 1H), 2.72-2.62 (m, 12H), 2.44-2.39 (m, 5H), 1.94-1.91 (m, 3H), 1.69 (s, 3H), 1.20 (d, J=6.8 Hz, 6H). LCMS (ESI): R$_T$=1.411 min, m/z found 916.2 [M−CF$_3$COOH+H]$^+$.

Compound 120

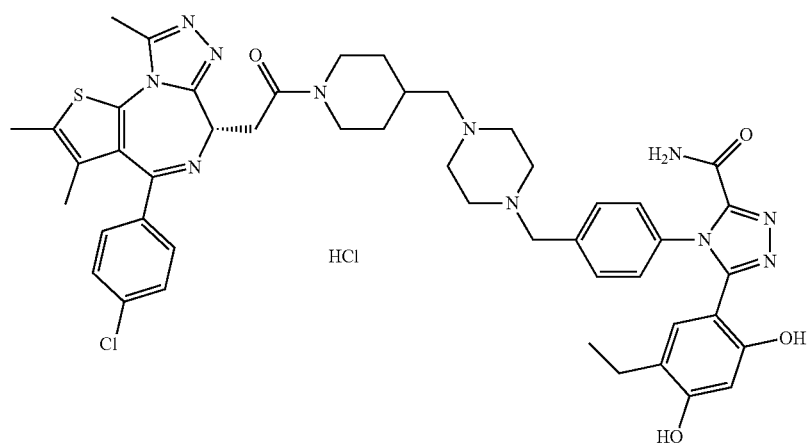

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(5-ethyl-2,4-dihydroxyphenyl)-4H-1,2,4-triazole-3-carboxamide hydrochloride. $^1$H NMR (400 MHz, CD$_3$OD): δ 7.89-7.87 (m, 2H), 7.67-7.60 (m, 6H), 6.83-6.81 (m, 1H), 6.46-6.43 (m, 1H), 5.13-5.11 (m, 1H), 4.65-4.59 (m, 3H), 4.22-4.21 (m, 1H), 3.93-3.71 (m, 9H), 3.31-3.28 (m, 8H), 3.01 (s, 3H), 2.87-2.82 (m, 1H), 2.36-2.32 (m, 3H), 2.13-2.01 (m, 2H), 1.72 (s, 3H), 1.55-1.29 (m, 2H), 0.93-0.91 (m, 3H). LCMS (ESI): R$_T$=1.130 min, m/z found 902.2 [M−HCl+H]$^+$.

Compound 121

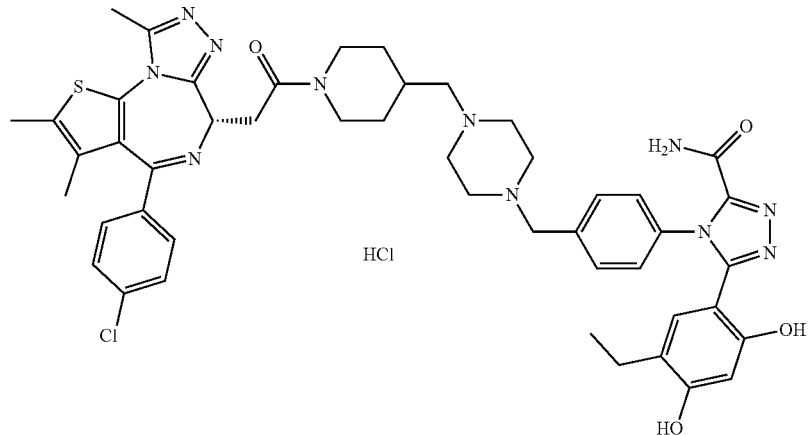

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(5-ethyl-2,4-dihydroxyphenyl)-4H-1,2,4-triazole-3-carboxamide hydrochloride. $^1$H NMR (400 MHz, CD$_3$OD): δ 7.89-7.87 (m, 2H), 7.67-7.60 (m, 6H), 6.83-6.81 (m, 1H), 6.46-6.43 (m, 1H), 5.13-5.11 (m, 1H), 4.65-4.59 (m, 3H), 4.22-4.21 (m, 1H), 3.93-3.71 (m, 9H), 3.31-3.28 (m, 8H), 3.01 (s, 3H), 2.87-2.82 (m, 1H), 2.36-2.32 (m, 3H), 2.13-2.01 (m, 2H), 1.72 (s, 3H), 1.55-1.29 (m, 2H), 0.93-0.91 (m, 3H). LCMS (ESI): R$_T$=1.130 min, 937.34 m/z found 902.2 [M−HCl+H]$^+$.

Compound 123

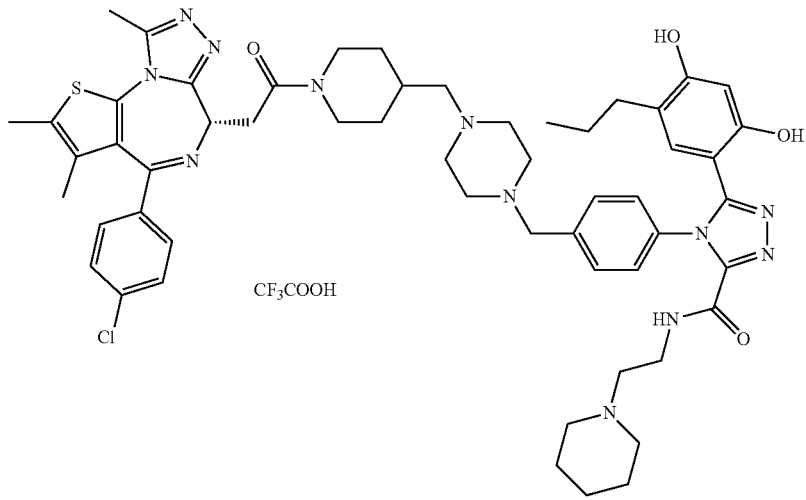

(S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxy-5-propylphenyl)-N-(2-(piperidin-1-yl)ethyl)-4H-1,2,4-triazole-3-carboxamide, trifluoroacetic acid. ¹H NMR (400 MHz, DMSO-d₆): δ 9.70 (s, 1H), 9.25 (s, 1H), 9.05 (s, 1H), 7.51-7.32 (m, 8H), 6.66 (s, 1H), 6.30 (s, 1H), 4.59-4.56 (m, 1H), 4.35-4.33 (m, 4H), 4.17-4.15 (m, 4H), 3.55-3.53 (m, 2H), 3.50-3.49 (m, 6H), 3.30-3.28 (m, 2H), 3.18-3.16 (m, 2H), 3.11-2.95 (m, 6H), 2.60 (s, 3H), 2.50 (s, 3H), 2.25-2.23 (m, 2H), 1.63-1.60 (m, 6H), 1.58 (s, 3H), 1.33-1.31 (m, 4H), 1.10-1.08 (m, 2H), 0.75-0.72 (m, 3H). LCMS (ESI): R$_T$=1.066 min, m/z found 1027.5 [M−CF$_3$COOH+H]⁺.

Compound 124

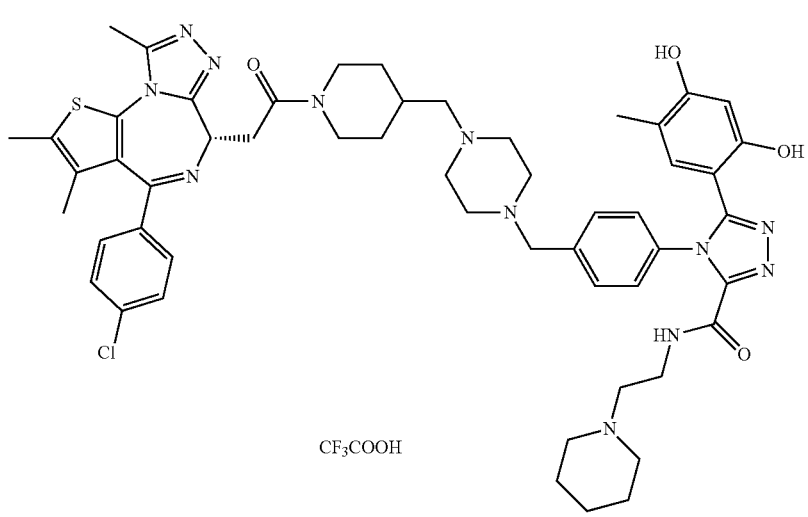

CF₃COOH (S)-4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxy-5-methylphenyl)-N-(2-(piperidin-1-yl)ethyl)-4H-1,2,4-triazole-3-carboxamide, trifluoroacetic acid. ¹H NMR (400 MHz, DMSO-d₆): δ 9.73 (s, 1H), 9.25 (s, 1H), 9.02 (s, 1H), 7.52-7.47 (m, 2H), 7.46-7.41 (m, 2H), 7.40-7.35 (m, 2H), 7.33-7.28 (m, 2H), 6.72 (s, 1H), 6.28 (s, 1H), 4.60-4.54 (m, 1H), 4.40-4.32 (m, 1H), 4.22-4.13 (m, 1H), 3.25-3.09 (m, 10H), 3.05-2.78 (m, 12H), 2.59 (s, 3H), 2.41 (s, 3H), 2.11-1.94 (m, 3H), 1.88 (s, 4H), 1.83-1.62 (m, 12H). LCMS (ESI): R$_T$=1.017 min, m/z found 999.4 [M−CF$_3$COOH+H]⁺.

Compound 125

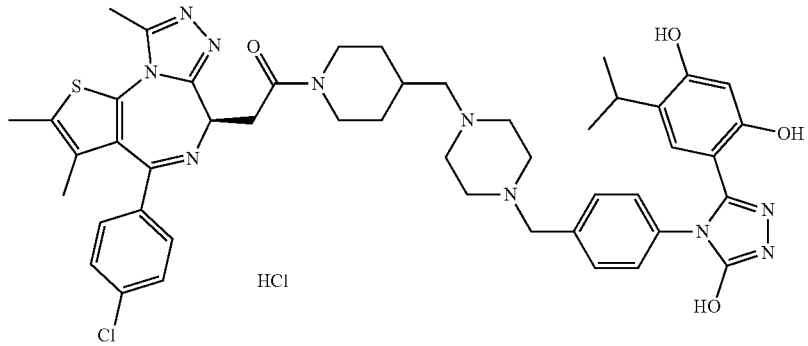

HCl (R)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-isopropylphenyl)-5-hydroxy-4H-1,2,4-triazol-4-yl)benzyl)piperazin-1-yl)methyl)piperidin-1-yl)ethan-1-one hydrochloride. $^1$H NMR (400 MHz, DMSO-$d_6$): δ 11.95 (s, 1H), 11.26 (s, 1H), 9.62 (s, 1H), 9.31 (s, 1H), 7.64-7.44 (m, 6H), 7.25 (d, J=8.4 Hz, 2H), 6.93 (s, 1H), 6.31 (s, 1H), 4.63 (t, J=6.7 Hz, 1H), 4.41-4.15 (m, 3H), 3.79-3.40 (m, 12H), 3.43-3.00 (m, 4H), 2.76-2.55 (m, 5H), 2.42 (s, 3H), 2.05-2.02 (m, 1H), 1.90-1.68 (m, 2H), 1.63 (s, 3H), 0.98 (d, J=6.9 Hz, 6H). LCMS (ESI): Rt=1.088 min, m/z found 889.6 [M−HCl+H$^+$].

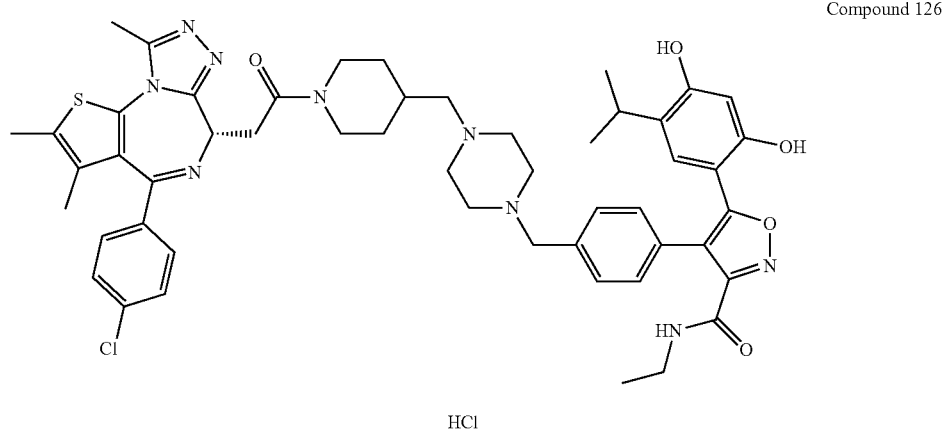 [SMILES: CCNC(=O)c1noc(-c2cc(C(C)C)c(O)cc2O)c1-c1ccc(CN2CCN(CC3CCN(C(=O)C[C@@H]4N=C(c5ccc(Cl)cc5)c5c(sc(C)c5C)-n5c(C)nnc54)CC3)CC2)cc1 ; Cl]

Compound 126

(S)-4-(4-(4-((4-((1-(2-(4-(4-chlorophenyl)-2,3,9-trimethyl-6H-thieno[3,2-f][1,2,4]triazolo[4,3-a][1,4]diazepin-6-yl)acetyl)piperidin-4-yl)methyl)piperazin-1-yl)methyl)phenyl)-5-(2,4-dihydroxy-5-isopropylphenyl)-N-ethylisoxazole-3-carboxamide hydrochloride. $^1$H NMR (400 MHz, DMSO-$d_6$): 9.85 (s, 1H), 9.67 (s, 1H), 8.93-8.90 (m, 1H) 7.52-7.31 (m, 8H), 6.82 (s, 1H), 6.48 (s, 1H), 4.60 (t, J=6.7 Hz, 1H), 4.37-4.23 (m, 2H), 4.17-4.02 (m, 2H), 3.74-2.98 (m, 19H), 2.67-2.65 (m, 4H), 2.42 (s, 3H), 2.16-2.14 (m, 1H), 1.94-1.92 (m, 2H), 1.63 (s, 3H), 1.23-1.11 (m, 3H), 0.98 (d, J=6.9 Hz, 6H). LCMS (ESI): $R_T$=1.420 min, m/z found 944.6 [M−HCl+H]$^+$.

Example 5: Testing of Various T-PEACH Molecules

Materials and Methods

HSP90α Binding Fluorescent Polarization (FP) Assay

A master mix was prepared with assay buffer, BSA and FITC-geldanamycin. In a 96-well plate, a serial 3-fold dilution of each compound was prepared ranging from 40 µM down until 2.0 nM. Also in a 96-well plate, recombinant HSP90α protein was diluted to 28 µg/ml. Then, in a 384-well plate, 10 µl of master mix and 5 µl of compound dilution were added per well to duplicate wells and mixed by brief shaking. Then 5 µl of diluted HSP90α protein was added per well, mixed by brief shaking, incubated at 25° C. for 30, 60 and 120 min and fluorescence was measured on an En Vision Plate Reader. Background-subtracted mP values were calculated from En Vision raw data and a four-parameter "log[inhibitor] vs. response" curve was fitted using GraphPad Prism 7.0.

Bromodomain Binding Assay

T7 phage strains displaying different human bromodomain proteins were grown in parallel in 24-well blocks in an E. coli host derived from the BL21 strain. E. coli were grown to log-phase and infected with T7 phage from a frozen stock (multiplicity of infection=0.4) and incubated with shaking at 32° C. until lysis (90-150 min). The lysates were centrifuged at 5,000×g and 0.2 µm filtered to remove cell debris. Streptavidin-coated magnetic beads were treated with biotinylated small molecule or acetylated peptide ligands for 30 min at room temperature to generate affinity resins for bromodomain assays. The liganded beads were blocked with excess biotin and washed with SEA BLOCK blocking buffer (Pierce Scientific), with 1% BSA, 0.05% Tween 20 and 1 mM DTT to remove unbound ligand and to reduce non-specific phage binding. Binding reactions were assembled by combining bromodomains, liganded affinity beads and test compounds in 1× binding buffer (16% SEA BLOCK, 0.32×PBS, 0.02% BSA, 0.04% Tween 20, 0.004% sodium azide and 7.9 mM DTT). Test compounds were prepared as 1000× stocks in 100% DMSO and subsequently diluted 1:25 in monoethylene glycol (MEG). The compounds were then diluted directly into the assays such that the final concentrations of DMSO and MEG were 0.1% and 2.4%, respectively. All reactions were performed in polypropylene 384-well plates in a final volume of 0.02 mL. The assay plates were incubated at room temperature with shaking for 1 hr and the affinity beads were washed with wash buffer (1×PBS, 0.05% Tween 20). The beads were then re-suspended in elution buffer (1×PBS, 0.05% Tween 20, 2 µM non-biotinylated affinity ligand) and incubated at room temperature with shaking for 30 min. The bromodomain concentration in the eluates was measured by qPCR. Percent control of the compound was determined by the following equation:

% Ctrl=(SignalCOMPOUNDS−SignalPC)/(SignalNC−SignalPC)

BRD4 Binding Homogeneous Time Resolved Fluorescence (HTRF) Assay

A master mix was prepared with assay buffer, 1.8 μg/ml recombinant BRD4 (BD1+BD2 domains) protein, and 200-fold dilutions of Tb-labeled donor and dye-labeled acceptor. 40-fold dilutions of acetylated and non-acetylated ligands were prepared in 1×BRD TR-FRET assay buffer. Also, a serial 3-fold dilution of each compound was prepared ranging from 40 μM down until 2.0 nM. In a 384-well plate, 5 μl diluted ligand and 5 μl of compound dilution were added per well to duplicate wells and mixed by brief shaking. Then 10 μl of master mix was added per well, mixed by brief shaking, incubated at 25° C. for 2 hr and fluorescence was measured on an En Vision Plate Reader. The 665 nm/615 nm ratio was calculated from EnVision raw data. Data were normalized using whole-plate averages of "positive" and "negative" readings. A four-parameter "log[inhibitor] vs. response" curve was fitted using GraphPad Prism 7.0.

Protein Degradation Flow Cytometry

MV4-11 cells were plated in a 24-well tissue culture plate at a density of 350,000 cells/450 μL/well and incubated in 37° C./5% CO2 for 1 hr. Cells were then treated with compounds at various concentrations and incubated in 37° C./5% CO2 for 24 hr. Cells were harvested, washed once, counted and 200 μL of 1% paraformaldehyde/PBS was added and incubated for 15 min at room temperature. 200 μL of 1×PBS/0.4% Triton X-100 was added and incubated for 15 min at 4° C. Cells were washed three times and resuspended in 50 μL of 1×PBS/0.2% Triton X-100. 2 μL/$10^6$ cells of anti-BRD4 antibody (ABCAM, #128874) was added and mixed by pipetting up and down. Cells were incubated for 30 min at room temperature in the dark, washed three times and resuspended in 50 μL of 1×PBS/0.2% Triton X-100. Goat anti-rabbit IgG H&L antibody (1:2000 dilution) was added and mixed by pipetting up and down and incubated for 30 min at room temperature in the dark. Finally, cells were washed three times and resuspended in 200 μL of PBS for flow cytometric analysis. Inhibition efficiency of the compound was determined by the following equation and analyzed using GraphPad Prism 7.0:

% Inhibition=100−(D−B)/(S−B)*100%.

S: The fluorescence intensity of MV4-11 with antibody
D: The fluorescence intensity in the presence of different compound dilutions with antibody
B: The fluorescence intensity of MV4-11 only Similar flow cytometry experiments for ERBB2 in BT-474 human breast carcinoma cells (ATCC, #HTB-20) and IGF1R, EGFR and RAF1 in HEK-293 human embryonic kidney (ATCC, #CRL-1573) were performed using anti-ERBB2 (R&D, #FAB1129P), anti-IGF1R (Cell Signaling Technology, #9750), anti-EGFR (Cell Signaling Technology, #139690) and anti-RAF1 (ABCAM, #ab181115) antibodies.

Western Blotting

MV4-11 human acute myeloid leukemia cells (ATCC, #CRL-9591) were seeded in 6-well tissue culture plates and after 1 hr, compounds were added at various concentrations and incubated at 37° C./5% CO2 for 24 hr. Cells were then collected by centrifugation, washed one time with cold PBS, supernatants aspirated and cell pellets lysed with 4° C. RIPA lysis buffer containing a protease/phosphatase inhibitor cocktail. The total protein concentrations of cell lysates were determined by BCA Protein Assay kit. Samples were normalized for equivalent protein concentrations, 5× loading buffer added and heated to 100° C. for 10 min and cooled to room temperature. 20 μl of each sample/well was loaded on a SDS-PAGE gel and electrophoresed for 20 min at 80 V, then 120 V for 1.5 hr. Gels were then electroblotted to nitrocellulose membranes using a wet-transfer method at 250 mA for 2.5 hr. Membranes were incubated with blocking buffer for 1 hr and washed 3 times with TBST for 5 min. Then membranes were incubated with anti-BRD4 (Cell Signaling Technology, #13440) and anti-beta-Actin (Cell Signaling Technology, #3700) antibodies diluted in blocking buffer per the manufacturer's recommendation at 4° C. overnight. After washing 3 times, blots were incubated with the appropriate labeled secondary antibody for 1 hr at room temperature and washed again. Images were read on a LI-COR and the optical density values of bands determined by ImageJ software. Data was analyzed using GraphPad Prism 7.0.

Similar western blotting experiments of for BRD2 and BRD3 were performed in MV4-11 cells using anti-BRD2 (Cell Signaling Technology, #139690) and anti-BRD3 (Cell Signaling Technology, #50818).

MYC HTRF Assay

MYC protein expression was measured using the Human c-Myc Cell-based Assay Kit (Cisbio, #63ADK053PEG), a homogeneous time resolved fluorescence (HTRF) assay. MV4-11 cells were plated in a 96-well tissue culture plate at a density of 100,000 cells/90 μL/well and incubated in 37° C./5% $CO_2$ for 1 hr and then treated with compounds at various concentrations (a 10-point, 3-fold serial dilution series starting at 10 μM) and then incubated in 37° C./5% $CO_2$ for 24 hr. Cells were collected by centrifugation, supernatant removed by aspiration and 10 μL of lysis buffer was added and incubated for 45 min at room temperature while shaking. In a 384-well plate, 10 μL of cell lysate/well was combined with 10 μL of premixed antibody solution containing anti-human MYC-Eu3+ Cryptate prepared in detection buffer and incubated overnight at room temperature, whereupon the signal was measured. The ratio of the acceptor and donor emission signals for each individual well were calculated (ratio=665 nm/620 nm×104). Inhibition efficiency of each compound was determined by the following the equation and analyzed using GraphPad Prism 7.0:

% Inhibition=100−(D−B)/(S−B)*100%.

S: The ratio of the maximum (positive control)
D: The ratio of the presence of different dilution compound with cells
B: The ratio of the minimum (blank control)

Cell Cytotoxicity Assay

MV4-11 cells were plated in a 96-well tissue culture plate at a density of 4,500 cells/90 μL/well and incubated at 37° C./5% $CO_2$ for 24 hr. Cells were then treated with compounds at various concentrations (a 10-point, 3-fold serial dilution series starting at 20 μM) with a final concentration of 0.5% DMSO/well and then incubated in 37° C./5% $CO_2$ for 72 hr. 10 μL the cell proliferation reagent CCK-8 (WST-8) was added into each well and incubated at 37° C./5% $CO_2$ for 3-4 hr and the absorbance at 450 nm measured with an En Vision Plate Reader. Inhibition efficiency of the compound was determined by the following the equation and analyzed using GraphPad Prism 7.0:

% Inhibition=100−(D−B)/(S−B)*100%.

S: The absorbance of the maximum (cells with DMSO)
D: The absorbance of the presence of different dilution compound with cells B: The absorbance of the minimum (medium with DMSO)

Tumor Xenograft Studies in Mice

MV4-11 acute myeloid leukemia and SU-DHL-4 diffuse large B-cell lymphoma (ATCC, #CRL-2957) cells were cultured in medium supplemented with 10% fetal bovine serum at 37° C./5% $CO_2$. $5 \times 10^6$ MV-4-11 or $1 \times 10^7$ SU-DHL-4 cells were collected and re-suspended in 0.1 mL of serum-free media with Matrigel (1:1 v/v) per mouse for subcutaneous inoculation in isoflurane anesthetized male BALB/c nude or C.B-17 scid mice, respectively (treated in accordance with AAALAC animal welfare guidelines). When the average tumor volumes reached 100-200 $mm^3$, tumor volume outliers were removed and the remaining animals randomly divided into groups of 6-8 with similar average tumor volumes in each group. Solutions of compound 074 and compound 078 were prepared in 45% PEG300 and 55% normal saline and adjusted to pH 3.0-7.0 with 0.15 M sodium bicarbonate solution. Animals were intravenously dosed at 25 mg/kg, 50 mg/kg or 100 mg/kg 1×/week for 3 or 4 weeks. The appearance and behavior of each mouse was observed and recorded daily. Body weights and tumor volumes were measured and recorded every 2-4 days and the results were expressed as group means±SEM. Pairwise statistical comparisons between groups were performed by one-way ANOVA, and $p<0.05$ was considered statistically significant.

Pharmacokinetics and Tissue Distribution

A solution of compound 074 was prepared in 30% PEG300 and 70% normal saline and adjusted to pH 3.0-7.0 with 0.15 M sodium bicarbonate solution. 15 female CB-17 SCID mice (treated in accordance with AAALAC animal welfare guidelines) were weighed and administered 5 mg/kg of compound 074 by a single intravenous injection. 0.10 mL of blood was collected from each mouse by submandibular vein and sodium heparin was added as an anticoagulant. Samples were collected before compound administration, and at 1 hr, 6 hr 24 hr and 48 hr time points after administration, with 3 mice sampled per time point. After collection, samples were placed on ice and the animals sacrificed to collect tumor and normal tissues. The method development and analysis of all samples were performed by the analytical laboratory at Shanghai Medicilon Inc. Intra-day accuracy evaluation of samples for quality control was carried out during sample analysis and a quality control accuracy of more than 66.7% of samples was required between to be 80-120%. Pharmacokinetic parameters were calculated using Phoenix WinNonlin7.0 software.

Results

A number of synthetic schemes have been developed to construct various T-PEACH molecules. A representative example is shown as follows between a HSP90 binder and the BET binder (+)-JQ1. Similar chemistry can be applied to other T-PEACH molecules not limited to HSP90 binders and (+)-JQ1.

A HSP90α fluorescent polarization (FP) binding assay measuring competition with FTIC-geldanamycin was applied to assess the binding capability of T-PEACH molecules to HSP90. As shown in Table 1, T-PEACH molecules containing HSP90 binding moieties documented in the literature were generally in agreement with the published structure activity relationship (SAR).

The incorporation a (+)-JQ1 BET binder of similar molecular weight to the HSP90 binder into the T-PEACHs had only minimal impact on the binding of T-PEACH molecules to HSP90α in this assay. There are a number of reasons: first the co-crystal structures of these moieties with their corresponding proteins are available and allow precise structure-based molecular designs; and secondly, the tether is constructed to provide rigidity with suitable length.

TABLE 1

HSP90α Binding FP Assay

| Compound ID | HSP90 Binding Potency* |
|---|---|
| 1 | B |
| 2 | A |
| 3 | B |
| 4 | C |
| 5 | B |
| 6 | B |
| 9 | B |
| 10 | B |
| 11 | A |
| 12 | A |
| 13 | B |
| 14 | B |
| 15 | B |
| 16 | B |
| 17 | B |
| 18 | B |
| 19 | B |
| 27 | B |
| 28 | B |
| 29 | C |
| 32 | B |
| 33 | B |
| 34 | C |
| 37 | A |
| 38 | B |
| 39 | B |
| 40 | A |
| 41 | B |
| 42 | B |
| 43 | B |
| 44 | B |
| 45 | A |
| 46 | A |
| 47 | A |
| 48 | A |
| 49 | A |
| 50 | B |
| 51 | B |
| 52 | A |
| 53 | B |
| 54 | A |
| 55 | B |
| 56 | B |
| 57 | B |
| 58 | B |
| 59 | B |
| 60 | B |
| 61 | B |
| 62 | B |
| 63 | B |
| 64 | B |
| 65 | B |
| 66 | B |
| 67 | B |
| 68 | B |
| 70 | B |
| 71 | B |
| 72 | C |
| 74 | B |
| 76 | B |
| 77 | B |
| 78 | B |
| 79 | B |
| 80 | B |
| 81 | B |
| 82 | B |
| 83 | B |
| 84 | B |
| 85 | B |
| 86 | B |

TABLE 1-continued

HSP90α Binding FP Assay

| Compound ID | HSP90 Binding Potency* |
|---|---|
| 87 | B |
| 88 | B |
| 89 | B |
| 90 | B |
| 91 | B |
| 92 | C |
| 93 | B |
| 94 | A |
| 95 | B |
| 96 | B |
| 97 | B |
| 98 | B |
| 99 | B |
| 100 | B |
| 101 | C |
| 102 | C |
| 103 | B |
| 104 | B |
| 105 | B |
| 106 | B |
| 107 | B |
| 108 | C |
| 109 | B |
| 110 | B |
| 111 | B |
| 112 | B |
| 117 | B |
| 118 | B |
| 119 | B |
| 120 | B |
| 121 | A |
| 123 | B |
| 124 | B |
| 125 | A |
| 126 | B |

*A. $IC_{50}$ < 100 nM;
B. $IC_{50}$ = 100-1000 nM;
C. $IC_{50}$ > 1000 nM

There are more than 40 human proteins that contain one or more bromodomain motifs, with each member of the BET family containing two separate bromodomains, termed BD1 and BD2, that can independently bind to acetylated lysines. To assess the ability of compound 074 to bind to a variety of recombinant bromodomain proteins a ligand binding site-directed competition assay was employed. As shown in Table 2, 10 μM compound 074 was able to efficiently compete for ligand binding to both bromodomains present in each of the BRD2, BRD3, BRD4 and BRD4 proteins. However, compound 074 displayed little or no binding to a variety of other bromodomain proteins.

TABLE 2

Bromodomain Binding Assay with 10 μM Compound 074

| Bromodomain | Bromodomain Binding % of Control* |
|---|---|
| ATAD2 | C |
| ATAD2B | C |
| BAZ2A | C |
| BAZ2B | C |
| BRD1 | C |
| BRD2 BD1 | A |
| BRD2 BD2 | A |
| BRD3 BD1 | A |
| BRD3 BD2 | A |
| BRD4 BD1 | A |
| BRD4 BD2 | A |
| BRD7 | C |
| BRD9 | C |
| BRDT BD1 | A |
| BRDT BD2 | A |
| BRPF1 | C |
| BRPF3 | C |
| CECR2 | C |
| CREBBP | C |
| EP300 | B |
| BPTF | C |
| KAT2A | C |
| PBRM1 BD2 | C |
| PBRM1 BD5 | C |
| KAT2B | C |
| SMARCA2 | C |
| SMARCA4 | C |
| TAF1 BD2 | C |
| TAF1L BD2 | C |
| TRIM24 | C |
| TRIM133 | C |
| BRWD1 BD2 | C |

*A. <10%;
B. 11-75%;
C. >75%

Inhibition of BRD4 (BD1+BD2) protein binding to its substrate by a variety of T-PEACH molecules was also assessed using a HTRF assay, as shown in Table 3. T-PEACH molecules containing a BRD4-binding moiety documented in the literature are generally in agreement with the published SAR analysis. Those BRD4-binding moieties include (+)-JQ1-based scaffolds, especially compounds bearing similar structures to OTX-15 and (+)-JQ1.

The incorporation of a chaperone binding moiety, such as a HSP90 binder, had only minimal impact on the binding of T-PEACH molecules to BRD4 in this assay. There are a number of reasons: first the co-crystal structures of these moieties with their corresponding proteins are available and allow precise structure-based molecular designs; and secondly, the tether is constructed to provide rigidity with suitable length.

TABLE 3

BRD4 (BD1 + BD2) Binding HTRF Assay

| Compound ID | BRD4 Binding Potency* |
|---|---|
| 1 | B |
| 2 | C |
| 3 | C |
| 4 | A |
| 5 | C |
| 6 | B |
| 9 | A |
| 10 | B |
| 11 | B |
| 12 | C |
| 13 | B |
| 14 | C |
| 15 | C |
| 16 | B |
| 17 | C |
| 18 | B |
| 19 | B |

TABLE 3-continued

BRD4 (BD1 + BD2) Binding HTRF Assay

| Compound ID | BRD4 Binding Potency* |
|---|---|
| 27 | C |
| 28 | B |
| 29 | C |
| 32 | C |
| 33 | B |
| 34 | C |
| 37 | A |
| 38 | C |
| 39 | B |
| 40 | B |
| 41 | B |
| 42 | B |
| 43 | B |
| 44 | C |
| 45 | A |
| 46 | A |
| 47 | A |
| 48 | B |
| 49 | B |
| 50 | C |
| 51 | C |
| 52 | C |
| 53 | B |
| 54 | B |
| 55 | B |
| 56 | B |
| 57 | B |
| 58 | B |
| 59 | B |
| 60 | B |
| 61 | C |
| 62 | C |
| 63 | B |
| 64 | B |
| 65 | C |
| 66 | C |
| 67 | B |
| 68 | B |
| 70 | B |
| 71 | C |
| 72 | C |
| 74 | B |
| 76 | C |
| 77 | A |
| 78 | B |
| 79 | B |
| 80 | A |
| 81 | B |
| 82 | A |
| 83 | C |
| 84 | C |
| 85 | B |
| 86 | B |
| 87 | B |
| 88 | B |
| 89 | B |
| 90 | B |
| 91 | B |
| 92 | C |
| 93 | B |
| 94 | B |
| 95 | B |
| 96 | A |
| 97 | A |
| 98 | B |
| 99 | C |
| 100 | B |
| 101 | C |
| 102 | C |
| 103 | B |
| 104 | A |
| 105 | B |
| 106 | B |
| 107 | A |
| 108 | C |
| 109 | A |
| 110 | A |
| 111 | A |
| 112 | A |
| 117 | A |
| 118 | A |
| 119 | A |
| 120 | A |
| 121 | C |
| 123 | A |
| 124 | A |
| 125 | C |
| 126 | B |

*A. $IC_{50} < 100$ nM;
B. $IC_{50} = 100$-1000 nM;
C. $IC_{50} > 1000$ nM

T-PEACH chimeric molecules are designed to induce targeted protein degradation. As shown in Table 4, for MV4-11 cells treated with T-PEACH molecules where the BET-binding moiety and HSP90-binding moiety are covalently linked, 50% of cellular BRD4 protein or more was degraded within 24 hr as measured in a flow cytometry assay. In contrast, no substantial BRD4 degradation was observed when MV4-11 cells were treated with ether BET inhibitor (+)-JQ1 or a HSP90 binder (1-(4-((4-(4-(3-(2,4-dihydroxy-5-isopropylphenyl)-5-hydroxy-4H-1,2,4-triazol-4-yl)benzyl)piperazin-1-yl)methyl)piperidin-1-yl)ethan-1-one). Compound 005 is a control T-PEACH molecule containing a non-BET-binding (−)-JQ1 moiety and does not degrade BRD4. In addition, when cells were pretreated with a combination of a HSP90 binder and (+)-JQ1, compound 40's ability to degrade BRD4 was significantly reduced. This demonstrates the requirement for both binding moieties to be covalently linked in a T-PEACH construct.

TABLE 4

BRD4 Degradation Flow Cytometry Assay

| Compound ID | Percentage BRD4 degradation vs untreated*# |
|---|---|
| 001 | A |
| 005 | C |
| 009 | B |
| 040 | A |
| 039 | C |
| 046 | A |
| HSP90 binder | C |
| Combinations<sup>&</sup> | B |

Figure 2:
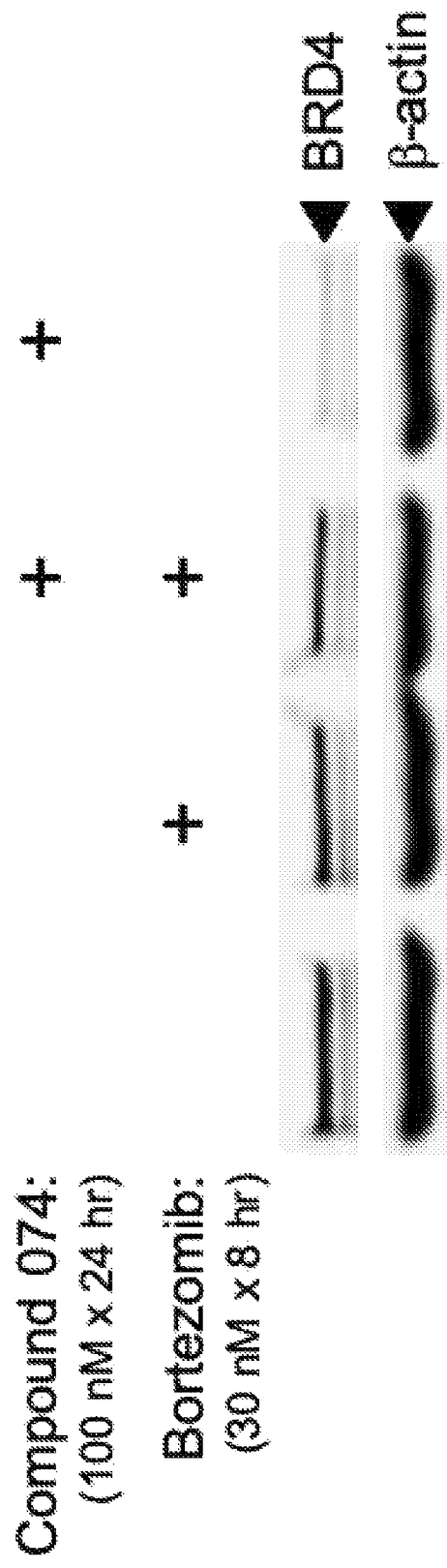
FIG. 2 shows a western blot of BRD4 after treatment with compound 074 and/or proteasome inhibitor bortezomib.

*A. Degradation > 50%;
B. 10% < Degradation = 10-50%;
C. Degradation < 10%
Highest degradation percentage observed at concentrations between 40-1000 nM
&Cells were pretreated with a combination of a HSP90 binder and (+)-JQ1 for 30 minutes before compound 40 was added To further assess BRD4 degradation, MV4-11 cells were treated for 24 hr with various concentrations of T-PEACH compounds and BRD4 expression was assessed by western blotting. As shown in FIG. 1, BRD4 degradation was observed at 100 and 300 nM concentrations of compound 074. Importantly, when the MV-411 cells were treated with both compound 074 and proteasome inhibitor bortezomib, BRD4 degradation was blocked (FIG. 2). This demonstrates that T-PEACH molecules induce targeted protein degradation via the UPS.

Although (+)-JQ1 is a pan-BET protein family binder, it is possible a T-PEACH molecule incorporating a (+)-JQ1 moiety may display greater selectivity in protein degradation due to charge repulsion and/or steric clashing between individual BET family member targets and the chaperone or chaperone complex. To examine this, MV4-11 cells were treated the (+)-JQ1-based PROTAC dBET1 (Winter et al, Science, 2015, 348:1376-1381) and compound 047 for 24 hr and expression of BRD2, BRD3 and BRD4 were assessed by flow cytometry. As shown in Table 5, dBET1 induced the degradation of BRD2, BRD3 and BRD4 with similar potencies. In contrast, compound 047 only induced significant degradation of BRD4. This indicates that promiscuous target binders may be converted into selective degraders using T-PEACH technology.

TABLE 5

BET Protein Family Degradation Flow Cytometry Assay

| Compound | Concentration (nM) | BRD2 (% of control) | BRD3 (% of control) | BRD4 (% of control) |
|---|---|---|---|---|
| dBET1 | 300 | 0.5 | 0.3 | 0.4 |
|  | 100 | 9.3 | 1.4 | 4.6 |
|  | 30 | 55.1 | 14.5 | 26.1 |
|  | 10 | 94.9 | 43.2 | 52.0 |
|  | 3 | 96.4 | 89.7 | 81 |
| 047 | 300 | 102.2 | 91.4 | 9.6 |
|  | 100 | 81.2 | 95.0 | 17.3 |

BRD4 is known to regulate expression of the MYC gene. As shown in Table 6, selected T-PEACH molecules were found to decrease expression of MYC protein in MV4-11 cells after 24 hr treatment as assessed by HTRF assay.

TABLE 6

MYC Protein Expression HTRF Assay

| Compounds | MYC protein expression* |
|---|---|
| 005 | A |
| 040 | A |

*A. $IC_{50} < 100$ nM;
B. $IC_{50} = 100$-1000 nM;
C. $IC_{50} > 1000$ nM

T-PEACH molecules may include chaperone and chaperone complex binders that have a range of different binding affinities. In different embodiments, it is desirable to use a high-affinity binder, a moderate-affinity binder or a low-affinity binder. Since a HSP90 binding moiety that interacts with the N-terminal ATP-binding pocket of HSP90 may inhibit HSP90 activity and induce the degradation of HSP90 client proteins, some T-PEACH molecules will not only induce the degradation of the desired target protein or proteins (which may or may not be HSP90 client proteins), but also simultaneously induce the degradation of HSP90 client proteins. This combination of degradation activities may increase the activity of T-PEACH molecules over that of other targeted protein degradation technologies directed towards the same target(s). As shown in Table 1, compound 074 has moderate potency in binding to HSP90. In order to assess the selectivity of compound 074 for BRD4 (which is not a sensitive HSP90 client protein) versus known sensitive HSP90 client proteins, flow cytometry assays were performed with various cell lines expressing HSP90 client proteins: ERBB2 in HER2 breast carcinoma cells) and IGF1R, EGFR and RAF1 in HEK-293 embryonic kidney cells. As shown in Table 7, compound 074 displayed $IC_{50}$ values between 339-1055 nM for degradation of these HSP90 clients, which were 6- to 18-fold higher than the $IC_{50}$ value of 59 nM for BRD4 degradation determined by western blotting in MV4-11 cells. This indicates that a T-PEACH molecule with a moderate-affinity HSP90-binding moiety displays selectivity towards the intended degradation target BRD4 versus other known HSP90 client proteins.

TABLE 7

HSP90 Client Protein Degradation Flow Cytometry Assay with Compound 074

| HSP90 client | ERBB2* | IGF1R** | EGFR** | RAF1** |
|---|---|---|---|---|
| $IC_{50}$ (nM) | 340 | 1055 | 405 | 762 |

*BT-474 cells;
**HEK-293 cells

As shown inn Table 8, treatment with various T-PEACH molecules potently inhibited the growth and survival of MV4-11 cells in a cytotoxicity assay.

TABLE 8

MV4-11 Cytotoxicity Assay

| Compound ID | MV4-11 cytotoxicity* |
|---|---|
| 1 | A |
| 2 | B |
| 3 | A |
| 4 | B |
| 5 | A |
| 6 | A |
| 7 | B |
| 8 | C |
| 9 | A |
| 10 | A |
| 11 | A |
| 12 | A |
| 13 | A |
| 14 | A |
| 15 | A |
| 16 | A |
| 17 | A |
| 18 | A |
| 19 | A |
| 20 | B |
| 21 | B |
| 22 | B |
| 23 | B |
| 24 | B |
| 25 | B |
| 26 | A |
| 27 | A |
| 28 | B |
| 29 | B |
| 32 | B |
| 33 | B |
| 34 | B |
| 37 | B |
| 38 | A |
| 39 | A |
| 40 | A |
| 41 | A |
| 42 | A |
| 43 | A |
| 44 | B |
| 45 | A |
| 46 | A |
| 47 | A |
| 48 | B |
| 49 | A |
| 50 | A |

TABLE 8-continued

MV4-11 Cytotoxicity Assay

| Compound ID | MV4-11 cytotoxicity* |
|---|---|
| 51 | A |
| 52 | B |
| 53 | A |
| 54 | B |
| 55 | B |
| 56 | B |
| 57 | B |
| 58 | A |
| 59 | A |
| 60 | A |
| 61 | B |
| 62 | B |
| 63 | B |
| 64 | B |
| 65 | B |
| 66 | B |
| 67 | B |
| 68 | B |
| 70 | A |
| 71 | B |
| 72 | A |
| 74 | A |
| 75 | C |
| 76 | A |
| 77 | B |
| 78 | A |
| 79 | A |
| 80 | A |
| 81 | A |
| 82 | A |
| 83 | A |
| 84 | A |
| 85 | A |
| 86 | A |
| 87 | A |
| 88 | A |
| 89 | A |
| 90 | A |
| 91 | A |
| 92 | B |
| 93 | A |
| 94 | A |
| 95 | A |
| 96 | A |
| 97 | A |
| 98 | A |
| 99 | A |
| 100 | A |
| 101 | A |
| 102 | A |
| 103 | A |
| 104 | A |
| 105 | A |
| 106 | A |
| 107 | A |
| 108 | B |
| 109 | A |
| 110 | B |
| 111 | A |
| 112 | A |
| 117 | A |
| 118 | A |
| 119 | A |
| 120 | A |
| 121 | A |
| 123 | A |
| 124 | A |
| 125 | A |
| 126 | A |

Figure 3A:
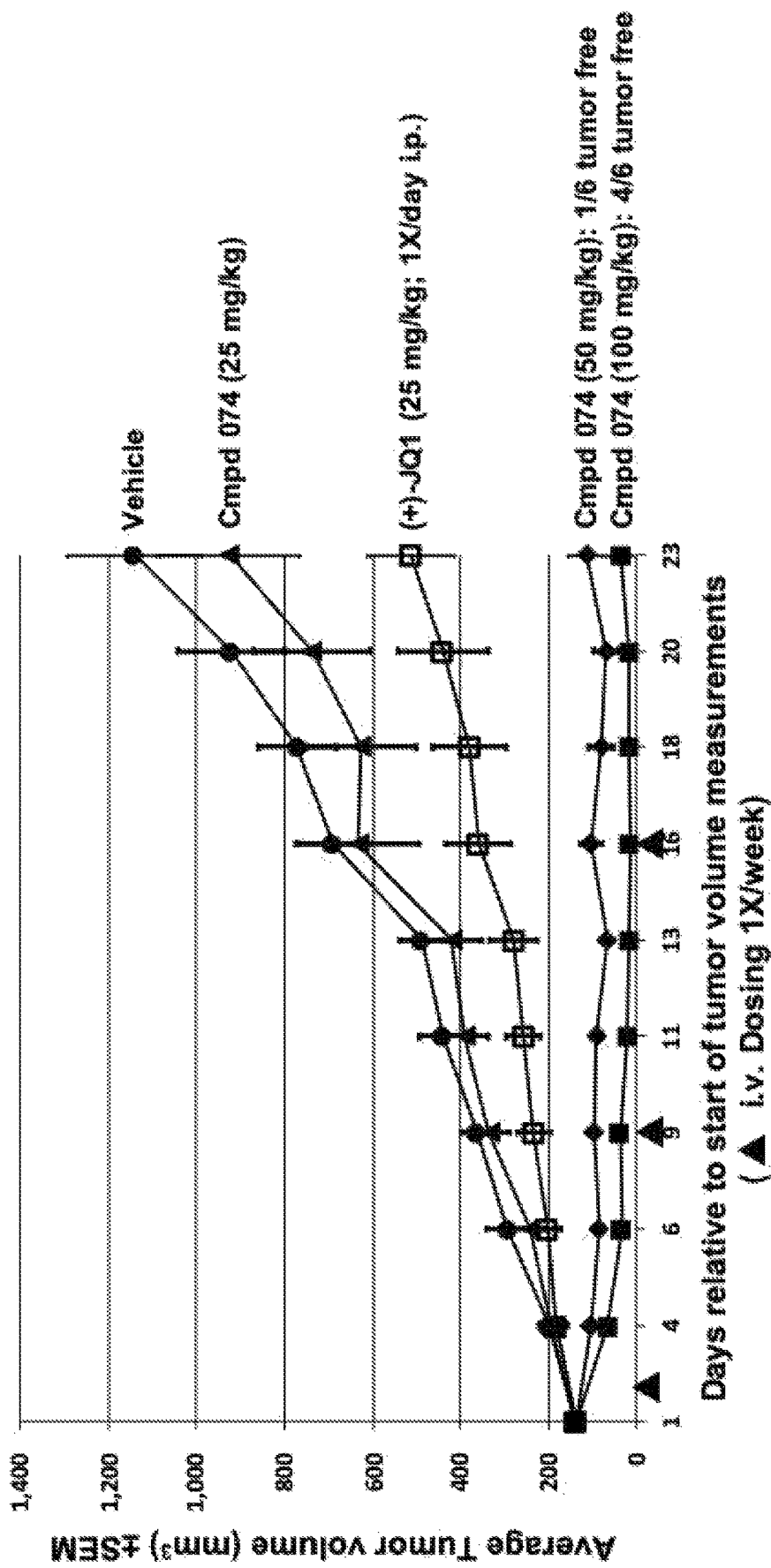
FIG. 3a shows average tumor volume in an MV4-11 AML xenograft model in mice treated with compound 074.
Figure 3B:
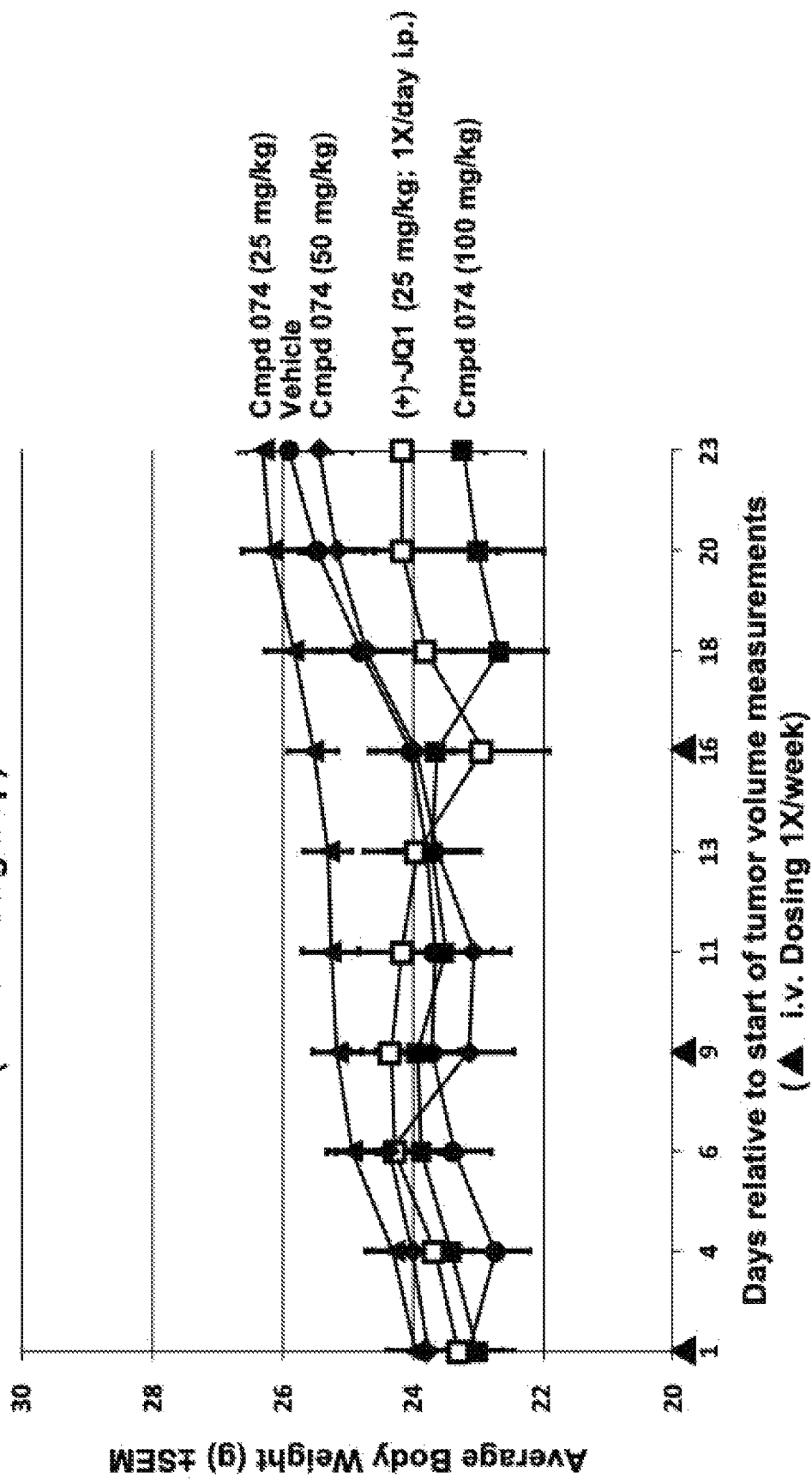
FIG. 3b shows average body weight in an MV4-11 AML xenograft model in mice treated with compound 074.

*A. $IC_{50} < 100$ nM;
B. $IC_{50} = 100\text{-}1000$ nM;
C. $IC_{50} > 1000$ nM Compounds 074 and 078 were selected to test for in vivo efficacy in tumor-bearing xenograft models in mice. In the MV4-11 xenograft model, 25 mk/kg, 50 mg/kg and 100 mg/kg of compound 074 were intravenously dosed 1×/week. As shown in FIG. 3a, after 3 weeks of dosing, the 100 mg/kg group displayed significant tumor growth inhibition, with 4 out of 6 animals being tumor free at the end of the study. The 50 mg/kg group also displayed significant tumor growth inhibition, with 1 out of 6 animals being tumor free at the end of the study. In comparison, 25 mg/kg intraperitoneal dosing 1×/day of the BET inhibitor (+)-JQ1 gave moderate tumor growth inhibition. No animal deaths or significant effects on body weights were observed in any group (FIG. 3b)

Figure 4A:
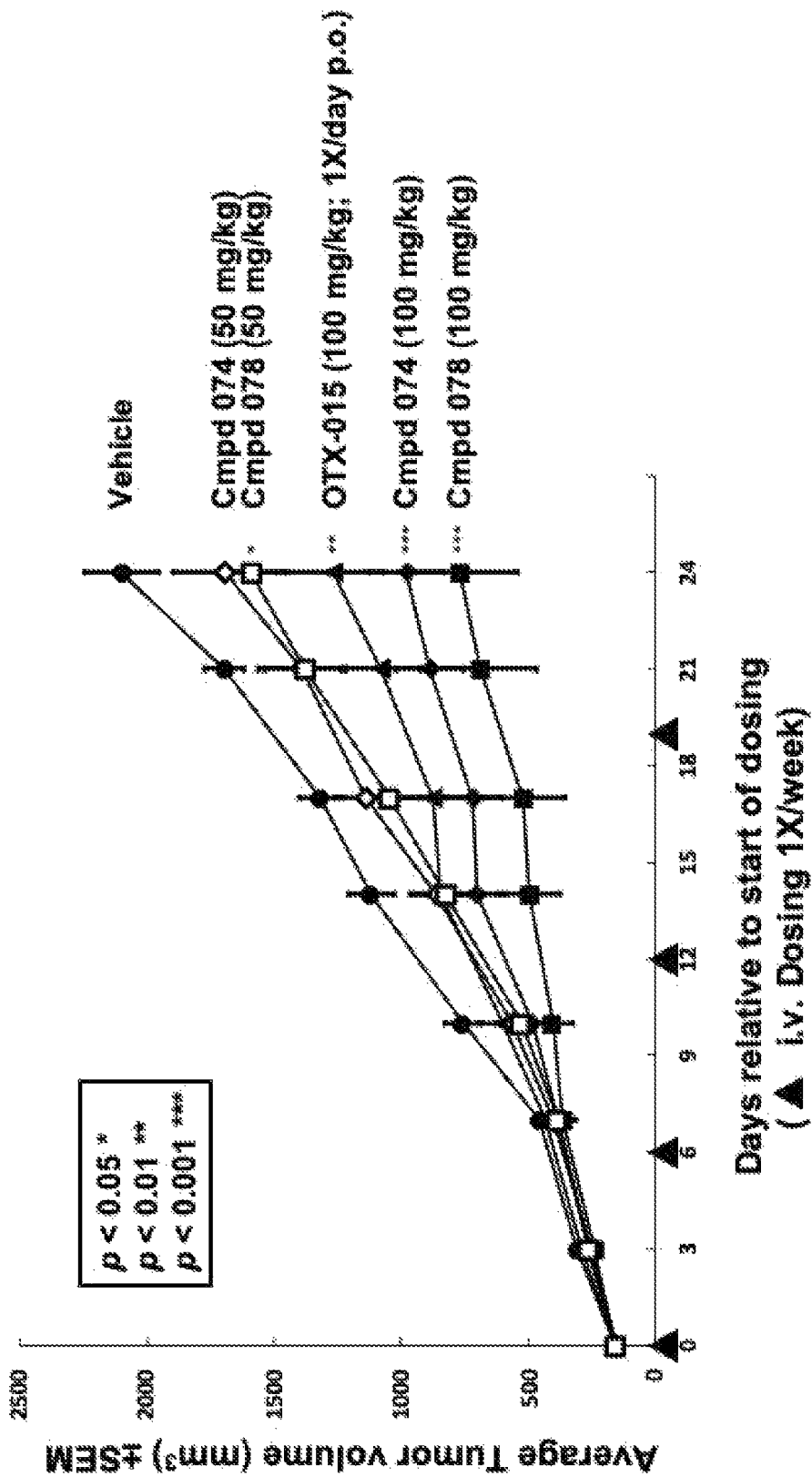
FIG. 4a shows average tumor volume in an SU-DHL-4 DLCBL xenograft model in mice treated with compounds 074 and 078.
Figure 4B:
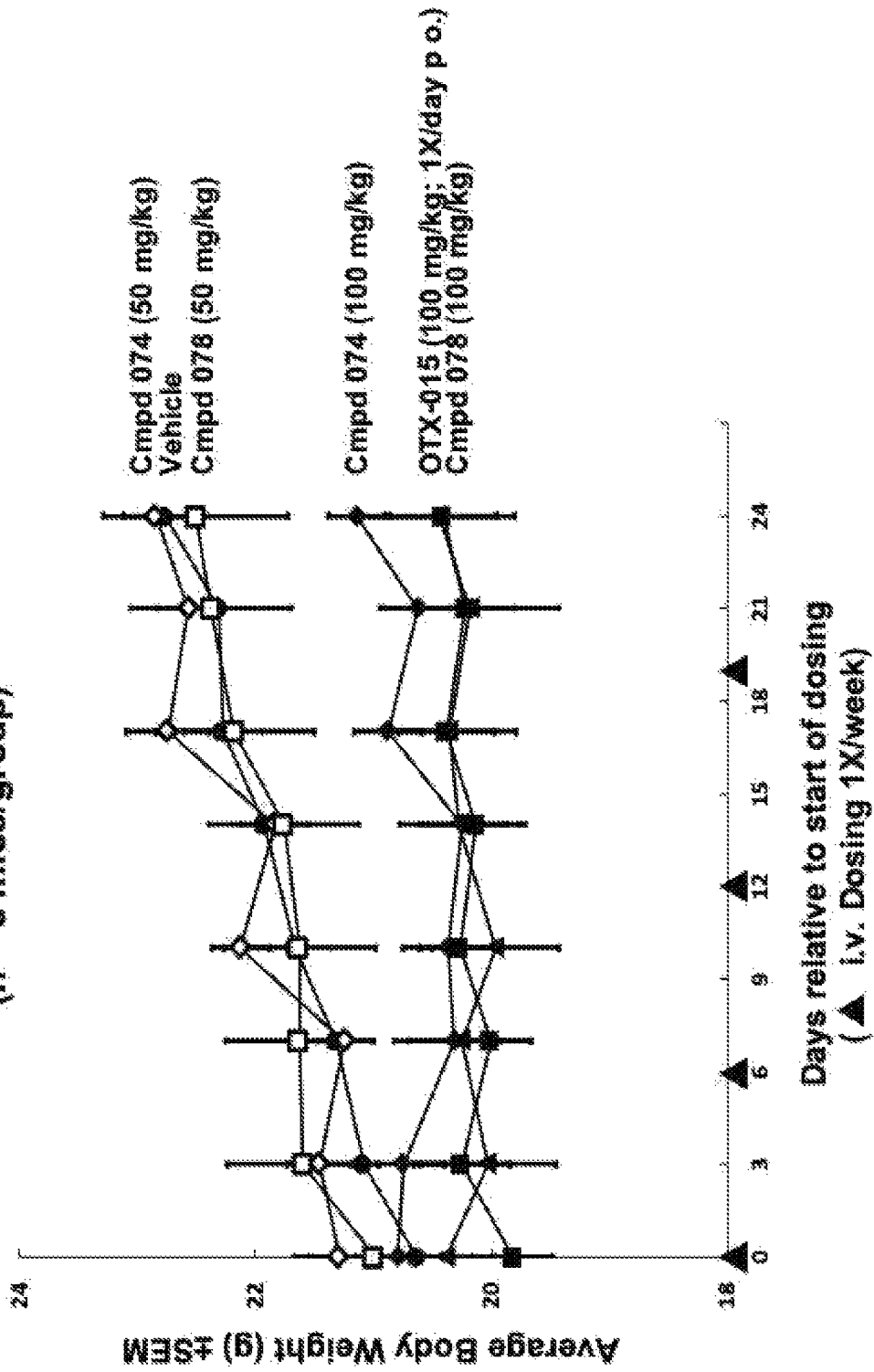
FIG. 4b shows average body weight in an SU-DHL-4 DLCBL xenograft model in mice treated with compounds 074 and 078.

In the SU-DHL-4 xenograft mouse model, 50 mg/kg and 100 mg/kg of compounds 074 and 078 were intravenously dosed 1×/week. As shown in FIG. 4a after 4 weeks of dosing, the 100 mg/kg groups for both compounds displayed significant tumor growth inhibition, with tumor vs control (T/C) values of 41% and 28% for compounds 074 and 078, respectively. In comparison, 100 mg/kg oral dosing 1×/day of the clinical stage BET inhibitor OTX-015 (Boi, Clin Cancer Res, 2015, 21:1628-38) displayed a T/C value of 45% No animal deaths or significant effects on body weights were observed at any dose level (FIG. 4b).

In order to examine the tumor-selective retention of T-PEACH molecules, a pharmacokinetics and tissue distribution study was conducted in the MV4-11 xenograft tumor model in mice. 5 mg/kg of compound 074 was given by a single intravenous dose and animals were sacrificed at different time points over 48 hr to assess the pharmacokinetics of the compound in plasma, heart, liver, lung and tumor tissues. As shown in Table 9, although the initial concentrations of compound 074 in the heart, liver and lung were higher compared to that observed in tumors, its half-life in tumors of 32.10 hr was 4.6-9.5-times as long as in plasma and other organs, demonstrating the tumor-selective retention of this T-PEACH molecule.

TABLE 9

Pharmacokinetics and Distribution of Compound 074 in the MV4-11 Xenograft Model in Mice

| Tissue | Dose (mg/kg) | $T_{1/2}$ (hr) | Tmax (hr) | Cmax (ng/mL) | AUC(0-∞) (h*ng/mL) | Cmax (ng/g) | AUC(0-∞) (h*ng/g) |
|---|---|---|---|---|---|---|---|
| Plasma | 5 | 3.92 | 1.00 | 497.95 | 3015.79 | n/a | n/a |
| Heart | 5 | 3.70 | 1.00 | n/a | n/a | 1643.16 | 8828.71 |
| Liver | 5 | 3.37 | 1.00 | n/a | n/a | 5036.96 | 24415.49 |
| Lung | 5 | 6.94 | 1.00 | n/a | n/a | 2027.34 | 14199.86 |
| Tumor | 5 | 32.10 | 1.00 | n/a | n/a | 461.97 | 23857.20 |

Modifications and variations of the described methods and compositions of the present disclosure will be apparent to those skilled in the art without departing from the scope and spirit of the disclosure. Although the disclosure has been described in connection with specific embodiments, it should be understood that the disclosure as claimed should not be unduly limited to such specific embodiments. Indeed, various modifications of the described modes for carrying out the disclosure are intended and understood by those skilled in the relevant field in which this disclosure resides to be within the scope of the disclosure as represented by the following claims.

INCORPORATION BY REFERENCE

All patents and publications mentioned in this specification are herein incorporated by reference to the same extent

The invention claimed is:
1. A compound of the Formula I:

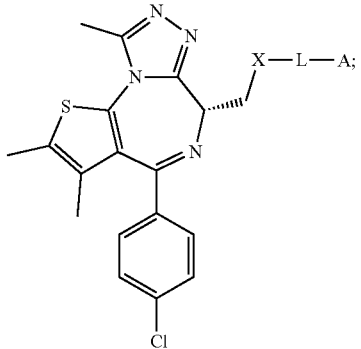

(I)

or a pharmaceutically acceptable salt thereof, wherein
X is C(O) or (C$_1$-C$_4$)alkylene;
A is

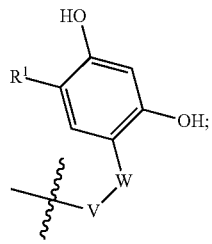

W is 5- or 6-membered heteroaryl optionally substituted with 1 to 3 groups selected from R$^2$;
V is phenyl or 5- to 9-membered heteroaryl optionally substituted with 1 to 3 groups selected from R$^3$;
R$^1$ is halo, (C$_1$-C$_4$)alkyl, halo(C$_1$-C$_4$)alkyl, (C$_1$-C$_4$)alkoxy, or halo(C$_1$-C$_4$)alkoxy;
R$^2$ is (C$_1$-C$_4$)alkyl, halo(C$_1$-C$_4$)alkyl, (C$_2$-C$_6$)alkenyl, halo(C$_2$-C$_6$)alkenyl, (C$_2$-C$_6$)alkynyl, halo(C$_2$-C$_6$)alkynyl, CN, —C$_{1-4}$alkylOR$^a$, —OR$^a$, —C(O)R$^a$, —C(O)OR$^a$, —C(O)NR$^a$R$^b$, —C(O)NR$^a$(C$_{1-4}$alkylene)OR$^a$, —C(O)NR$^a$(C$_{1-4}$alkylene)NR$^a$R$^b$, —C(O)NR$^a$(C$_{1-4}$alkylene)OR, —NR$^a$R$^b$, —O(C$_{1-4}$alkylene)NR$^a$R$^b$, —C$_{1-4}$alkylNR$^a$R$^b$, —SR$^a$, —S(O)R$^a$, —S(O)$_2$R$^a$, —S(O)NR$^a$R$^b$, —SO$_2$NR$^a$R$^b$, —NR$^a$(C$_{1-4}$alkylene)OR$^a$, —NR$^a$(C$_{1-4}$alkylene)NR$^a$R$^b$, —C$_{1-6}$alkylC(O)NR$^a$R$^b$, phenyl or 5- to 7-membered heteroaryl, wherein said phenyl and 5- to 7-membered heteroaryl are each optionally and independently substituted with 1 to 3 groups selected from R$^4$;
R$^a$ and R$^b$ are each independently selected from hydrogen and (C$_1$-C$_4$)alkyl, wherein said (C$_1$-C$_4$)alkyl is optionally substituted with one or more halo or a 3- to 7-membered heterocyclyl, or both;
R$^3$ and R$^4$ are each independently halo, —NR$^a$R$^b$, (C$_1$-C$_4$)alkyl, halo(C$_1$-C$_4$)alkyl, (C$_1$-C$_4$)alkoxy, or halo(C$_1$-C$_4$)alkoxy; and
L is a linker.

2. The compound of claim 1, or a pharmaceutically acceptable salt thereof, wherein
A is

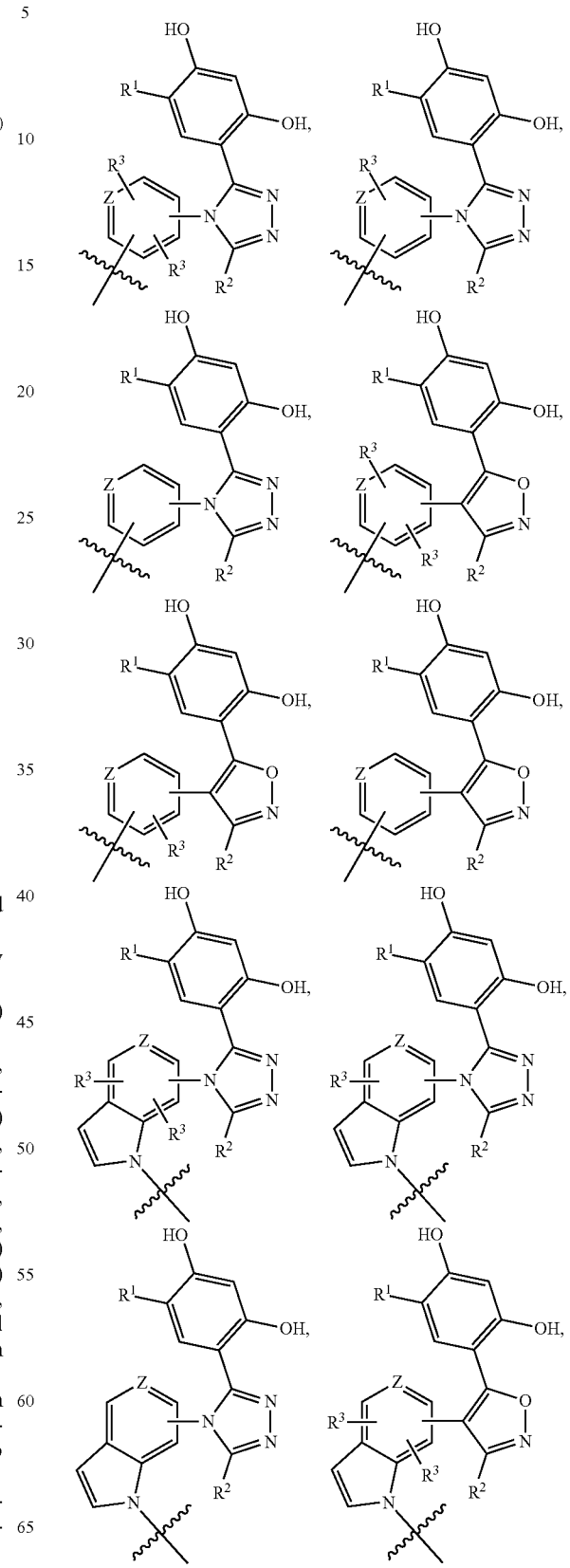

-continued
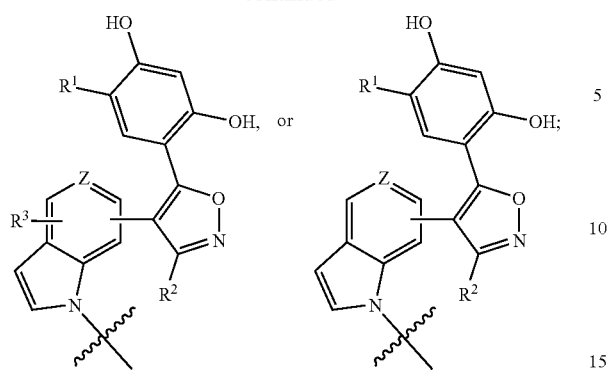
and
Z is N or CH.
3. The compound of claim 2, or a pharmaceutically acceptable salt thereof, wherein Z is CH.
4. The compound of claim 1, wherein each $R^3$ is independently $(C_1\text{-}C_4)$alkyl or halo.
5. The compound of claim 1, or a pharmaceutically acceptable salt thereof, wherein A is
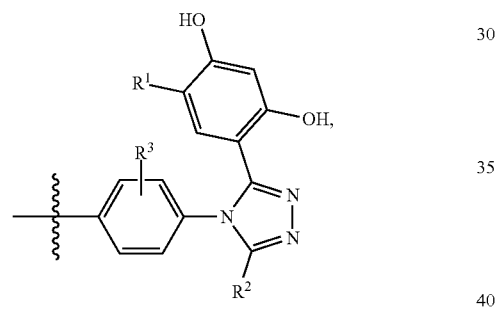
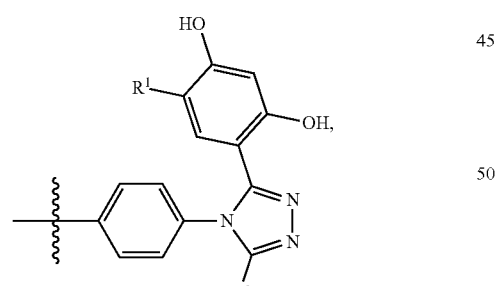
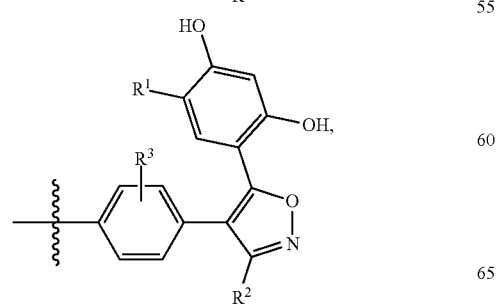
-continued
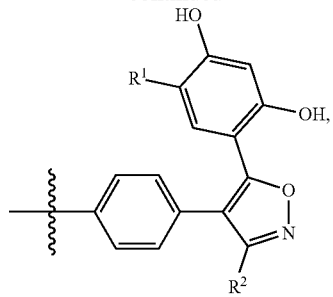
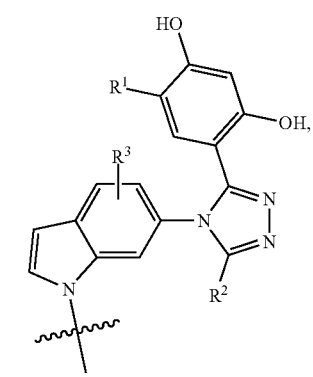
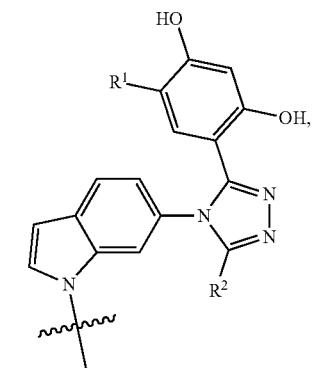
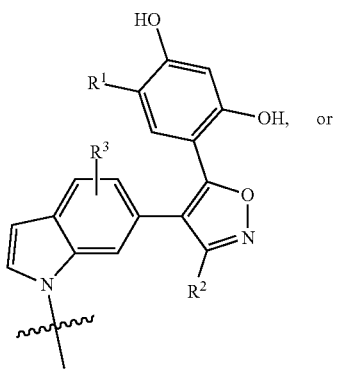

-continued

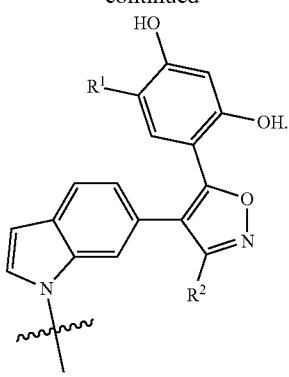

6. The compound of claim 1, or a pharmaceutically acceptable salt thereof, wherein A is

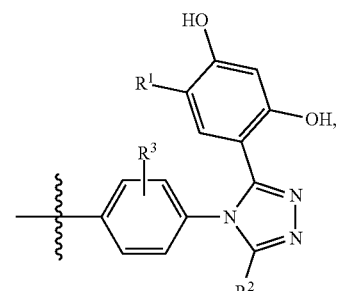

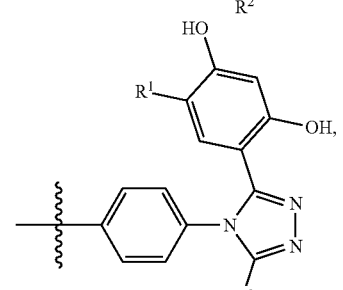

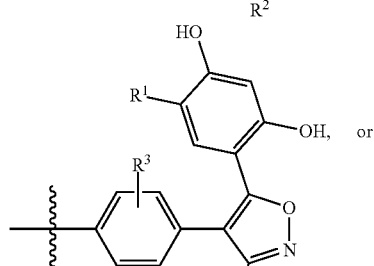 or

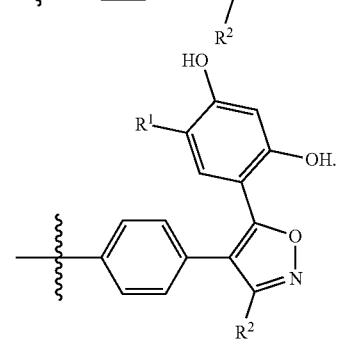

7. The compound of claim 1, or a pharmaceutically acceptable salt thereof, wherein A is

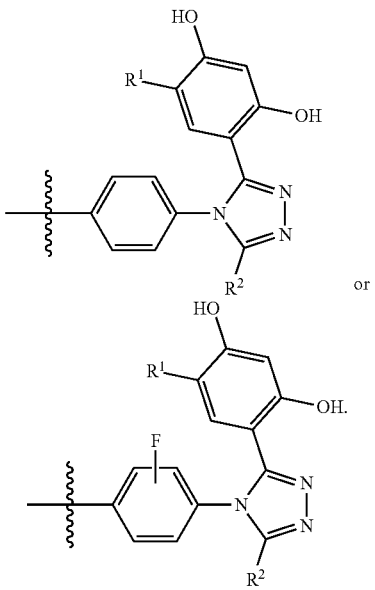

8. The compound of claim 1, or a pharmaceutically acceptable salt thereof, wherein L is *Het$^1$-X$^1$—, *Het$^1$-X$^1$-Het$^2$-X$^2$—, *Het$^1$-X$^1$—(C$_1$-C$_4$)alkylene-Het$^2$-X$^2$—, *Het$^1$-X$^1$-Het$^2$-X$^2$(C$_1$-C$_4$)alkylene-, *—(CH$_2$CH$_2$O)$_o$—(CH$_2$)$_p$-Het$^1$-X$^1$-Het$^2$-(CH$_2$CH$_2$O)$_n$, *—(CH$_2$CH$_2$O)$_n$—(CH$_2$)$_m$-Het$^1$-X$^1$-Het$^2$-X$^2$, *Het$^1$-X$^1$-Phe-X$^2$—NR$^c$—X$^3$, *—(CH$_2$CH$_2$O)$_o$—(CH$_2$)$_p$-Het$^1$-X$^1$-Phe-X$^2$—NR$^c$—(CH$_2$CH$_2$O)$_n$—, *—(CH$_2$CH$_2$O)$_n$—(CH$_2$)$_m$—NR$^c$-Phe-X$^1$—, *—(CH$_2$CH$_2$O)$_o$—(CH$_2$)$_p$—NR$^c$-Phe-(CH$_2$CH$_2$O)$_n$—, *—(CH$_2$CH$_2$O)$_o$—(CH$_2$)$_p$—NR$^c$—(CH$_2$CH$_2$O)$_n$—(CH$_2$)$_m$—, *(CH$_2$CH$_2$O)$_n$—(CH$_2$)$_m$—NR$^c$—(CH$_2$CH$_2$O)$_n$—(CH$_2$)$_m$—C(O)—NR$^d$—(CH$_2$CH$_2$O)$_o$—(CH$_2$)$_p$—, *—(CH$_2$CH$_2$O)$_o$—(CH$_2$)$_p$—NR$^c$—(CH$_2$CH$_2$O)$_n$—(CH$_2$)$_m$-Het$^1$-X$^1$-Het$^2$-X$^2$—, *—(CH$_2$CH$_2$O)$_o$—(CH$_2$)$_p$—NR$^c$—(CH$_2$CH$_2$O)$_n$—(CH$_2$)$_m$-Het$^1$-X$^1$-Het$^2$-X$^2$—(CH$_2$CH$_2$O)$_o$, *NR$^c$—(CH$_2$CH$_2$O)$_n$—(CH$_2$)$_m$-Phe-NH—X$^1$-Het$^1$-X$^2$, *NR$^c$—(CH$_2$CH$_2$O)$_n$—(CH$_2$)$_m$-Phe-NH—X$^1$-Het$^1$-X$^2$—(CH$_2$CH$_2$O)$_o$, *—(CH$_2$CH$_2$O)$_o$—(CH$_2$)$_p$—NR$^c$—(CH$_2$CH$_2$O)$_n$—(CH$_2$)$_m$-Phe-X$^1$—NR$^c$—(CH$_2$CH$_2$O)$_o$—(CH$_2$)$_p$—, *—(CH$_2$CH$_2$O)$_o$—(CH$_2$)$_p$—NR$^c$—(CH$_2$CH$_2$O)$_n$—(CH$_2$)$_m$- Het$^1$-X$^1$—, *—(CH$_2$CH$_2$O)$_o$—(CH$_2$)$_p$—NR$^c$—(CH$_2$CH$_2$O)$_n$—(CH$_2$)$_m$-Het$^1$-X$^1$—(CH$_2$CH$_2$O)$_n$—, *—(CH$_2$CH$_2$O)$_n$—(CH$_2$)$_m$—NR$^c$—(CH$_2$)$_m$—C(O)—NR$^d$-Het$^1$-X$^1$-Het$^2$-(CH$_2$CH$_2$O)$_o$—(CH$_2$)$_p$, or *NR$^c$—(CH$_2$)$_m$—C(O)—NR$^d$—(CH$_2$)$_m$-Het$^1$-X$^1$-Het$^2$-X$^2$;

* indicates the point of attachment to X;

Het$^1$ and Het$^2$ are each independently phenyl, a 4- to 6-membered heterocyclyl, 5- to 7-membered heteroaryl, or a 4- to 6-membered cycloalkyl;

X$^1$, X$^2$, and X$^3$, are each independently C(O) or (CH$_2$)$_r$;

R$^c$ and R$^d$ are each independently hydrogen or (C$_1$-C$_4$) alkyl; and m, n, o, p, and r are each independently integers selected from 0, 1, 2, 3, 4, 5, and 6.

9. The compound of claim 1, wherein the compound is of the Formula II:

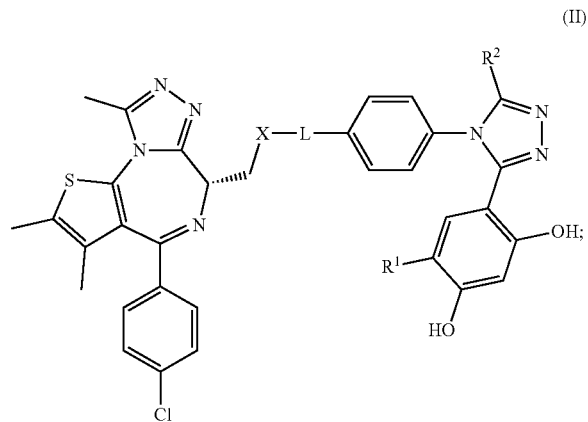

(II)

or a pharmaceutically acceptable salt thereof.

10. The compound of claim 1, or a pharmaceutically acceptable salt thereof, wherein $R^1$ is halo or $(C_1$-$C_4)$alkyl.

11. The compound of claim 1, or a pharmaceutically acceptable salt thereof, wherein $R^1$ is chloro, isopropyl, methyl, propyl, or ethyl.

12. The compound of claim 1, or a pharmaceutically acceptable salt thereof, wherein $R^1$ is isopropyl or ethyl.

13. The compound of claim 1, or a pharmaceutically acceptable salt thereof, wherein $R^2$ is —$OR^a$, —$SR^a$, —C(O)$NR^aR^b$, or —C(O)$NR^a(C_{1-4}$alkylene)$NR^aR^b$.

14. The compound of claim 1, or a pharmaceutically acceptable salt thereof, wherein $R^a$ and $R^b$ are each independently selected from hydrogen and $(C_1$-$C_4)$alkyl, wherein said $(C_1$-$C_4)$alkyl is optionally substituted with 1 to 3 halo or a 6-membered heterocyclyl.

15. The compound of claim 1, or a pharmaceutically acceptable salt thereof, wherein $R^2$ is OH, SH, —C(O)NHCH$_2$CF$_3$, —C(O)NHCH$_2$CH$_3$, —C(O)NH(CH$_2$)$_2$N(CH$_2$CH$_3$)$_2$, —C(O)NHCH (CH$_3$)$_2$, C(O)NH$_2$, —C(O)NH(CH$_2$)$_2$piperidinyl.

16. The compound of claim 1, or a pharmaceutically acceptable salt thereof, wherein $R^2$ is —C(O)NHCH$_2$CF$_3$ or OH.

17. The compound of claim 1, or a pharmaceutically acceptable salt thereof, wherein the compound is of the Formula III:

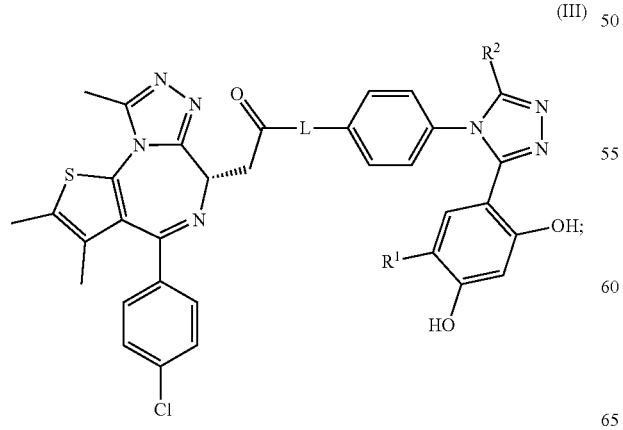

(III)

or a pharmaceutically acceptable salt thereof.

18. The compound of claim 8, or a pharmaceutically acceptable salt thereof, wherein Het$^1$ and Het$^2$ are each independently a 4- to 6-membered heterocyclyl.

19. The compound of claim 1, or a pharmaceutically acceptable salt thereof, wherein L is *Het$^1$-X$^1$—, *Het$^1$-X$^1$-Het$^2$-X$^2$—, *Het$^1$-X$^1$-Het$^2$-(CH$_2$CH$_2$O)$_n$—, *Het$^1$-X$^1$-Phe-X$^2$—NR$^c$—X$^3$—, *Het$^1$-X$^1$-Phe-X$^2$—NR$^c$—(CH$_2$CH$_2$O)$_n$—, *NR$^c$-Phe-X$^1$—, *NR$^c$-Phe-(CH$_2$CH$_2$O)$_n$—, *NR$^c$—(CH$_2$CH$_2$O)$_n$—(CH$_2$)$_m$—, *NR$^c$—(CH$_2$CH$_2$O)$_n$—(CH$_2$)$_m$—C(O)—NR$^d$—(CH$_2$CH$_2$O)$_o$—(CH$_2$)$_p$—, *NR$^c$—(CH$_2$CH$_2$O)$_n$—(CH$_2$)$_m$-Het$^1$-X$^1$-Het$^2$-X$^2$, *NR$^c$—(CH$_2$CH$_2$O)$_n$—(CH$_2$)$_m$-Phe-NH—X$^1$-Het$^1$-X$^2$—, *NR$^c$—(CH$_2$CH$_2$O)$_n$—(CH$_2$)$_m$-Phe-X$^1$-Het$^1$-X$^2$—, *NR$^c$—(CH$_2$CH$_2$O)$_n$—(CH$_2$)$_m$-Phe-X$^1$—NR$^c$—(CH$_2$CH$_2$O)$_o$—(CH$_2$)$_p$—, *NR$^c$—(CH$_2$CH$_2$O)$_n$—(CH$_2$)$_m$-Het$^1$-X$^1$—, *NR$^c$—(CH$_2$)$_m$—C(O)—NR$^d$-Het$^1$-X$^1$-Het$^2$-(CH$_2$CH$_2$O)$_o$—(CH$_2$)$_p$, or*NR$^c$—(CH$_2$)$_m$—C(O)—NR$^d$—(CH$_2$)$_m$-Het$^1$-X$^1$-Het$^2$-X$^2$—.

20. The compound of claim 1, or a pharmaceutically acceptable salt thereof, wherein L is *Het$^1$-X$^1$—(CH$_2$)$_r$, *Het$^1$-X$^1$-Het$^2$-(CH$_2$)$_r$—, *Het$^1$-(CH$_2$)$_r$-Phe-(CH$_2$)$_r$—NR$^c$—(CH$_2$)$_r$—, *NR$^c$-Phe-(CH$_2$)$_r$—, *NR$^c$—(CH$_2$CH$_2$O)$_n$—, *NR$^c$—(CH$_2$)$_m$—, *NR$^c$—(CH$_2$)$_m$—C(O)—NR$^d$—(CH$_2$)$_p$—, *NR$^c$—(CH$_2$)$_m$—C(O)—NR$^d$—(CH$_2$CH$_2$O)$_o$—, *NR$^c$—(CH$_2$)$_m$-Het$^1$-X$^1$-Het$^2$-(CH$_2$)$_r$—, *NR$^c$—(CH$_2$)$_m$-Phe-(CH$_2$)$_r$-Het$^1$-(CH$_2$)$_r$—, *NR$^c$-Phe-NH—C(O)-Het$^1$-(CH$_2$)$_r$—, *NR$^c$—(CH$_2$CH$_2$O)$_n$—(CH$_2$)$_m$-Phe-(CH$_2$)$_o$—NR$^c$—(CH$_2$)$_p$—, or *NR$^c$—(CH$_2$)$_m$—C(O)—NR$^d$—(CH$_2$)$_m$-Het$^1$-X$^1$-Het$^2$-(CH$_2$)$_r$—.

21. The compound of claim 8, or a pharmaceutically acceptable salt thereof, wherein m, n, o, p, and r are each independently integers selected from 0, 1, 2, and 3.

22. The compound of claim 8, or a pharmaceutically acceptable salt thereof, wherein Het$^1$ and Het$^2$ are each independently piperidinyl, piperazinyl, azetidinyl, or pyrrolidinyl.

23. The compound of claim 1, or a pharmaceutically acceptable salt thereof, wherein L is

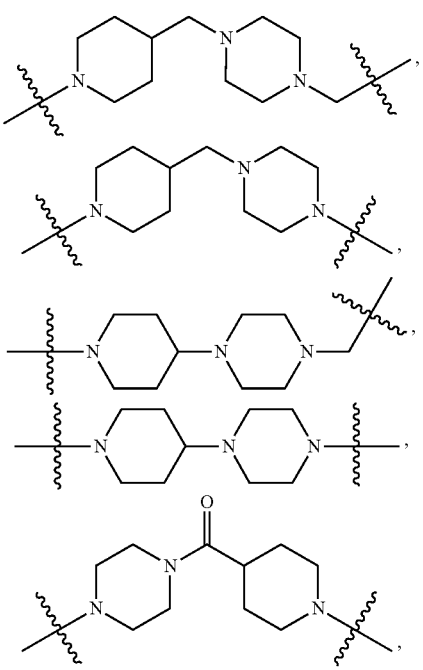

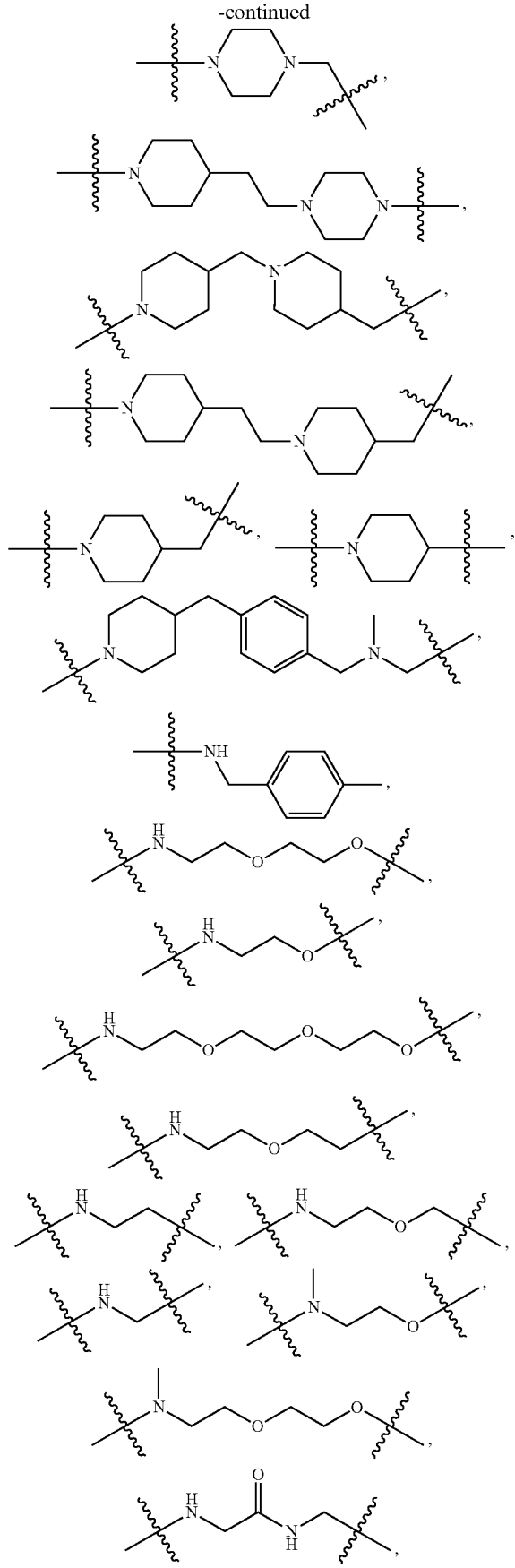
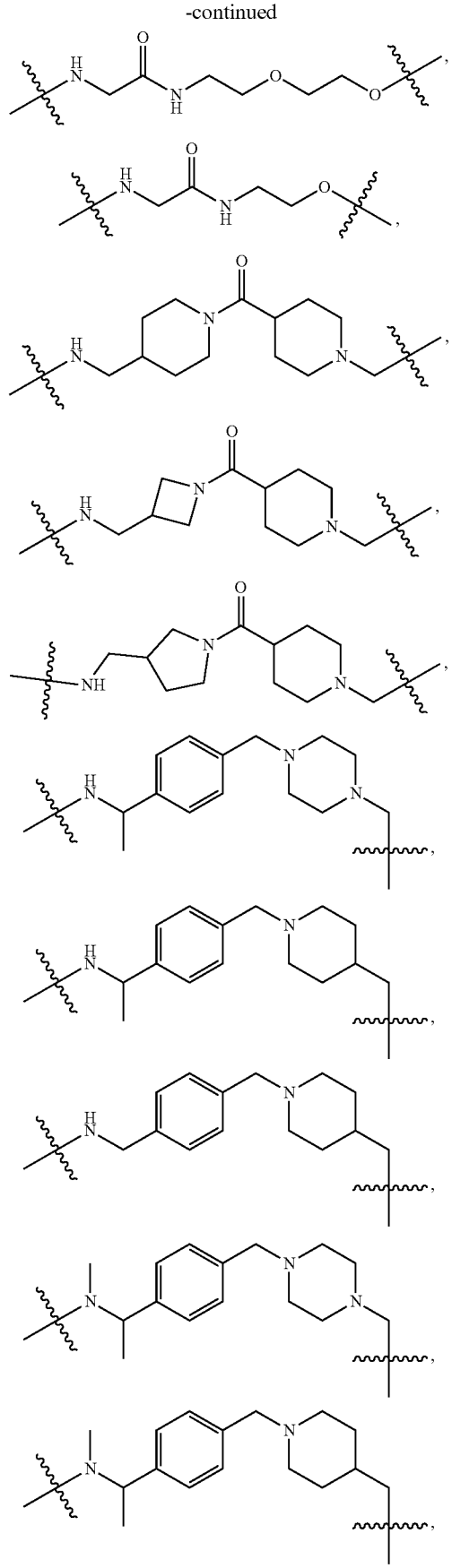

-continued

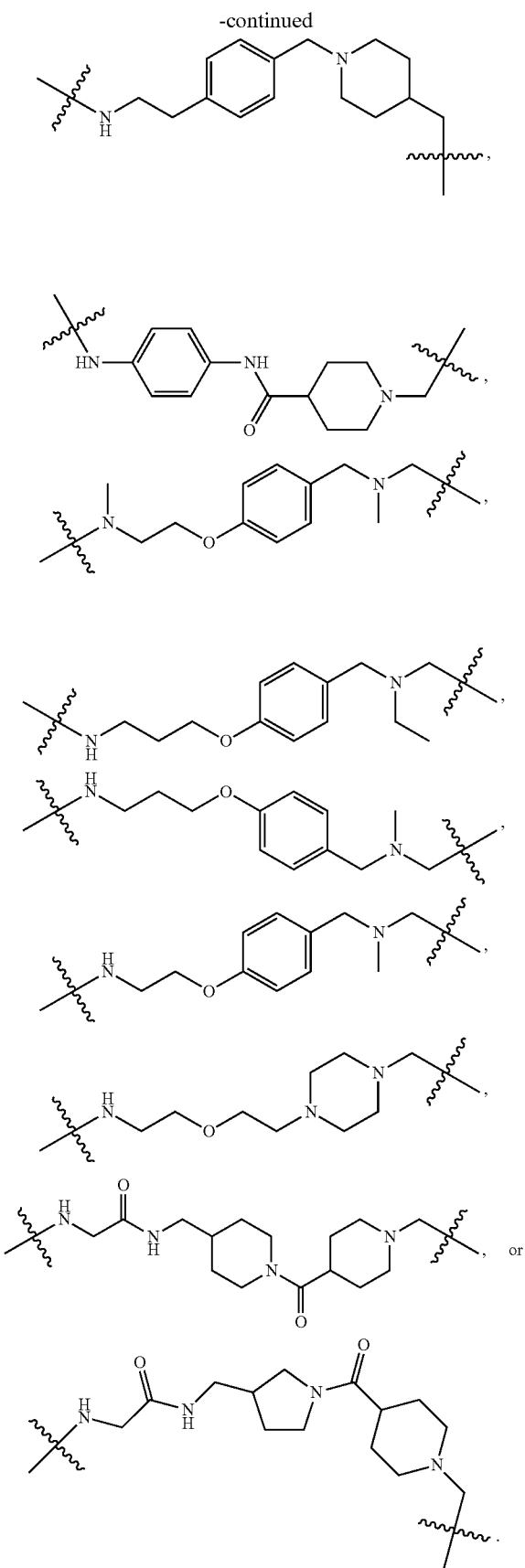

24. The compound of claim 1, wherein the compound is of the Formula IV:

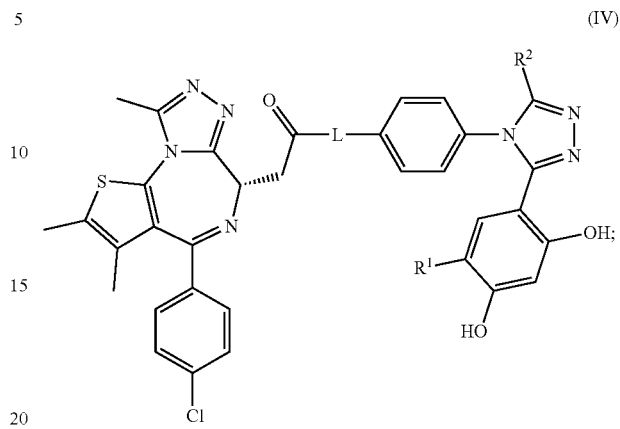

or a pharmaceutically acceptable salt thereof, wherein
R$^1$ is (C$_1$-C$_4$)alkyl;
R$^2$ is —C(O)NR$^a$R$^b$ or OH;
R$^a$ is hydrogen or (C$_1$-C$_2$)alkyl;
R$^b$ is (C$_1$-C$_4$)alkyl optionally substituted with 1 to 3 halo; and
L is *Het$^1$-X$^1$-Het$^2$-X$^2$— or *Het$^1$-X$^1$-Phe-X$^2$—NR$^c$—X$^3$.

25. The compound of claim 24, or a pharmaceutically acceptable salt thereof, wherein R$^a$ is hydrogen.

26. The compound of claim 24, or a pharmaceutically acceptable salt thereof, wherein R$^b$ is (C$_1$-C$_4$)alkyl substituted with 1 to 3 halo.

27. The compound of claim 24, or a pharmaceutically acceptable salt thereof, wherein L is *Het$^1$-(CH$_2$)$_r$-Het$^2$-X$^2$— or *Het$^1$-(CH$_2$)$_r$-Phe-(CH$_2$)$_r$—NR$^c$—(CH$_2$)$_r$.

28. The compound of claim 24, or a pharmaceutically acceptable salt thereof, wherein each r is independently integers selected from 1 and 2.

29. The compound of claim 24, or a pharmaceutically acceptable salt thereof, wherein Het$^1$ and Het$^2$ are each independently piperidinyl or piperazinyl.

30. A pharmaceutical composition comprising the compound of claim 1, or a pharmaceutically acceptable salt thereof; and a pharmaceutically acceptable carrier.

31. A method of treating cancer comprising administering to a subject a therapeutically effective amount of a compound of claim 1, or a pharmaceutically acceptable salt thereof.

32. A compound, wherein the compound is (S)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-isopropylphenyl)-5-hydroxy-4H-1,2,4-triazol-4-yl)benzyl)piperazin-1-yl)methyl)piperidin-1-yl)ethan-1-one, or a pharmaceutically acceptable salt thereof.

33. A pharmaceutical composition comprising (S)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-isopropylphenyl)-5-hydroxy-4H-1,2,4-triazol-4-yl)benzyl)piperazin-1-yl)methyl)piperidin-1-yl)ethan-1-one, or a pharmaceutically acceptable salt thereof; and a pharmaceutically acceptable carrier.

34. A method of treating cancer comprising administering to a subject a therapeutically effective amount of (S)-2-(4-(4-chlorophenyl)-2,3,9-trimethyl-6H-thieno[3,2-f][1,2,4]triazolo[4,3-a][1,4]diazepin-6-yl)-1-(4-((4-(4-(3-(2,4-dihydroxy-5-isopropylphenyl)-5-hydroxy-4H-1,2,4-triazol-4-yl)benzyl)piperazin-1-yl)methyl)piperidin-1-yl)ethan-1-one, or a pharmaceutically acceptable salt thereof.

\* \* \* \* \*